US008515735B2

(12) United States Patent
Chandrasekhar

(10) Patent No.: US 8,515,735 B2
(45) Date of Patent: Aug. 20, 2013

(54) UNIVERSAL SCRIPT THAT ADDRESSES PHONEMIC IDIOSYNCRASY FOR TRANSCRIBING LANGUAGE AND METHODS OF USING THE SAME

(76) Inventor: Prasanna Chandrasekhar, Lakewood, NJ (US)

( * ) Notice: Subject to any disclaimer, the term of this patent is extended or adjusted under 35 U.S.C. 154(b) by 218 days.

(21) Appl. No.: 12/764,094

(22) Filed: Apr. 21, 2010

(65) Prior Publication Data

US 2011/0264441 A1 Oct. 27, 2011

(51) Int. Cl.
*G06F 17/27* (2006.01)

(52) U.S. Cl.
USPC .......................... 704/9; 704/7; 704/8; 704/10

(58) Field of Classification Search
None
See application file for complete search history.

(56) References Cited

U.S. PATENT DOCUMENTS

| | | | | |
|---|---|---|---|---|
| 4,193,212 | A | 3/1980 | Al-Kufaishi | |
| 4,299,577 | A | 11/1981 | Marryman | |
| D327,499 | S | 6/1992 | Lemon | |
| 5,137,383 | A | 8/1992 | Wong | |
| 5,488,363 | A | 1/1996 | Peng | |
| 5,953,692 | A | 9/1999 | Siegel | |
| 6,704,116 | B1 | 3/2004 | Abulhab | |
| 7,987,494 | B1 * | 7/2011 | Donahue | 726/1 |
| 2007/0269248 | A1 | 11/2007 | Markotic | |
| 2010/0125449 | A1 * | 5/2010 | Hsu | 704/8 |

OTHER PUBLICATIONS

Christian Thalmann, The Jovian Language, 2001-2003.*
Thomas Shelton, Wikipedia, http://en.wikipedia.org/wiki/Thomas__Shelton__(stenopgrapher), (date of attribution 1626).
Unifon, Wikipedia, http://en.wikipedia.org/wiki/Unifon, (date of attribution 1950).
Shorthand, Answers.com, http://www.answers.com/topic/short-hand, (date of attribution 1800-1900).
Thomas Shelton, Wikipedia, http://en.wikipedia.org/wiki/Thomas__Shelton, (date of attribution 1626).
Modi script, Omniglot, http://www.omniglot.com/writing/modi.htm, (date of attribution 1600).
Deseret alphabet, Wikipedia, http://wikipedia.org/wiki/Deseret__alphabet, (date of attribution 1800).
Gabelsberger shorthand, Wikipedia, http://en.wikipedia.org/wiki/Gabelsberger__shorthand, (date of attribution 1834).
Tengwar, Wikipedia, http://en.wikipedia.org/wiki/Tengwar, (date of attribution 1930).
Rovenchak, Andrij et al., "Distribution of complexities in the Vai script", Glottometrics, 18: 1-12 (2009).
Weeks, Raymond et al., "The N.E.A. Phonetic Alphabet with a Review of the Whipple Experiments", The New Era Printing Company, Lancaster, PA, pp. 5-8 (1912).

(Continued)

*Primary Examiner* — Leonard Saint Cyr
(74) *Attorney, Agent, or Firm* — Thomas H. Walls; Dann, Dorfman, Herrell and Skillman, P.C.

(57) ABSTRACT

Articles, surfaces, media or educational material containing a universal script, comprised of glyphs derived almost entirely from the Roman script and with only a few new glyphs, for transcription of all the world's languages, with particular attention to a means for expression of the phonemic idiosyncrasies within and between languages and language families are provided.

22 Claims, 182 Drawing Sheets

(56) References Cited

OTHER PUBLICATIONS

Bell, Alex Melville, "Visible Speech: the Science of Universal Alphabetics; or Self-Interpreting Physiological Letters for the Writing of All Lanugages in One Alphabet", Simpkin, Marshall & Co., London; N. Trubner & Co., London and New York, pp. 35-45 (1867).
King, Duane H et al., The Sequoyah Legacy Official Guidebook to the Sequoyah Birthplace Museum, Cherokee Communications, Cherokee, NC, p. 40—(1988).
The World's Writing Systems, Section 55: The Cree Syllabary, Chipewyan, Peter T. Daniels and William Bright eds., Oxford University Press, p. 609 (1996).
The World's Writing Systems, Section 55: The Cree Syllabary, Peter T. Daniels and William Bright eds., Oxford University Press, p. 601 (1996).
The World's Writing Systems, Section 52: The Invention of Writing, The Fraser Script, Peter T. Daniels and William Bright eds., Oxford University Press, p. 609 (1996).
The World's Writing Systems, Section 55: The Cree Syllabary, Inuit (Eskimo) languages, Peter T. Daniels and William Bright eds., Oxford University Press, p. 607 (1996).
The World's Writing Systems, Section 54: Scripts of West Africa, T. Daniels and William Bright eds., Oxford University Press, p. 593 (1996).
The World's Writing Systems, Part IX: Scripts Invented in Modern Times, The Pollard Script, Peter T. Daniels and William Bright eds., Oxford University Press, p. 580 (1996).
The World's Writing Systems, Section 56: Scripts for Munda Languages, Peter T. Daniels and William Bright eds., Oxford University Press, p. 613 (1996).
The World's Writing Systems, Section Part IX: Scripts Invented in Modern Times, Pahawh, Peter T. Daniels and William Bright eds., Oxford University Press, p. 620 (1996).
Owens, Robert L., The Global Alphabet, "Instructions on Writing with Global Alphabet", United States Government Printing Office, Washington, pp. 8-9 (1944).
Graham, Andrew, The Hand-Book of Standard or American Phonography, "Advantages of Phonography" (1886).
Evans, John Comstock, Shorthand, "Alphabet of Evans Scientific Speed Shorthand", p. viii (1946).
Leslie, Louis A. et al., Gregg Shorthand Manual Simplified Functional Method, The Gregg Publishing Company, pp. 1-5 (1949).
Albright, Robert William, International Journal of American Linguistics, Part III, "Early Backgrounds", 24(1): 1-17 (1958).
Albright, Robert William, International Journal of American Linguistics, Part III, "Nineteenth Century Backgrounds", 24(1): 18-46 (1958).
Handbook of the International Phonetic Association, A guide to the use of the International Phonetic Alphabet, Cambridge University Press, Cambridge University Press (1999).
Japanese writing system, Wikipedia, http://en.wikipedia.org/wiki/Japanese_script, (date of attribution 2009).
Johnston, Harry, Phonetic Spelling, A proposed Universal Alphabet for the rendering of English, French, German and all other forms of Speech, Cambridge University Press, pp. 42-46 (1913).
Densapa, Tashi, Bulletin of Tibetology, "A Short Biography of 'Gromgon Chos-rgyal 'Phags-pa", 13: 5-14 (1977).
'Phags-pa script, Wikipedia, http://en.wikipedia.org/wiki%27Phags-pa_script, pp. 1-4 (date of attribution 2009).
Pike, Kenneth L., Phonemics, A Technique for Reducing Languages to Writing, "Phonetic Symbolism", University of Michigan Press, Ann Arbor, pp. 5-7 (1947).
Story, Charles A., The Fonetic Primer Offering the Universal Alfabet and the Science of Spelling, Isaac H. Blanchard Company, New York City, NY, pp. 7-13 (1906).
Nouvel Abecedaire, "New Abecedaire or Syllabic Alphabet", Chez A.J. Blocquerst, Philadelphia (1811).
Ewing, James, The Columbian Alphabet, Published Trenton, NJ, 1798.
The World's Writing Systems, Peter T. Daniels and William Bright eds., Oxford University Press, p. 383 (1996).
The World's Writing Systems, Part IX: Scripts Invented in Modern Times, "The Alaska script", "The Ndjuka script" and "The Caroline Islands script", Peter T. Daniels and William Bright eds., Oxford University Press, p. 584 (1996).

* cited by examiner

Y CROSS-SECTIONS OF THE 3-D VOWEL CLASSIFICATION MATRIX

THE FULL PHONAL VOWEL CLASSIFICATION MATRIX

*(Reduced from five dimensions to three)*

Key

"Y= 1 CROSS-SECTION"

*(Y=1, Tongue position= Medio-palatal [IPA nomenclature "front", and "front-central"])*

"Y= 1 CROSS-SECTION"

*(Y=1, Tongue position= Medio-palatal [IPA nomenclature "front", and "front-central"])*

(X) LIP POSITION

"Y= 1 CROSS-SECTION"

*(Y=1, Tongue position= Medio-palatal [IPA nomenclature "front", and "front-central"])*

"Y= 2 CROSS-SECTION"

*(Y=2, Tongue position= Flat [IPA nomenclature "central"])*

"Y= 2 CROSS-SECTION"

*(Y=2, Tongue position= Flat [IPA nomenclature "central"])*

FIG. 9

"Y= 2 CROSS-SECTION"

*(Y=2, Tongue position= Flat [IPA nomenclature "central"])*

(X) LIP POSITION

| (+Z) VERTICAL JAW POSITION | STRETCHED | FLAT | ROUNDED |
|---|---|---|---|
| Close-mid | *(2,4) | *(2,4) | *(2,4) |

"Y= 2 CROSS-SECTION"

*(Y=2, Tongue position= Flat [IPA nomenclature "central"])*

"Y= 3 CROSS-SECTION"

*(Y=3, Tongue position= Retracted [IPA nomenclature "back"])*

"Y= 3 CROSS-SECTION"

*(Y=3, Tongue position= Retracted [IPA nomenclature "back"])*

FIG. 13

"Y= 3 CROSS-SECTION"

*(Y=3, Tongue position= Retracted [IPA nomenclature "back"])*

(X) LIP POSITION

| (+Z) VERTICAL JAW POSITION | STRETCHED | FLAT | ROUNDED |
|---|---|---|---|
| Close-mid | *(2,4) | *(2,4) | *(2,4) |

FIG. 14

"Y= 3 CROSS-SECTION"

*(Y=3, Tongue position= Retracted [IPA nomenclature "back"])*

(X) LIP POSITION (+Z) VERTICAL JAW POSITION

| | STRETCHED | FLAT | ROUNDED |
|---|---|---|---|
| Close | *(2,4) | *(2,4) | 3(3)(1) उ IPA: u ʊ ɯ *(1) (5)<br>u U u U<br>English book pull<br>Hindi/Urdu kintu, "however" किन्तु<br>uu Uu uu Uu<br>Spanish<br>English bool<br>Hindi/Urdu luu, "you"<br>Tu |

FIG. 15

"Y= 4 CROSS-SECTION"

(Y=4, Centrals ("r" sounds), Tongue position= Apico-RETROFLEX)

(X) LIP POSITION (+Z) VERTICAL JAW POSITION

| | STRETCHED | FLAT | ROUNDED |
|---|---|---|---|
| Open | *(2,4) | *(2,4) | *(2,4) |

FIG. 16

"Y= 4 CROSS-SECTION"

*(Y=4, Centrals ("r" sounds), Tongue position= Apico-RETROFLEX)*

(X) LIP POSITION

| (+Z) VERTICAL JAW POSITION | STRETCHED | FLAT | ROUNDED |
|---|---|---|---|
| Open-mid | *(2,4) | *(2,4) | *(2,4) |

FIG. 18

"Y= 4 CROSS-SECTION"

(Y=4, Centrals ("r" sounds), Tongue position= Apico-RETROFLEX)

(X) LIP POSITION (+Z) VERTICAL JAW POSITION

| | STRETCHED | FLAT | ROUNDED |
|---|---|---|---|
| Close | *(2,4) | *(2,4) | *(2,4) |

"Y= 4 CROSS-SECTION"

*(Y=4, Centrals ("r" sounds), Tongue position= Apico-RETROFLEX)*

(X) LIP POSITION

FIG. 20

"Y= 4 CROSS-SECTION"

*(Y=4, Centrals ("r" sounds), Tongue position= Apico-RETROFLEX)*

(X) LIP POSITION (-Z) HORIZONTAL JAW POSITION

| | STRETCHED | FLAT | ROUNDED |
|---|---|---|---|
| Close-mid Jaw Back | *(2,4) | *(2,4) | *(2,4) |

FIG. 21

"Y= 5 CROSS-SECTION"

*(Y=5, Laterals ("L" sounds), Tongue position= Apico-RETROFLEX)*

(X) LIP POSITION

| (+Z) VERTICAL JAW POSITION | STRETCHED | FLAT | ROUNDED |
|---|---|---|---|
| Open | *(2,4) | *(2,4) | *(2,4) |

FIG. 22

"Y= 5 CROSS-SECTION"

*(Y=5, Laterals ("L" sounds), Tongue position= Apico-RETROFLEX)*

(X) LIP POSITION

| (+Z) VERTICAL JAW POSITION | STRETCHED | FLAT | ROUNDED |
|---|---|---|---|
| Open-mid | *(2,4) | *(2,4) | *(2,4) |

"Y= 5 CROSS-SECTION"

*(Y=5, Laterals ("L" sounds), Tongue position= Apico-RETROFLEX)*

FIG. 24

"Y= 5 CROSS-SECTION"

*(Y=5, Laterals ("L" sounds), Tongue position= Apico-RETROFLEX)*

(X) LIP POSITION

| (+Z) VERTICAL JAW POSITION | STRETCHED | FLAT | ROUNDED |
|---|---|---|---|
| Close | *(2,4) | *(2,4) | *(2,4) |

FIG. 25

"Y= 6 CROSS-SECTION"

*(Y=6, Centrals ("r" sounds), Tongue position= Apico-PALATAL)*

(X) LIP POSITION (+Z) VERTICLE JAW POSITION

| | STRETCHED | FLAT | ROUNDED |
|---|---|---|---|
| Open | *(2,4) | *(2,4) | *(2,4) |
| Open-mid | *(2,4) | *(2,4) | *(2,4) |
| Close-mid | | | |
| Close | *(2,4) | *(2,4) | *(2,4) |

The "central" variant of this artition is rare and is not phonemically significant in any major language. It is thus not used in NAVLIPI.

FIG. 26

"Y= 7 CROSS-SECTION"

*(Y=7, Laterals ("L" sounds), Tongue position= Apico-PALATAL)*

(X) LIP POSITION

| | STRETCHED | FLAT | ROUNDED |
|---|---|---|---|
| Open | *(2,4) | *(2,4) | *(2,4) |

(+Z) VERTICAL JAW POSITION

FIG. 27

“Y= 7 CROSS-SECTION”

*(Y=7, Laterals (“L” sounds), Tongue position= Apico-PALATAL)*

(X) LIP POSITION

| (+Z) VERTICAL JAW POSITION | STRETCHED | FLAT | ROUNDED |
|---|---|---|---|
| Open-mid | *(2,4) | *(2,4) | *(2,4) |

"Y= 7 CROSS-SECTION"

*(Y=7, Laterals ("L" sounds), Tongue position= Apico-PALATAL)*

(X) LIP POSITION

FIG. 29

"Y= 7 CROSS-SECTION"

*(Y=7, Laterals ("L" sounds), Tongue position= Apico-PALATAL)*

(X) LIP POSITION (+Z) VERTICAL JAW POSITION

| | STRETCHED | FLAT | ROUNDED |
|---|---|---|---|
| Close | *(2,4) | *(2,4) | *(2,4) |

FIG. 30

"Y= 8 CROSS-SECTION"

*(Y=8, Centrals ("r" sounds), Tongue position= {Apico} [ALVEOLO-DENTAL] ) (Most common "r"-sound)*

(X) LIP POSITION

| (+Z) VERTICAL JAW POSITION | STRETCHED | FLAT | ROUNDED |
|---|---|---|---|
| Open | *(2,4) | *(2,4) | *(2,4) |

FIG. 31

"Y= 8 CROSS-SECTION"

*(Y=8, Centrals ("r" sounds), Tongue position= {Apico} [ALVEOLO-DENTAL] ) (Most common "r"-sound)*

(X) LIP POSITION (+Z) VERTICAL JAW POSITION

| | STRETCHED | FLAT | ROUNDED |
|---|---|---|---|
| Open-mid | *(2,4) | *(2,4) | *(2,4) |

“Y= 8 CROSS-SECTION”

*(Y=8, Centrals (“r” sounds), Tongue position= {Apico} [ALVEOLO-DENTAL] ) (Most common “r”-sound)*

(X) LIP POSITION

FIG. 33

"Y= 8 CROSS-SECTION"

*(Y=8, Centrals ("r" sounds), Tongue position= {Apico} [ALVEOLO-DENTAL] ) (Most common "r"-sound)*

(X) LIP POSITION

| (+Z) VERTICAL JAW POSITION | STRETCHED | FLAT | ROUNDED |
|---|---|---|---|
| Close | *(2,4) | *(2,4) | *(2,4) |

FIG.34

"Y= 10 CROSS-SECTION"

*(Y=10, Centrals ("r" sounds), Tongue position= INTERDENTAL)*

(Most common *"l"-sound*)

(X) LIP POSITION (+Z) VERTICLE JAW POSITION

| | STRETCHED | FLAT | ROUNDED |
|---|---|---|---|
| Open | *(2,4) | *(2,4) | *(2,4) |
| Open-mid | *(2,4) | *(2,4) | *(2,4) |
| Close-mid | Difficult to Articulate and not phonemically significant in any language. Thus not used. | | (2,4) |
| Close | *(2,4) | *(2,4) | *(2,4) |

FIG. 35

"Y= 11 CROSS-SECTION"

*(Y=11, Laterals ("L" sounds), Tongue position= (Apico) [SupraDental])*

(X) LIP POSITION

| (+Z) VERTICAL JAW POSITION | STRETCHED | FLAT | ROUNDED |
|---|---|---|---|
| Open | *(2,4) | *(2,4) | *(2,4) |

FIG. 36

"Y= 11 CROSS-SECTION"

*(Y=11, Laterals ("L" sounds), Tongue position= {Apico} [SupraDental])*

(X) LIP POSITION

| (+Z) VERTICAL JAW POSITION | STRETCHED | FLAT | ROUNDED |
|---|---|---|---|
| Open-mid | *(2,4) | *(2,4) | *(2,4) |

"Y= 11 CROSS-SECTION"

*(Y=11, Laterals ("L" sounds), Tongue position= {Apico} [SupraDental])*

FIG. 38

"Y= 11 CROSS-SECTION"

*(Y=11, Laterals ("L" sounds), Tongue position= {Apico} [SupraDental])*

(X) LIP POSITION

| (+Z) VERTICAL JAW POSITION | STRETCHED | FLAT | ROUNDED |
|---|---|---|---|
| Close | *(2,4) | *(2,4) | *(2,4) |

FIG. 39

"Y= 12 CROSS-SECTION"

*(Y=12, Nasals ("m" sounds), Tongue position= Nasal/Bilabial)*

(X) LIP POSITION (+Z) VERTICAL JAW POSITION

| | STRETCHED | FLAT | ROUNDED |
|---|---|---|---|
| Open | *(2,4) | *(2,4) | *(2,4) |

FIG. 40

"Y= 12 CROSS-SECTION"

*(Y=12, Nasals ("m" sounds), Tongue position= Nasal/Bilabial)*

(X) LIP POSITION

| (+Z) VERTICAL JAW POSITION | STRETCHED | FLAT | ROUNDED |
|---|---|---|---|
| Open-mid | *(2,4) | *(2,4) | *(2,4) |

FIG. 41

"Y= 12 CROSS-SECTION"

*(Y=12, Nasals ("m" sounds), Tongue position= Nasal/Bilabial)*

(X) LIP POSITION (+Z) VERTICAL JAW POSITION

| | STRETCHED | FLAT | ROUNDED |
|---|---|---|---|
| Close-mid | *(2,4) | 2(12)(2) IPA: * (13) (15)<br>$m_0m_0$ $M_0m_0$<br>South African name M Beki<br>NOT APPLICABLE | *(2,4) |

FIG. 42

"Y= 12 CROSS-SECTION"

*(Y=12, Nasals ("m" sounds), Tongue position= Nasal/Bilabial)*

(X) LIP POSITION (+Z) VERTICAL JAW POSITION

| | STRETCHED | FLAT | ROUNDED |
|---|---|---|---|
| Close | *(2,4) | *(2,4) | *(2,4) |

"Y= 13 CROSS-SECTION"

*(Y=13, Nasals ("n" sounds), Tongue position= Nasal Dental-Aveolar-Palatal-Retroflex)*

(X) LIP POSITION (+Z) VERTICAL JAW POSITION

FIG. 44

"Y= 13 CROSS-SECTION"

*(Y=13, Nasals ("n" sounds), Tongue position= Nasal Dental-Aveolar-Palatal-Retroflex)*

(X) LIP POSITION (+Z) VERTICAL JAW POSITION

| | STRETCHED | FLAT | ROUNDED |
|---|---|---|---|
| Open-mid | *(2,4) | *(2,4) | *(2,4) |

"Y= 13 CROSS-SECTION"

*(Y=13, Nasals ("n" sounds), Tongue position= Nasal Dental-Aveolar-Palatal-Retroflex)*

(X) LIP POSITION

FIG. 46

"Y= 13 CROSS-SECTION"

*(Y=13, Nasals ("n" sounds), Tongue position= Nasal Dental-Aveolar-Palatal-Retroflex)*

(X) LIP POSITION (+Z) VERTICAL JAW POSITION

| | STRETCHED | FLAT | ROUNDED |
|---|---|---|---|
| Close | *(2,4) | *(2,4) | *(2,4) |

FIG. 47

"Y= 14 CROSS-SECTION"
*(Y=14, Nasals Sounds, Tongue position= Velar-uvular)*

(X) LIP POSITION (+Z) VERTICLE JAW POSITION

| | STRETCHED | FLAT | ROUNDED |
|---|---|---|---|
| Open | *(2,4) | *(2,4) | *(2,4) |
| Open-mid | *(2,4) | *(2,4) | *(2,4) |
| Close-mid | *(2,4) | *(2,4) | *(2,4) |
| Close | *(2,4) | *(2,4) | *(2,4) |

FIG.48

FOOTNOTES FOR MAIN NAVLIPI TABLES (MATRICES)

A. VOWEL MATRIX

1. Due to the need for discretization and practical consideration of actual phonemic distinctions in major languages (the "practical phonemics" aspect of Navlipi), all these IPA phones are taken to be represented by this single Navlipi glyph.

2. Phonemic distinction rare or nonexistent in any major language.

3. Length not phonemically distinct for this vowel in nearly all languages. Shown here for completeness only. Not part of main Navlipi script as presented for teaching.

4. Not used in Navlipi.

5. English examples given do not strictly belong to this phone. However, they are cited here due to the "practical phonemics" aspect of Navlipi.

6. See discussion on the probable original significance of these Dewanaagari letters in Chapter 8 (i.e., pure vowels, not diphthongs).

7. Example words cited use the semivowel derived from this vowel.

8. This central phone, i.e. r-sound, is inexplicably treated as a lateral phone (l-sound) in Maraathi and Tamil orthography.

9. This phone is prominent only in Dravidian languages. In other languages where it is found, e.g. Panjaabi, it is phonemically indistinct from the apico-dental phone.

10. Tongue contact for this phone is actually closer to the medio- position. However, rather than writing "apico-medio-palatal", we retain "apico-palatal" due to phonemic indistinctiveness.

11. American English articulation is strictly with lips rounded, i.e. 2(9)(3) rather than 2(9)(2). But once again, from the "practical phonemics" aspect of Navlipi, it is classed as 2(9)(2).

12. IPA glyphs cited here are for corresponding semivowels.

13. (Supra/infra)-labiodental vowels are phonemically indistinct in all languages, so not treated of.

14. Dental, alveolar and palatal are grouped together here because no major language makes a phonemic distinction between these. Distinction with the other nasal vowel (m0) is that lips are open here.

15. It is important to note that these are true nasal vowels, according to our definition, and do not just represent nasalization of other, non-nasal vowels.

| | PLOSIVES | | | | |
|---|---|---|---|---|---|
| | UNVOICED (SURD) | | VOICED (SONANT) | | NASALS |
| | X=11 UNASPIRATED | ASPIRATED | UNASPIRATED | ASPIRATED | |
| INTERDENTAL | 1-12 Not phonemically distinct from Standard Dental in most major languages, so not used. | 2-12 | 3-12 | 4-12 | 5-12 |
| INFRA-LABIO-SUPRADENTAL (NO TONGUE CONTACT) | 1-13 | 2-13 | 3-13 | 4-13 | 5-13 |

| | CLICKS-INGRESSIVE | | | | | | | |
|---|---|---|---|---|---|---|---|---|
| | CENTRAL *(7) | | | | LATERAL | | | |
| | SINGLE | | | TRILL OR CONTINUOUS | SINGLE | | | TRILL OR CONTINUOUS |
| | X-14 UNVOICED | VOICED | NASAL | | UNVOICED | VOICED | NASAL | |
| Y-1 GLOTTAL | 14-1 | 15-1 | 16-1 | 17-1 | 18-1 | 19-1 | 20-1 | 21-1 |
| PHARYNGEAL | 14-2 | 15-2 | 16-2 | 17-2 | 18-2 | 19-2 | 20-2 | 21-2 |

| | CLICKS-INGRESSIVE | | | | | | | |
|---|---|---|---|---|---|---|---|---|
| | CENTRAL *(7) | | | | LATERAL | | | |
| | SINGLE | | | TRILL OR CONTINUOUS | SINGLE | | | TRILL OR CONTINUOUS |
| | X=14 UNVOICED | VOICED | NASAL | | UNVOICED | VOICED | NASAL | |
| APICO/ MEDIO- DENTAL | 14-9 | 15-9 | 16-9 | 17-9 | 18-9 | 19-9 | 20-9 | 21-9 |
| STANDARD DENTAL | 14-10 ǀ *10 tz Tz | 15-10 | 16-10 | 17-10 | 18-10 Phonemically indistinct from alveolar (#8) in nearly all languages, so not used. | 19-10 | 20-10 | 21-10 |

| | CLICKS-INGRESSIVE | | | | | | | |
|---|---|---|---|---|---|---|---|---|
| | CENTRAL *(7) | | | | LATERAL | | | |
| | SINGLE | | | TRILL OR CONTINUOUS | SINGLE | | | TRILL OR CONTINUOUS |
| | UNVOICED | VOICED | NASAL | | UNVOICED | VOICED | NASAL | |
| Y=11<br>PHARYNGEALIZED<br>DENTAL | 14-11 | 15-11 | 16-11 | 17-11 | 18-11 | 19-11 | 20-11 | 21-11 |

| | CLICKS-INGRESSIVE | | | | | | | |
|---|---|---|---|---|---|---|---|---|
| | CENTRAL *(7) | | | | LATERAL | | | |
| | SINGLE | | | TRILL OR CONTINUOUS | SINGLE | | | TRILL OR CONTINUOUS |
| | UNVOICED | VOICED | NASAL | | UNVOICED | VOICED | NASAL | |
| INTERDENTAL | 14-12 | 15-12 Treated the same as Dental (#10), since phonemically indistinct in most click languages. | 16-12 | 17-12 | 18-12 | 19-12 | 20-12 | 21-12 |
| INFRA-LABIO-SUPRADENTAL (NO TONGUE CONTACT) | 14-13 | 15-13 Can be articulated, but not phonemically used in any known language. | 16-13 | 17-13 | 18-13 | 19-13 | 20-13 | 21-13 |

| | CLICKS-INGRESSIVE | | | | | | | |
|---|---|---|---|---|---|---|---|---|
| | CENTRAL *(7) | | | | LATERAL | | | |
| | SINGLE | | | TRILL OR CONTINUOUS | SINGLE | | | TRILL OR CONTINUOUS |
| | UNVOICED | VOICED | NASAL | | UNVOICED | VOICED | NASAL | |
| SUPRA-LABIO-INFRADENTAL (NO TONGUE CONTACT) | 14-14 | 15-14 | 16-14 | 17-14 | 18-14 | 19-14 | 20-14 | 21-14 |
| BILABIAL (NO TONGUE CONTACT) | 14-15 pz pž Pz Pž | 15-15 | 16-15 | 17-15 | 18-15 | 19-15 | 20-15 | 21-15 |

| | CLICKS-EGRESSIVE | | EJECTIVES | | IMPLOSIVES | |
|---|---|---|---|---|---|---|
| | CENTRAL X=22 | LATERAL | UNVOICED | FRICATIVE | UNVOICED | VOICED |
| Y=1 GLOTTAL | 22-1 | 23-1 | 24-1 | 25-1 | 26-1 | 27-1 |

| | CLICKS-EGRESSIVE | | EJECTIVES | | IMPLOSIVES | |
|---|---|---|---|---|---|---|
| | CENTRAL X=22 | LATERAL | UNVOICED | FRICATIVE | UNVOICED | VOICED |
| PHARYNGEAL | 22-2 | 23-2 | 24-2 | 25-2 | 26-2 | 27-2 |
| UVULAR | 22-3 | 23-3 | 24-3 | 25-3 | 26-3 | 27-3 |

| | CLICKS-EGRESSIVE | | EJECTIVES | | IMPLOSIVES | |
|---|---|---|---|---|---|---|
| | CENTRAL X=22 | LATERAL | UNVOICED | FRICATIVE | UNVOICED | VOICED |
| Y=6 MEDIO-PALATAL | 22-6 | 23-6 | 24-6 | 25-6 | 26-6 | 27-6 |

| | CLICKS-EGRESSIVE | | EJECTIVES | | IMPLOSIVES | |
|---|---|---|---|---|---|---|
| | CENTRAL X=22 | LATERAL | UNVOICED (SURD) | FRICATIVE | UNVOICED (SURD) | VOICED (SONANT) |
| Y=11 PHARYNGEALIZED DENTAL | 22-11 | 23-11 | 24-11 | 25-11 | 26-11 | 27-11 |

FOOTNOTES FOR MAIN NAVLIPI TABLES (MATRICES) B. NON VOWEL MATRIX

1. Cursive handwriting of this phone is as shown in the illustration:

2. Should correctly be ɔh$_0$, i.e. ɔ plus the post-op for fricatives, h$_0$. However, an exception is made for purposes of recognizability and correspondence to the currently used English sh, German sch, French ch, etc.

3. As for the corresponding unvoiced phone (sh$_0$), this should correctly be ɟh$_0$, i.e. ɟ plus the post-op for fricatives, h$_0$. However, an exception is made again for purposes of recognizability, since zh is the customary phonetic transcription of this phone in Roman script.

4. Common Mandarin articulation of Xie Xie ("thank you") is strictly between alveolar and standard-dental artitions. But once again, from the "practical phonemics" aspect of Navlipi, we place it here.

5. The same glyph (n) is used to represent 5-8 (alveolar nasal) and 5-10 (dental nasal) since these two are phonemically distinct in virtuallyno major languages.

6. (re 8-8) This glyph also represents the phonemic condensate (semivowel + flap) etc. since this is the "common r".

7. For simplicity, and again from the "practical phonemics" aspect of Navlipi, a distinction is not made between a simple click and an affricate click.

8. The English "tsk tsk" click is also articulated as a standard-dental click in some pronunciations, and would thus qualify under this phone as well, i.e. it would be placed here.

9. Zulu also has aspirated variants of the retroflex and alveolar unvoiced clicks listed here. However, closer analysis reveals that these are in fact clicks quickly followed by aspiration. Thus, rather than warranting the use of the aspirate postop (h$_0$), they are best expressed as simple glottal aspirations, i.e. with h only.

10. The (z plus ') is chosen, rather than the (') alone, to avoid possible confusion with the apostrophe. Since in Navlipi the z, i.e. the post-op for clicks (z with cross-out), will be a rare letter (as opposed to the common z), any transcription with the apostrophe, i.e. z', will be instantly recognized as distinct from the apostrophe alone.

11. This click is used as an obscene articulation in some countries, eg. in Brazil and among the eunuch (*hijra*) community in India.

12. Georgian also has phonemes which are afficate variants of *ttz'*, made by adding the medio-dental fricative, i.e. the common "s", and the palatal fricative (the common "sh", *sh$_0$* in Navlipi). These can be readily transcribed by adding these fricatives to the parent phone, getting *ttz's* and *ttz'sh$_0$*. Thus, they are not treated of separately here.

13. The Mandarin glyph (X) is actually post-alveolar with jaw open-mid (vs. pure alveolar with jaw close-mid). However, for "practical phonemics" purposes, characteristic of Navlipi, it is placed here.

FIG. 88

SIMPLE SEMIVOWELS

| | PHONO CHROMATICITY | | |
|---|---|---|---|
| | PARENT VOWEL<br>X= (IF APPLICABLE) | SEMI-VOWEL *(1) | PHONEMIC CONDENSATES |
| ARTITION<br>Y=<br>BILABIAL<br>*(tongue back, lips rounded)* | v [3(3)(1)]<br>u | IPA: 28-15 *(2)<br>example* W<br>W | |

*(1) A semi-vowel is written as a combination of the parent vowel followed by either a ], [ i ], [ u ], etc.

*(2) F is used for jaw forward position in the artition. This is the only non vowel for which a jaw forward artition exists within *NAVLIPI*.

FIG. 89

SIMPLE SEMIVOWELS

| | | PHONO CHROMATICITY | | |
|---|---|---|---|---|
| | | PARENT VOWEL X= (IF APPLICABLE) | SEMI-VOWEL *(1) | PHONEMIC CONDENSATES |
| ARTITION | BILABIAL *(tongue central, lips flat)* | | IPA: 28-19b *(2) example* W° W° 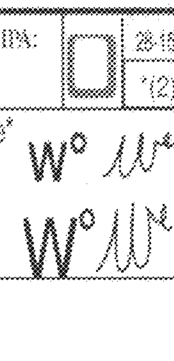 | |

*(1) A semi-vowel is written as a combination of the parent vowel followed by either a ], [ i ], [ u ], etc.

*(2) F is used for jaw forward position in the artition. This is the only non vowel for which a jaw forward artition exists within *NAVLIPI*.

FIG. 90

SIMPLE SEMIVOWELS

| ARTITION | | PHONO CHROMATICITY | | |
|---|---|---|---|---|
| | | PARENT VOWEL<br>X= (IF APPLICABLE) | SEMI-VOWEL *(1) | PHONEMIC<br>CONDENSATES |
| | STANDARD PALATAL | v [1(1)(1)]<br>i | IPA: 28-7<br>example* j<br>J | |

*(1) A semi-vowel is written as a combination of the parent vowel followed by either a ], [ i ], [ u ], etc.

*(1) A semi-vowel is written as a combination of the parent vowel followed by either a ], [ i ], [ u ], etc.

FIG. 92

SIMPLE SEMIVOWELS

| | | PHONO CHROMATICITY | | |
|---|---|---|---|---|
| | | PARENT VOWEL<br>X= (IF APPLICABLE) | SEMI-VOWEL *(1) | PHONEMIC CONDENSATES |
| ARTITION | (BILABIAL) + (INFRALABIO-SUPRADENTAL) | v [3(3)(1)]<br>U | | IPA:<br>example* VW vw<br>VW vw<br>[ PCON-7 ] |

*(1) A semi-vowel is written as a combination of the parent vowel followed by either a ], [ i ], [ u ], etc.

*(1) A semi-vowel is written as a combination of the parent vowel followed by either [ a ], [ i ], [ u ], etc.

CENTRALS ("r"-SOUNDS)

*(1) A semi-vowel is written as a combination of the parent vowel followed by either [ a ], [ i ], [ u ], etc.

*(2) F is used for jaw forward position in the artition. This is the only non vowel for which a jaw forward artition exists within NAVLIPI.

FIG. 96

CENTRALS ("r"-SOUNDS)

| | | PHONO CHROMATICITY | |
|---|---|---|---|
| | | PARENT VOWEL X= (IF APPLICABLE) | SEMI-VOWEL *(1) |
| ARTITION | PALATAL | Not phonemically distinct in any major language. Irish has a palatalized aveolar tap which is probably best described as having two component phones- an aveolar tap [r] and the palatal semi-vowel [j]. It is best transcribed as a digraph [rj]. | |

*(1) A semi-vowel is written as a combination of the parent vowel followed by either [ a ], [ i ], [ u ], etc.

*(1) A semi-vowel is written as a combination of the parent vowel followed by either [ a ], [ i ], [ u ], etc.

FIG. 98

CENTRALS ("r"-SOUNDS)

| ARTITION | | PHONO CHROMATICITY | |
|---|---|---|---|
| | | Parent Vowel | Semi-Vowel *(1) |
| | [SUPRA] DENTAL | Very rare, and also not phonemically distinct from neighboring articulation positions (esp. alveolar). Thus not used in NAVLIPI. | |
| | INTERDENTAL | | |

*(1) A semi-vowel is written as a combination of the parent vowel followed by either [ a ], [ i ], [ u ], etc.

FIG. 99

| CENTRALS ("r"-SOUNDS) | | PHONO CHROMATICITY | | |
|---|---|---|---|---|
| | | PARENT VOWEL X= (IF APPLICABLE) | SEMI-VOWEL | PHONEMIC CONDENSATES |
| COMBINATION ARTITIONS AND PHONOCHROMATICITIES | Y= ALVEOLO-DENTAL *(flap+trill+semi-vowel)* | | | r ɤ r ɤ [PCON-8] |
| | RETROFLEX *(flap+trill+semi-vowel)* | | | Not used, no phonemic significance. Mentioned for completness only. |

FIG. 100
| CENTRALS ("r"-SOUNDS) | | PHONO CHROMATICITY | | |
|---|---|---|---|---|
| | | PARENT VOWEL X= (IF APPLICABLE) | SEMI-VOWEL | PHONEMIC CONDENSATES |
| COMBINATION ARTITIONS AND PHONOCHROMATICITIES | ALVEOLO-DENTAL *(flap+trill+semi-vowel)*+ UVULAR *fricative* | | | 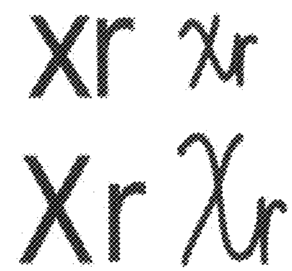 [PCON-10] |
| | *(Central flap + central trill + central semivowel + lateral semivowel) in* ALVEOLO-DENTAL *artition.* | | | 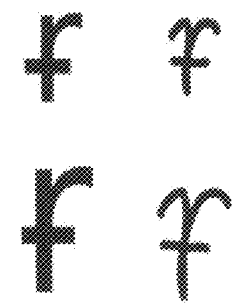 [PCON-11] |

FIG. 101
CENTRALS
("r"-SOUNDS)
| COMBINATION ARTITIONS AND PHONOCHROMATICITIES | | PHONO CHROMATICITY | | |
|---|---|---|---|---|
| | | PARENT VOWEL X= (IF APPLICABLE) | SEMI-VOWEL | PHONEMIC CONDENSATES |
| | *(Central semivowel + lateral semivowel)* in RETROFLEX *artition.* | | | 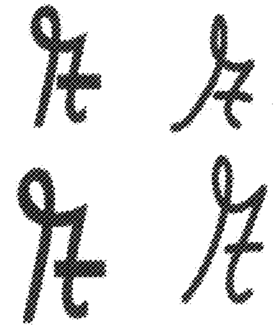 [PCON-12] |
| | *(Central flap + central trill + central semivowel + lateral semivowel + nasal)* in ALVEOLO-DENTAL *artition.* | | | 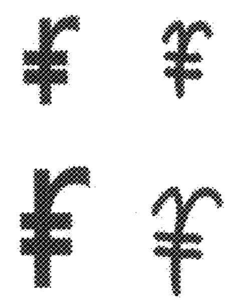 [PCON-13] |

FIG. 102
| CENTRALS ("r"-SOUNDS) | PHONO CHROMATICITY | | |
|---|---|---|---|
| COMBINATION ARTITIONS AND PHONOCHROMATICITIES | PARENT VOWEL X= (IF APPLICABLE) | SEMI-VOWEL | PHONEMIC CONDENSATES |
| *(Central semivowel + lateral semivowel + nasal)* in RETROFLEX *artition.* | | |  [ PCON-14 ] |
| "UNIVERSAL R" | | | 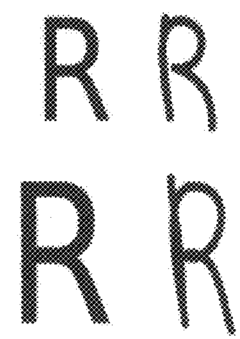 [ PCON-15 ] |

*(1) A semi-vowel is written as a combination of the parent vowel followed by either [a], [i], [u], etc.

*(1) A semi-vowel is written as a combination of the parent vowel followed by either [a], [i], [u], etc.

*(4) Multigraph, used only where there is phonemic opposition to other laterals (primarily alveolar, e.g. Irish, Turkish, also some Arabic dialects).

FIG. 105

KEY

| Dewanaagari | IPA Symbol | Keyboard | 1-1 Matrix element number. |
|---|---|---|---|
| | | | *(n) Asterisk indicates footnote # n. |

| PRINT | CURSIVE |
|---|---|
| Small | Small |
| Caps | Caps |

*WORD EXAMPLES*

LATERALS ("L")-SOUNDS

| | | PHONO CHROMATICITY | | |
|---|---|---|---|---|
| | X= | PARENT VOWEL (IF APPLICABLE) | SEMI-VOWEL *(1) ASPIRATED | PHONEMIC CONDENSATES |
| ARTITION | Y= RETROFLEX, JAW NORMAL | v [2(5)(2)] 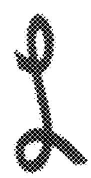 | 32-5 | |
| | PALATAL | v [2(7)(2)] 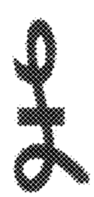 | 32-7 | |

*(1) A semi-vowel is written as a combination of the parent vowel followed by either [a], [i], [u], etc.

*(1) A semi-vowel is written as a combination of the parent vowel followed by either [a], [i], [u], etc.

FIG. 107

KEY

| Dewanaagari | IPA Symbol | Keyboard | 1-1 Matrix element number. |
|---|---|---|---|
| | | | *(n) Asterisk indicates footnote # n. |

| PRINT | CURSIVE |
|---|---|
| Small | Small |
| Caps | Caps |

*WORD EXAMPLES*

LATERALS ("L")-SOUNDS

| ARTITION | X→ PHONO CHROMATICITY: PARENT VOWEL (IF APPLICABLE) | SEMI-VOWEL *(1) FRICATIZED | PHONEMIC CONDENSATES |
|---|---|---|---|
| Y↓ RETROFLEX, JAW NORMAL | v [2(5)(2)] 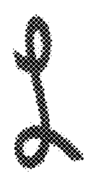 | 33-6 | |
| PALATAL | v [2(7)(2)] 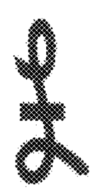 | 33-7 | |

*(1) A semi-vowel is written as a combination of the parent vowel followed by either [a], [i], [u], etc.

*(1) A semi-vowel is written as a combination of the parent vowel followed by either [a], [i], [u], etc.

FIG. 109

KEY

| Dewanaagari | IPA Symbol | Keyboard | 1-1 Matrix element number. |
|---|---|---|---|
| | | | *(n) Asterisk indicates footnote # n. |

| PRINT | CURSIVE |
|---|---|
| Small | Small |
| Caps | Caps |

WORD EXAMPLES

LATERALS ("L")-SC

| ARTITION | | PHONO CHROMATICITY | | |
|---|---|---|---|---|
| | | PARENT VOWEL (IF APPLICABLE) | SEMI-VOWEL *(1) PALATALIZED | PHONEMIC CONDENSATES |
| | RETROFLEX, JAW NORMAL | v [2(5)(2)] 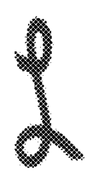 | 34-5 | |
| | PALATAL | v [2(7)(2)] 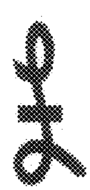 | 34-7 | |

*(1) A semi-vowel is written as a combination of the parent vowel followed by either [a], [i], [u], etc.

*(1) A semi-vowel is written as a combination of the parent vowel followed by either [a], [i], [u], etc.
*(5) Multigraph. A detailed analysis of, e.g. the Irish palatalized lateral, orthographed in the IPA as [lʲ], shows that l can easily be repeated as a quick, successive articulation of [l] and [j] hence the multigrpah.

FIG. 111

KEY

| Dewanaagari | IPA Symbol | Keyboard | 1-1 Matrix element number. *(n) Asterisk indicates footnote # n. |
|---|---|---|---|
| PRINT Small / Caps | CURSIVE Small / Caps | | |
| *WORD EXAMPLES* | | | |

LATERALS ("L")-SOUNDS

| | | PHONO CHROMATICITY | | |
|---|---|---|---|---|
| | | Parent Vowel (if applicable) | Semi-vowel *(1) Pharyngealized | Phonemic Condensates |
| ARTITION | RETROFLEX, JAW NORMAL | v [2(5)(2)] 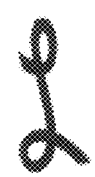 | 35-6 | |
| | PALATAL | v [2(7)(2)] 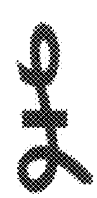 | 35-7 | |

*(1) A semi-vowel is written as a combination of the parent vowel followed by either [a], [i], [u], etc.

*(1) A semi-vowel is written as a combination of the parent vowel followed by either [a], [i], [u], etc.

FIG. 113

KEY

| Devanagari | IPA Symbol | Glyph | 1.1 Matrix element number |
|---|---|---|---|
| | | | *(n) Asterisk indicates footnote # n. |

| Print | Cursive |
|---|---|
| Small Case | Small Case |

WORD EXAMPLES

LATERALS ("L"-SOUNDS)

| ARTITION | PHONO CHROMATICITY | | | | | | | |
|---|---|---|---|---|---|---|---|---|
| | Parent Vowel (if applicable) | SEMI-VOWEL *(1) | | | | | Phonemic Condensates | PCON # |
| | | Unaspirated | Aspirated | Fricatized | Palatalized | Pharyngealized | | |
| (Central flap + central trill + central semi-vowel + lateral semi-vowel) in ALVEOLO-DENTAL artition. | | | | | | | 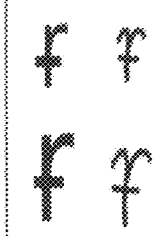 | PCON-11 |
| (Central semivowel + lateral semivowel) in RETROFLEX artition. | | | | | | | 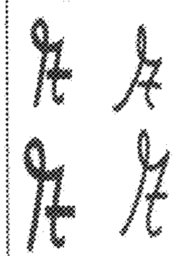 | PCON-12 |

*(1) A semi-vowel is written as a combination of the parent vowel followed by either [ a ], [ i ], [ u ], etc.

FIG. 114

KEY

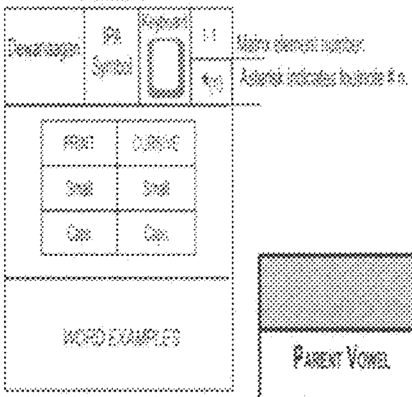

LATERALS ("L"-SOUNDS)

| ARTITION | PHONO CHROMATICITY | | | | | | | |
|---|---|---|---|---|---|---|---|---|
| | Parent Vowel (if applicable) | Semi-Vowel*(1): Unaspirated | Aspirated | Fricated | Palatalized | Pharyngealized | Phonemic Condensates | PCON # |
| (Central flap + central trill + central semivowel + lateralsemivowel + nasal) in ALVEOLO-DENTAL artition. | | | | | | | 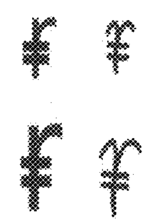 | PCON-13 |
| (Central semivowel + lateral semivowel + nasal) in RETRO-FLEX artition. | | | | | | | 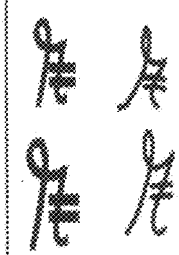 | PCON-14 |

*(1) A semi-vowel is written as a combination of the parent vowel followed by either [ a ], [ i ], [ u ], etc.

FIG. 115A

Suggested Pedagogical "Alphabetical" Order of NAVLIPI
(illustrated with print lower case only)

A. Vowels, Fundamental 001 q [2(2)(1)], qq [2(2)(1)], a [2(2)(3)], $a_o$ [2(2)(3)], aa [2(2)(4)], $aa_o$ [2(2)(4)], 007 i [1(1)(1)], ii [1(1)(1)], u [3(3)(1)], uu [3(3)(1)], 011 $ħ_o$ [2(4)(-1)], ħ [2(4)(2)], ɩ [2(5)(2)], $ɩ_o$ [2(7)(2)], r [PCON-8], l [2(9)(2)], ɩl [2(11)(2)], 081 $m_o m_o$ [2(12)(2)], $n_o n_o$ [2(13)(2)],

B. Vowels, Derivative

020 ε [1(1)(2)], εε [1(1)(2)], e [1(1)(3)], ee [1(1)(3)], c [1(1)(4)], cc [1(1)(4)], 026 y [3(1)(1)], yy [3(1)(1)], o/ [3(1)(2)], o// [3(1)(3)], 030 o [3(3)(3)], oo [3(3)(3)], Ω [3(3)(4)], ΩΩ [3(3)(4)],

N.B: Total number of vowels: 45 of which 22 have short/long versions (=44) (not all shown in above list) and one of which is a phonemic condensate.

B. Non Vowels, except clicks, ejectives and implosives 034 8 [1-1], h [6-1], h.. [6-2], 037 k.. [1-3], $k..h_o$ [2-3], g.. [3-3], n.. [5-3], x.. [6-3], ɕ.. [7-3], 043 k [1-4], $kh_o$ [2-4], g [3-4], $gh_o$ [4-4], $n_o$ [5-4], x [6-4], ɕ [7-4], 050 t [1-5], $th_o$ [2-5], đ [3-5], $đh_o$ [4-5] h [5-5], $th_o$ [6-5], $đh_o$ [7-5], đ. [8-5], $đh_o$ [9-5], h• [10-5], 060 ħ [30-5], $ħ_o$ [30-5F], ɩ [31-5], 063 2 [1-6], ï [3-6], °n [5-6], $2h_o$ [6-6], $ïh_o$ [7-6], 068 ɔ [1-7], $ɔh_o$ [2-7], ị [3-7], $ịh_o$ [4-7], ŋ [5-7], $sh_o$ [6-7] $zh_o$ [7-7], 075 j [28-7], ɩ [31-7], 077 tt [1-8], $tth_o$ [2-8], dt [3-8], $dth_o$ [4-8], n [5-8], $tth_o$ [6-8], $đh_o$ [7-8], 084 r [8-8], rh [11-8], rr [12-8], $rrh_o$ [13-8], (***)

FIG. 115B

Suggested Pedagogical "Alphabetical" Order of NAVLIPI (Continued)

B. Non Vowels, except clicks, ejectives and implosives (continued)

088 l [31-8], $lh_o$ [32-8],

090 $lh_0$ [33-8], lj [34-8], l.. [35-8], 093 s [6-9], z [7-9], 095 t [1-10], $th_o$ [2-10], d [3-10], $dh_0$ [4-10], n [5-10] (PCON), 100 t.. [1-11], d.. [3-11], $th_0$.. [6-11],

103 $dh_0$.. [7-11], $th_0$ [6-12], $dh_0$ [7-12], ɬl [31-12], 107 f [6-13], v [7-13], 109 p [1-15], $ph_o$ [2-15], b [3-15], $bh_o$ [4-15] m [5-15], $ph_0$ [6-15], $bh_0$ [7-15], $ph_0ph_0$ [12-15], 117 w [28-15], w° [28-15b], (***) $r_o$ [30-8], placed here, is very rare, so not used.

FIG. 115C

Suggested Pedagogical "Alphabetical" Order of NAVLIPI (Continued)

D. Phonemic Condensates *(illustrated with examples where appropriate)*

119 $p_o$ [PCON-1] (aspirate + non-aspirate), $p_{\infty}$ [PCON-2] (unvoiced + voiced), $kh_{\infty}$ [PCON-3] (stop + fricative), 122 ph8 [PCON-4] (stop + forward fricative), 123 $b_8$ [PCON-5] (stop + semi-vowel), VW [PCON-6] (semi-vowel + forward fricative), ttr [PCON-7] (stop + flap), 126 xr [PCON-10] [((trill + flap + semi-vowel) in alveolo-dental artition) + (uvular fricative)], 127 a= [PCON-15] Denotes a "mobile, generic" vowel where choice of vowel does not appear to matter, e.g. in some Semitic and Chinese languages.

*(PCON-11 to PCON-14, PCON-16, PCON-17 not in alphabetical order since they are very rare.)*

E. Tones

*In the "alphabetical order", tones will be placed here. However, tones will be language specific. Hence, for tonal languages,*
*each language's tones will be placed here, in the order that they are taught traditionally in that language. Thus, e.g., for Mandarin, the four tones will be placed here in the order they are traditionally taught, with word examples.*

FIG. 115D

Suggested Pedagogical "Alphabetical" Order of NAVLIPI (Continued)

F. Clicks, Implosives, Ejectives*

128 k..ƶk..ƶ [17-3], kƶ [14-4], kƶkƶ [17-4], kƶ' [24-4], gƶ'' [27-4], 133 tƶ [14-5], đƶ [15-5], tƶn₀ [16-5], tƶtƶ [17-5], 137 2ƶ [14-6],

138 ɔƶ [14-7], ɔƶ' [24-7], jƶ' [27-7], 141 ttƶ [14-8], dtƶ [15-8], ttƶn₀ [16-8], 144 lƶ [18-8], ƶ∞ [2-5], lƶn₀ [20-8], 147 ttƶ [22-8], lƶ [23-8], 149 ttƶ' [24-8], dtƶ'' [27-8], 151 sƶ' [25-9], tƶ [14-10], ttƶ [22-10], lƶ [23-10], tƶ'' [27-10], 156 fƶ' [25-13], pƶ [14-15], pƶ [1-6], pƶ' [24-15], bƶ' [27-15]

*As these are rare in the world's major languages, they are placed last in the "alphabetical order", and are unlikely to be taught at all, except in the languages to which they apply.*

FIG. 116D

*KEY NOTATION*
*USED FOR REPRESENTATION OF KEYS ON THE NAVLIPI KEYBOARD*

**(*m*)(*n*)(N,S,C,A)**
*(generically referenced as (m)(n)(X))*

Where *m* is the column number (x-axis, a total of 22), *n* is the row number (y-axis, a total of 6) and N, S, C and A represent *Normal, Shift, Control* and *Alternate*.

When a combination of functions, e.g. CTRl+ALT, is required, then the notation is simply changed accordingly, e.g. as (C+A) or simply, and *more preferably*, as (CA)

For the American QWERTY keyboard, we then have:

*22 columns (m)* *and* *6 rows (n)* *in all*

FIG. 116E

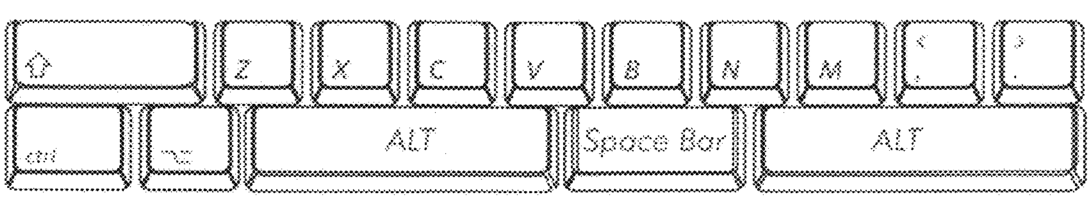

FIG.117A
| Serial # | Old Key | Old Key # | New Key # | New Key Representation (*Blank Square Indicates Place Available*) | Comments |
|---|---|---|---|---|---|
| 1. | c (*lower case*) | (4)(5)(N) | (2)(3)(A) [ALT+q] | (2)(3) 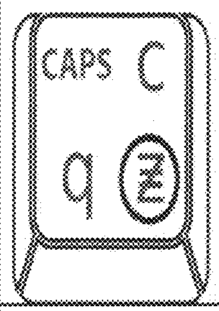  | |
| 2. | C (*upper case*) | (4)(5)(S) | (2)(3)(AS) [ALT+SHIFT+q ] | | |
| 3. | < > | (9)(5)(S) (10)(5)(S) | (12)(2)(S) (12)(2)(C) | (12)(2) 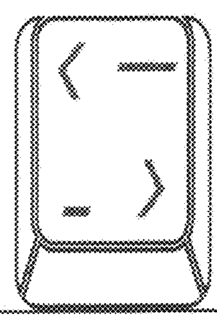 | < and > moved from comma, period (full-stop) keys to this new key |

FIG. 117B

<table>
<tr><th>Serial #</th><th>Old Key</th><th>Old Key #</th><th>New Key #</th><th>New Key Representation (Blank Square Indicates Place Available)</th><th>Comments</th></tr>
<tr><td>4.</td><td>\<br>|</td><td>(15)(3)(N)<br>(15)(3)(S)</td><td>(2)(2)(C)<br>(2)(2)(A)</td><td>(2)(2)<br>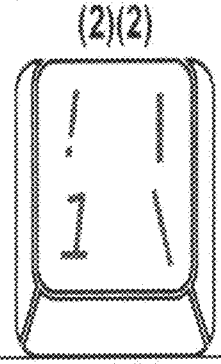</td><td></td></tr>
<tr><td>5.</td><td>]<br>}</td><td>(13)(3)(N)<br>(13)(3)(S)</td><td>(15)(3)(N)<br>(15)(3)(S)</td><td>(15)(3)<br>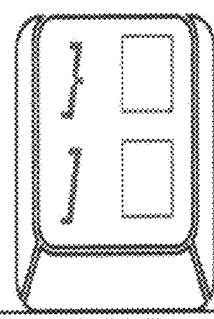</td><td>(15)(3)(C, A) are still available (free)</td></tr>
<tr><td>6.</td><td>[<br>{</td><td>(12)(3)(N)<br>(12)(3)(S)</td><td>(13)(3)(N)<br>(13)(3)(S)</td><td>(13)(3)<br>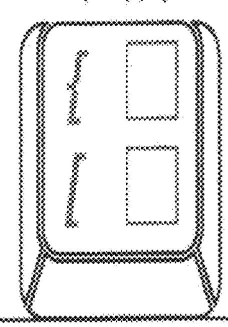</td><td>(13)(3)(C, A) are still available (free)</td></tr>
</table>

FIG.117C

| Serial # | Old Key | Old Key # | New Key # | New Key Representation (*Blank Square Indicates Place Available*) | Comments |
|---|---|---|---|---|---|
| 7. | ;<br>: | (11)(4)(N)<br>(11)(4)(S) | (12)(3)(N)<br>(12)(3)(S) | (12)(3)<br>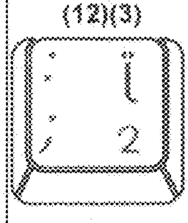<br> | For the new glyphs (12)(3)(C, A) shown, see under Section 16.2.8 below |
| 8. | ' *(apostrophe)*<br>" *(quote mark)* | (12)(4)(N)<br><br>(12)(4)(S) | (5)(2)(N)<br><br>(5)(2)(S) | (5)(2)<br>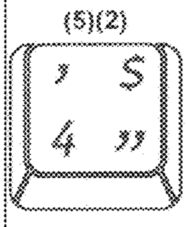<br> | (12)(4) is now fully available (free) |
| 9. | *ALL NUM LOCK NUMBER KEYS, When NUM LOCK is <u>not</u> on* | (19-22)(2-6)(X) | (19-22)(2-6)(X) | | *When NUM LOCK is not on, these keys will be used to render various, very rare phonemic condensates, as discussed later in this chapter. When NUM LOCK is on, they will simply render numbers.* |

FIG. 120
*Hindi/Spanish/Indonesian keyboard*
(5)(3)
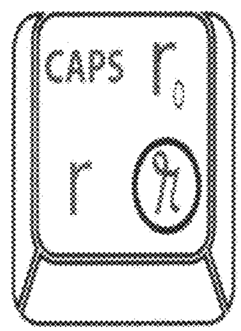
*English/French/German/West European languages keyboard*
(5)(3)
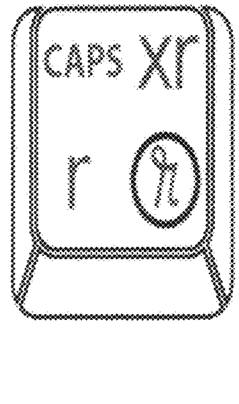

FIG. 121
*Hindi/Spanish/Indonesian*
(10)(4)
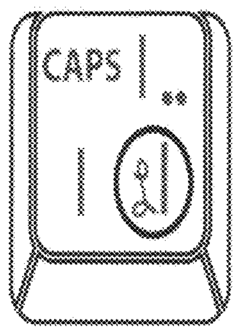
*English/French/German/West-European languages*
(10)(4)
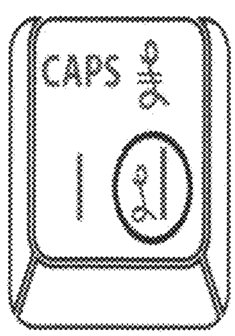

FIG. 122
*Hindi/Spanish/Indonesian*
(9)(4) (6)(4)
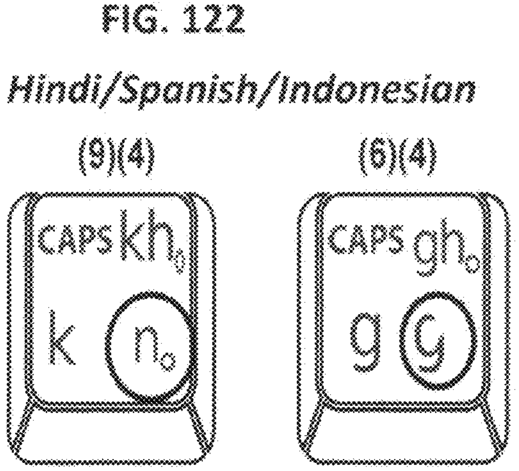
*Chinese languages group*
(9)(4) (6)(4)
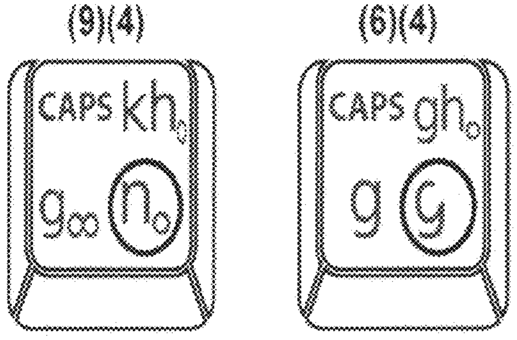
*English/French/German/West-European languages group*
(9)(4) (6)(4)
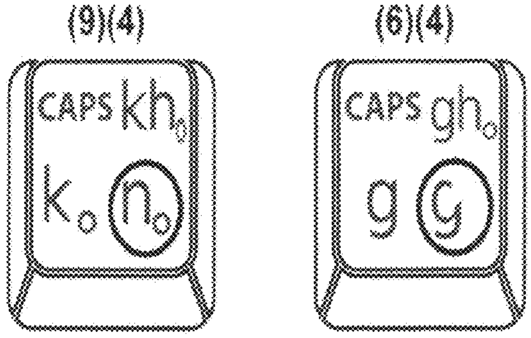
*Arabic group*
(10)(4) (9)(4)
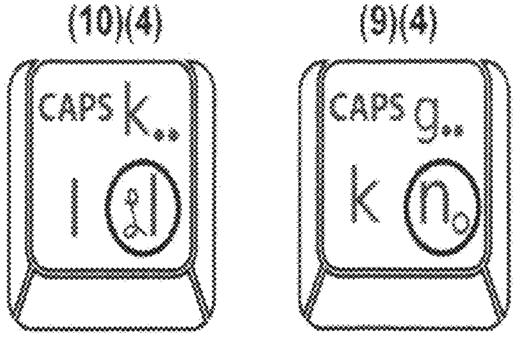

Common velar keys for ALL keyboards

FIG. 125A
*A. (6)(3) KEY*
*(Unvoiced, current QWERTY "t" key)*
| Language-specific keyboard | Key |
|---|---|
| *Hindi/Spanish/Indonesian....* *(Dental, except (CA) position)* | 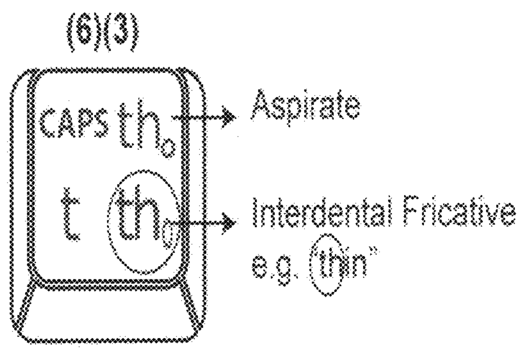 |
| *Mandarin/Cantonese:* *(Alveolar)* | 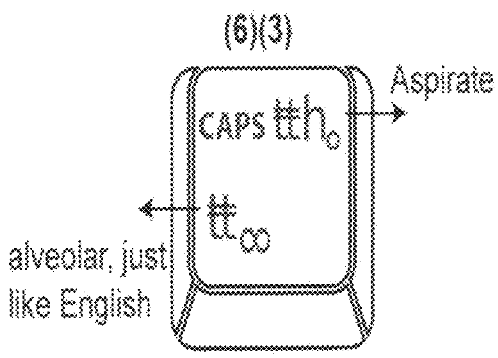 |

FIG. 125B
*A. (6)(3) KEY*
*(Unvoiced, current QWERTY "t" key)*
(continued)
| Language-specific keyboard | Key |
|---|---|
| *English/ W. European languages... (Alveolar, except (CA) position)* | 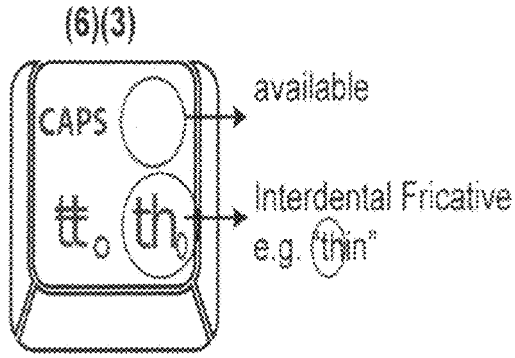 |
| *Arabic* | 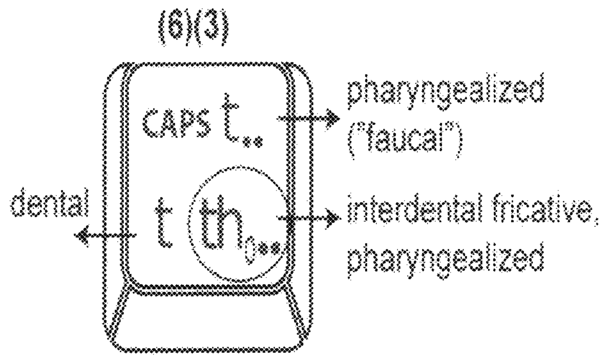 |
| *Tamil---- (Dental, except (CA) position)* | 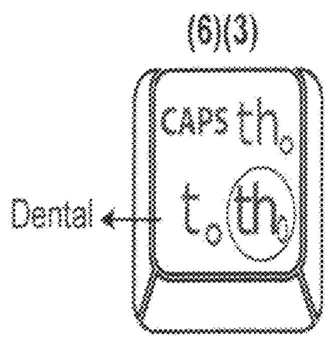 |

FIG. 125C
*B. (4)(4) KE*
*(Voiced, current QWERTY "d" key)*
| Language-specific keyboard | Key |
|---|---|
| *Hindi/Spanish/Indonesian....* *(Dental, except (CA) position)* | 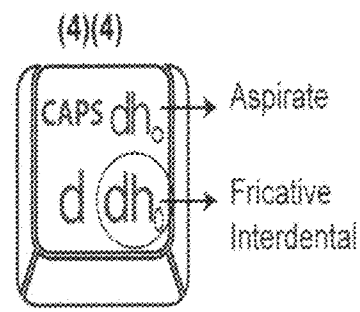 |
| *Mandarin* and *Cantonese:* *(Alveolar)* | 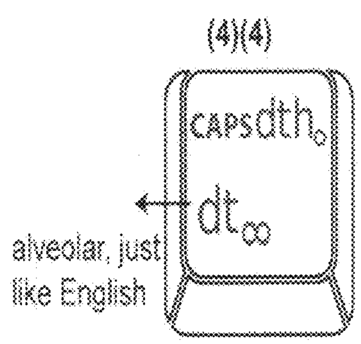 |

FIG. 125D
*B. (4)(4) KE*
*(Voiced, current QWERTY "d" key)*
(continued)
*English/ W. European languages...*
*(Alveolar, except (CA) position)*
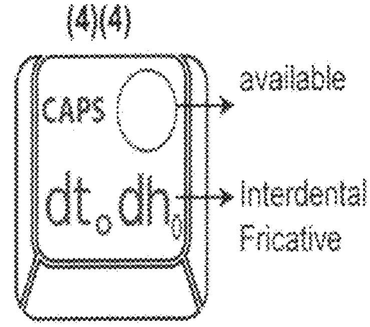
*Arabic*
*(Dental, except (CA) position)*
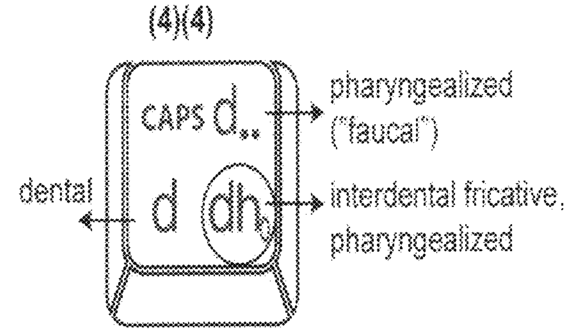
*Tamil*
*(Dental, except (CA) position)*
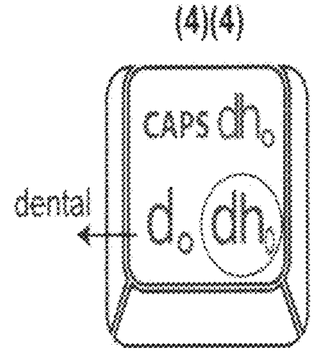

*C. (11)(4), (12)(4) KEYS, FOR RETROFLEX NON-VOWELS*

*(Current QWERTY (; :) and (' ") keys)*

<u>Language-specific keyboard</u> <u>Key</u>

*Hindi/Spanish/Indonesian....*

*(Retroflex)*

FIG. 132A

*Tone* keys

*Generic:*

| Number Key | Navlipi notation | Shift (S) | Ctrl (C) | Alt (A) | Alt + Shift (AS) | Ctrl + Shift (CS) |
|---|---|---|---|---|---|---|
| 5 | (6)(2) | ǀ | ⌈ | ⌈ | ⁄ ˩ | ⌉ (rare) |
| 6 | (7)(2) | ⁄ | ⁄ | 〉 | 〉 | ⁄ |
| 7 | (8)(2) | – | ¬ (rare) | ˩ | ˩ | |
| 8 | (9)(2) | Use these for combination, unique tones, etc., language specific. | | | | |
| 9 | (10)(2) | | | | | |

*Mandarin/Cantonese:*

| Number Key | Navlipi notation | Shift (S) | Ctrl (C) |
|---|---|---|---|
| 5 | (6)(2) | ǀ (*M*, *C*, 1st tone) | – (*C*, 3rd tone) |
| 6 | (7)(2) | 〉 (*M*, 2nd tone) | ¬ (*C*, 4th tone) |
| 7 | (8)(2) | ⌈ (*M*, 4th tone) | ⌉ (*C*, 5th tone) |
| 8 | (9)(2) | ⁄˩ (*M*, 3rd tone) | ˩ (*C*, 6th tone) * |
| 9 | (10)(2) | ⁄ (*C*, 2nd tone) | |

* This is treated as low to mid.

M- Mandarin
C-Cantonese

FIG. 132B

*Tone* keys (continued)

*Yoruba/Igbo:*

| | | Shift (S) | | Alt (A) | Alt + Shift (AS) |
|---|---|---|---|---|---|
| Number Key | Navlipi notation | Yoruba | Igbo | Yoruba | Yoruba |
| 5 | (6)(2) | ǀ (1st tone) | ǀ (1st tone) | ┌ (5th tone) | |
| 6 | (7)(2) | ⁄ (2nd tone) | ⁄ or rarely ┌ (3rd tone) | | |
| 7 | (8)(2) | — (3rd tone) | — (2nd tone) | | ⌐ (4th tone) |

*Cashinahua (a Peruvian language):*

| Number Key | Navlipi notation | Shift (S) |
|---|---|---|
| 5 | (6)(2) | ǀ (1st tone) |
| 7 | (8)(2) | — (2nd tone) |

FIG. 132C

*Tone* keys (continued)

*Swedish:*

| Number Key | Navlipi notation | Shift (S) | Alt (A) |
|---|---|---|---|
| 5 | (6)(2) | | ⎾ (1st tone) |
| 7 | (8)(2) | − (2nd tone) | |

*Indo-European Pitch Accents (e.g. for ancient Sanskrit, Greek and Latin):*

| Number Key | Navlipi notation | Shift (S) |
|---|---|---|
| 5 | (6)(2) | \| (Uddaata, acute) |
| 6 | (7)(2) | / (Swarita-1, circumflex-neutral) |
| 7 | (8)(2) | − (Anuddaata, grave) |
| 8 | (9)(2) | ⌐/ (Swarita-2, circumflex-active) |

*Stress (ictus) accents (e.g. as used in Spanish):*

| Number Key | Navlipi notation | Shift (S) |
|---|---|---|
| 5 | (6)(2) | \| (only 1 stress accent) |

*Rare Central Glyphs*

INDIVIDUAL KEYS (continued)

FIG. 136A (1) LMü xÉÑISU ÌSIÉ, LMü AÉSqÉÏ AÉæU AéæUiÉ

*(2) Ek sundar din, ek aadmii aur aurat*

(3) Eɛk sundar din, ɛɛk aadmii ɔɔr ɔɔrat (4) Eɛk sundar din, ɛɛk aadmii ɔɔr ɔɔrat (1) (ÍqÉrÉÉ ÌoÉoÉÏ, uÉkÉÑuÉUâ),

*(2) (miyaa biibii, wadhuware),*

(3) ( mijaa biibii, vwadhu vwarɛ ), (4) (mijaa biibii, vwadhuvwarɛ), (1) AmÉlÉâ SÉâ xÉÑISU oÉŠÉâÇ Mâü xÉÉjÉ, bÉÔqÉlÉâ ÌlÉMüsÉâ |

*(2) apne do sundar bachchon ke saath, ghuumne nikle.*

(3) apnɛ do sundar baɔɔo~ [baɔɔon] kɛ saath, ghuumnɛ niklɛ.

(4) apnɛ do sundar baɔɔõ [baɔɔon] kɛ saath, ghuumnɛ niklɛ.

(1) xÉÔUeÉ cÉqÉMü UwûÉ jÉÉ,

*(2) Suuraj chamak rahaa thaa,*

(3) Suuraj ɔamak rahaa thaa, (4) Suuraj ɔamak rahaa thaa,

FIG. 136B (1) ÌSlÉ MüÉå pÉUmÉÔU EeÉÉsÉÉ SåiÉå |

(2) *din ko bharpurr ujaalaa dete.*

(3) din ko bh̥arpuur ujaalaa dɛtɛ.

(4) din ko bh̥arpuur ujaalaa dɛtɛ.

(1) oÉŠå qÉÉoÉÉmÉ Måü TåüUå sÉå Uwåû jÉå |

(2) *Bachche maabaap ke phere le rahe the.*

(3) Baɔɔɛ maabaap kɛ ph̥ɛrɛ lɛ rahɛ th̥ɛ..

(4) Baɔɔɛ maabaap kɛ ph̥ɛrɛ lɛ rahɛ th̥ɛ..

(1) ÌMü oÉlÄQû NûÉrÉå qÉåÇ oÉæPåû |

(2) *Sab pariwaar ek banyaan ped*

(3) Sab parivwaar ɛk banjaan pɛḍ.

(4) Sab parivwaar ɛk banjaan pɛḍ

(1) xÉoÉ mÉËUuÉÉU LMü oÉlrÉÉlÉ mÉåÄQû

(2) *ki badi chhaaye mein baithe.*

(3) ki baḍ.i ɔh̥aajɛ mɛ~ [mɛn̥] beeth̥ɛ

(4) ki baḍi ɔh̥aajɛ mɛ̃ [mɛn̥] beeth̥ɛ

(1) AélÉlS qÉåÇ AÉSqÉÏ AéæU (2) *Aanand mein aadmii aur*

(3) Aanand mɛ~ [mɛn̥] aadmii ɔr (4) Aanand mɛ̃ [mɛn̥] aadmii ɔr

FIG. 136C (1) ExÉMüĐ oÉÏoÉÏ xÉÉå aÉL |

(2) *uskii biibii so gae.*

(3) uskii biibii so gaɛ.

(4) uskii biibii so gae.

(1) mÉiÉÉ lÉÏWÇû YrÉÉ xÉmÉlÉå mÉÉrÉå |

(2) *Pataa nahin kyaa sapne paaye.*

(3) pataa nahi~[nahin] kjaa sapnɛ paajɛ.

(4) Pataa nahĩ [nahin] kjaa sapnɛ paajɛ.

(1) oÉŠå ZéåsÉiÉå Uwâû |

(2) *Bachche khelte rahe.*

(3) Baɔɔɛ khɛltɛ rahɛ.

(4) Baɔɔɛ khɛltɛ rahɛ.

FIG. 137A

*(1) A man and a woman go out*

(2) Q mccn cndt q wumqn gou aautt₀

(3) Q mccn cndtt q wumqn gou aautt

(1) for a walk with their

(2) fɑ% q wɑk widh₀ dh₀εq%

(3) fvr q wlk widh dhεqr

(1) two beautiful children.

(2) tt₀uu bjuutt₀iful cildt%qn.

(3) tteuu bjuutteiful zildtrqn.

(1) It is a sunny day.

(2) Itt₀ iz q sani dtεi.

(3) Itte iz q sani dtεi.

FIG. 137B (1) They sit down on the grass

(2) Dhεi sitto dtaaun ɔn dhq g*ccs (3) Dhεi sitte dtaaun ɔn dhq gaccs (1) below a shady tree.

(2) bilou q shεdtii ttorii.

(3) bilou q shεdtii ttorii.

(1) The children play nearby.

(2) Dhq cildtrqn plεi njq*baaε.

(3) Dhq cildtrqn plεi njq*baaε.

(1) After some time,

(2) Cfttoq* sam ttoaaim, (3) Cfttoq* sam ttoaaim, (1) they head home.

(2) dhɛi hedt houm.

(3)

FIG. 138A (1) Un otro terremoto suficientemente (2) Uun otro terrɛmoto suuficientɛmentɛ

(3) Uun otro terrɛmoto suuficientɛmentɛ

(1) fuerte para generar un pequeño (2) fuertɛ paaraa genɛrrar uun pɛkɛnjo (3) fuertɛ paaraa gɛnɛrraar uun pɛkɛnjo (1) tsunami con una ola de dos metros (2) tsuunaami kon uunaa olaa dɛ dos metros (3) tsuunaami kon uunaa olaa dɛ dos metros (1) ocurrido la semana pasada dejó

(2) okurriido laa sɛmaanaa paasaadaa dɛhó

(3) okurriido laa sɛmaanaa paasaadaa dɛhó

(1) a Indonesia. El sismo estaba de 6,9 grados (2) aa Indoniisiaa, el siismo estaabaa dɛ 6,9 graados (3) aa Indoniisiaa. El siismo estaabaa dɛ 6,9 graados

FIG. 138B (1) en la escala de Richter. Se les recomendó

(2) en laa eskaalaa dɛ ɾixtqr. Sɛ les rrɛkomɛndó

(3) en laa eskaalaa dɛ ɾixtqr. Sɛ lɛs rrɛkomɛndó

(1) a los habitantes de las áreas costeras (2) a los haabitaantɛs dɛ laas áarrɛaas kosteerraas (3) a los haabitaantɛs dɛ laas áarrɛaas kosteerraas (1) que se movieran por un tiempo (2) kɛ sɛ moviɛrraan por uun tiempo (3) kɛ sɛ moviɛrraan por uun tiempo (1) a suelo más alto.

(2) aa suelo maás aalto.

(3) aa suelo maás aalto.

*Rough Roman, Navlipi PRINT and Navlipi CURSIVE Transcriptions*

Estaeyaqata eshaabu attawilu alqamati

C stcaak,,ata esh,aabu at,,aawilu alk,,amati faejae'aeten wo kaannau yukmelu

Fcjcȣcten wo kaannaau jukmelu a'-kherae maetaebaeqae men holmen mozeshe~.

aȣ axεyc mctcbck,,c men holmen mozesh,e

[mozesh,en,]

Alqae nalhraten miinaa ae'shoubeki.

Alk,,c nalh,raten miinaa ccȣ sh,uubeki.

O kaanaa yaaoume~ jaemilaen.

O kaanaa jaaoumε [mεn,] jemilcn.

Ashaemsu kaenet saetaataan waa berraaghme

A sh,cmsu kcnet sct aaȣ taan waa beraagmε

FIG. 139C mean taajaawezehae aloufouq mmmae zaelet mɛaan taajaawɛzɛzhc aloufouk̤ m̦m̦mczcclet mɛan taajaawɛzɛhc aloufouk̤ m̦m̦mczcclet

*taa~luhaa maashaatun burtukaliiaatu* taa [taan̦] lu haa maas haatun burtukaliiaatu taã [taan̦] lu haa maas haatun burtukaliiaatu allaawne aalhaafaaraa shuruq.

allaaw nɛ aalh̦aafaavaa sh̦uruk̤.

allaaw nɛ aalh̦aafaavaa sh̦uruk̤.

Taethaeaabae wae taemaataataa.

Te th̦cc aa bcc wc tc maataataa

Te th̦cc aa bcc wc tc maataataa.

Thuma faetaehae aelnaefelhata, faja'at zoqzoqaetu.

th̦uma fet cchcc cinc fɛlh̦ata, fajaˁat zok̤zok̤ctu th̦uma fet cchcc cinc fɛlh̦ata, fajaˁat zok̤zok̤ctu al'assaefiire waa. Kae'anna-haa thaay-fuu~.

alˁasscfiivɛ waa. kcˁannahaath̦aai [fuu].

[fuun̦].

alˁasscfiivɛ waa. Kcˁannahaath̦aai fuũ [fuun̦].

Kalmoaataede fi kolli saabaehii~ aakhaa thae kalmoaatcdɛ fi kolli saabcche aaxaath̦c Kalmoaatcdɛ fi kolli saabcche aaxaath̦c

FIG. 139D weaeae maein faereghiin limalehe wɛ c̊c mc̊in fcrɛqiin limalɛhɛ wɛ cc mcgin fcrɛgiin limalɛhɛ miim almiitaekhate fii alkaryate miim almiitcxatɛ fii alkarjate miim almiitcxatɛ fii alkarjate al mujaaweraatea wa ghadaaraa almaenziilae al mujaa we yaatɛa wa gadaaraavaa al mcnziilc al mujaa wɛ yaatɛa wa gadaraa al mcnziilc 'muuta'aeteashen liibulughi al biaeri.

˚muuta˚ta˚ctɛash.en liibulugi albicri.

ʃmuutagctɛashen liibulughi albicri.

Ta-mnae mulaeqaatea sadiikaetiihe

Ta manc mulck..ctɛa sadiikɛtiihɛ al

Ta manc mulckctɛa sadiikɛtiihɛ al aljaediidaetii. Allaatii al jcdiidctii. Allaatii jcdiidctii. Allaatii

FIG. 139E

Iltaeqae biinaehae hunaekae billaemsi.

iltck„c biinchc hunckc billcmsi.

iltcke biinche huncke billcmi.

Sa-ya-kunu yaau-maen jaamii laen lou qaedii mat.

Sa jakunu jaaumcn jaamiilcn lou k„cdiimat, ba jakunu jaaumcn jaamiilcn lou kcdiimat,

FIG. 140A

(1) Un homme et sa femme partent aller se promener,

(2) Qn o/m ɛ saa faam paamxrtt aalɛ sq pxrɒmqnɛ, (3) Qn om ɛ saa faam paaxrtt aalɛ sq pxrɒmqnɛ,

(1) avec leurs deux beaux enfants.

(2) aavek lo/xr dtq boz ɒ~fɒ~[ɒn̥fɒn̥].

(3) aavek lo/xr dtq boz ɒ̃fɒ̃[ɒn̥fɒn̥].

(1) Le soleil brille, remplissant le jour

(2) Lq solɛi bxriij, xrɒ~mpliisɒ~ lq zh̥uuxr
[xrɒn̥mpliisɒn̥]

(3) Lq solɛi bxriij, xrɒ̃mpliisɒ̃ lq zh̥uuxr
[xrɒn̥mpliisɒn̥]

(1) avec son eclat. En jouant, les enfants font

(2) aavek sɒn ɛklaa. Ω~ zh̥uuɒ~, lɛz ɒ~fɒ~ fɒ~
[Ωn̥] [zh̥uuɒn̥], [ɒn̥fɒn̥] [fɒn̥]

(3) aavek sɒn ɛklaa. Ω̃ zh̥uuɒ̃, lɛz ɒ̃fɒ̃ fɒ̃
[Ωn̥] [zh̥uuɒn̥] [ɒn̥fɒn̥] [fɒn̥]

(1) des cercles autour de ses parents. La famille

(2) dtɛ seexrklq ottuuxr dtq sɛ paaxrɒ~. Laa faamiij
[paaxrɒn̥]

(3) dtɛ seexrklq ottuuxr dtq sɛ paaxrɒ̃. Laa faamiij
[paaxrɒn̥].

FIG. 140B

(1) s'arret au-dessous d'un grand arbre

(2) s'aaxrett o-dtqsuu dt'q~ gxrΩ~ aaxrbxrq
[d'qn̦] [gxrΩn̦]

(3) s'aadrett o-dtqsuu dt'q̃ gxr̃ aaxrbxrq
[d'qz] [gxrz]

(1) donnant une grande ombre.

(2) dtΩ~nΩ~ uunq gxrΩ~dt Ω~bxrq.
[dtΩn̦nΩn̦] [gxrΩn̦dt] [Ωn̦bxrq].

(3) dtΩ̃nΩ̃ uunq gxrΩ̃tt Ω̃bxrq.
[dtrznrz] [gxrzatt] [-rzbxrq].

(1) Dans l'ambience, le sommeil engloute les parents.

(2) dtΩ~ l'Ω~biΩ~s, lq someij Ω~gluutt lε paaxrΩ~
[dtΩn̦] [l'Ωn̦biΩn̦s] [Ωn̦gluutt] [paaxrΩn̦]

(3) DtΩ̃ l'Ω̃biΩ̃s, lq someij Ω̃gluutt lε paaxrΩ̃
[Dtrz] [l'rzbirzs], [-rzgluutt] [paaxrrz]

(1) Qui sache quel sort de reves ils ont?

(2) Kii saash̦ kel sΩxr dtq xrev iilz Ω~
[Ω~]

(3) Kii saash̦ kel sΩxr dtq xrev iilz Ω̃
[-rz]

FIG. 141A

*Original German, Followed by Navlipi (PRINT), Navlipi (CURSIVE)*
*(Hochdeutsch (Radio deutsche Welle) Pronunciation)*

Die meisten Menschen sind so subjektiv, dass im

Dtii maaistt$_\circ$en Mensh$_\circ$n zintt$_\circ$ zo subjek$_\circ$tt$_\circ$iiv, dtaas im Dtii maaistten Menshn zintte zo subjektteiiv, dtaas im Grunde nichts Interesse für sie hat als ganz allein Gxrundtq nizh$_\circ$tt$_\circ$s Intt$_\circ$qxrεsq fyr zii haatt$_\circ$ aalz gaantt$_\circ$s aallaain Gxrundtq nizhttes Inttegxresq fyr zii haatte aalz gaanttes aallaain sie selbst. Daher kommt es, dass sie bei allem, zii zelbstt$_\circ$. Dtaahεqr k$_\circ$omtt$_\circ$ es, dtaas zii baai aalem, zii zelbstte. Dtaahεqr komtte es, dtaas zii baai aalem, was gesagt wird, sogleich an sich denken vaas gezaagtt$_\circ$ viiqdt, zoglaaizh$_\circ$ aan zizh$_\circ$ dtenk$_\circ$n vaas gezaagtte viqdt, zoglaaizh aan zizh dtenken

FIG. 141B

*(Original German, Followed by Navlipi (PRINT), Navlipi (CURSIVE), cont.)* und jede zufällige, noch so entfernte Beziehung auf irgend etwas untt$_o$ jedta tt$_o$sufeeliga, nox.. zo entt$_o$fexrntt$_o$ Bett$_o$siihun$_o$g aauf iiqgntt$_o$ ett$_o$vaas

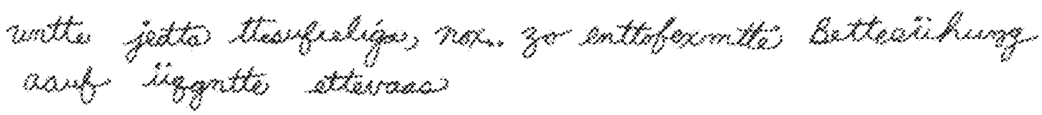

ihnen Persönliches ihre ganze Aufmerksamkeit iingn P$_o$εqzo/nlish$_o$qs iixrq gaantt$_o$sq Aaufmεqxrkzaamk$_o$aaitt$_o$

an sich reißt und in Besitz nimmt; so dass aan zish$_o$ xraaisstt$_o$ untt$_o$ in Bezitt$_o$s nimtt$_o$; zo dt$_o$aas

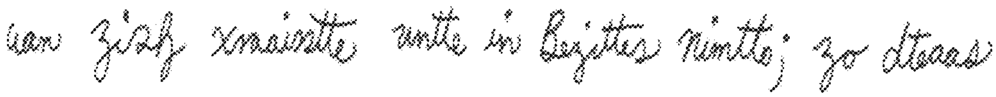

sie für den objektiven Gegenstand der Rede zii fyxr dten objek$_o$tt$_o$iivn Gegnsh$_o$tt$_o$aandt dtεqxr Xrεdta

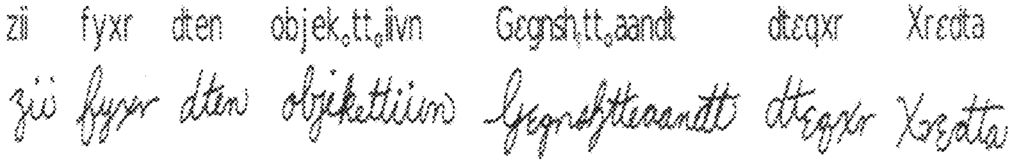

keine Fassungskraft übrig behalten;

k$_o$aaina Faasun$_o$gzk$_o$xraaftt$_o$ ybxrig bεhaaltt$_o$n;

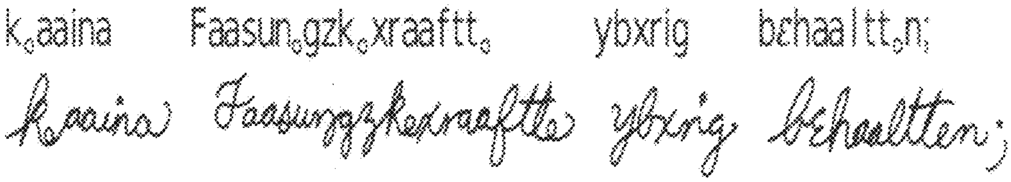

wie auch, dass keine Gründe etwas bei ihnen vii aaux, daas k$_o$aaina Gxrynda ett$_o$vaas baai iingn

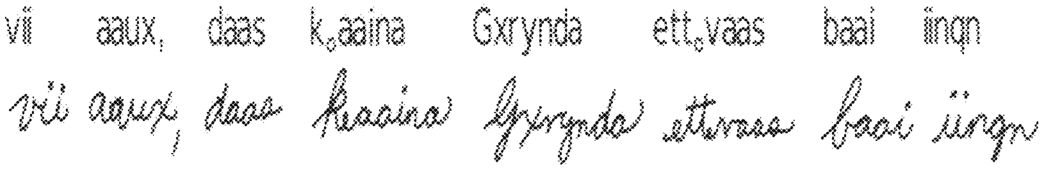

FIG. 141C
*(Original German, Followed by Navlipi (PRINT), Navlipi (CURSIVE), cont.)*
gelten, sobald ihr Interesse oder ihre
geltt$_{o}$n, zobaaldt iixr Intt$_{o}$qxresq odta iixra
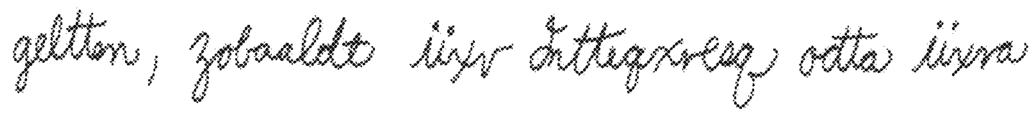
Eitelkeit denselben entgegensteht.
Aaitt$_{o}$lk$_{o}$aaitt$_{o}$ dtenzelbn entt$_{o}$gεgnsh$_{t}$tt$_{o}$εtt$_{o}$.
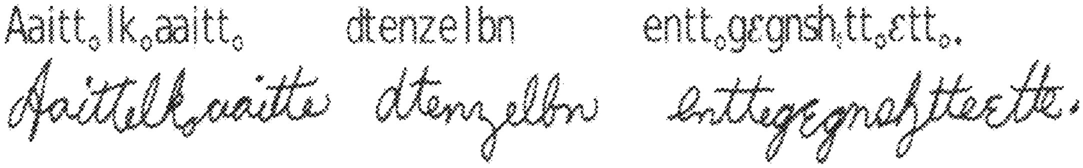

FIG. 142A (1) LMü zÉÉliÉ ÌSuÉxÉ, qÉÑqoÉD qÉWûÉlÉaÉUÏ qÉkrÉå

(2) ek shaanta diwas, mumbai mahaanagari madhe (3) Ek sh̤aanta diwas, Mumbai mahaanagarii madh̤ɛ

(4) Ek shaanta diwas, Mumbai mahaanagarii madhɛ

(1) LMü xÉqqÉåsÉlÉÉiÉ, mÉëirÉåMü eÉhÉ irÉÉ

(2) ek sammelanaat, pratyek jan tyaa (3) Ek sammɛlanaat, pratjɛk jaɳ tjaa (4) Ek sammɛlanaat, pratjɛk jaɳ tjaa (1) ¤ÉhÉÉcÉÏ uÉÉOû mÉÉWûiÉ WûÉåiÉÉ, eÉåuWûÉÇ

(2) kshanaachii waat paahat hotaa, jewhaan (3) ksh̤ɳaaɔii waat paahat hotaa, jɛwh̤aa~[jɛwh̤aan̤]

(4) kshɳaasii waat paahat hotaa, jɛwhaã [jɛwhaan]

(1) ÌuÉSåwÉ qÉÇÌ§É LMü bÉÉåwÉhÉÉ MüUhÉÉU WûÉåiÉÉ.

(2) widesh mantri ek ghoshanaa karnaar hotaa.

(3) widɛsh̤ mantri ɛk gh̤osh̤aɳaa karɳaar hotaa.

(4) widɛsh mantri ɛk ghoshɳaa karɳaar hotaa.

FIG. 142B 1) mÉëirÉåMüÉcÉÏ EixÉÑMüiÉÉ iÉÉhÉsÉÏ aÉåsÉÏ WûÉåiÉÏ

(2) pratyekaachii utsuktaa taanlii geli hoti (3) pratjɛkaaɔi utsuktaa taaɳlii gɛlii hotii.

(4) pratjɛkaaɔii utsuktaa taaɳlii gɛlii hotii.

(1) ÌMü ÌuÉSåwÉ qÉÇÌ§É AÉmÉsrÉÉ EmÉ-qÉÇÌ§É

(2) ki widesh mantri aaplyaa up-mantri (3) ki widɛsh mantri aapljaa upa-mantri (4) ki widɛɛʑ mantri aapljaa upa-mantri (1) xrÉÉPûÏ MüÉåhÉÉsÉÉ mÉxÉÇiÉÏ SåhÉÉU?

(2) syaathi konaalaa pasantii denaar?

(3) sjaathi koɳaalaa pasanti dɛɳaar?

(4) sjaathi koɳaalaa pasanti dɛɳaar?

(1) rÉÉoÉÉoÉiÉ LMüqÉåMüÉÇqÉkrÉå AOûMüVû

(2) yaabaabat ekamekaanmadhe atakal (3) jaabaabat ɛkamɛkaa~madhɛ atkaɭ

[ɛkamɛkaanmadhɛ]

(4) jaabaabat ɛkamɛkaãmadhɛ atkaɭ

[ɛkamɛkaanmadhɛ]

FIG. 142C (1) oÉÉÇkÉsÉÏ eÉÉiÉ WûÉåiÉÏ.

(2) baandhlii jaat hoti.

(3) baandh̥ lii jaat hotii.

(4) baandhlii jaat hotii.

(1) AZÉåU ÌuÉSåwÉ qÉÇÌ§ÉlÉÏ AÉ¶ÉrÉïuÉiÉ

(2) akher widesh mantrinii aashcharyawat (3) akh̥ɛr widɛsh̥ mantrinii (4) akher widesh mantrinii.

(1) oÉÉoÉÉxÉÉWåûoÉ UÉlÉÉQåû rÉÉsÉÉ mÉxÉÇiÉÏ ÌSsÉÏ.

(2) babaasaaheb raanaade yaalaa pasantii dilii.

(3) Baabaasaahɛb raanaaɖɛ jaalaa pasantii dilii.

(4) Baabaasaaheb raanaaɖe jaalaa pasantii dilii.

FIG. 143A

*Original Hungarian, Followed by Navlipi (PRINT), Navlipi (CURSIVE)*

A magas, fiatal fèrfi hirtelen felèbredt,

Aa maagaash, fiaattaal fjerfi hiiqrttelen feljebredt,

*Aa maagaash fiaattaal fjerfi hiigrttelen feljebredt,* kiugrott az àgybòl, mintha egy zavaros kiugrott aaz aaijbool, mintth,aa ej zaavaarosh,

*kiuogrott aaz aaijbool, mintthaa ej zaavaarosh* alom utolsò rèszeit fejezte volna be.

aaɛlom utolsh,o/ rjeszɛitt fejeztte volnaa be.

*aaɛlom utolshjo rjeszɛitt fejeztte volnaa be.*

Kinèzett az ablakon. Gyönyörű nap volt.

kinjezett aaz aablaakon. Įo̤njo/ryy naap voltt.

*Kinjezett aaz aablaakon. Jönjöryy naap voltt.*

FIG. 143B
*Original Hungarian, Followed by Navlipi (PRINT), Navlipi (CURSIVE)*
A nap fènyesen sütött, mėg mindig kissė
Aaf naap fjenjesen sh,yttotott, mjeg mindtig kissje
narancssàrgàn kora hajnali ragyogàsàban,
naaraanzh,eergeen koraa haajnaali raajogeesh,eebaan,
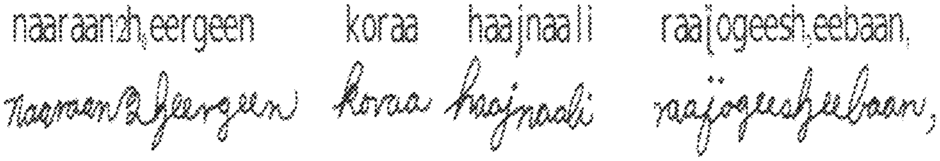
bàr màr magasan a horizont felett. Àsìtott,
beer meer maagaasaan aa horizontt felett, Csh,jttott
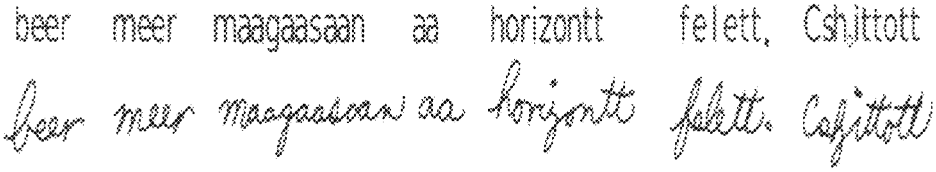

FIG. 143C nyùjtòzkodott ès kinyitotta az ablakot. A madarak

ŋjujttoozkodtott jesh kiŋjitt͵ttaa aaz aablaakoott, Aa maadtaaraak

ŋjujttoozkodtott jesh kiŋjittottaa aaz aablaakoott, Aa maadtaa-raak

èneke ùgy àradt be, mint egy meghivott vendèg.

jeneke juį eeraadt be, mintt eį megjvot vendtjeg.

jeneke juį eeraadt be, mintt eį megjivott vendtjeg.

Megragadta a vizes kancsòt, amibe a falusi kùt

Megraagaadtaa aa vizesh kaanʑoott, aamiibe aa faalush̡ikjutt

Megraagaadtaa aa vizesh kaanʑoott, aamiibe aa faalush̡ikjutt melletti csapbòl kellett vizet tölteni, a reggel elsö meletti ʑaapbool kelett vizett tto/ltten, aa regel elsh̡o/o/ meletti ʑaapbool kelett vizett tto/lteni, aa regel elsh̡o/o/

FIG. 143D szertartàsakent, ès kiment az ajtòn, alig vàrva, hogy elèrje szerttaartteeshaakentt, jes kimentt aaz aajttoon, aalig veervaa hoj eljerje szerttaartteeshaakentt, jes kimentt aaz aajttoon, aalig veervaa hoj eljerje a kutat. Remèlte, hogy ott talàlkozik tegnapi aa kuttaatt. remjeltte, hoj ott ttaaleelkozik ttegnaapi aa kuttatt. remjeltte, hoj ott ttaaleelkozik ttegnaapi baràtjàval, hàtha ott lesz. Szèp nap lenne.

baareettjeevaal, heethaa ott les. Sjep naap lennε.

baareettjeevaal, heethaa ott les. Sjep naap lennε.

FIG. 144A

*Original Vietnamese script, PRINT*

Mốt ngưỡi đãn ống cao lớn đot nhiền tỉnh dậy vã nhảy rạ khoỉ giuỡng như thể anh ta vữa trải qua môt giấi mở khủng khiếp. Anh nhìn ra bên ngoaĩ cửa sổ. Thờĩ tiết thật lã đẹp. Mặt trỗi đang tỏa ánh nắng, vẫn lằ ánh nắng mẫu da cam của buổi sáng sớm mặc dũ đến lúc nẫy đã lên cao tân đuỡng chân trỗi. Anh ngáp một cái, vươn vai rỗi sau đó mở cửa sổ.

*Navlipi, PRINT*

*Navlipi, CURSIVE*

UNIVERSAL SCRIPT THAT ADDRESSES PHONEMIC IDIOSYNCRASY FOR TRANSCRIBING LANGUAGE AND METHODS OF USING THE SAME

FIELD OF THE INVENTION

This invention relates to articles, surfaces, media or educational tools for the conveyance of phonemic and phonetic information. More particularly, it relates to such articles, surfaces, media or educational tools in such a way that a universal script, comprised of glyphs derived almost entirely from the Roman script and with only a few new glyphs, is created for transcription of all the world's languages, with particular attention to a means for expression of the phonemic idiosyncrasies within and between languages and language families. Attention is also directed to being able to express phonemic and phonetic features of languages, including but not limited to, e.g., tones (in tone languages) and clicks (in click languages), through the use of devices such as post-positional operators ("post-ops") and phonemic condensates ("p-cons") replacing cumbersome diacritics and agglomerations currently used.

BACKGROUND OF THE INVENTION

Attempts to come up with a universal script (orthography, "alphabet") capable of being applied to a large number of languages have been made from time immemorial, or at least for several thousand years. These include highly scientific and systematically organized ones, such as the Braahmi, originating in India possibly in the 2nd millennium B.C.E. or earlier, and the Haangul, originating in Korea in the 15th century. They also include more or less "ad-hoc", "build-as-you-go" ones, such as the several Semitic scripts, the Greek script originating from the Semitic scripts, our own Roman script emanating from the Greek script and used in this patent specification, and the script of the International Phonetic Association (IPA) based in London, England.

Examples of attempts within the last approximately 2000 years include the following: Phagspa (Mongolia), various Modi's (India), Japanese, Pahawh (S.E. Asia), Varang Kshiti, Sorang Sampeng, Ol Ciki (all India); scripts developed from the 16th through the 19th centuries by John Hart, Robert Robinson, John Wilkins, Richard Mulcaster, Charles Butler, William Holder, Thomas Smith, August Meigret, Timothy Bright, John Willis, Thomas Shelton/Samuel Pepys William Mason, Samuel Taylor, and Franz Gabelsberger; shorthand and scripts of Sir Isaac Pitman, Andrew Graham and John Gregg; alphabets/scripts of Alexander Ellis, Andrew Graham, George D. Watt (Deseret Alphabet), C. R. Lepsius, Alexander Melville Bell (father of Alexander Graham Bell, inventor of the telephone, a script called "Visible Speech"), Henry Sweet, Otto Jespersen, Janvrin, Charles A. Story, Harry Johnston, Robert L. Owen (U.S. Senator from Oklahoma), Kenneth Pike; scripts for native North and South American languages, including for Cherokee (by Sequoia), Cree/Ojibwe, Inuit (one called Inuktitut and another Uyaqoq), Chippewa; for African languages, including for Vai (by Liberian M. D. Bukele), various West African languages (called N'ko, by Guinean S. Kante); scripts called Unifon (by John R. Malone), Shavian (by Ronald Kingsley, for George Bernard Shaw), Columbian (by James Ewing), Abulhaab (an improved Arabic, by Saad D. Abulhab), J. O. Fraser (for Chinese and other tone languages), S. Pollard (for Hmong and related languages), Tengwar (by J. R. R. Tolkien, author of The Hobbit); newer scripts/alphabets created by LeGuin, A. J. Bloquerst, Josiah Wilbur Arthur, Greenaway, Raymond Weeks, William Makepeace Thackeray. The scripts developed in these examples all fall within one or more classifications of scripts generally accepted in the current linguistics and phonetics literature, such as alphabet, ideographic/logographic, logophonetic, abugida, abjad, syllabic and featural.

Other examples include the following patents: U.S. Pat. No. 6,704,116 B1 (Mar. 9, 2004, Saad D. Abulhaab); U.S. Pat. No. 5,953,692 (Sep. 14, 1999, Steven H. Siegel); U.S. Pat. No. 5,488,363 (Jan. 30, 1996, Jingmin Peng); U.S. Pat. No. 5,137,383 (Aug. 11, 1992, Kam-Fu Wong); U.S. D327,499 (Jun. 30, 1992, Sarah Lemon); U.S. Pat. No. 4,299,577 (Nov. 10, 1981, Milisande L. Marryman); U.S. Pat. No. 4,193,212 (Mar. 18, 1980, Hassan A. Al-Kufaishi).

One of the greatest difficulties in arriving at a single, universal script capable of transcribing all the world's languages is the phonemic idiosyncrasy of languages. This concept of phonemic idiosyncrasy can be briefly defined as the existence of very different sets (usually, pairs) of phones (a phone is any sound relevant to language). A phoneme is a group of slightly or very different sounds that speakers of the language or dialect deem to have the same linguistic function; a very basic test for whether two different phones belong to the same phoneme in a language is whether substitution of one by the other in a word changes the meaning of the word. Allophones are phones that belong to the same phoneme. Phonemic idiosyncrasy is best illustrated with examples.

As one example, the unvoiced and voiced bilabial stops, [p] and [b] are allophones of the same phoneme in many Chinese languages, whereas they are of course different phonemes in most Indo-European languages including English; that is to say, in a language such as Mandarin, it does not make a difference whether one says Beijing or Peltin—the meaning understood is the same. As another example, the bilabial stop [p] and its aspirated counterpart, [ph] (as in Lapham, but also as in put), are allophones of the same phoneme, /p/, in English, whereas they are distinct phonemes in Hindi/Urdu: For in Hindi/Urdu, substitution of one for the other changes the meaning of a word, e.g. pal ("an instant, a moment") vs. phal ("fruit"). This aspirated/unaspirated phonemic opposition exists in all North Indian languages.

Other examples of peculiar allophones found in some languages include [x] and [r], two radically different phones of modern French and German (the first is a velar or sometimes uvular fricative and the second an alveolar tap or trill or semivowel). These are part of the same phoneme in French and German, i.e. substitution of one for the other does not change the meaning of a word. Even other examples include the [v]/[w] and [f]/[ph] phone pairs of Hindi/Urdu, which are freely interchanged and have the same phonemic value, although they are obviously very different phones (the [v] and [f] being labiodental fricatives, whilst the [w] is a bilabial semivowel and the [ph] is an aspirated bilabial stop).

This conception of phonemic idiosyncrasy also encompasses cases where a particular phone is entirely missing from a language, e.g. the [p] in standard Arabic or the [l] in standard Japanese; in these cases the missing phone is always mistaken for one and only one other particular phone, here [b] in Arabic and [r] in Japanese.

The aforementioned examples are by no means comprehensive or complete and are only cited to illustrate the problems in arriving at a single universal script that expresses phonemic information, in the form of phonemic idiosyncrasies, of particular languages or language families. To the best of current knowledge, no past or present script in any part of the world addresses phonemic idiosyncrasy. None of the examples of scripts cited above has taken phonemic idiosyncrasy into consideration or have even recognized phonemic idiosyncrasy as an issue.

The problems that phonemic idiosyncrasy presents when attempting to transcribe different languages (i.e., to convey phonemic information) in a single, universal script, are then easy to visualize. For example, an English speaker, when reading Hindi/Urdu in the universal script, should be able to immediately comprehend that the phone [v] (as in very) can also be pronounced as a [w] (as in wit), with no effect on word meaning. That is to say, the very different sounds [v] and [w] are components of the same phoneme in Hindi/Urdu. Similarly, a Hindi/Urdu speaker should immediately be able to comprehend, when reading English in the same script, that [p] (as in spy) and [ph] (as in put) have the same value in English. Similarly, an English speaker, when reading Arabic in the same universal script, should immediately be able to understand that [p] and [b] are not separate phonemes in Arabic, and such bilabial sounds are usually, but not always, pronounced as [b]; in effect, the sound [p] does not exist in standard Arabic. These problems affect the real world quite dramatically. For example, one of the greatest difficulties in arriving at a single script for Indian languages, which currently have more than 10 distinct scripts, is being able to accommodate the phonemic idiosyncrasy of South Indian vs. North Indian languages: In the former, the aspirated and unaspirated plosives are part of the same phoneme, whereas in the latter, they are very distinct phonemes.

OBJECTS OF THE INVENTION

Apart from the all-important requirement of being able to address phonemic idiosyncrasy as described above, there are several other important requirements for conveying phonemic and phonetic information in a Universal Script.

One such requirement is universality and completeness. This implies being able to represent every single phone and tone found in the world's major languages. Quite evidently, a prerequisite for this requirement is a thorough and complete phonological classification.

Another set of requirements is recognizability, distinctiveness, simplicity and intuitive nature. For example, recognizability may mean the use of the Roman script ("alphabet") as a basis, since historical happenstance has rendered this particular script ubiquitous in all corners of the world. The property of distinctiveness, closely related to recognizability, implies that two glyphs (letters), especially those representing similar phones, should be easily distinguishable.

As an example of a script that appears to be partly lacking in recognizability and distinctiveness, one may cite the "alphabet" of the International Phonetic Association based in London, England (referred hereinafter as the IPA). In the IPA, many glyphs (letters) appear to be straight from outer space, to use a very harsh description. And many very similar glyphs are highly confusing, even to the expert. Examples among these are the various inverted and rotated e's and a's, the inverted/rotated/hooked, etc. variants of r and R used to represent the various alveolar trills and flaps or uvular "r's", and the variants of n with inward/outward hooks, etc. used for the various nasals. These properties also make such glyphs difficult to transcribe cursively and to keyboard.

Simplicity and intuitive nature are associated with recognizability: As an example, the large number of glyphs and diacritics in the IPA detracts from simplicity. This leads to associated problems, such as slow keyboarding. Intuitive nature can be expressed, in orthography, by, e.g., using [aa] and [a] for the open and open-mid jaw positions of the central vowel (as in father and bun, respectively), or duplicating vowel glyphs to indicate vowel lengthening, e.g. short [i], [u] vs. long [ii], [uu], as already used in modern Finnish. In keyboarding, it can be expressed, e.g., by using (Alt+h) to keyboard aspiration. Another important set of requirements is ease and rapidity of transcription from three points of view: Cursive, print and keyboard.

Apart from the above requirements, there are several preferred properties of a means of conveying phonemic information such as a universal script. These include systematic, scientific classification and accuracy in the phonological classification used as basis for the script. As an example, such systematic, scientific classification is found in the Braahmi script and its descendants, and the Korean Haangul, but not in the Roman alphabet or the IPA. Conversely, accuracy may be lacking in the IPA, since its classification of vocalic-r as "rhoticity" and several palatal plosives as affricates, is the subject of much contention.

Another set of preferred properties is discretization and the related practical phonemics. These properties can be understood with an illustrative example: If one were to use lip position as one of the variables in classification of a vowel, then, to represent a vast majority of the world's languages, one would need to use only three, discrete values of this variable, comprising the lips rounded (as in boot), flat (as in but) or stretched (as in beet), although there are innumerable additional values of this variable possible between these three values. In our treatment, we thus discretize the lip position variable to just these three values from the point of view of practical phonemics, since the other, intermediate values of this variable have no phonemic significance in a vast majority of the world's languages.

SUMMARY OF THE INVENTION

The present invention provides an article having a surface that can convey phonemic and phonetic information with the requirements described above, in particular the requirement of addressing phonemic idiosyncrasy. The script that the present invention uses to convey this phonemic and phonetic information is given the appellation NAVLIPI. In particular, the article of the present invention has a surface that contains at least one word having at least one glyph wherein said word comprises at least one of (a) one or more phonemic condensates; (b) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (c) one or more post-ops indicating tones as used in a tone language, wherein, said tones are depicted in Table 5, FIG. 132A-C; or (d) one or more glyphs selected from the group consisting of: (i) a medio-palatal, unvoiced, unaspirated plosive phone depicted by the glyph 1-6 set forth in FIGS. 53-55; (ii) a medio-palatal, voiced, unaspirated plosive phone depicted by the glyph 3-6 set forth in FIGS. 53-55; (iii) a velar, nasal, plosive phone depicted by the glyph 5-4 set forth in FIGS. 50-52; (iv) a retroflex, nasal, plosive phone depicted by the glyph 5-5 set forth in FIGS. 50-52; (v) a mediopalatal, nasal, plosive phone depicted by the glyph 5-6 set forth in FIGS. 53-55; (vi) a standard palatal, nasal, plosive phone depicted by the glyph 5-7 set forth in FIGS. 53-55; (vii) a retroflex, unvoiced, unaspirated plosive phone depicted by the glyph 1-5 set forth in FIGS. 50-52; (viii) a retroflex, voiced, unaspirated plosive phone depicted by the glyph 3-5 set forth in FIGS. 50-52 and (ix) velar, voiced fricative depicted by the glyph 7-4 set forth in FIGS. 59-61.

Furthermore, the invention is directed to a method for providing phonemic information comprising providing the articles of the present invention. In a related aspect, the invention is further directed to a method for indicating phonemic information comprising: (a) representing allophones as phonemic condensates and/or classifying at least one of: (A) vowel phone according to three lip, five jaw and four tongue positions and represented in a 3-d matrix depicted in FIGS. 1-3, particularly FIG. 1A-B; (B) a nonvowel phone having a phonochromaticity (the "color" of the phone, such as voiced or unvoiced, aspirated or fricatized) and articulation position (denoted as "artition") depicted in FIGS. 49-114, particularly FIGS. 50-98; and (b) displaying said phonemic information obtained in (a) on an article having a surface.

The invention further provides a keyboard, comprising the following two features: (a) a plurality of keys wherein each key is allocated four values, corresponding, to the key pressed alone, the key pressed along with the SHIFT key, the key pressed along with the ALT key, and the key pressed along with the CTRL key and (b) an Alt bar at least two times wider than the space bar.

In a particular embodiment, the keyboard is a language specific keyboard. As defined herein, a "language specific keyboard" contains keys specific to a particular language or group of languages. The language specific keyboard may contain keys specific to the following groups of languages including but not limited to (1) Hindi/Spanish/Indonesian; (2) English/French/German/Other non-Spanish European languages; (3) Arabic; (4) Yoruba/Igbo; (5) Mandarin/Cantonese; (6) South African; (7) Tamil. In a more particular embodiment, the keyboard may contain keys set forth in FIG. 134. For example, ALT+k key in the Hindi/Spanish/Indonesian keyboard would print as [kh], a velar unvoiced aspirated plosive, whereas in the Arabic keyboard, it would print as [g], which is the uvular, unvoiced, unaspirated, plosive.

In yet another particular embodiment, the keyboard of the present invention contains in addition to the plurality of keys, tone keys, optionally set forth in FIG. 132A-C.

In yet another particular embodiment the keyboard of the present invention further comprises (A) a plurality of standard keys and (B) one or more glyphs of a script associated with a selected subset of the plurality of keys, said script comprising at least one of: (a) one or more phonemic condensates; (b) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (c) one or more post-ops indicating tones as used in a tone language, wherein, said tones are depicted in Table 5, FIG. 132A-C; or (d) one or more glyphs selected from the group consisting of: (i) a medio-palatal, unvoiced, unaspirated plosive phone depicted by the glyph 1-6 set forth in FIGS. 53-55; (ii) a medio-palatal, voiced, unaspirated plosive phone depicted by the glyph 3-6 set forth in FIGS. 53-55; (iii) a velar, nasal, plosive phone depicted by the glyph 5-4 set forth in FIGS. 50-52; (iv) a retroflex, nasal, plosive phone depicted by the glyph 5-5 set forth in FIGS. 50-52; (v) a mediopalatal, nasal, plosive phone depicted by the glyph 5-6 set forth in FIGS. 53-55; (vi) a standard palatal, nasal, plosive phone depicted by the glyph 5-7 set forth in FIGS. 53-55; (vii) a retroflex, unvoiced, unaspirated plosive phone depicted by the glyph 1-5 set forth in FIGS. 50-52; (viii) a retroflex, voiced, unaspirated plosive phone depicted by the glyph 3-5 set forth in FIGS. 50-52 and (ix) velar, voiced fricative depicted by the glyph 7-4 set forth in FIGS. 59-61.

The keyboard of the present invention may be used in a language specific system that comprises (a) a language specific keyboard of the present invention and (b) a language specific processor coupled to the keyboard that associates selection of a key on said keyboard with a glyph applicable to the language. In a particular embodiment, the script comprises at least one of: (a) one or more phonemic condensates; (b) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (c) one or more post-ops indicating tones as used in a tone language, wherein, said tones are depicted in Table 5, FIG. 132A-C; or (d) one or more glyphs selected from the group consisting of: (i) a medio-palatal, unvoiced, unaspirated plosive phone depicted by the glyph 1-6 set forth in FIGS. 53-55; (ii) a medio-palatal, voiced, unaspirated plosive phone depicted by the glyph 3-6 set forth in FIGS. 53-55; (iii) a velar, nasal, plosive phone depicted by the glyph 5-4 set forth in FIGS. 50-52; (iv) a retroflex, nasal, plosive phone depicted by the glyph 5-5 set forth in FIGS. 50-52; (v) a mediopalatal, nasal, plosive phone depicted by the glyph 5-6 set forth in FIGS. 53-55; (vi) a standard palatal, nasal, plosive phone depicted by the glyph 5-7 set forth in FIGS. 53-55; (vii) a retroflex, unvoiced, unaspirated plosive phone depicted by the glyph 1-5 set forth in FIGS. 50-52; (viii) a retroflex, voiced, unaspirated plosive phone depicted by the glyph 3-5 set forth in FIGS. 50-52 and (ix) velar, voiced fricative depicted by the glyph 7-4 set forth in FIGS. 59-61.

In a related aspect, the invention provides an apparatus and method for indicating phonemic information. The apparatus comprises (a) a means for inputting data representing glyphs of the script set forth above with respect to the keyboard, (b) a processing means coupled to the means for inputting data of (a) for receiving the data inputted and associating the data received with glyphs of the script set forth in the previous paragraph above and (c) a display means for displaying glyphs of the script to indicate phonemic information. The method comprises (a) providing data representing glyphs of the script used in the keyboard and apparatus of the present invention; (b) processing the data provided in step (a) with a processing device to associate said data inputted with said glyphs and (c) displaying said glyphs of said script with a display device. In the apparatus and methods of the present invention, data may be inputted using a keyboard or voice recognition device. Data inputted may be processed using a data processing device such as computer readable media, particularly when a keyboard is used. The computer readable media may comprise instructions for: (1) transcribing phonemic idiosyncrasy by means of phonemic condensates; (2) indicating language of a script and (3) associating a glyph with pressing of a keyboard character key and optionally simultaneous pressing of a keyboard shift, control or alt key, wherein said glyph is at least one of: (a) one or more phonemic condensates; (b) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (c) one or more post-ops indicating tones as used in a tone language, wherein, said tones are depicted in Table 5, FIG. 132A-C; or (d) one or more glyphs selected from the group consisting of: (i) a medio-palatal, unvoiced, unaspirated plosive phone depicted by the glyph 1-6 set forth in FIGS. 53-55; (ii) a medio-palatal, voiced, unaspirated plosive phone depicted by the glyph 3-6 set forth in FIGS. 53-55; (iii) a velar, nasal, plosive phone depicted by the glyph 5-4 set forth in FIGS. 50-52; (iv) a retroflex, nasal, plosive phone depicted by the glyph 5-5 set forth in FIGS. 50-52; (v) a mediopalatal, nasal, plosive phone depicted by the glyph 5-6 set forth in FIGS. 53-55; (vi) a standard palatal, nasal, plosive phone depicted by the glyph 5-7 set forth in FIGS. 53-55; (vii) a retroflex, unvoiced, unaspirated plosive phone depicted by the glyph 1-5 set forth in FIGS. 50-52; (viii) a retroflex, voiced, unaspirated plosive phone depicted by the glyph 3-5 set forth in FIGS. 50-52 and (ix) velar, voiced fricative depicted by the glyph 7-4 set forth in FIGS. 59-61.

BRIEF DESCRIPTION OF THE DRAWINGS

FIG. 1 shows the vowel classification used in the present invention.

FIGS. 3-48 show the Y-cross sections of the 3-dimensional classification matrix.

FIGS. 3-6 show the Y cross-section circled in FIG. 1A.

FIG. 48 provides footnotes for FIGS. 3-47.

FIGS. 49-114 illustrate the two-dimensional non-vowel classification matrix including semivowels, centrals and laterals used in the present invention.

FIG. 49 shows the key for the two dimensional non-vowel classification matrices set forth in FIGS. 50-85 and FIGS. 87-114.

FIG. 86 shows footnotes for the classification matrices set forth in FIGS. 50-85.

FIGS. 87-92 show the two-dimensional nonvowel classification matrix for simple semivowels.

FIGS. 93-102 shows the two dimensional nonvowel classification matrixes for centrals (“r”-sounds).

FIGS. 103-114 show the two dimensional nonvowel classification matrixes for laterals (“l”-sounds).

FIG. 115A-D shows the didactic (pedagogical) order of NAVLIPI. FIG. 115A shows the suggested pedagogical “alphabetical” order of NAVLIPI for A. Vowels, Fundamental, B. Vowels, Derivative, B. Non Vowels, except, ejectives and implosives; FIGS. 115B and 115C show, respectively, the suggested pedagogical “alphabetical” order of NAVLIPI for B. Non Vowels, except clicks, ejectives and implosives, and for D. Phonemic Condensates and E. Tones; FIG. 115D shows the suggested pedagogical “alphabetical” order of NAVLIPI for F. Clicks, Implosives, Ejectives.

FIGS. 116-133 show the keyboarding scheme used in the invention. FIG. 116D shows a combination of the matrix notation and 4-part keys, to arrive at the key notation, used to refer to NAVLIPI keyboard keys. FIG. 116E shows the NAVLIPI keyboard layout, for the American QWERTY keyboard, showing changes to the ALT keys and Spacebar. Only the regular (non-“ergonomic”) keyboard is shown for simplicity.

FIG. 117A-C show a list of key changes reflecting major reassignments. For convenience in reference, the keys are addressed in the (m)(n)(X) key notation described earlier.

FIG. 118 shows changed number keys, as to be used in NAVLIPI. The keys for numbers 5 to 9 are shown with their SHIFT, ALT and CTRL places blank, since the characters for the SHIFT setting of these keys in the QWERTY keyboard, that is to say the characters %, ˆ, &, * and (, have been moved to other locations in the NAVLIPI keyboard. These free places are then to be used for tones. The keys (15 to 22)(2), i.e. all the Row #2 keys in columns 15 through 22, remain unchanged.

FIG. 119 shows a list of key changes, reflecting keys with high frequency of use and some major post-ops. Once again, for convenience in reference, the keys are referenced in the (m)(n)(X) key notation described earlier.

FIG. 120 shows the Central (“R”) key used in the Hindi/Spanish//Indonesian keyboard and the English/French/German/West European languages keyboard.

FIG. 121 shows the major lateral (“L”) key. There is only one major lateral (“L”) key. Other lateral phones are incorporated into phonemic condensates, most of which are in common with central (“R”) phones and have been dealt with earlier. NAVLIPI uses only two (2) language-specific variants of the major lateral key, the Hindi/Spanish/Indonesian keyboard and the English/French/German/West European languages keyboard. The Hindi/Spanish/Indonesian keyboard can also be used for Arabic, Mandarin/Cantonese and Tamil keyboards.

FIGS. 122 and 123 show major velar keys.

FIG. 124 shows major palatal and sibilant keys. For these, NAVLIPI is able to use common keys for all language groups. Thus, these keys are not language-specific.

FIGS. 125A-E shows a summary of A. (6)(3), B. (4)(4) and C. (11)(4) and (12)(4) keys for major language-specific keyboards.

FIG. 126 shows a summary of the bilabial (11)(3)(p) and (6)(5), (b) keys for major language-specific keyboards. There would be several other, language-specific keyboards, not shown here for space reasons, e.g. for the Min-Chinese languages such as Fujienese/Hokka, for the Tamil/South Indian languages, etc.

FIG. 127 shows major nasal (“M-N”) keys.

FIG. 128 shows major standard-semivowel keys.

FIG. 129 shows major vowel keys.

FIG. 130 shows special non-vowel keys.

FIG. 131 shows keys for very rare post-ops.

FIG. 132A-C shows tone keys.

FIG. 133 shows rare central glyphs.

(1) The Chinese script, (2) The Roman transcription according to the official Chinese government method.

(3) Rough, word-for-word translation, into English.

(4) The NAVLIPI PRINT transcription.

(5) The NAVLIPI CURSIVE transcription.

(In the latter two, the alternative transcription for nasalizations is given in square brackets.) For clarity, the NAVLIPI post-ops for the TONES are highlighted in dotted circles with an arrow pointer for cursive.

Figure 1A:
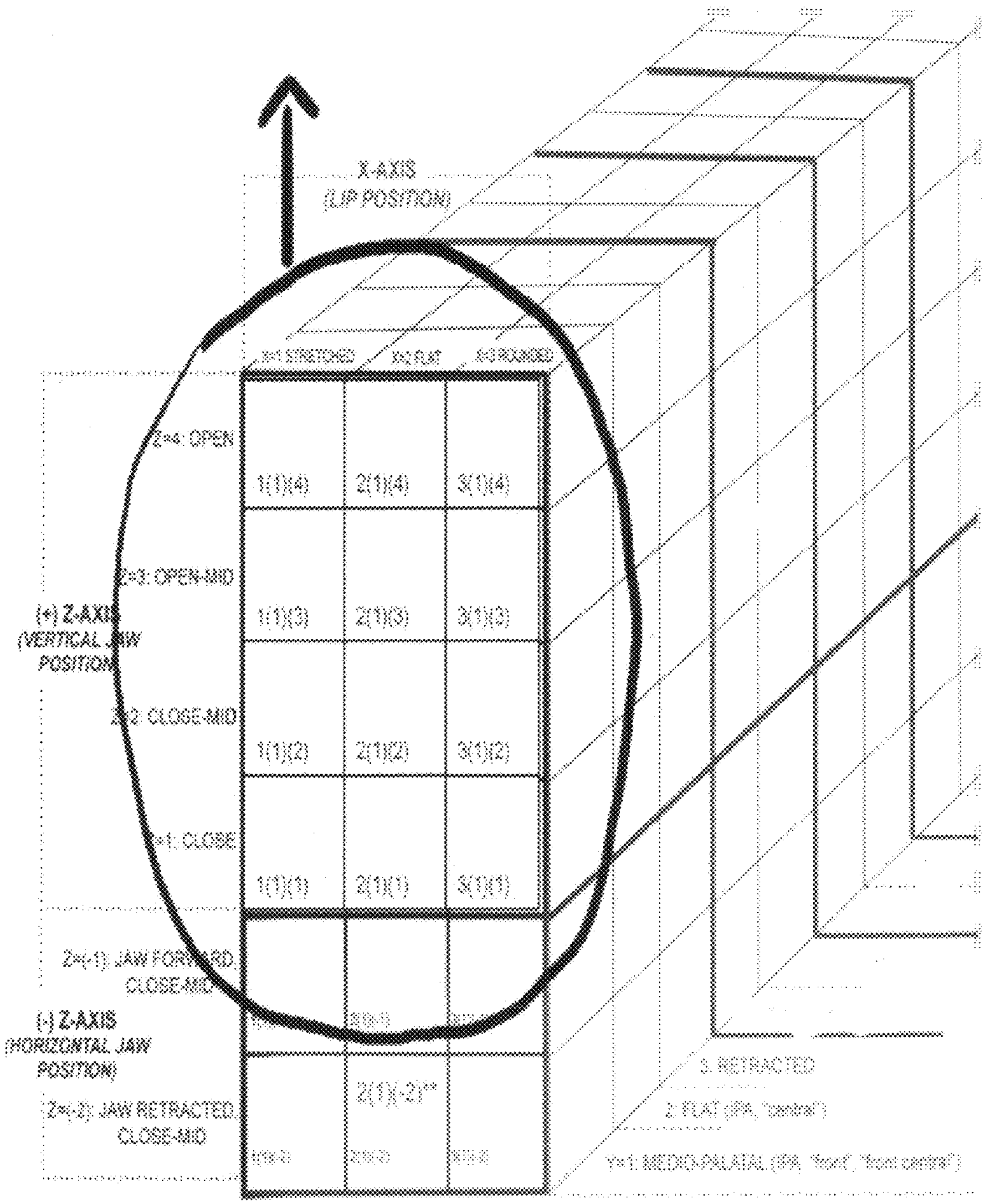
FIG. 1A-B show the 3-dimensional NAVLIPI vowel classification matrix.
Figure 1B:
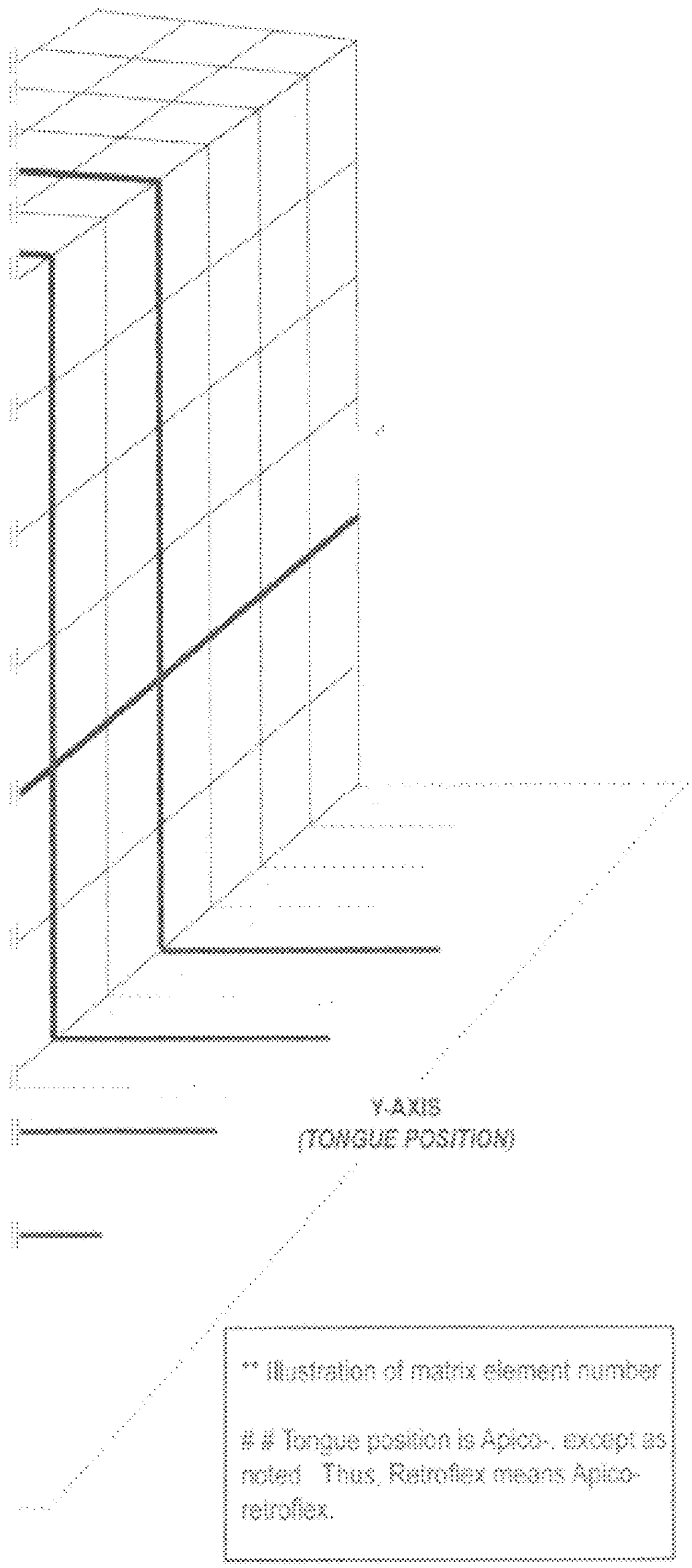
Figure 2:
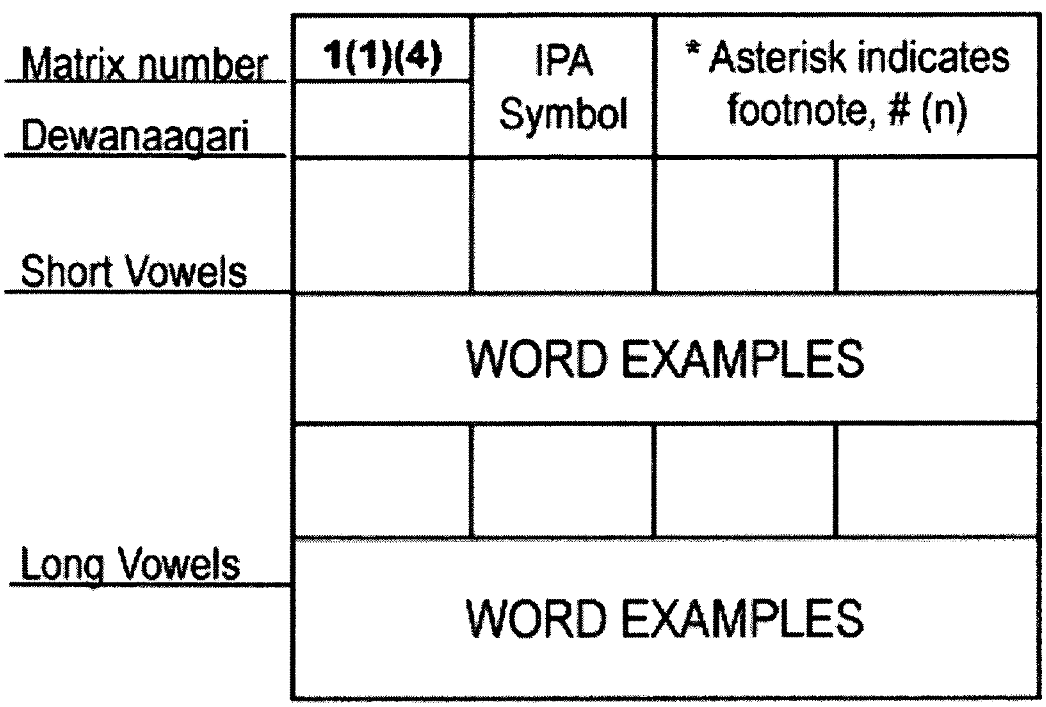
FIG. 2 shows the key for the Y cross-section of the 3-dimensional classification matrix shown in FIGS. 3-48.
Figure 3:
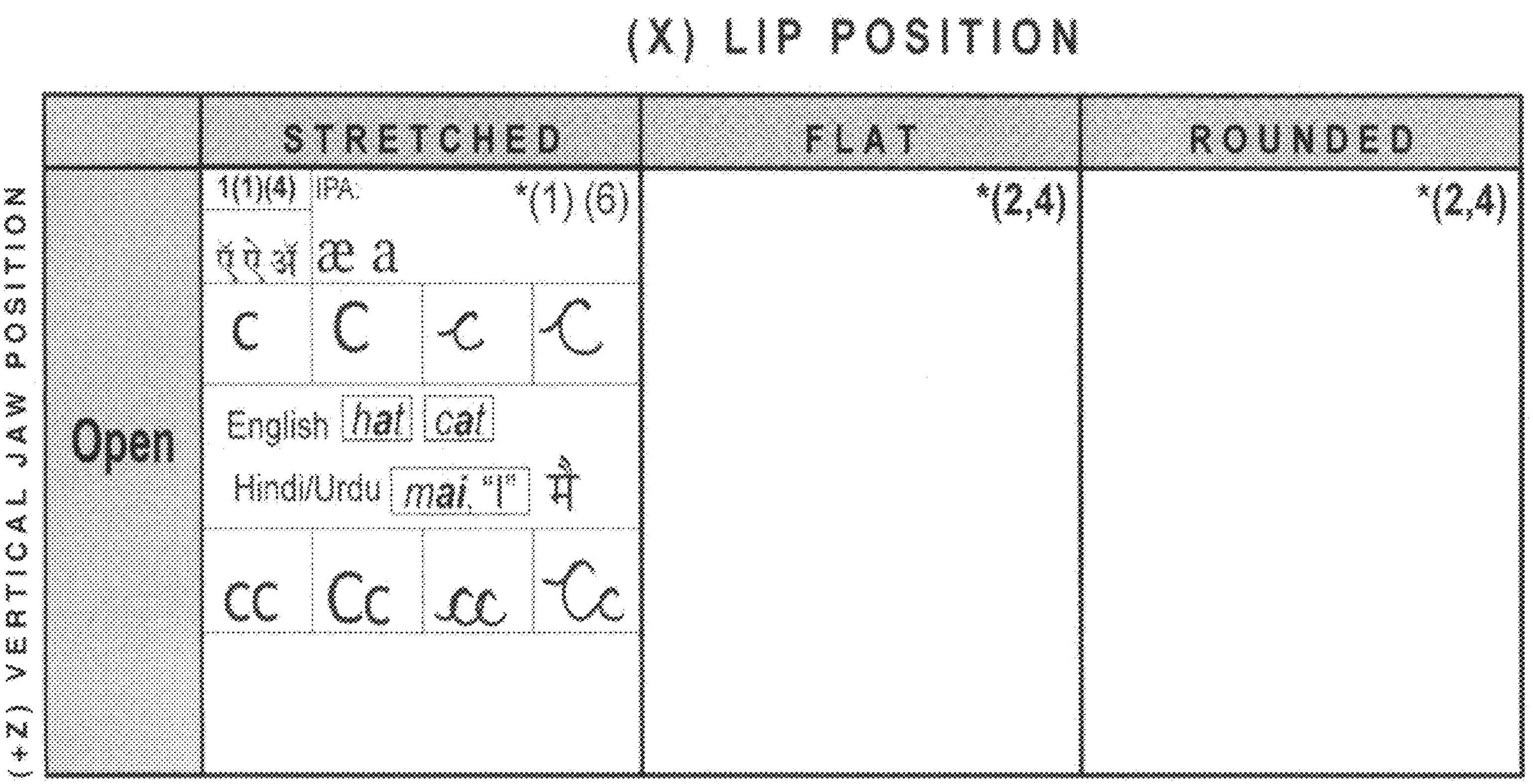
Figure 4:
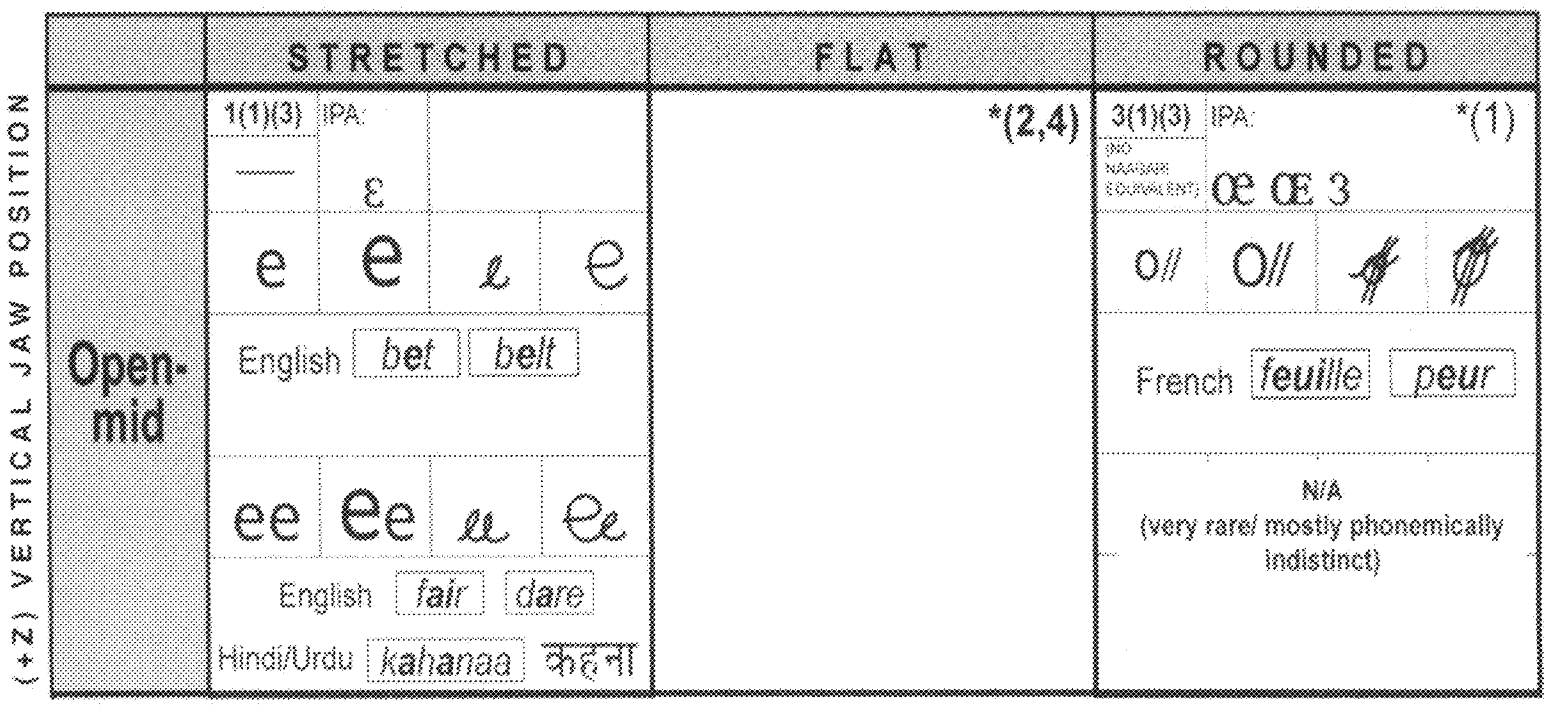
Figure 5:
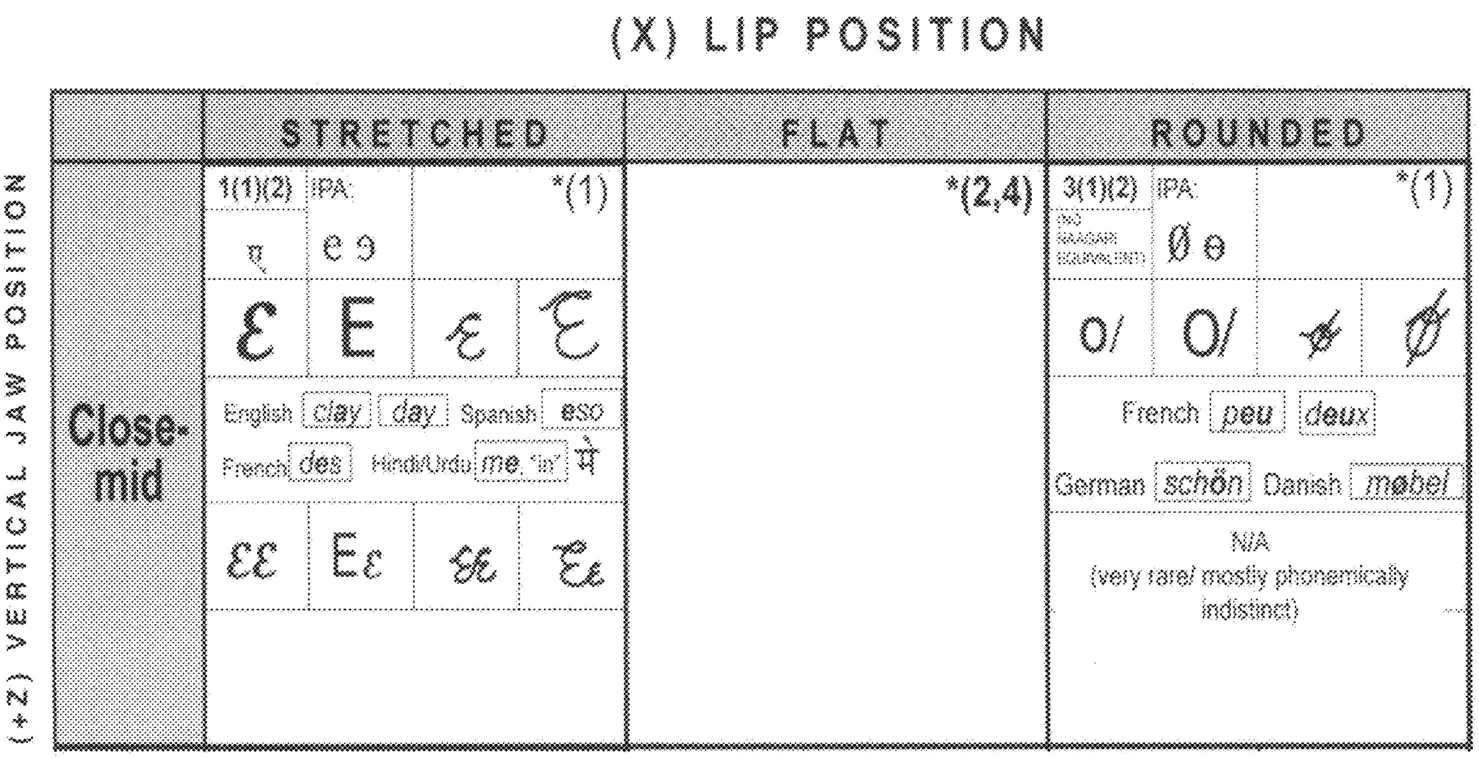
Figure 6:
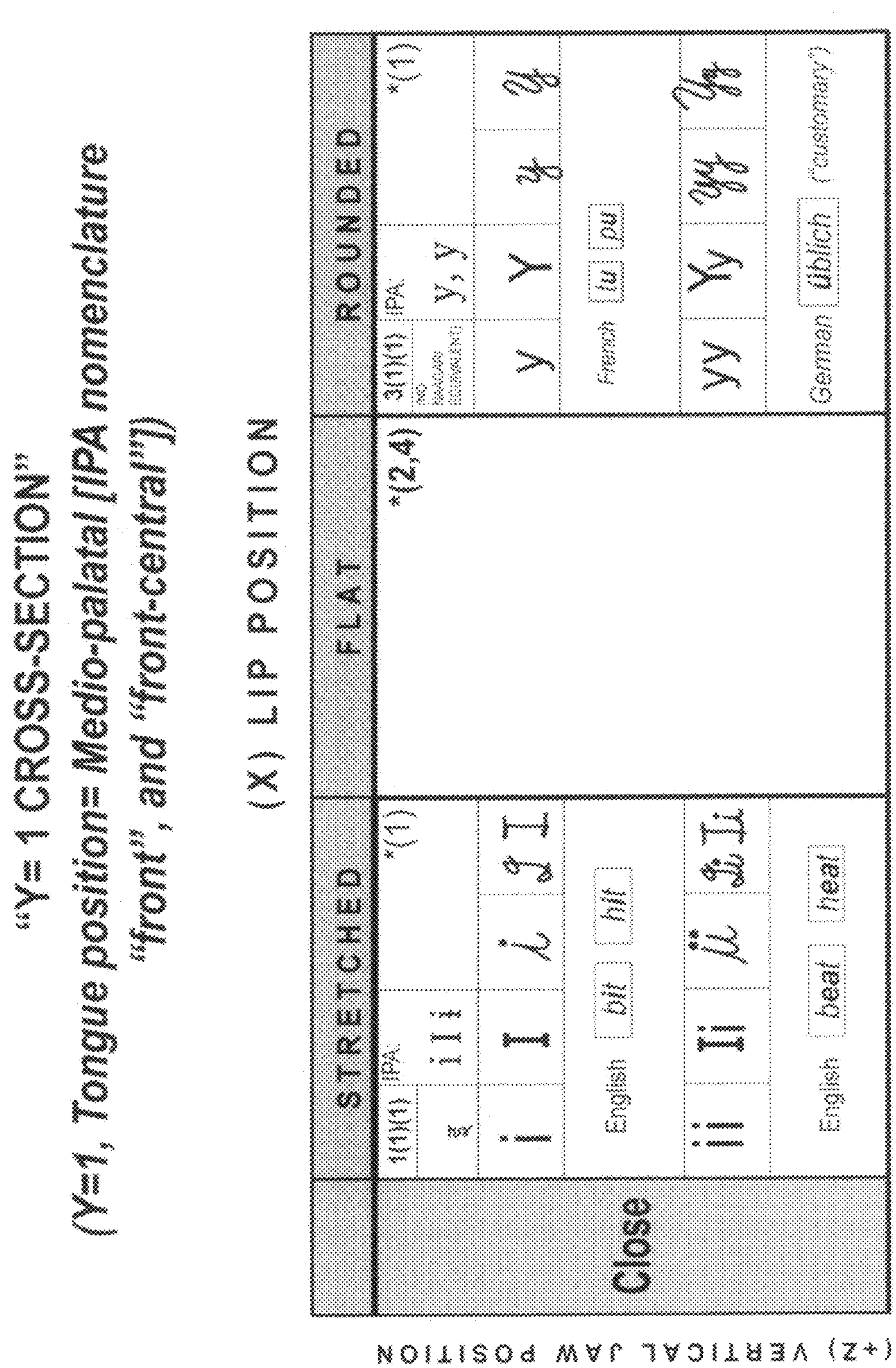
Figure 7:
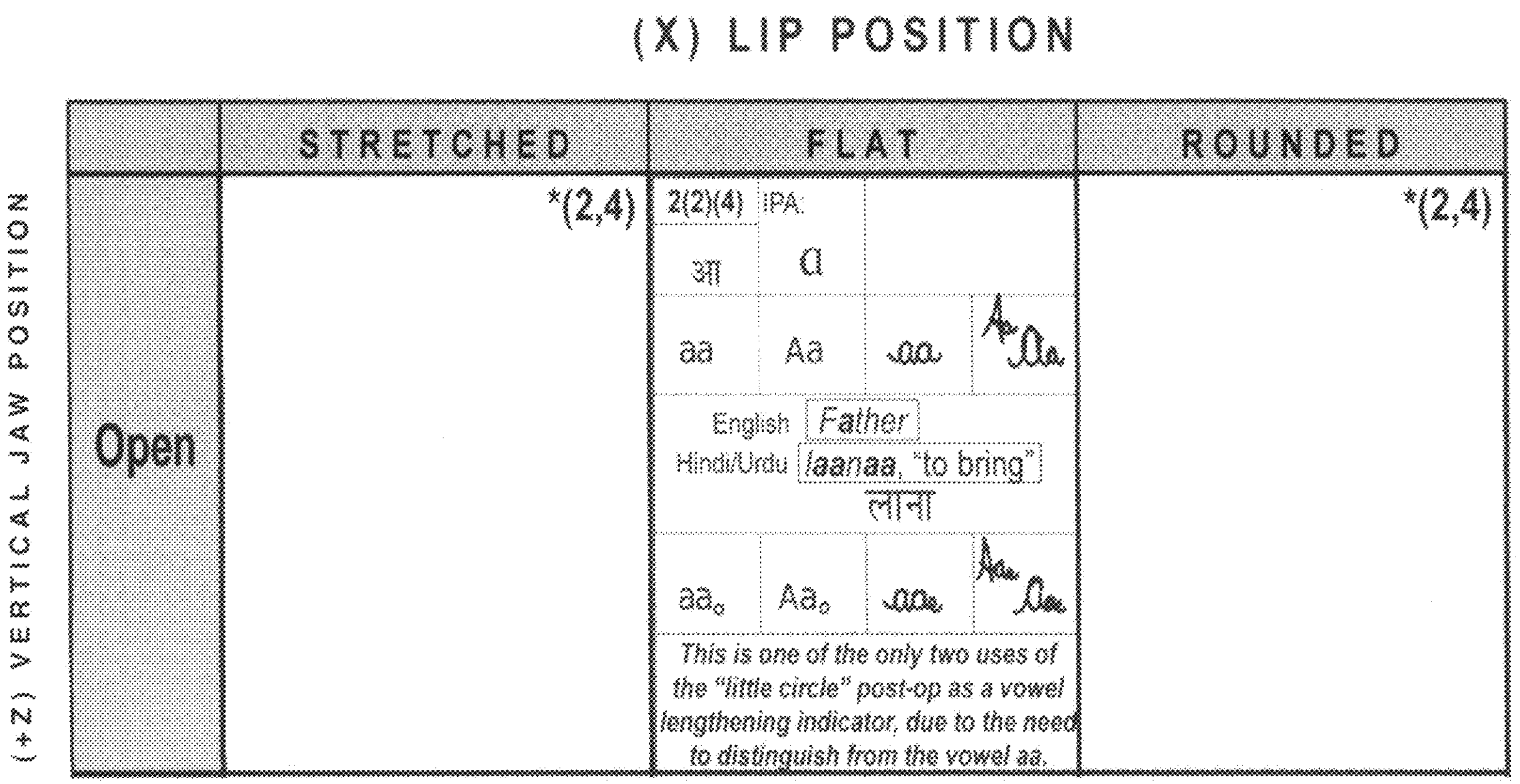

Tones: 1st tone: level, high, Chinese government Roman transcription (). NAVLIPI print transcription: as shown in the figure. 2nd tone: rising, mid to high, Chinese government Roman transcription ( ). NAVLIPI print transcription: as shown in the figure. 3rd tone: falling (mid-to-low)+rising (low-to-mid), Chinese government Roman transcription (). NAVLIPI print transcription: as shown in the figure. 4th tone: falling, high-to-low, Chinese government Roman transcription (). NAVLIPI print transcription: as shown in the figure.

FIG. 136A-C shows the transcription of a Hindu/Urdu passage into NAVLIPI. Lines give:

(1) The Hindu/Urdu script.

(2) The “rough” Roman transcription, in italics.

(3) The NAVLIPI PRINT transcription.

(4) The NAVLIPI CURSIVE transcription.

(In the latter two, the alternative transcription for nasalizations is given in square brackets.)

Figure 137C:

FIG. 137A-C shows the transcription of an English passage into NAVLIPI. Lines give:

(1) The English.

(2) The NAVLIPI PRINT transcription.

(3) The NAVLIPI CURSIVE transcription.

(In the latter two, the alternative transcription for nasalizations is given in square brackets.)

FIG. 138A-B shows the transcription of a Spanish passage into NAVLIPI. Lines give:

(1) The Spanish.

(2) The NAVLIPI PRINT transcription.

(3) The NAVLIPI CURSIVE transcription.

(In the latter two, the alternative transcription for nasalizations is given in square brackets.)

FIG. 139A-E shows the transcription of an Arabic passage into NAVLIPI. FIG. 139A shows the original Arabic. FIGS. 139B-E shows the NAVLIPI cursive transcription.

FIG. 140A-B shows the transcription of a French passage into NAVLIPI. Lines give:

(1) The French.

(2) The NAVLIPI PRINT transcription.

(3) The NAVLIPI CURSIVE transcription.

(In the latter two, the alternative transcription for nasalizations is given in square brackets.)

FIG. 141A-C shows the transcription of a German passage into NAVLIPI.

FIG. 142A-C shows the transcription of a Marathi (Maraathi) passage into NAVLIPI. Lines give:

(1) The Marathi script.

(2) The "rough" Roman transcription, in italics.

(3) The NAVLIPI PRINT transcription.

(4) The NAVLIPI CURSIVE transcription.

(In the latter two, the alternative transcription for nasalizations is given in square brackets.) Note: The NAVLIPI transcription is an as-spoken transcription. Thus, e.g., madhye is transcribed as madhe, since that is how it is pronounced in common usage, sort of like the gh in English light not being pronounced in common usage.

FIG. 143A-D shows the transcription of a Hungarian passage into NAVLIPI.

Figure 144B:
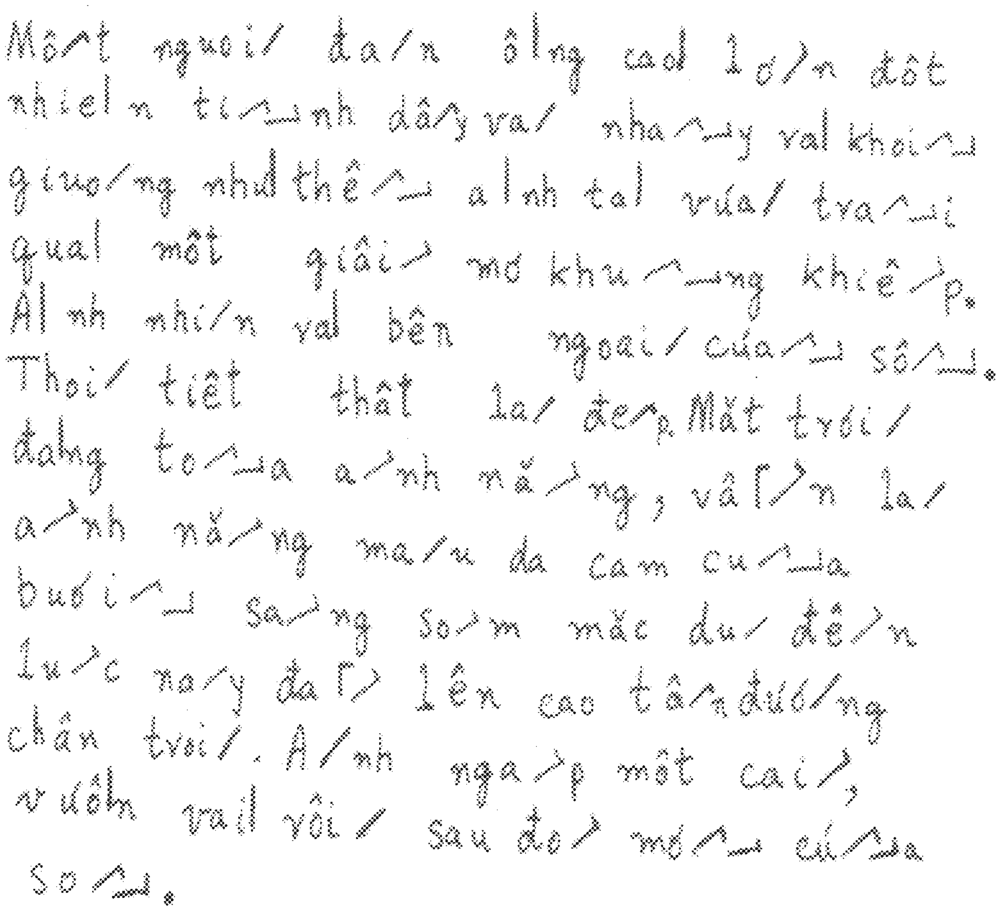
Figure 144C:
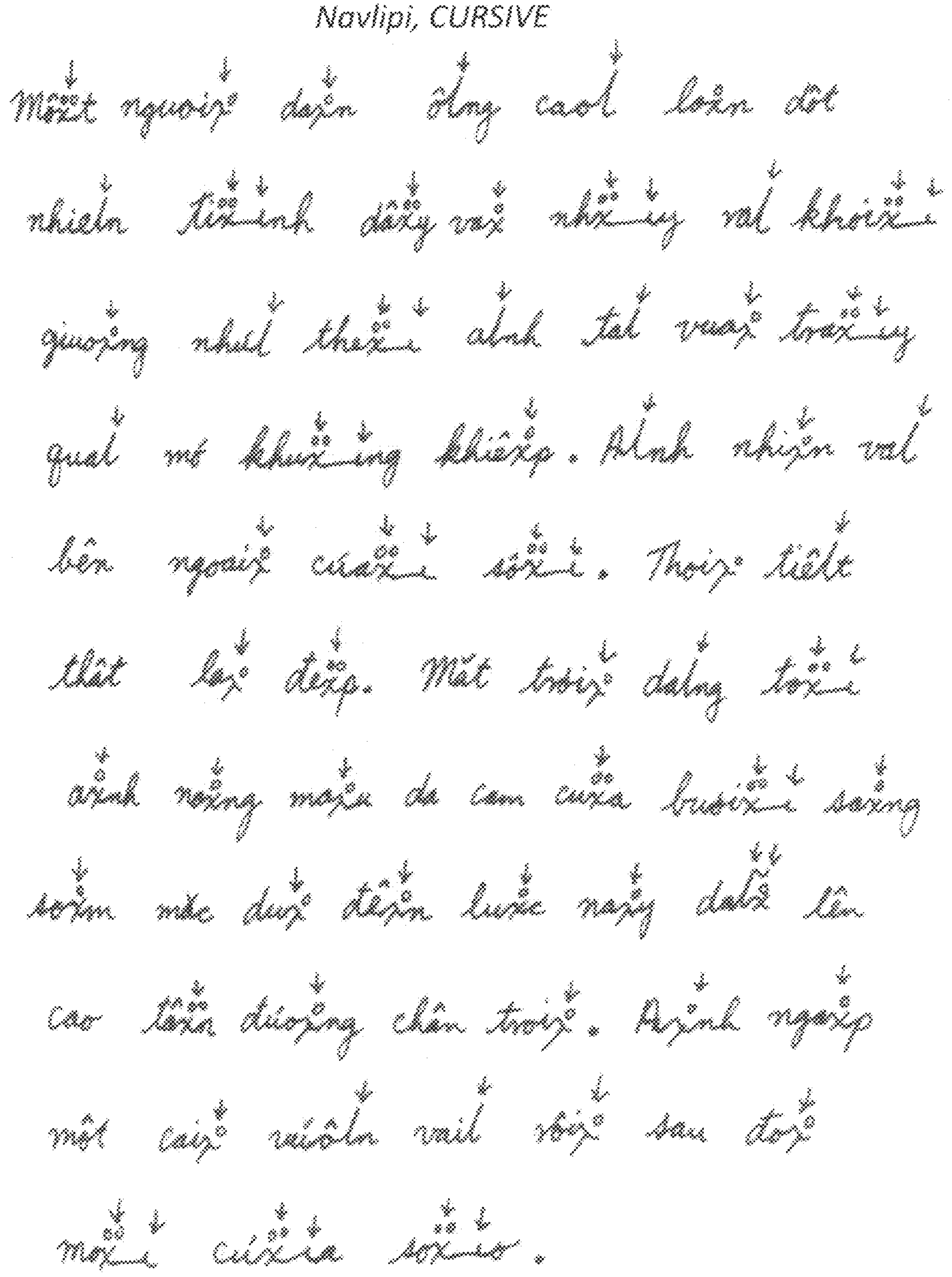

FIG. 144A-C shows the transcription of a Vietnamese passage into NAVLIPI. FIG. 144A shows the original Vietnamese script; FIG. 144B shows the NAVLIPI transcription (print) and FIG. 144C shows the NAVLIPI transcription (script).

DETAILED DESCRIPTION OF THE INVENTION

While the compositions, methods and devices heretofore are susceptible to various modifications and alternative forms, exemplary embodiments will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Unless defined otherwise, all technical and scientific terms used herein have the same meaning as commonly understood by one of ordinary skill in the relevant art. Although any methods and materials similar or equivalent to those described herein can also be used, the preferred methods and materials are now described.

Figure 50:
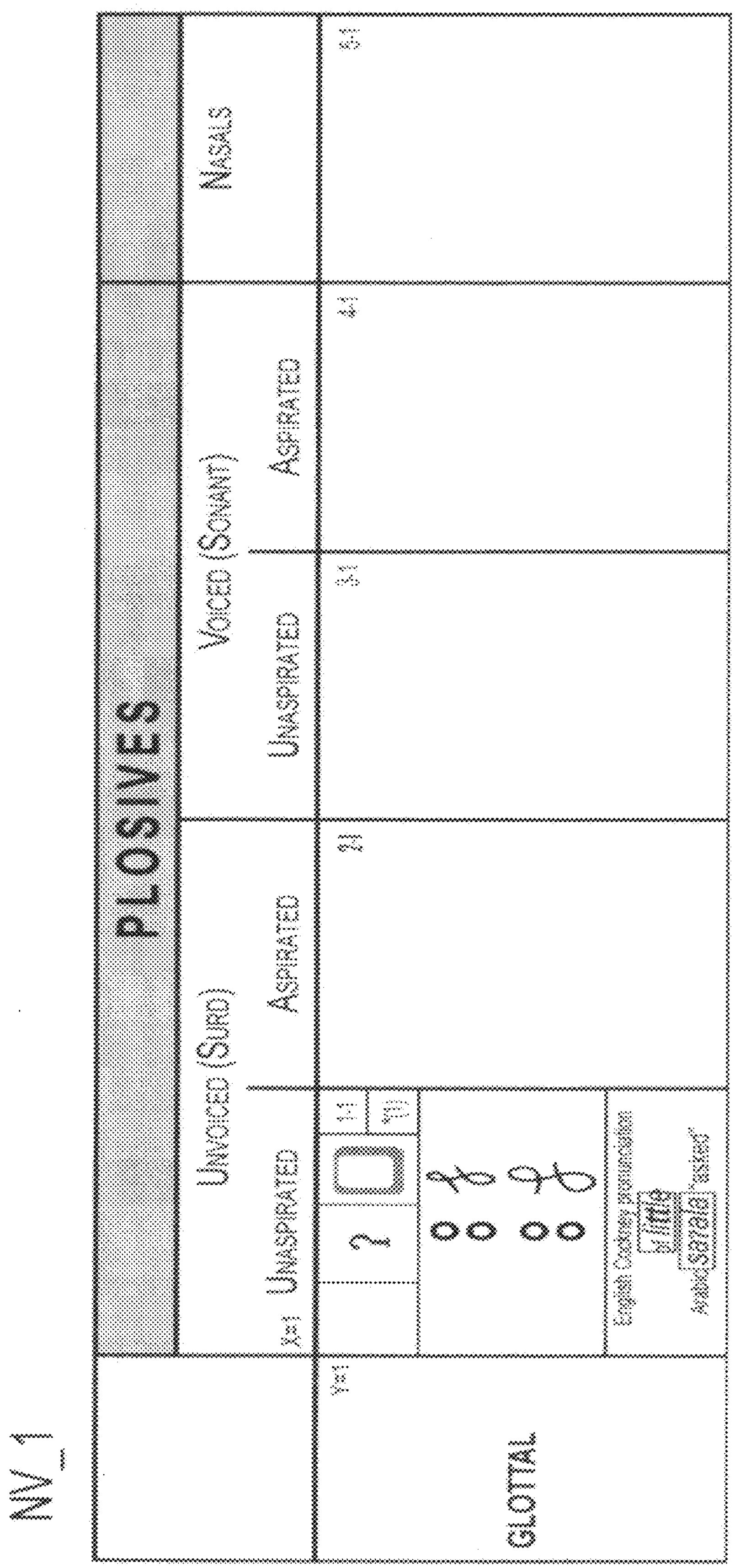
Figure 51:
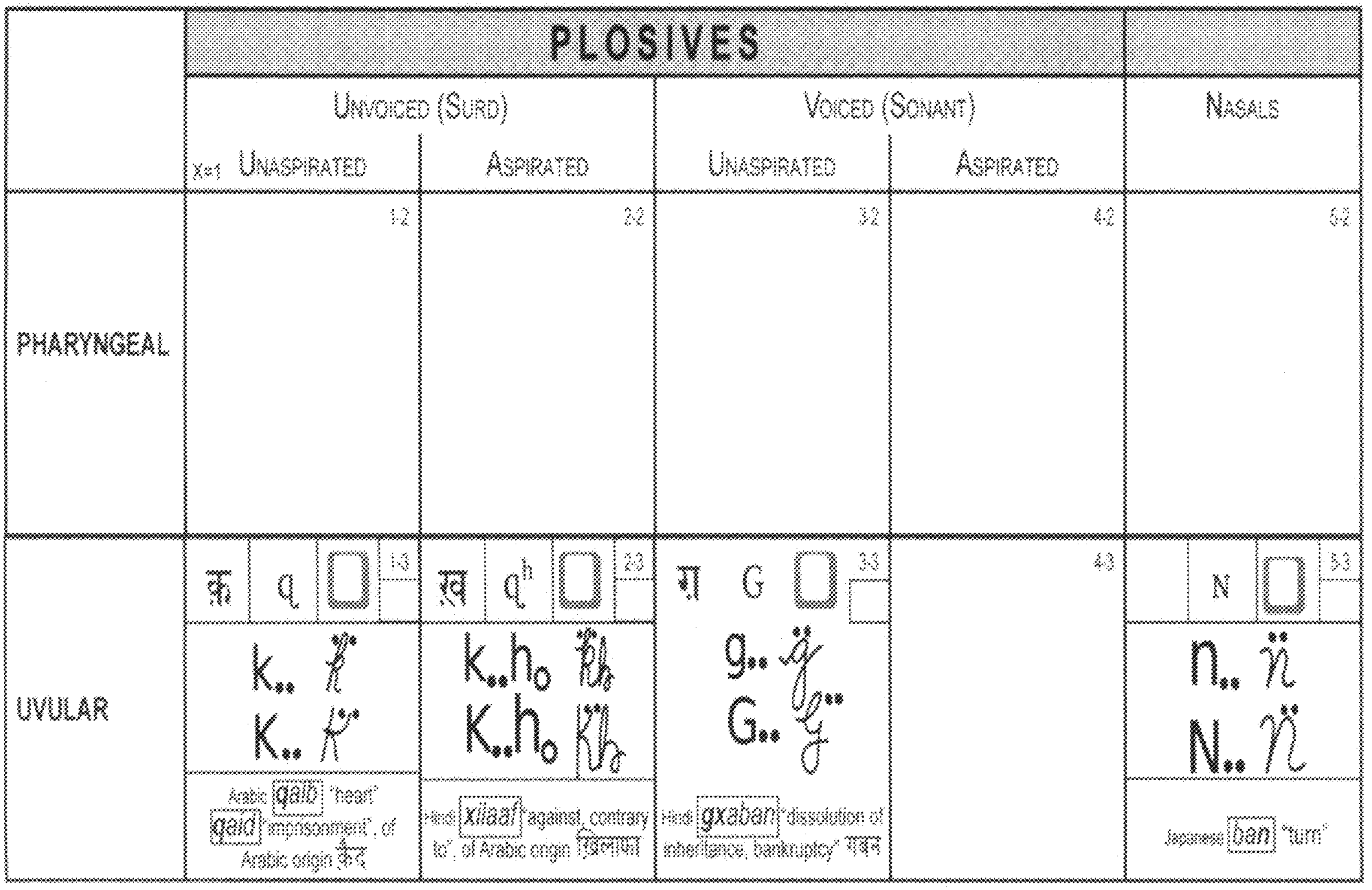
Figure 52:
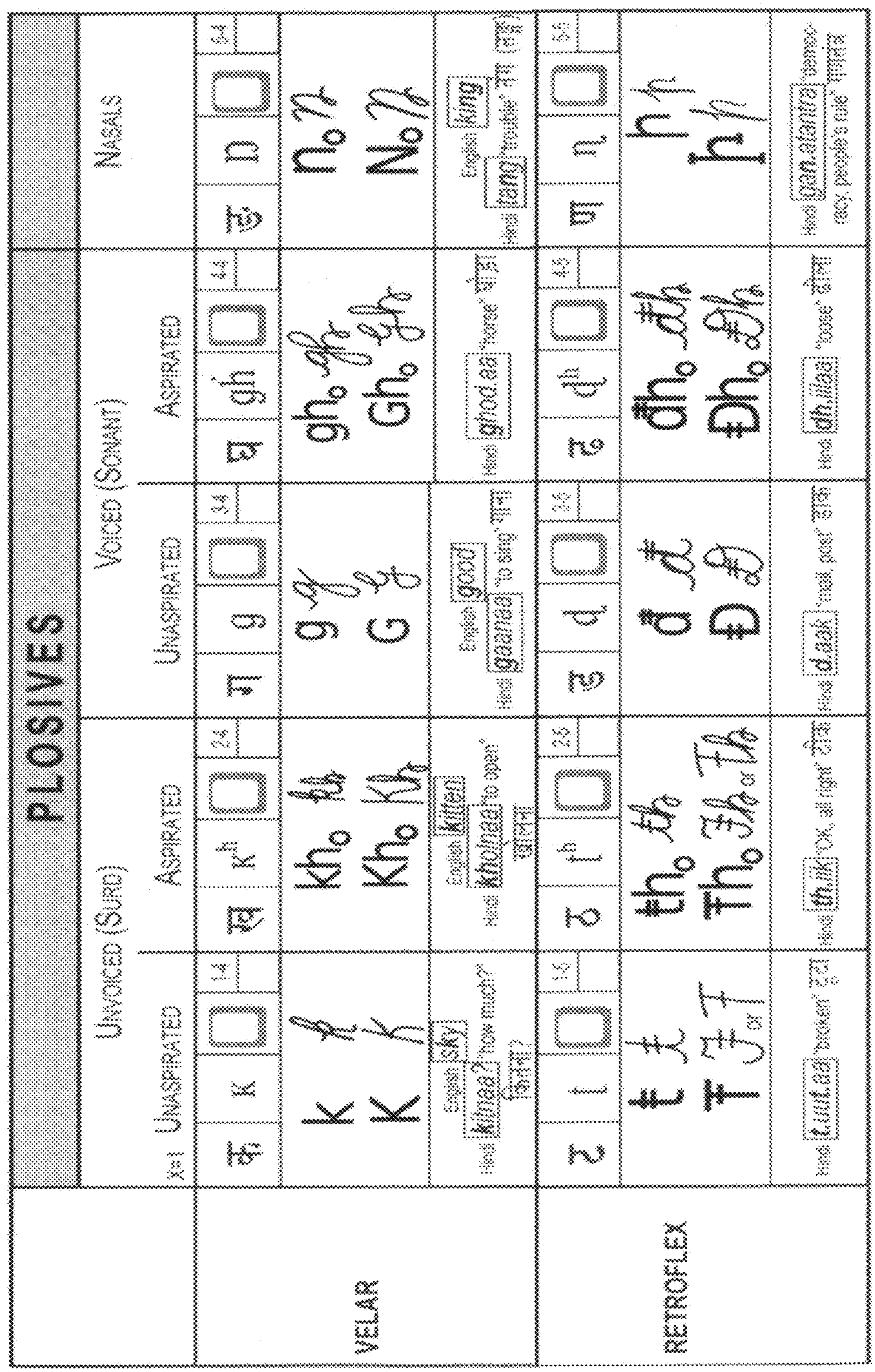
Figure 53:
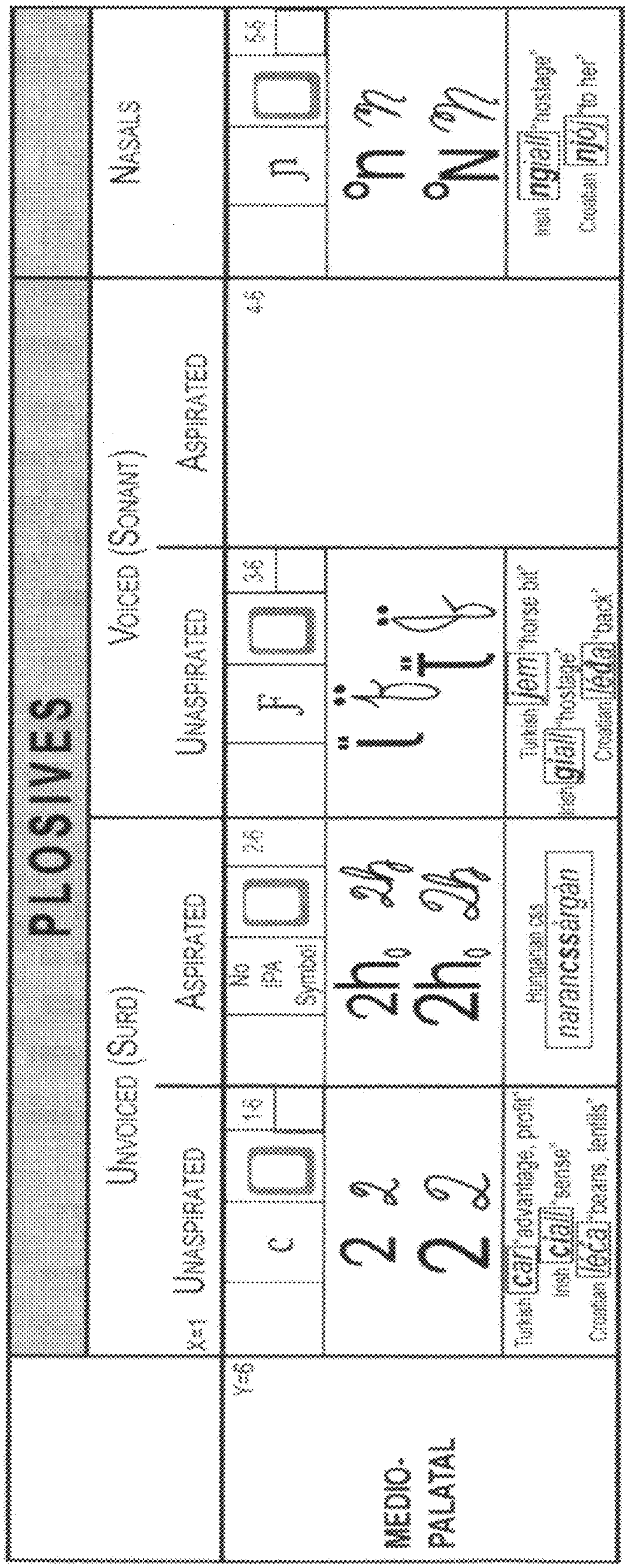
Figure 54:
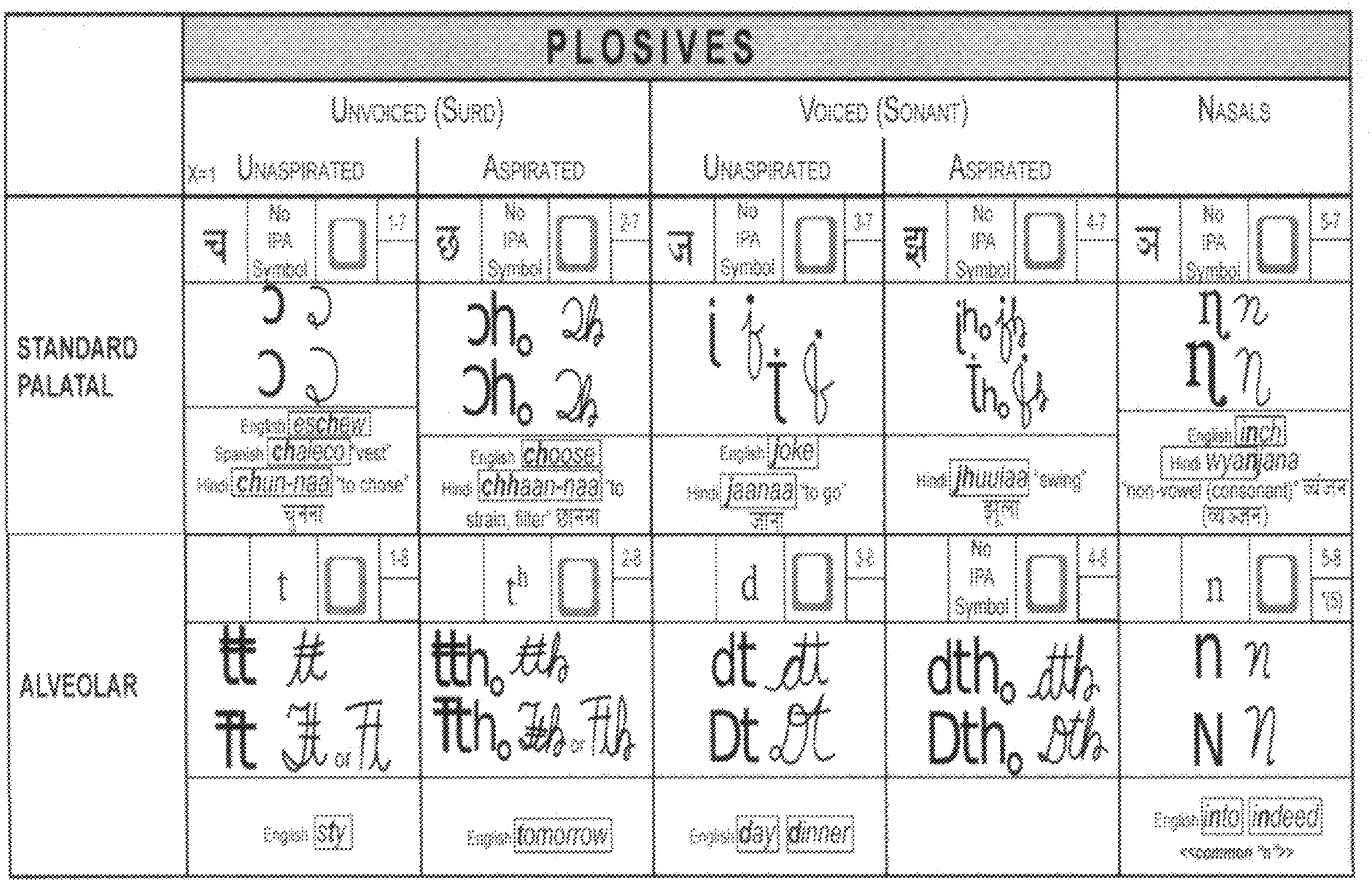
Figure 55:
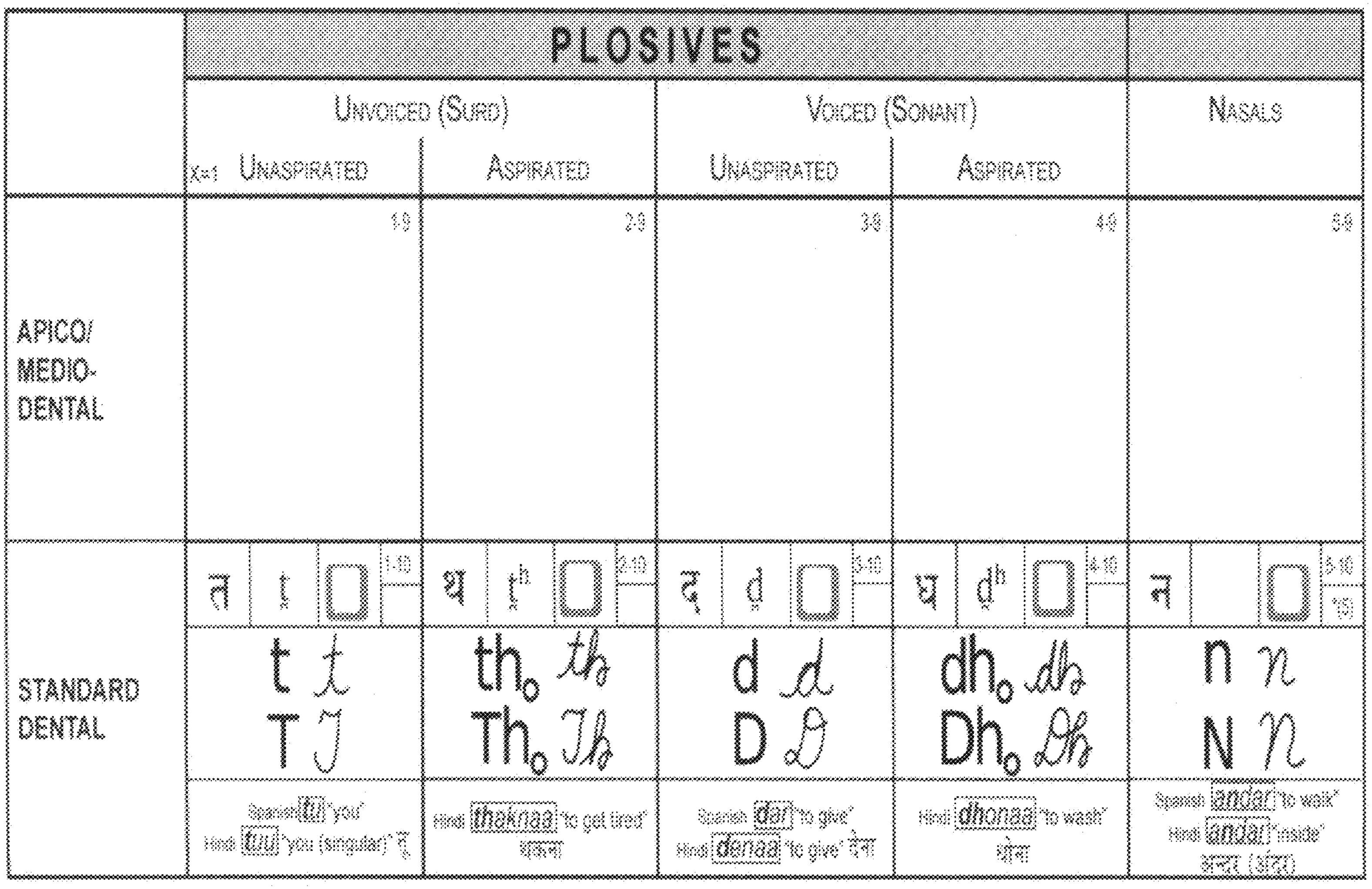
Figure 56:
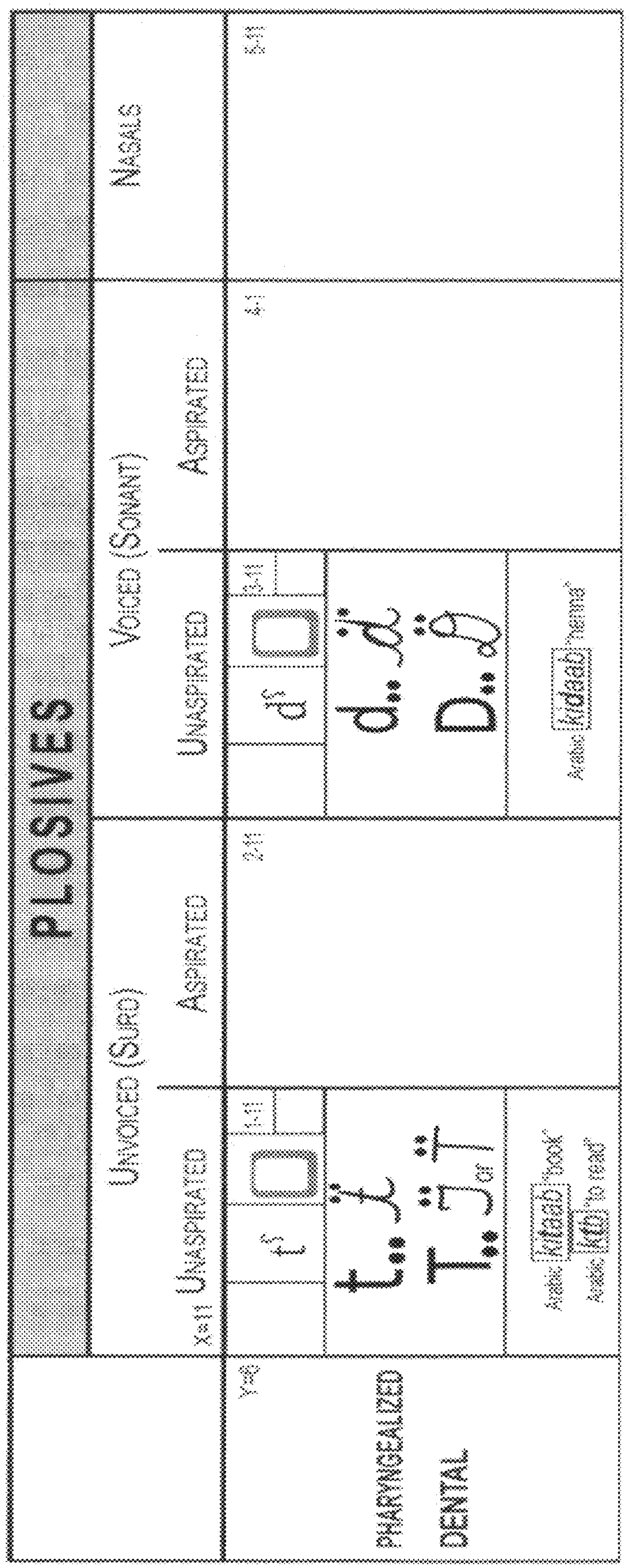
Figure 58:
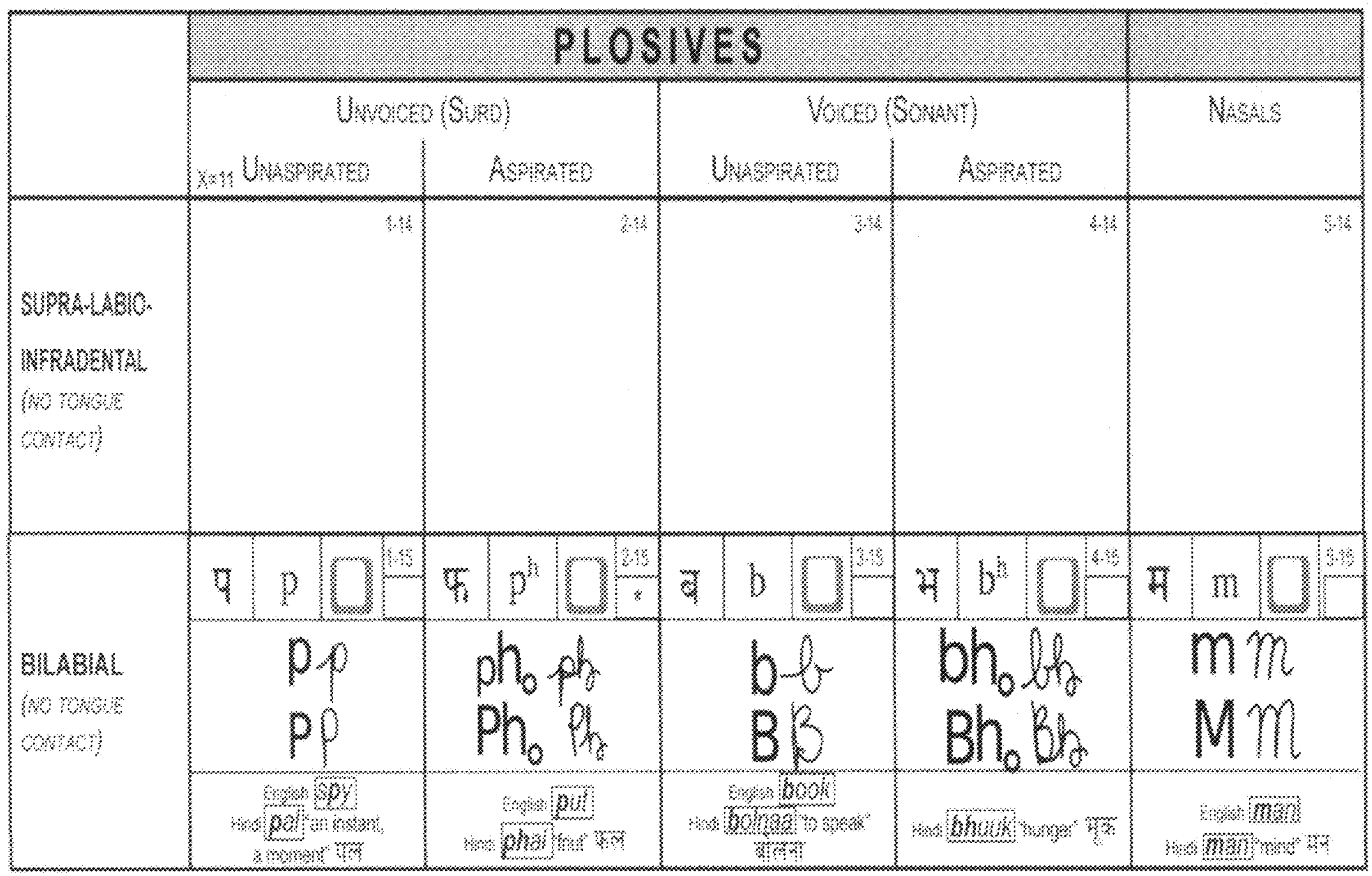
Figure 59:
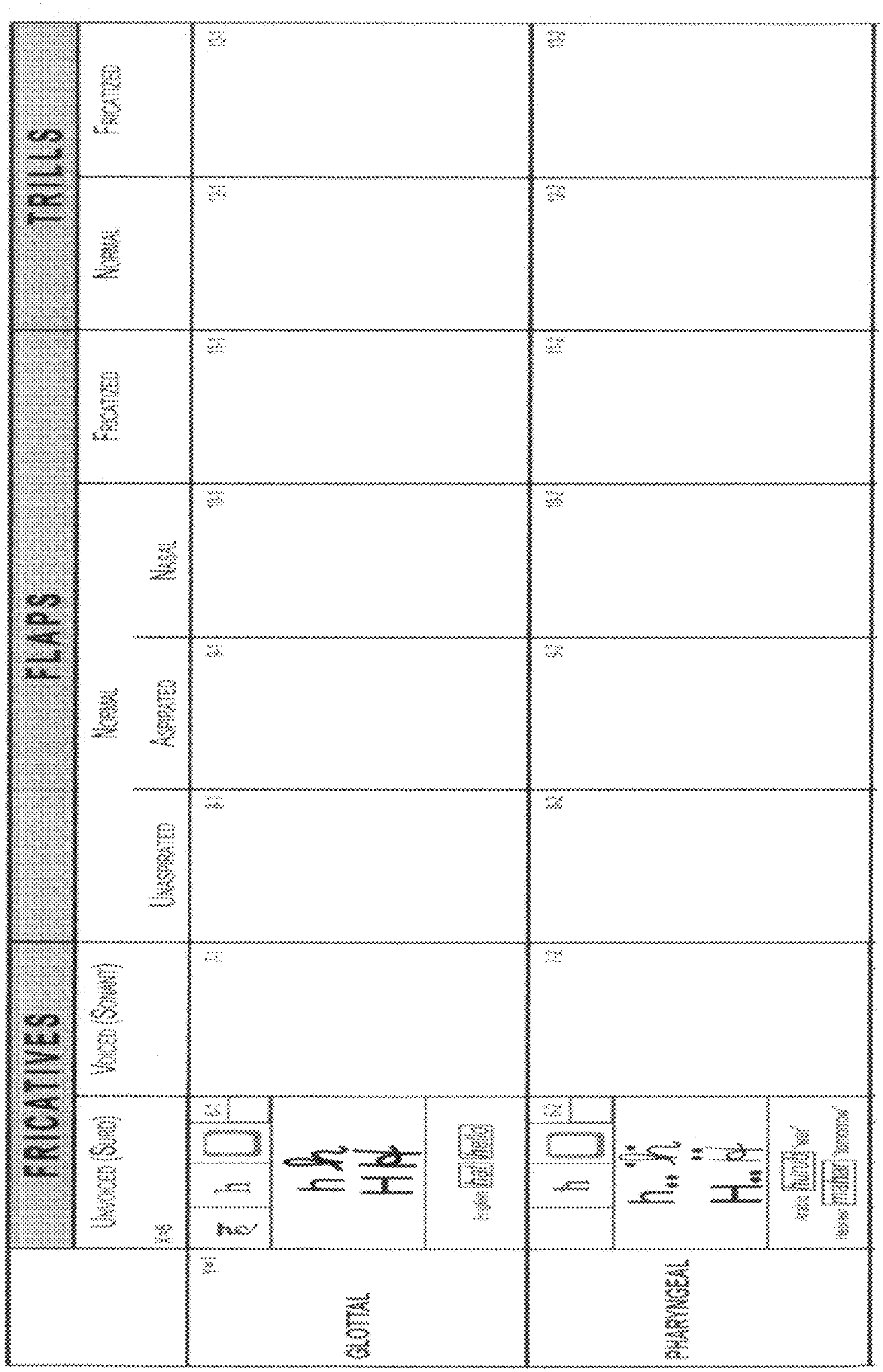
Figure 60:
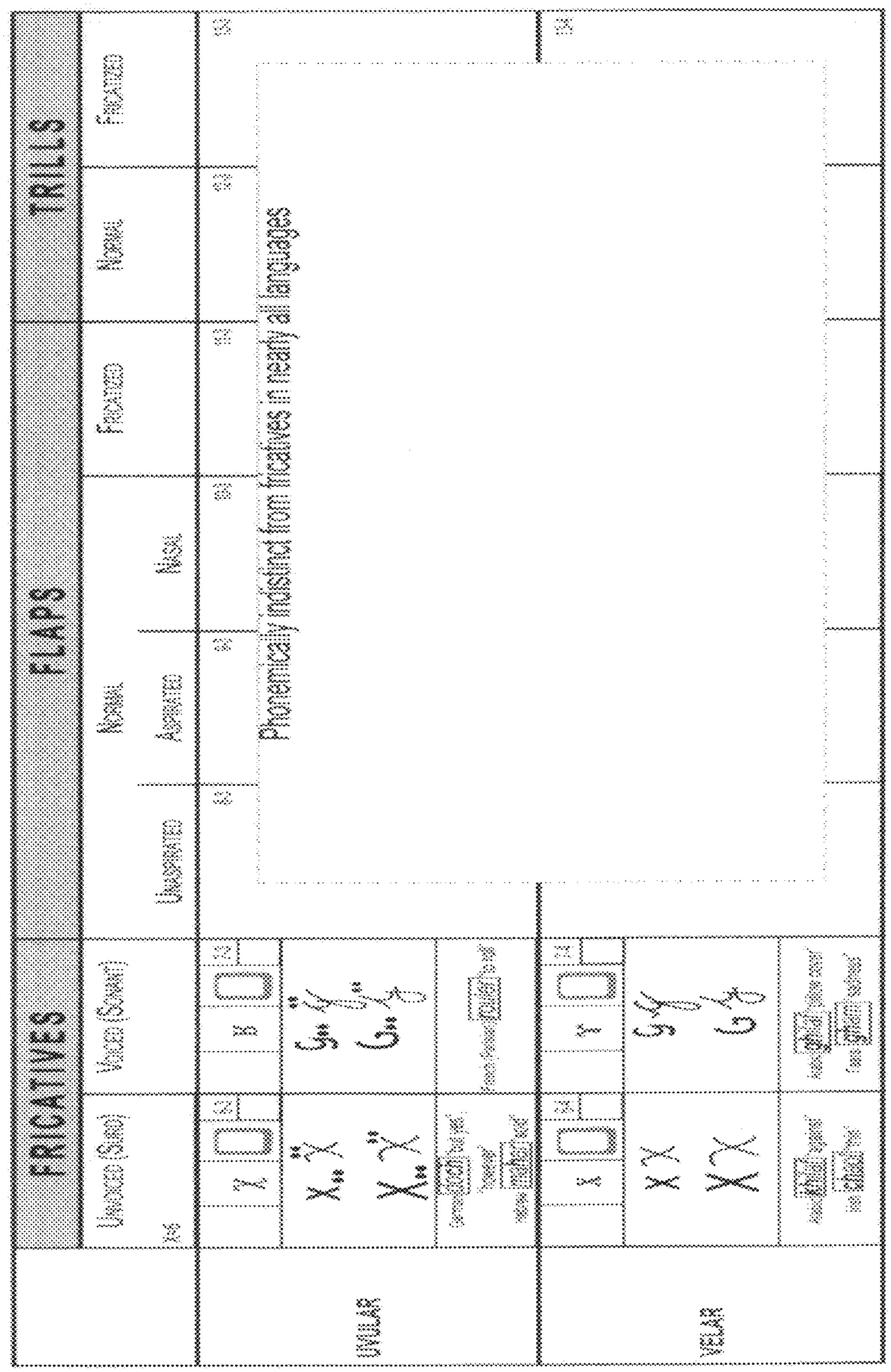
Figure 61:
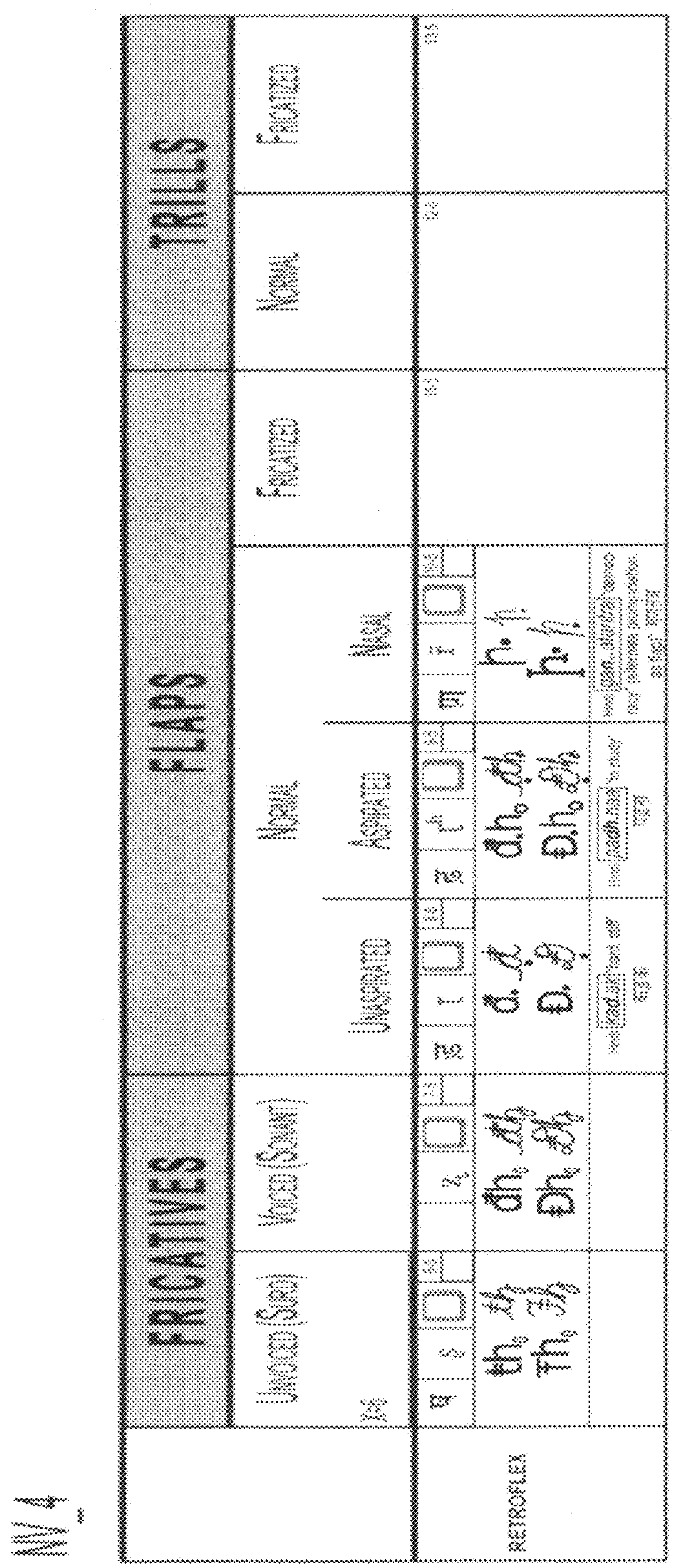
Figure 62:
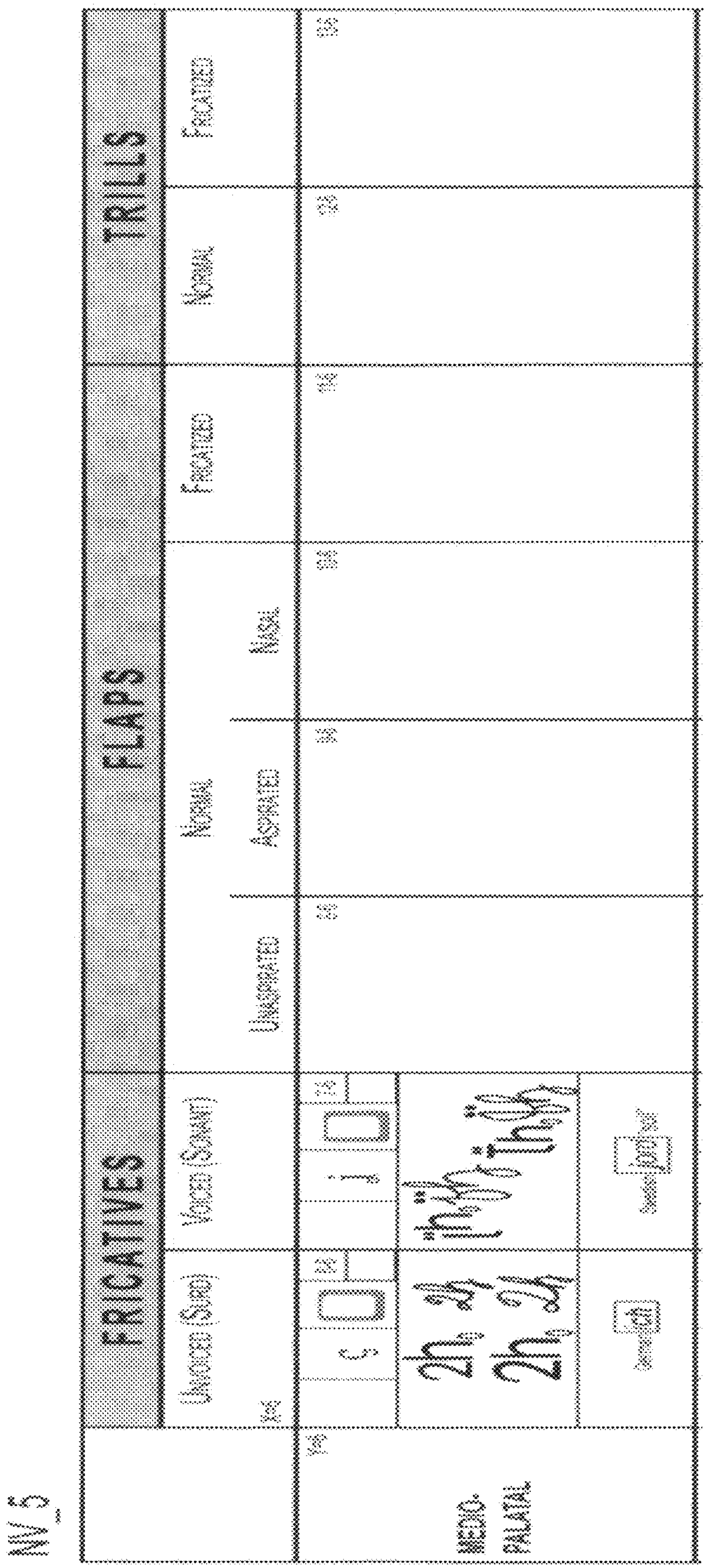
Figure 63:
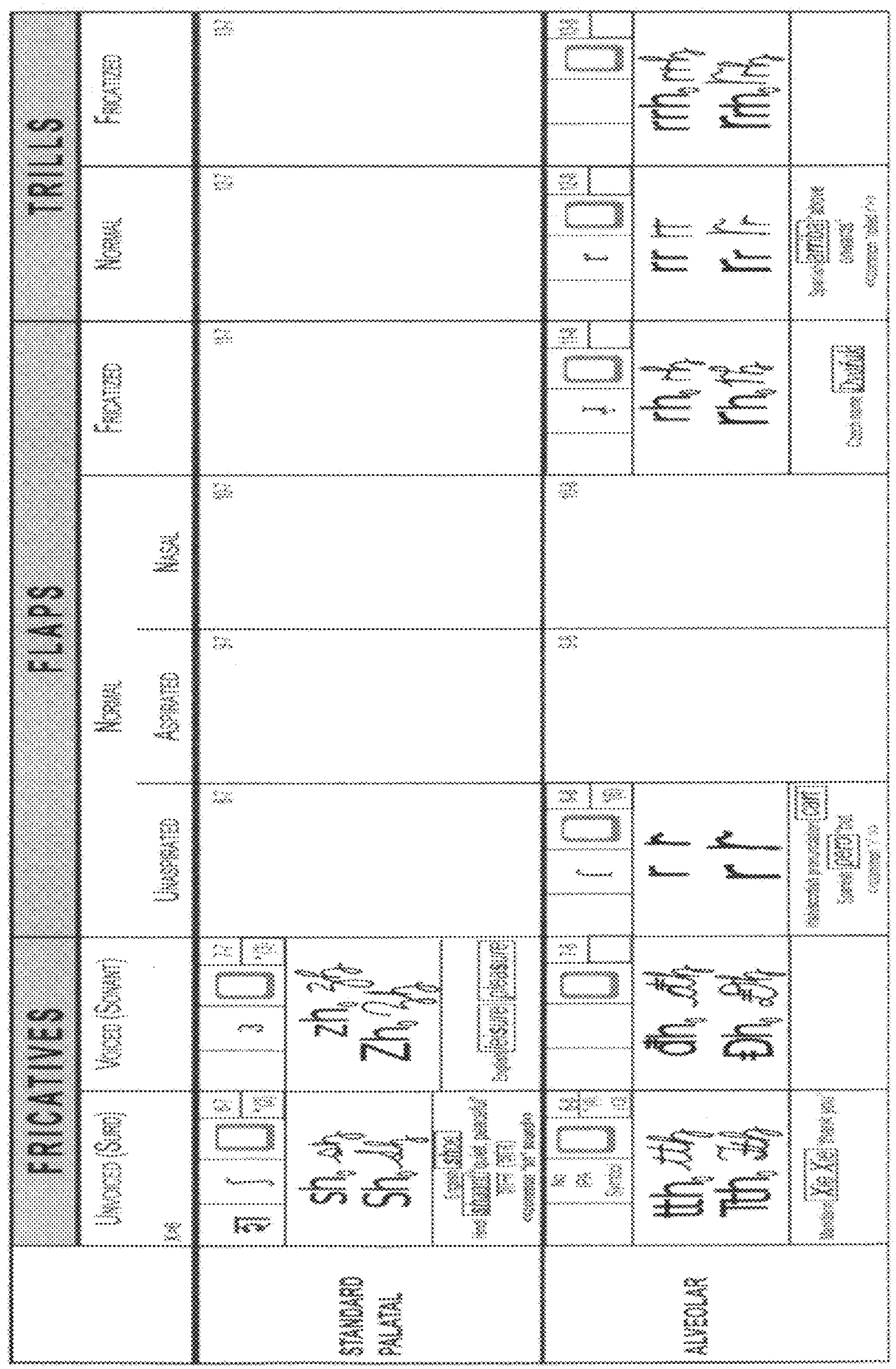
Figure 64:
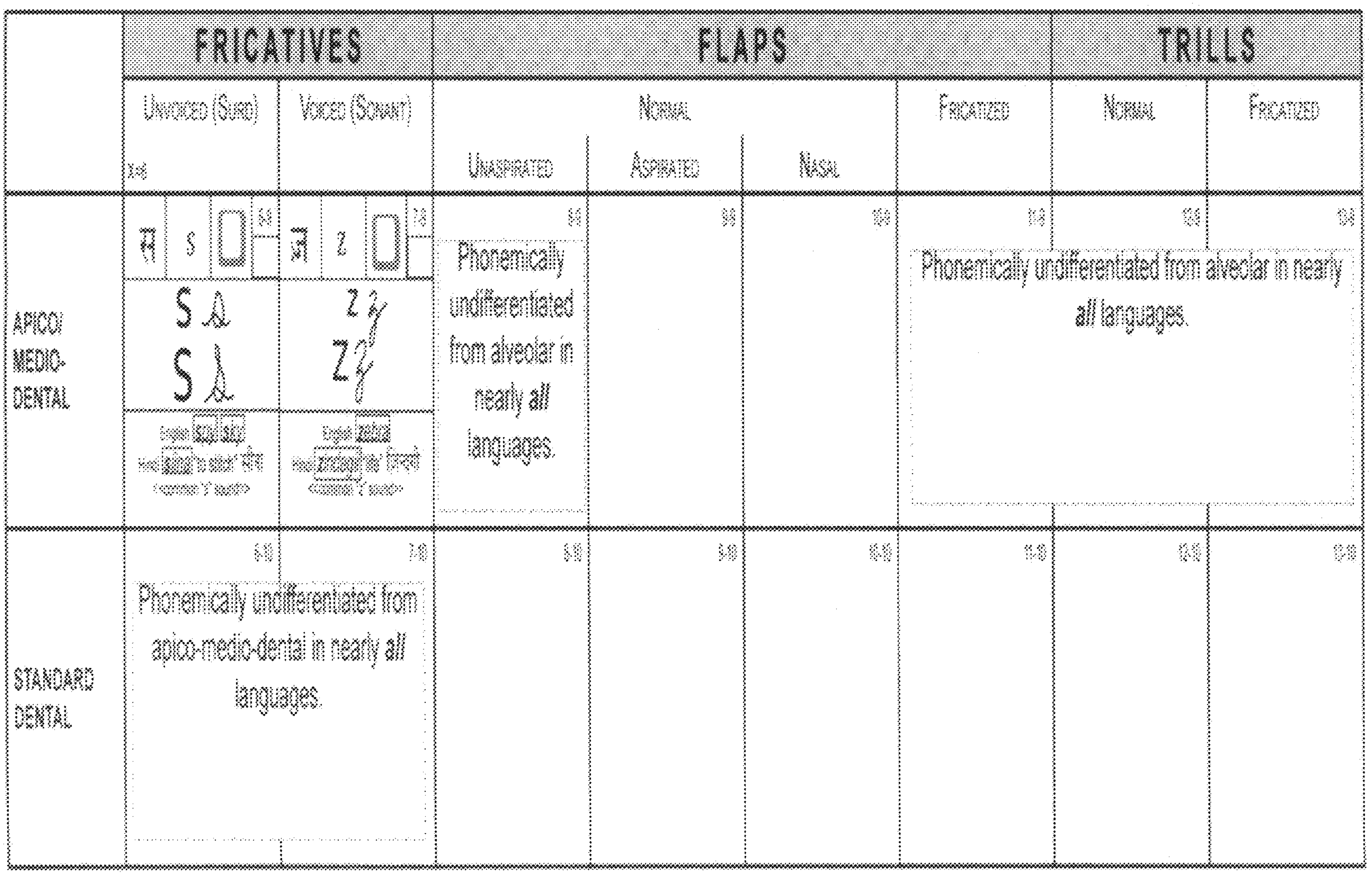
Figure 65:
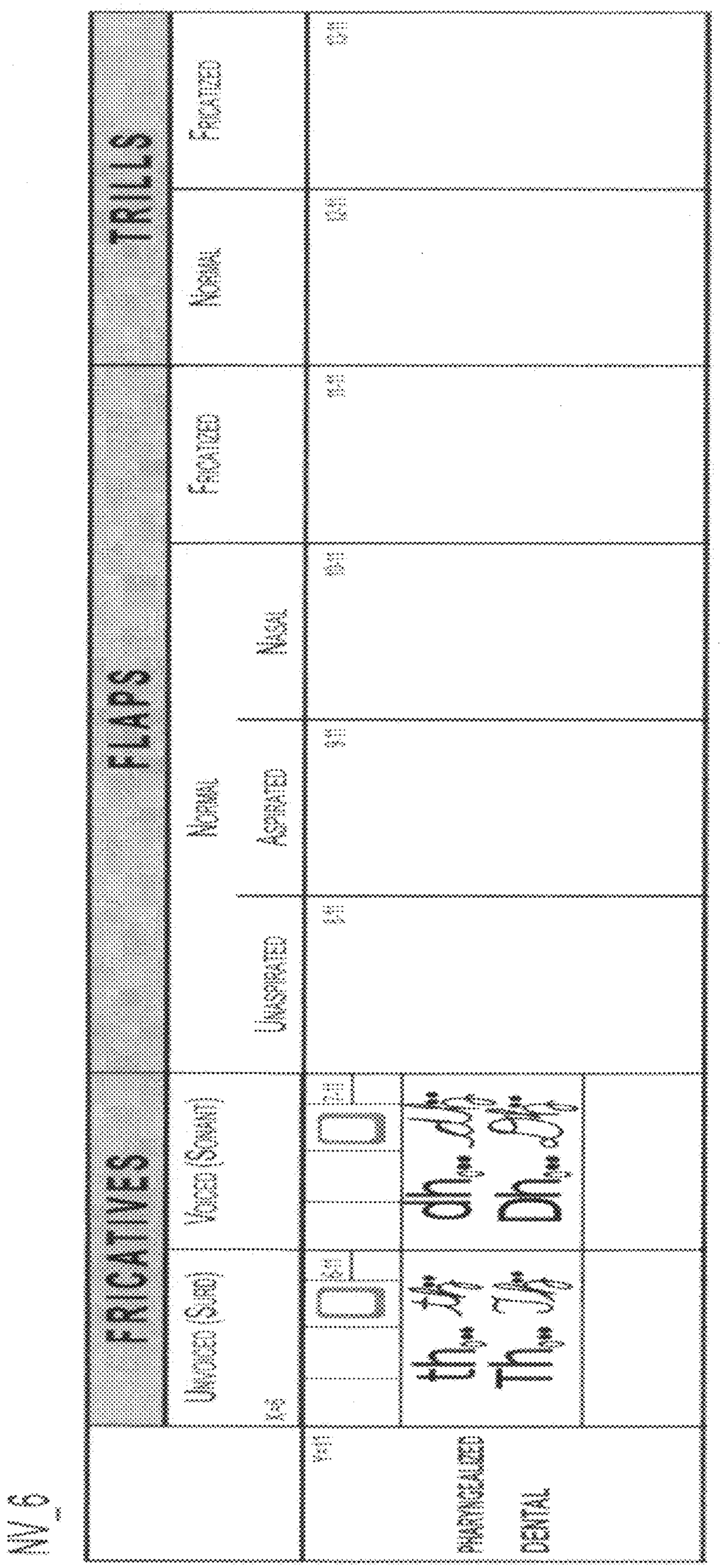
Figure 66:
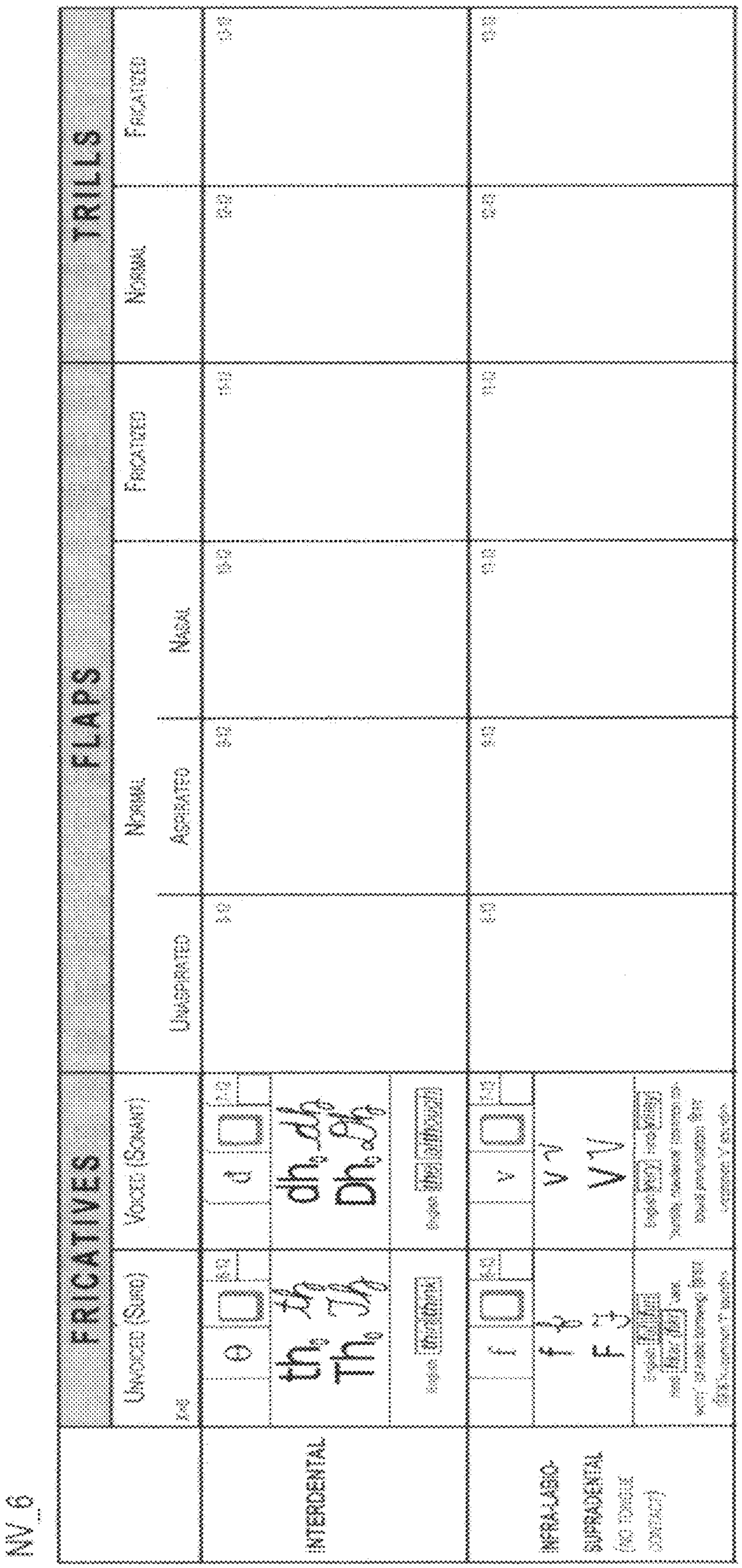
Figure 67:
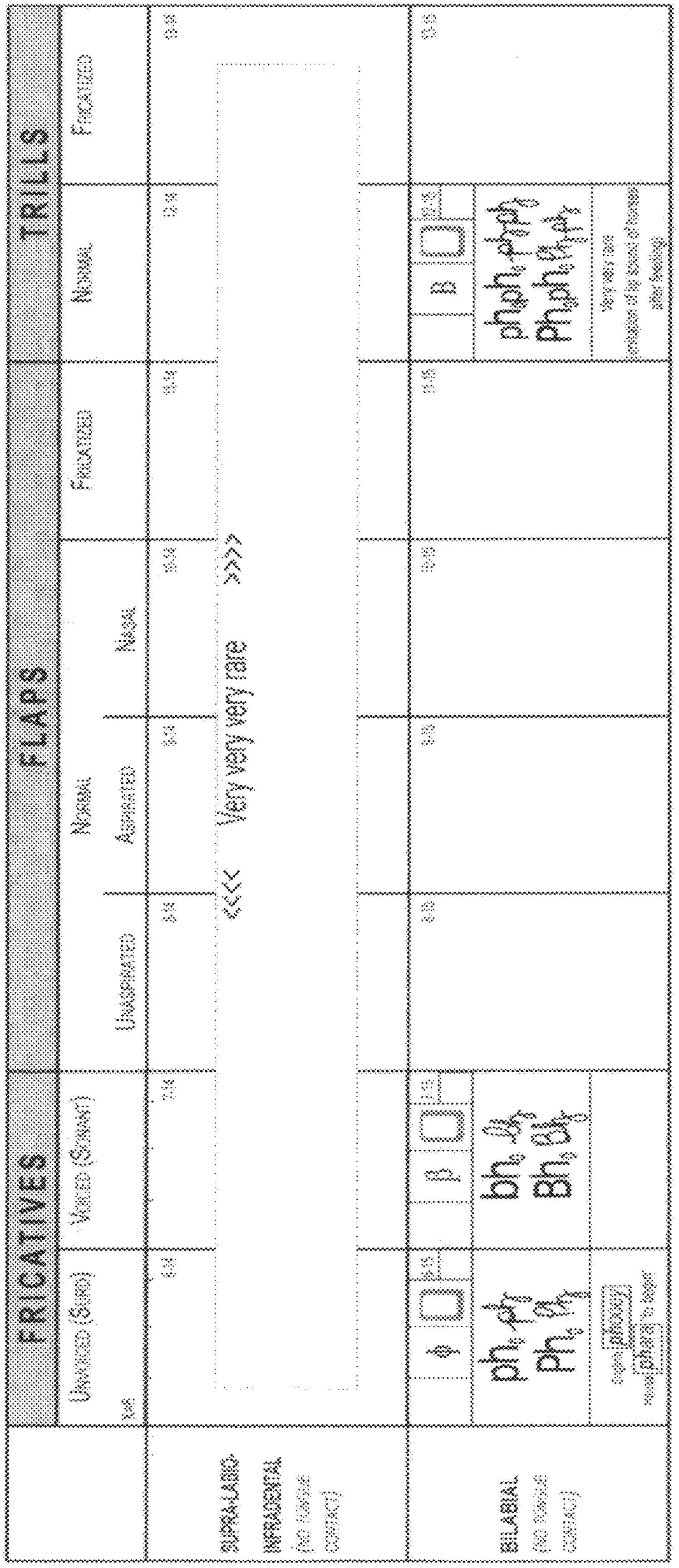
Figure 69:
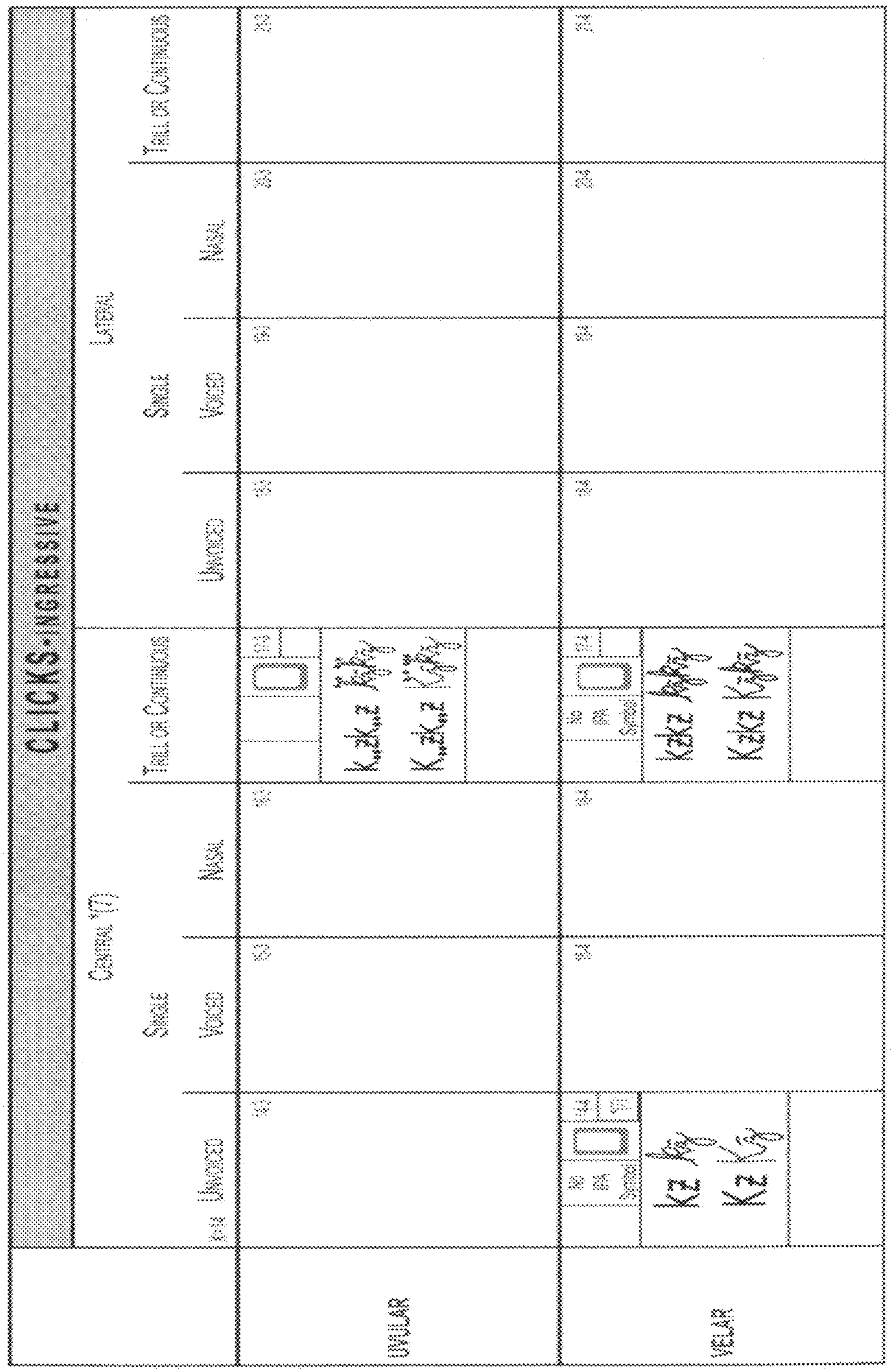
Figure 70:
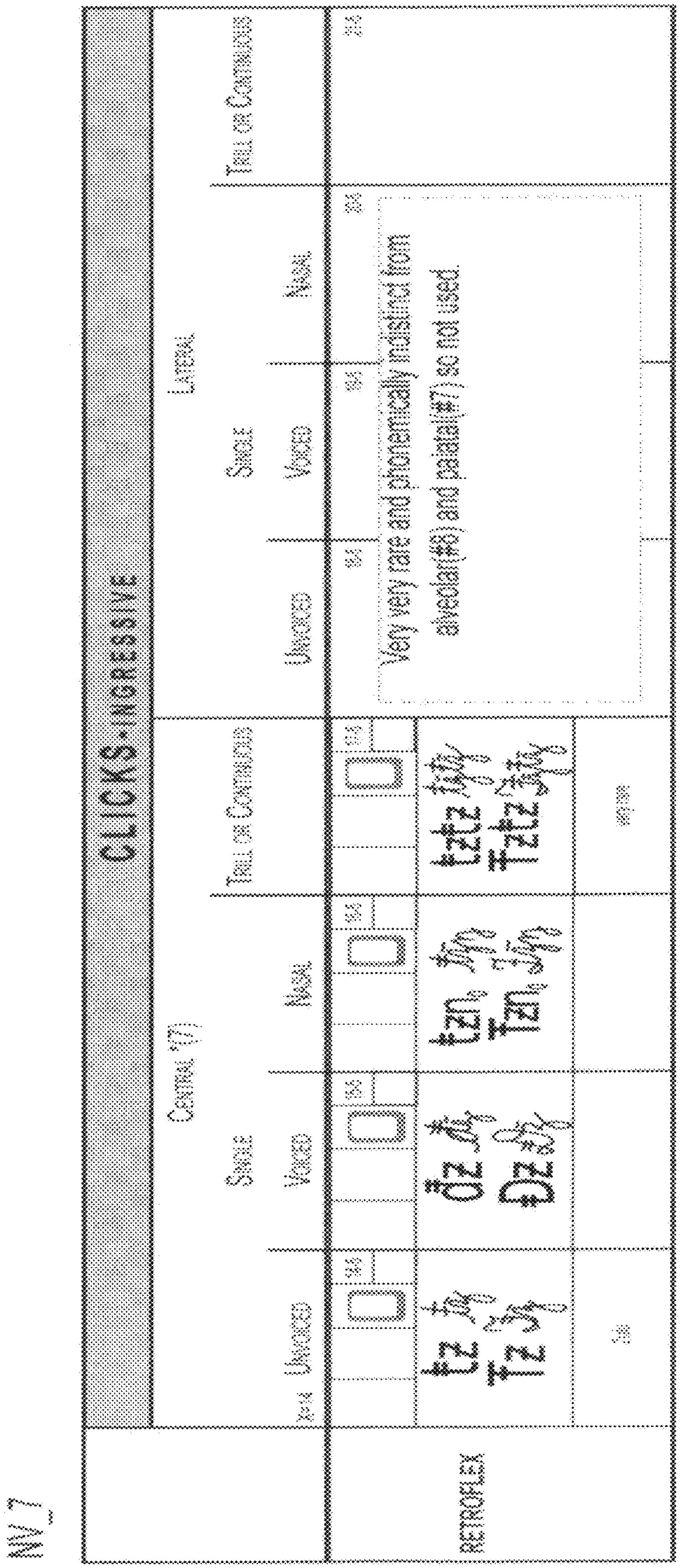
Figure 71:
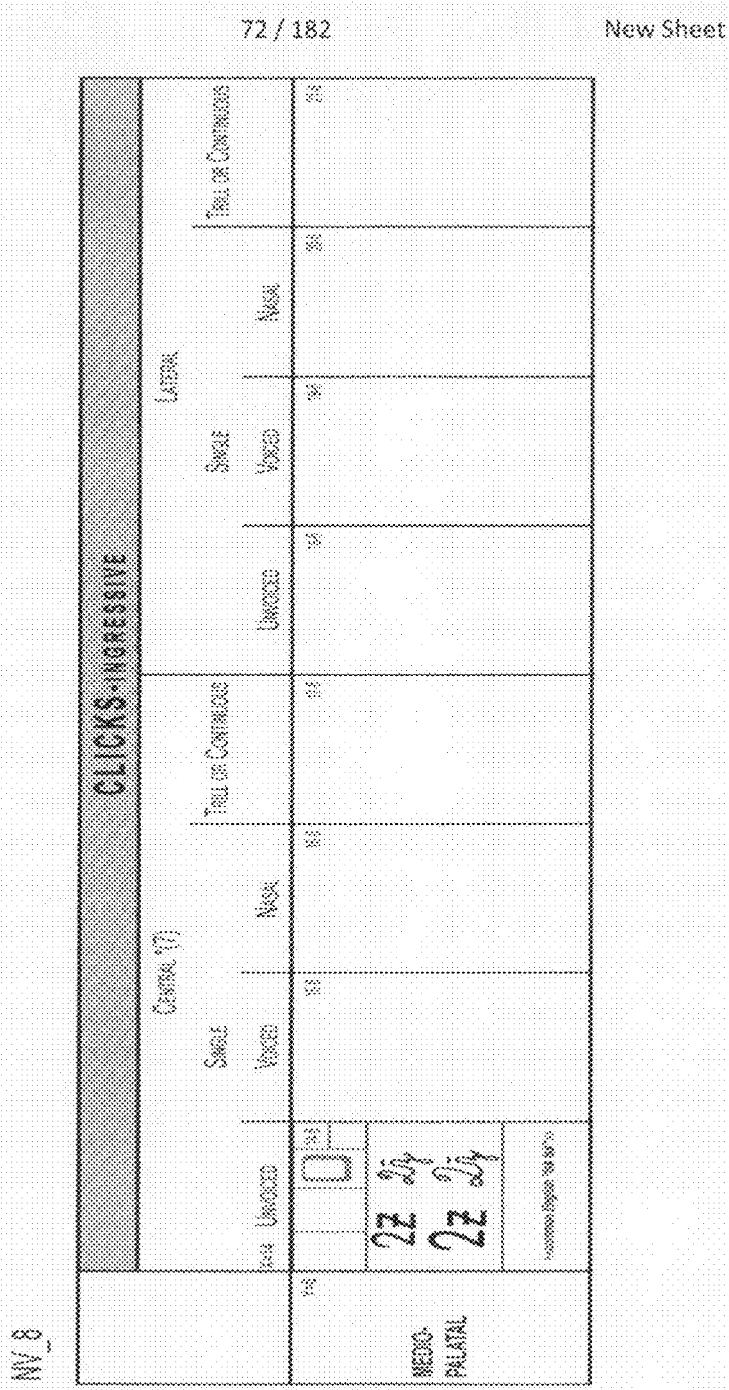
Figure 72:
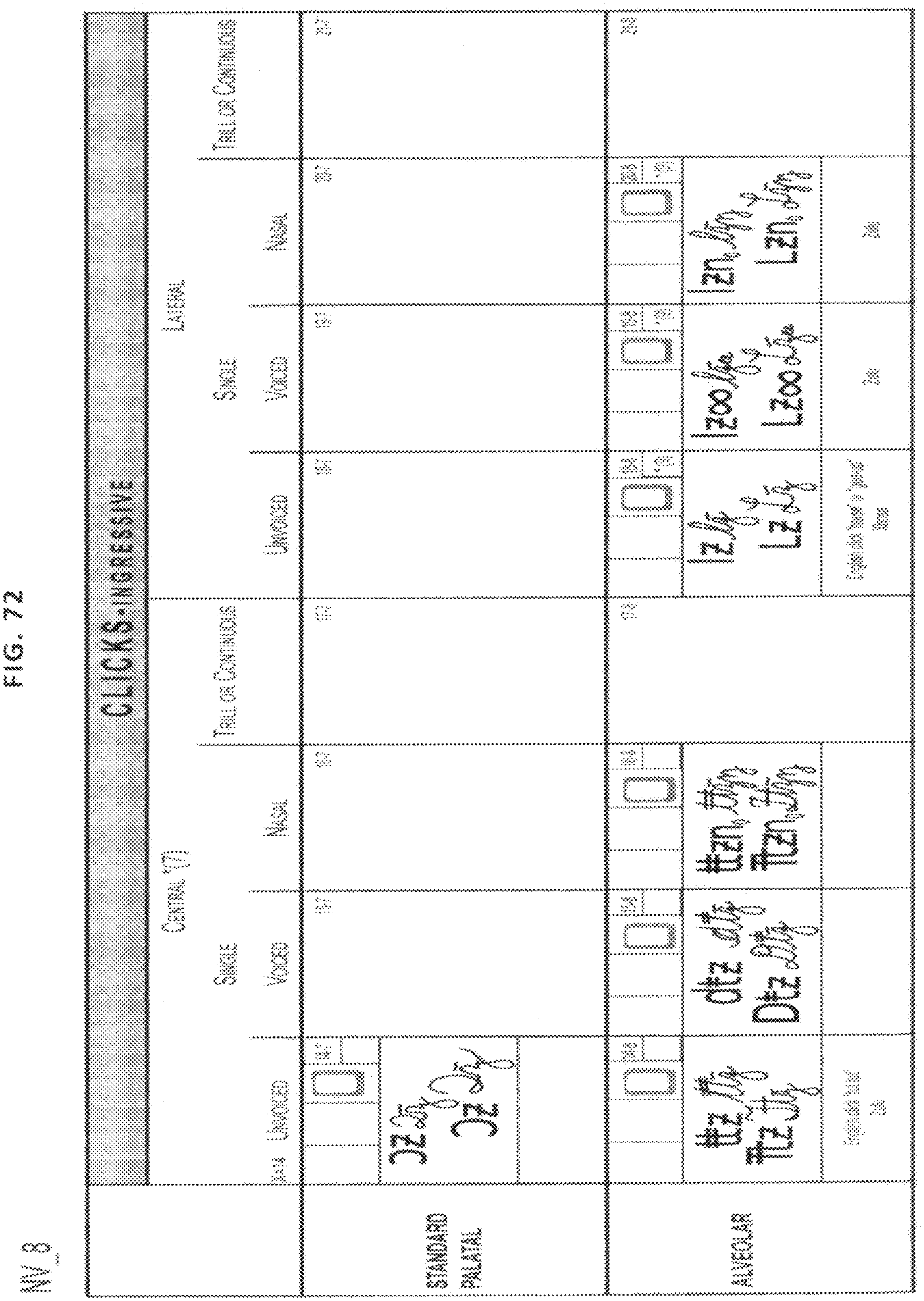
Figure 79:
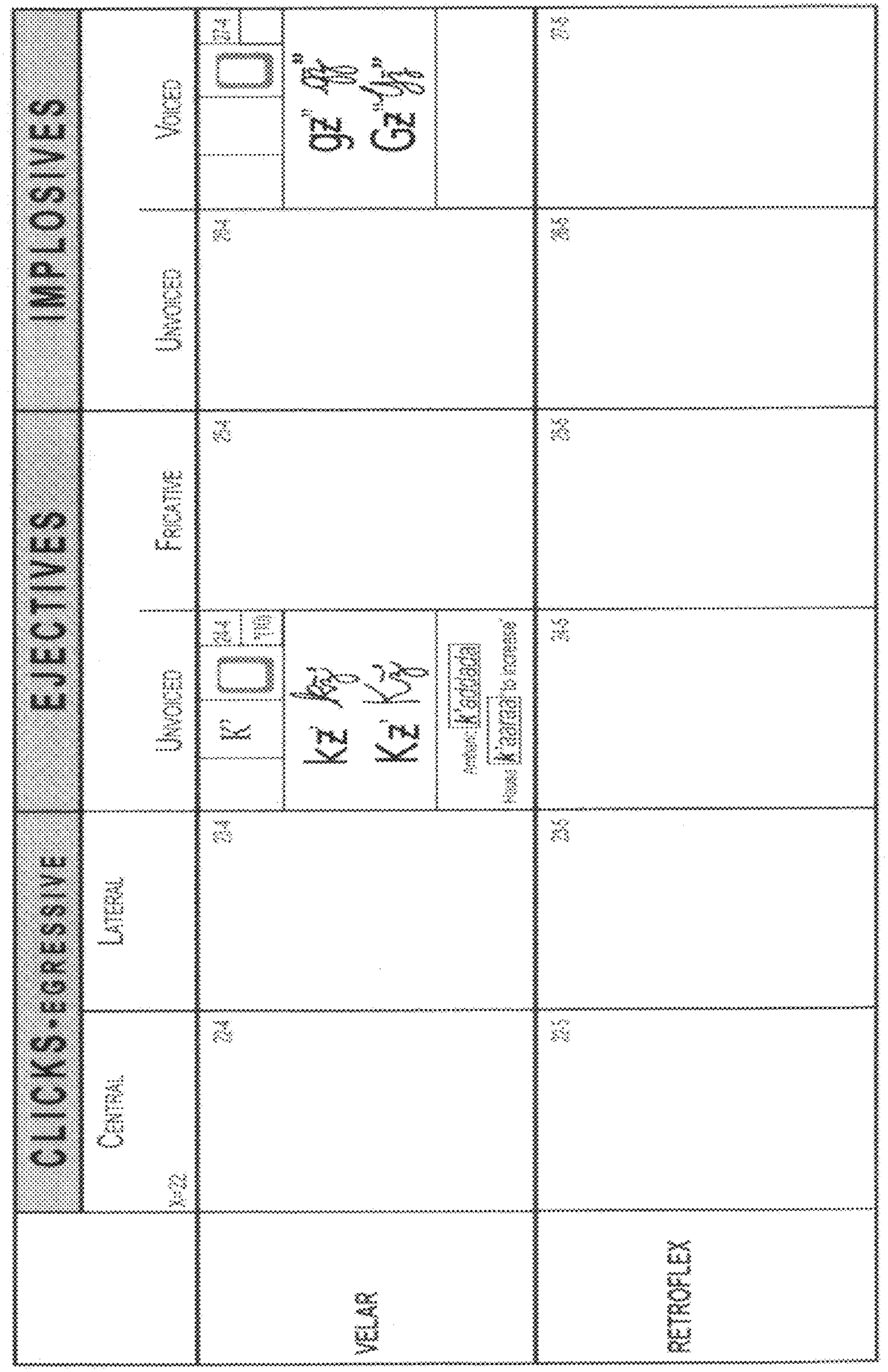
Figure 81:
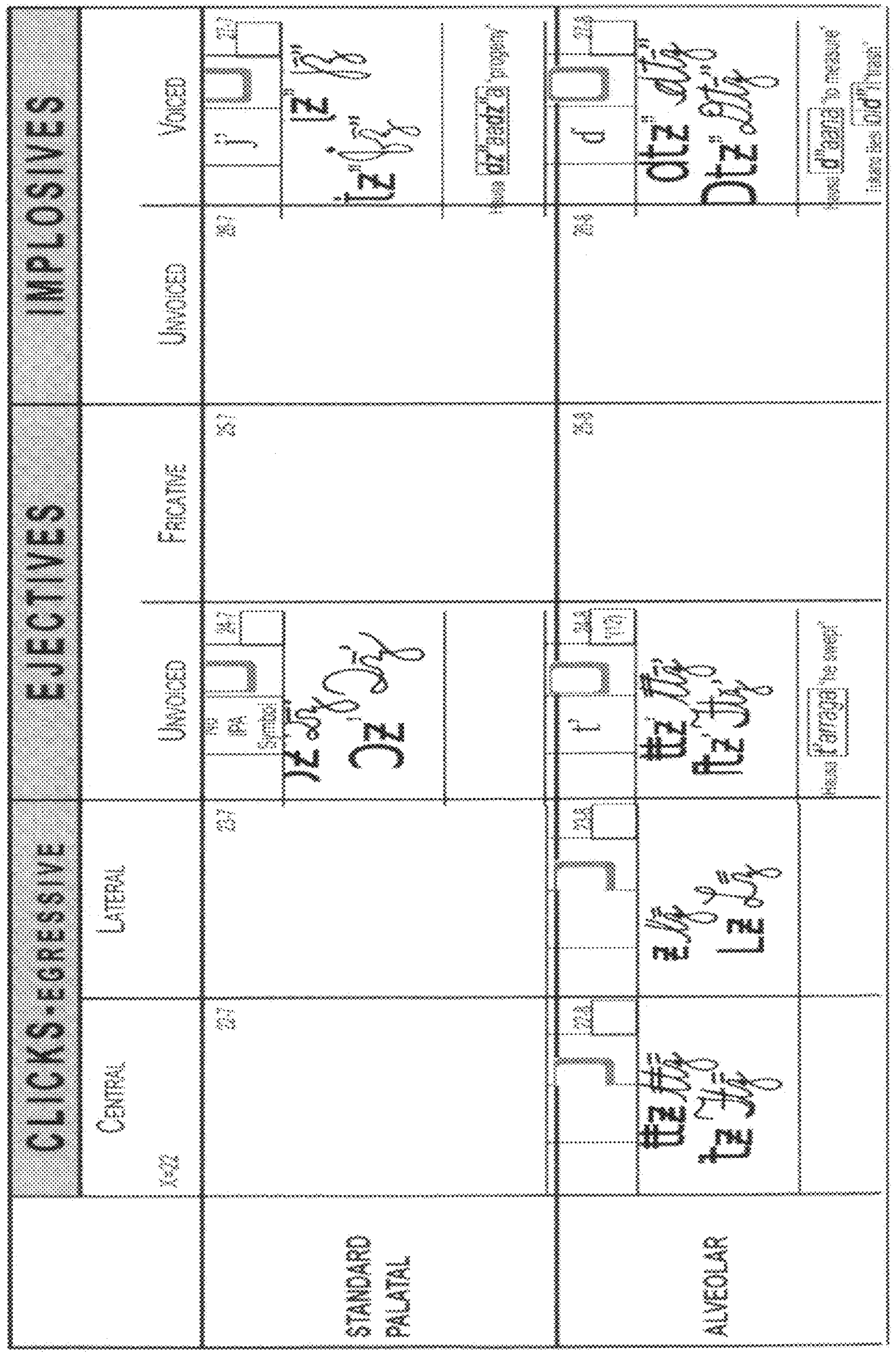
Figure 82:
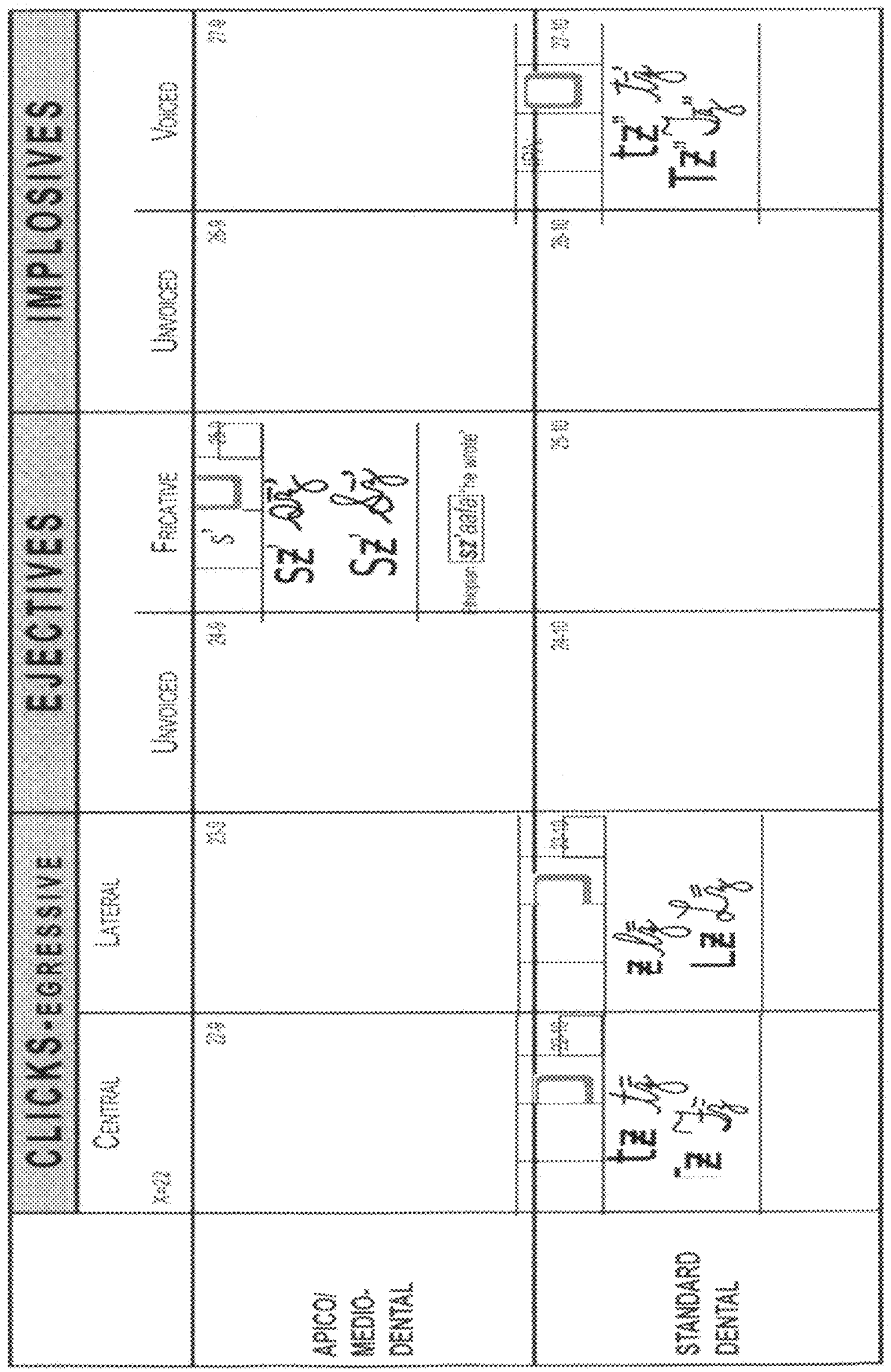
Figure 84:
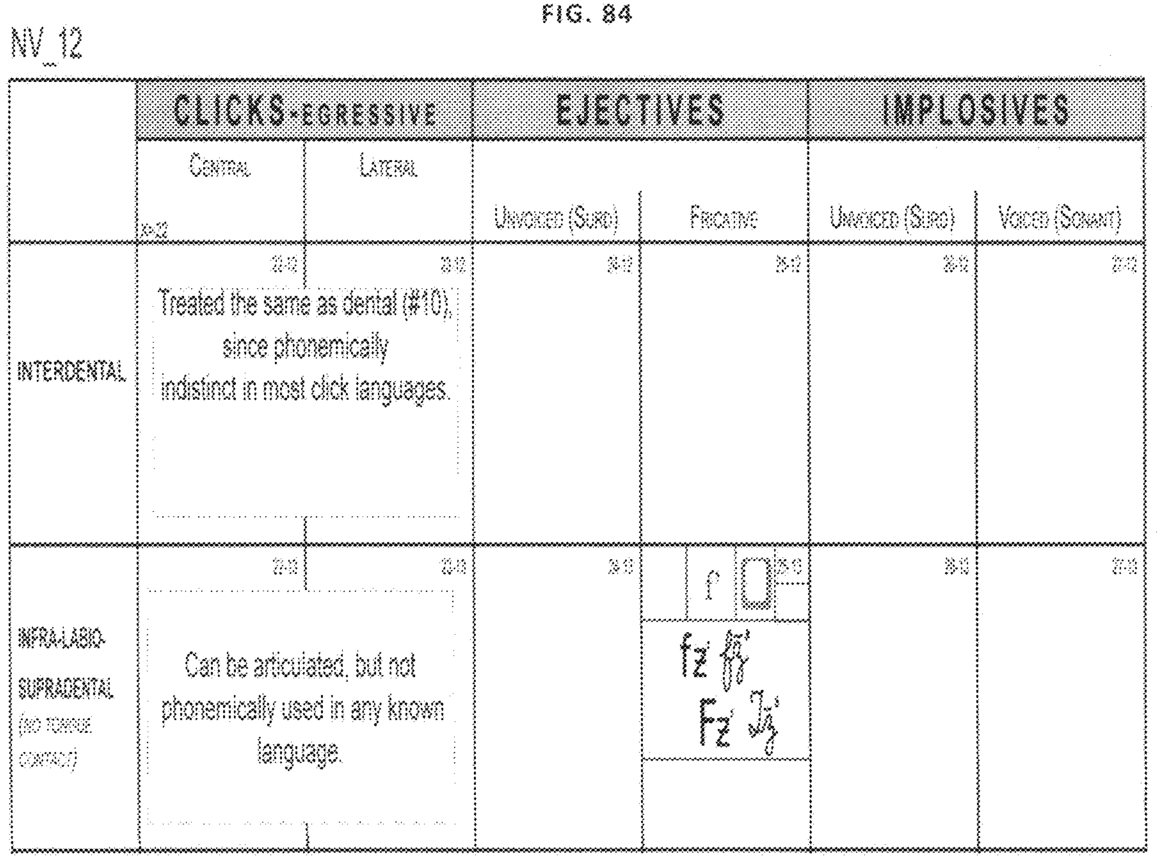
Figure 85:
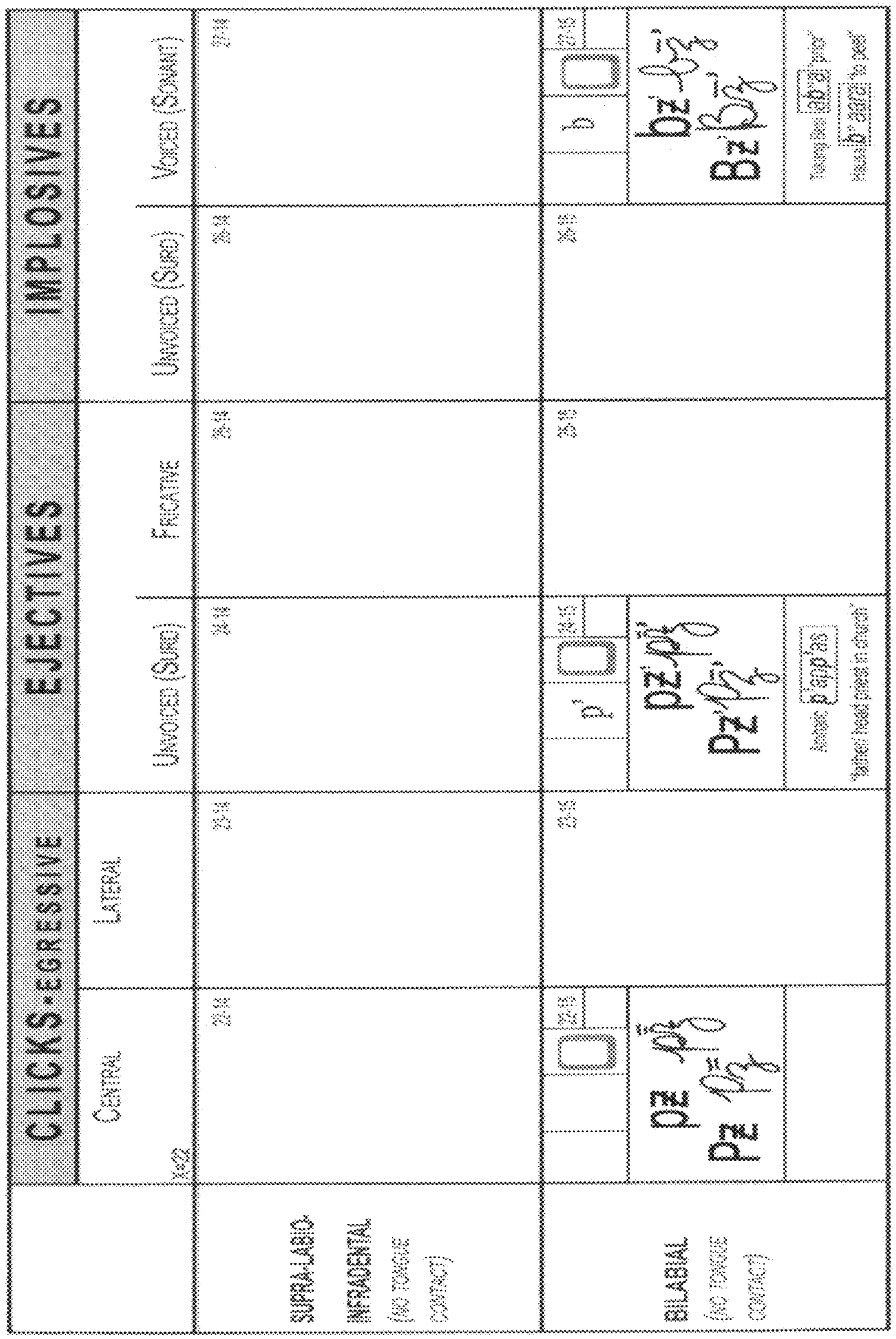
Figure 87:
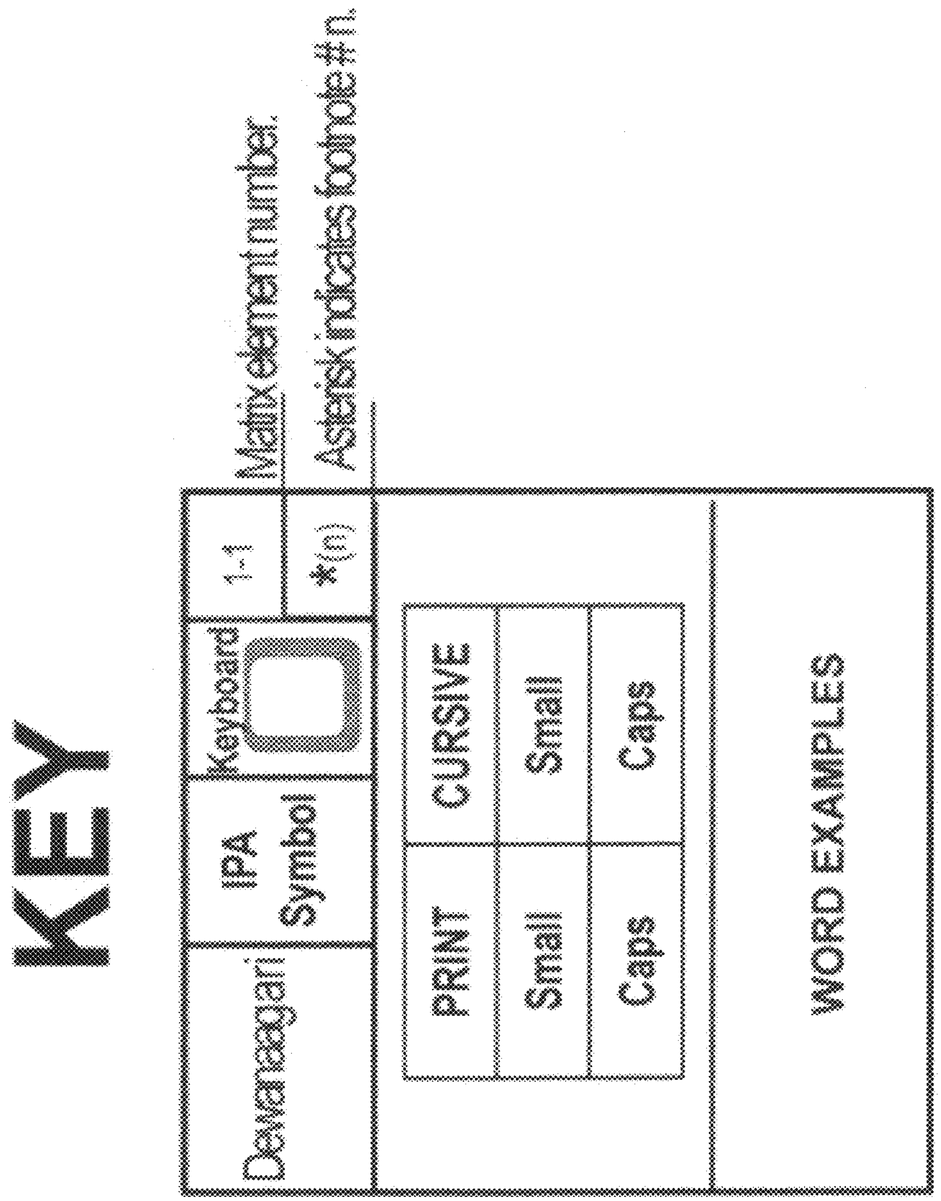
Figure 91:
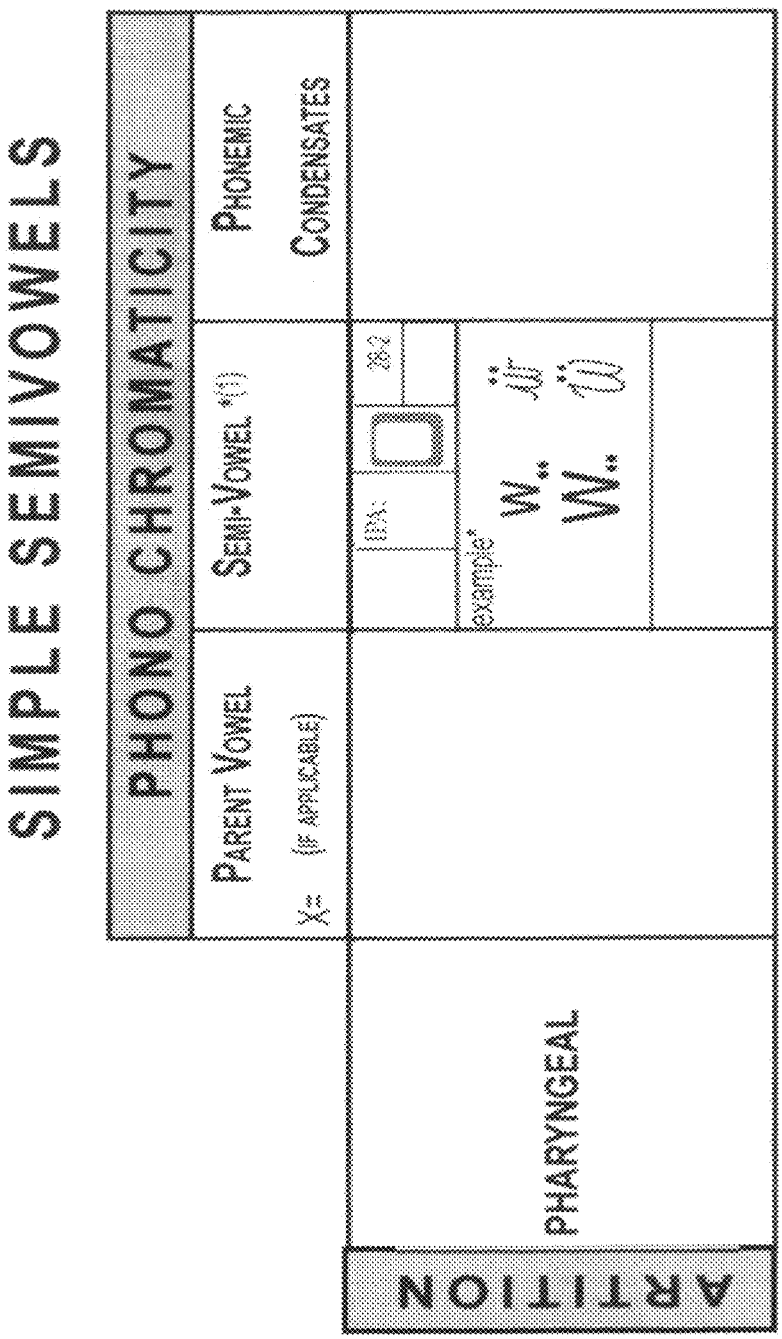
Figure 93:
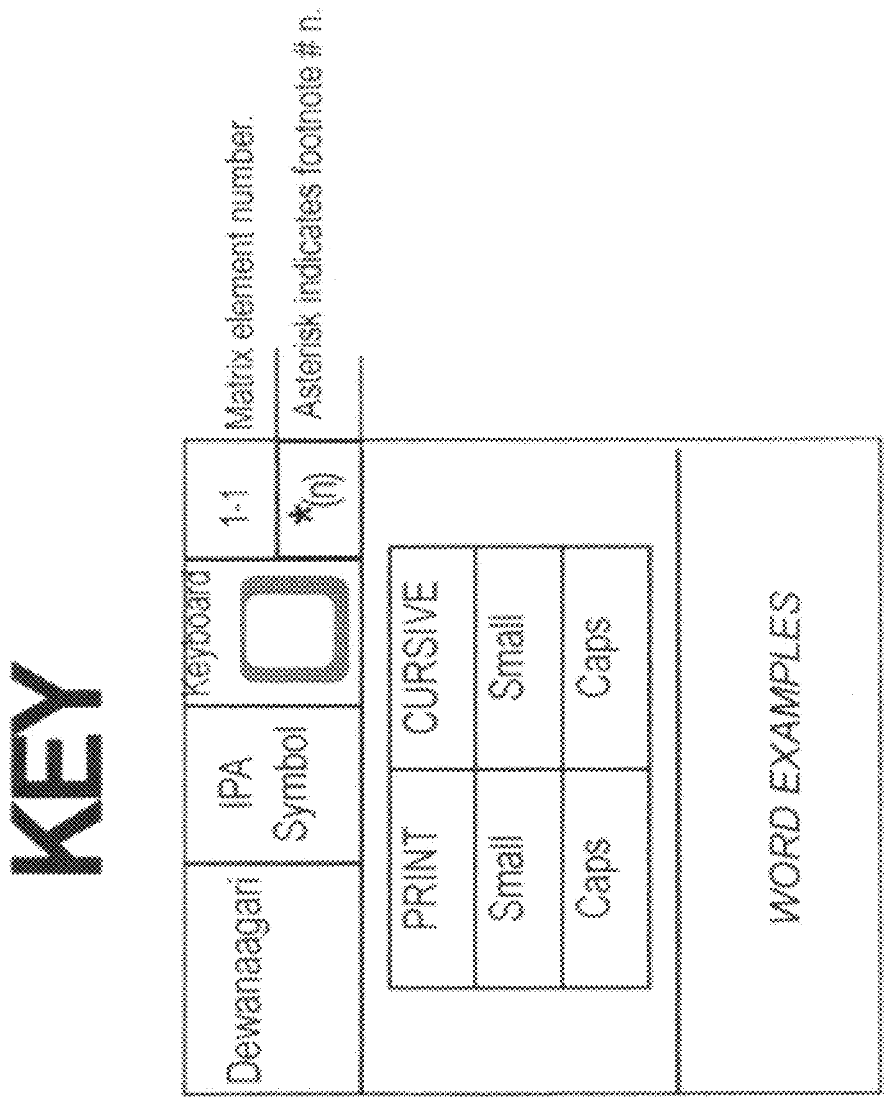
Figure 94:
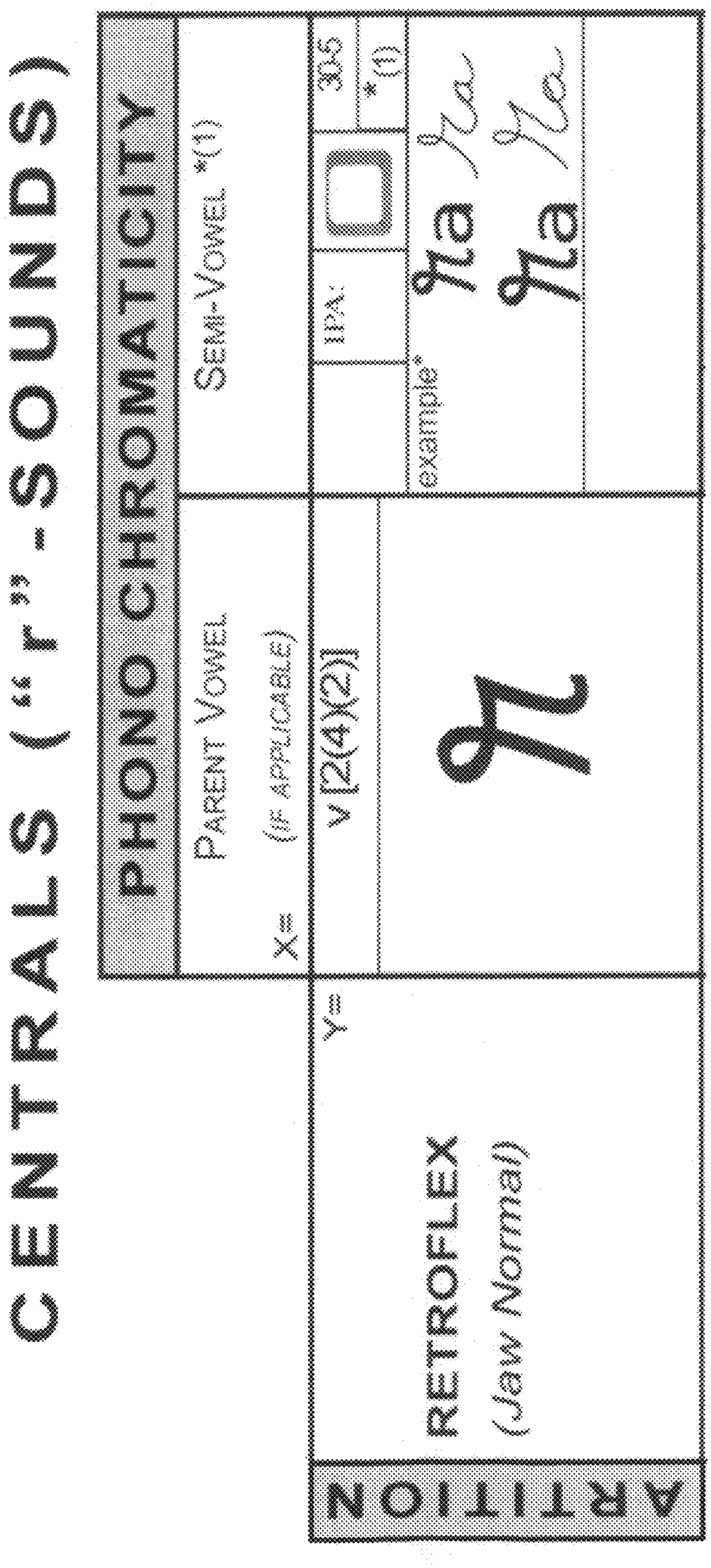
Figure 95:
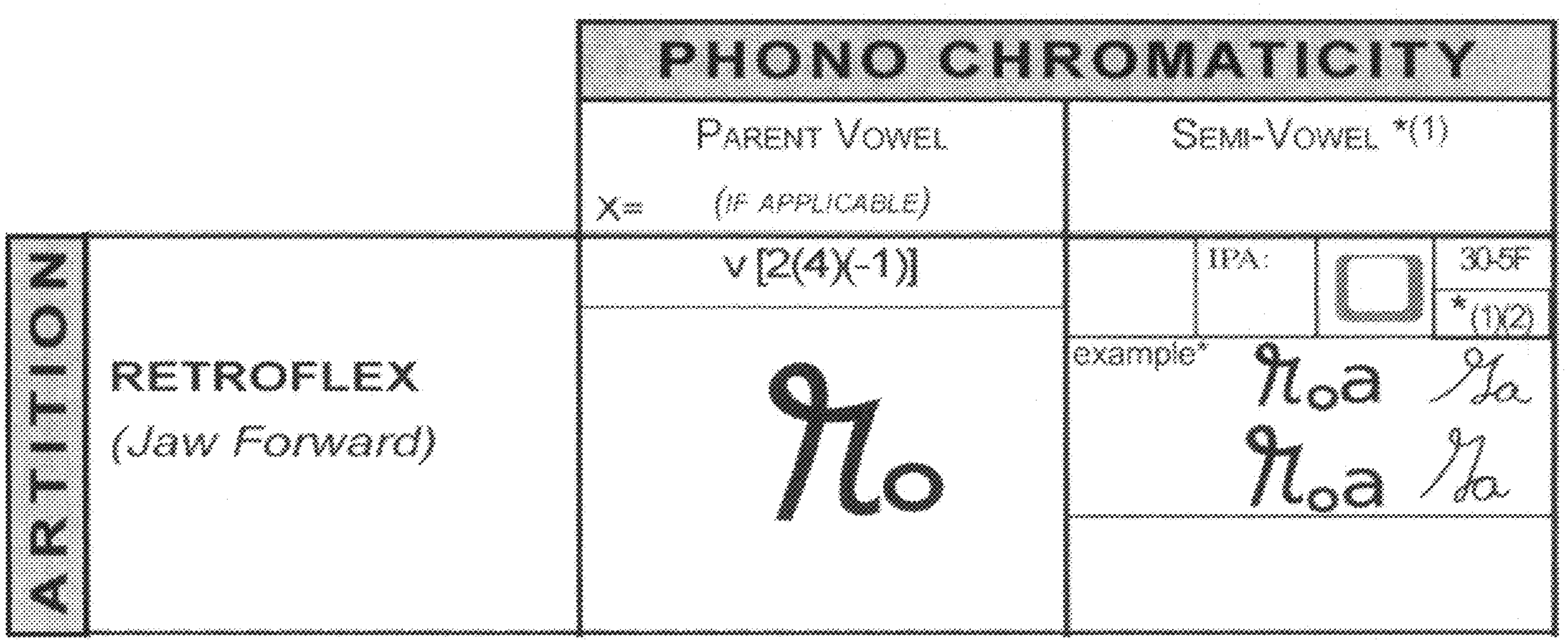
Figure 97:
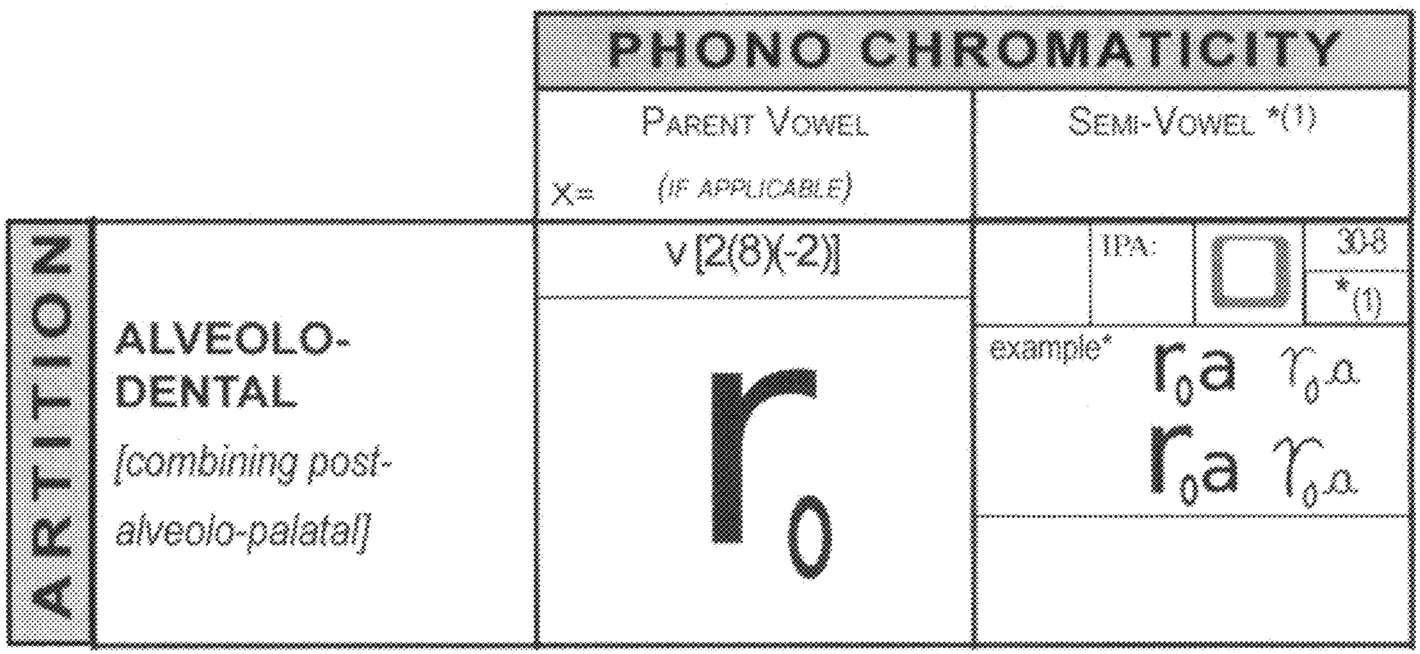
Figure 103:
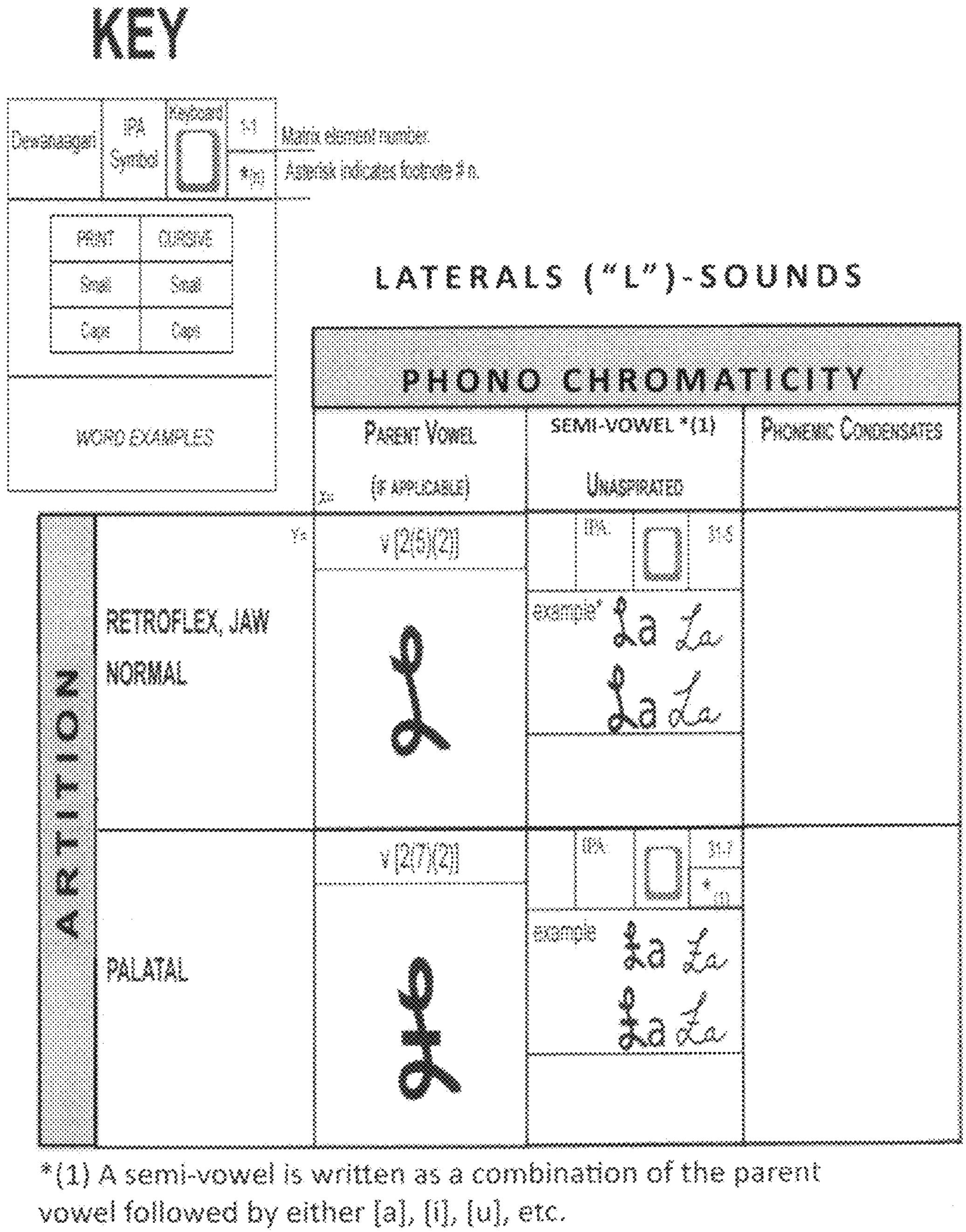
Figure 104:
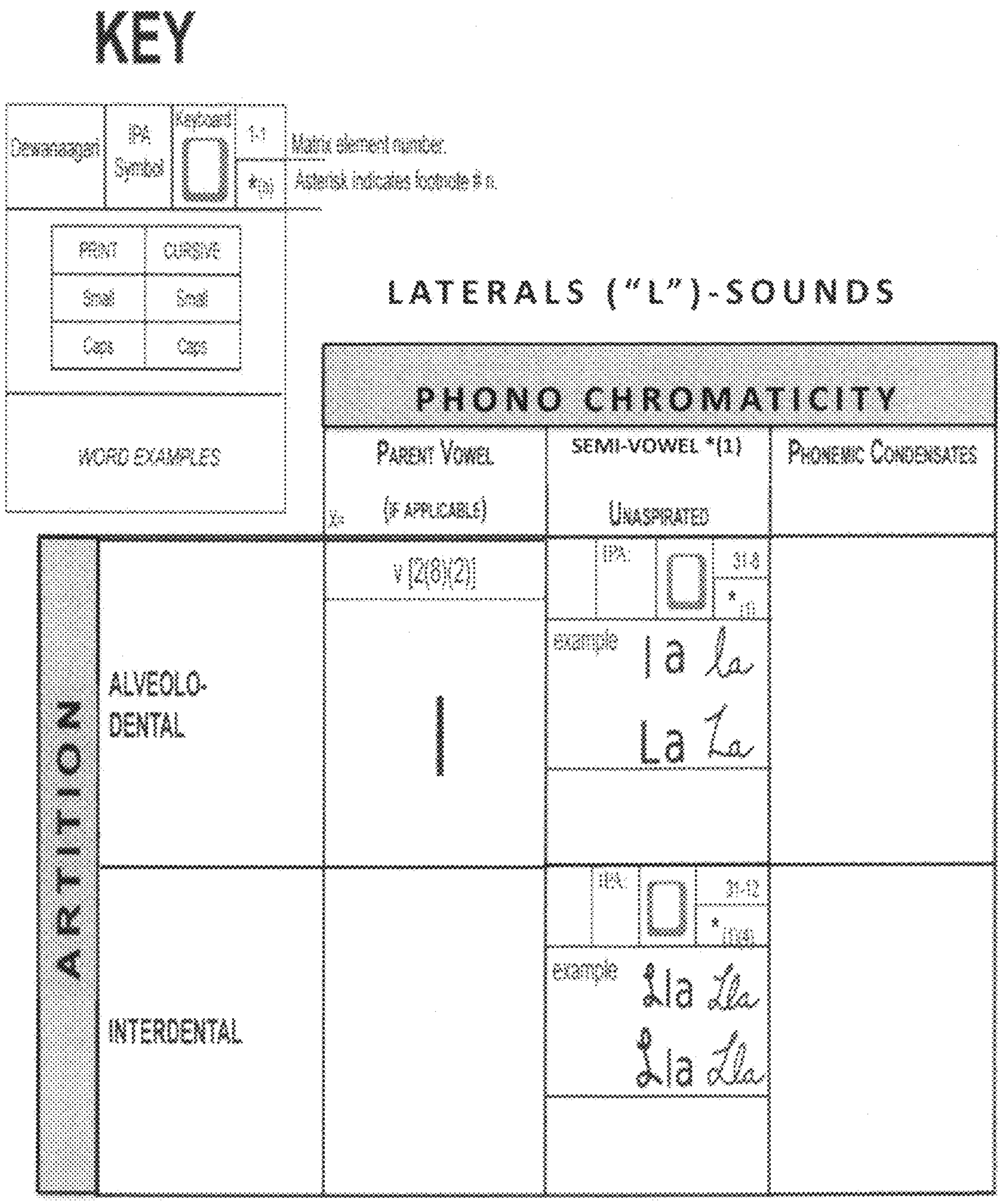
Figure 106:
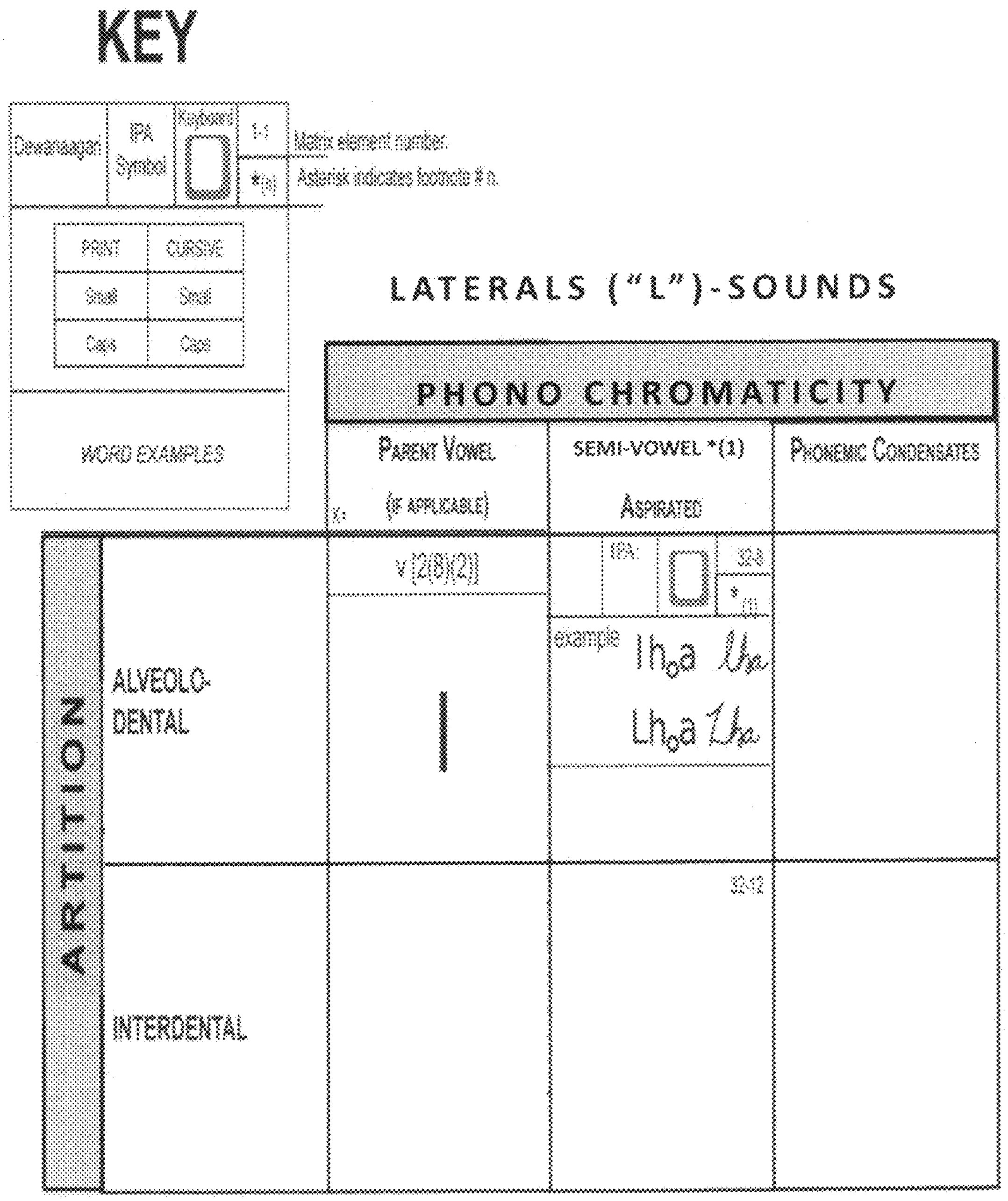
Figure 108:
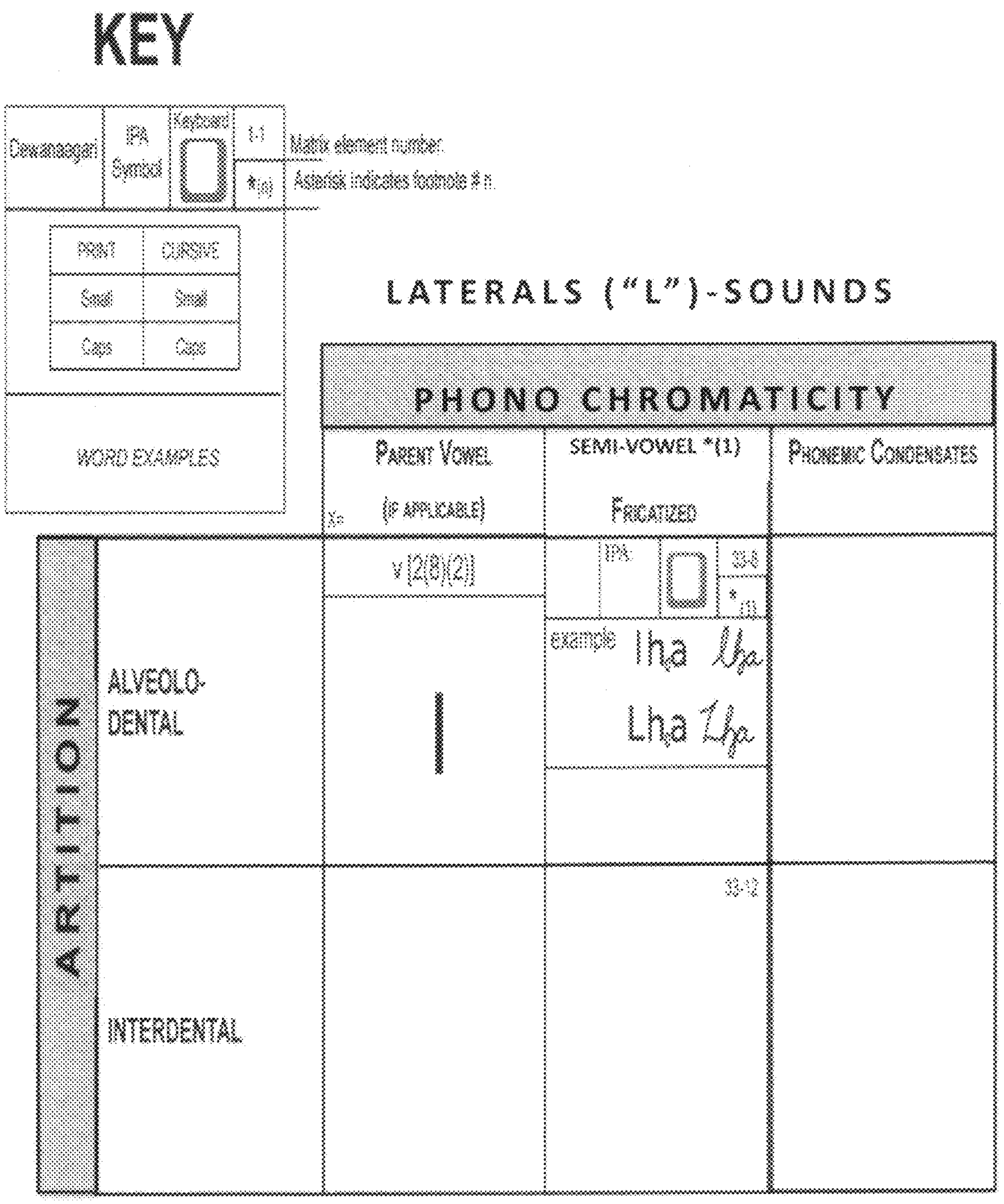
Figure 110:
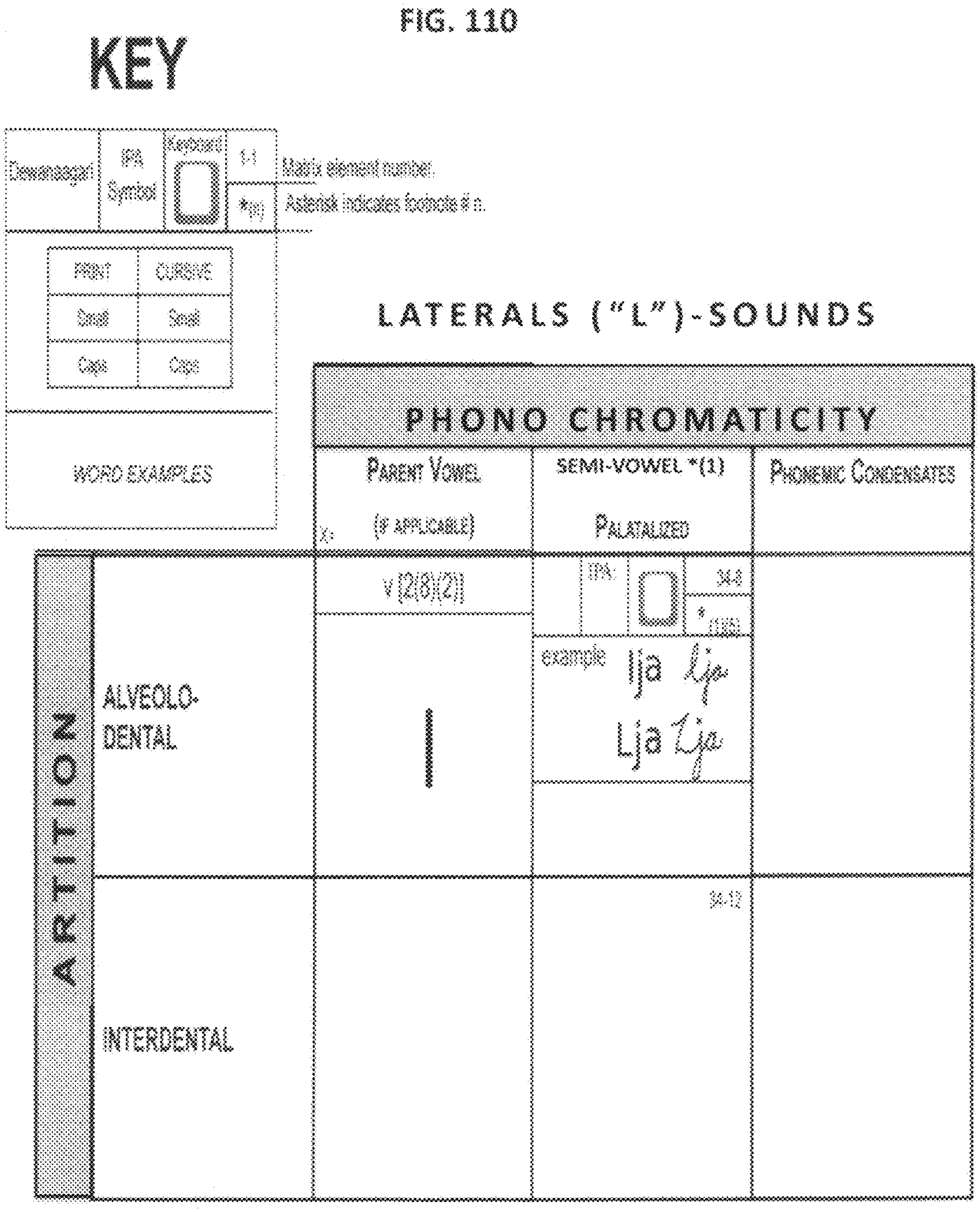
Figure 112:
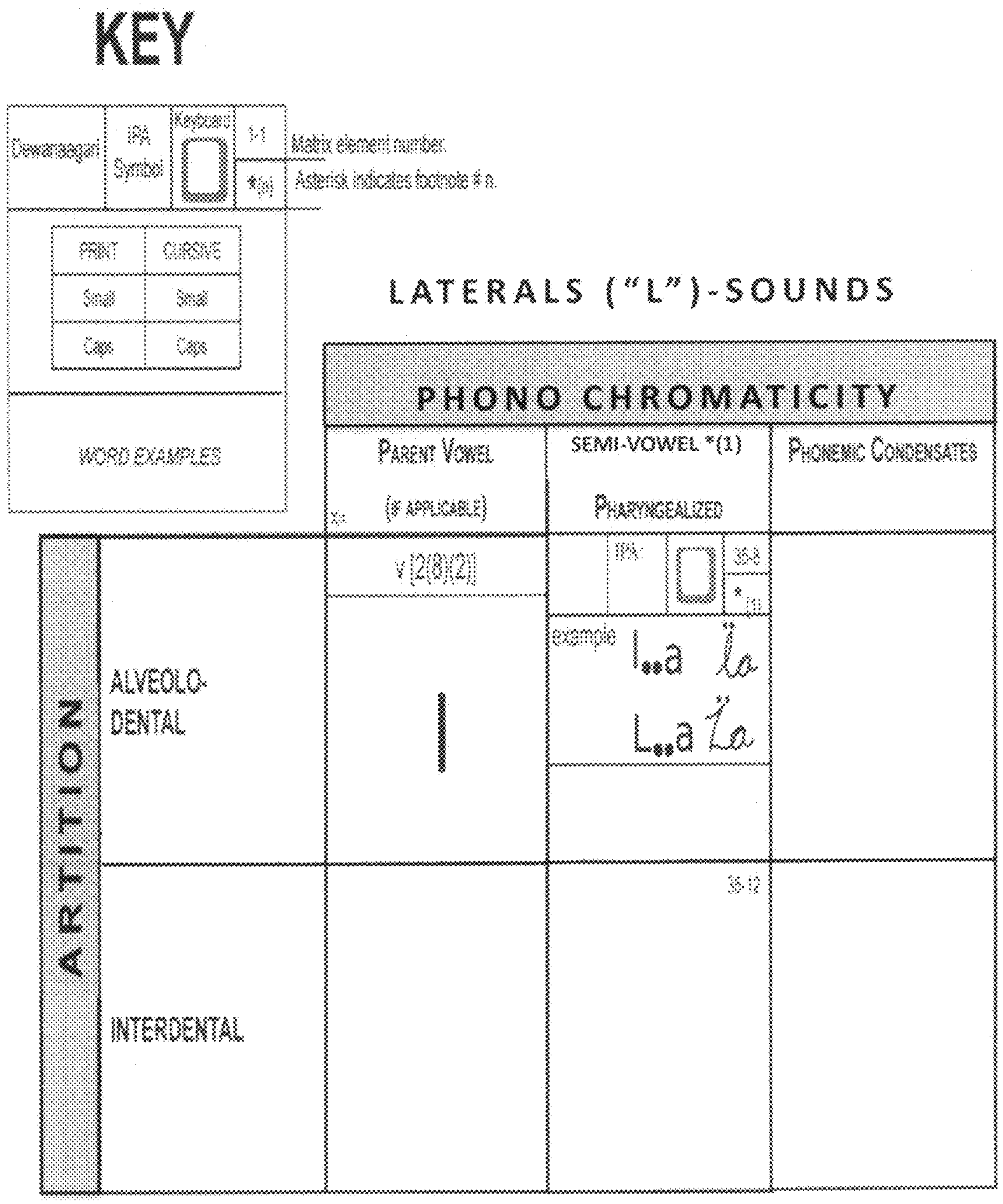

In a specific embodiment, the article, keyboard, apparatus, method, computer readable medium and language specific system uses a script or word comprising (a) one or more phonemic condensates; (b) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (c) one or more post-ops indicating tones as used in a tone language, wherein, said tones are depicted in Table 5, FIG. 132A-C; or (d) one or more glyphs selected from the group consisting of: (i) a medio-palatal, unvoiced, unaspirated plosive phone depicted by the glyph 1-6 set forth in FIGS. 53-55; (ii) a medio-palatal, voiced, unaspirated plosive phone depicted by the glyph 3-6 set forth in FIGS. 53-55; (iii) a velar, nasal, plosive phone depicted by the glyph 5-4 set forth in FIGS. 50-52; (iv) a retroflex, nasal, plosive phone depicted by the glyph 5-5 set forth in FIGS. 50-52; (v) a mediopalatal, nasal, plosive phone depicted by the glyph 5-6 set forth in FIGS. 53-55; (vi) a standard palatal, nasal, plosive phone depicted by the glyph 5-7 set forth in FIGS. 53-55; (vii) a retroflex, unvoiced, unaspirated plosive phone depicted by the glyph 1-5 set forth in FIGS. 50-52; (viii) a retroflex, voiced, unaspirated plosive phone depicted by the glyph 3-5 set forth in FIGS. 50-52 and (ix) velar, voiced fricative depicted by the glyph 7-4 set forth in FIGS. 59-61. In a particular embodiment, the word further comprises at least one of (a) a vowel having a phonological classification consisting of an x-axis, y-axis and z-axis set forth in Table 1, (b) one or more non-vowels having an artition set forth in Table 2A and (c) one or more phonochromes set forth in Table 2B.

Script

Table 1 summarizes, and FIGS. 1-48 illustrate, the vowel classification used in the present invention. Vowels are phones in which there is no impediment to the breath whatsoever.

TABLE 1

| Vowel Classification<br>THE NAVLIPI VOWEL CLASSIFICATION |
|---|
| X-AXIS, LIP POSITION |
| X = 1, Lips stretched |
| X = 2, Lips flat |
| X = 3, Lips rounded |
| Y-AXIS, TONGUE'S OR OTHER ARTICULATING ORGANS' POSITION |
| Y = 1, tongue medio-palatal |
| Y = 2, tongue flat |
| Y = 3, tongue retracted |
| Y = 4, tongue central, retroflex |
| Y = 5, tongue lateral, retroflex |
| Y = 6, tongue central, palatal |
| Y = 7, tongue lateral, palatal |
| Y = 8, tongue central, alveolo-dental |
| Y = 9, tongue lateral, alveolo-dental |
| Y = 10, tongue central, interdental |
| Y = 11, tongue lateral, interdental |
| Y = 12, nasal, bilabial |
| Y = 13, nasal, alveolo-dental |
| Y = 14, nasal, palatal |
| Y = 15, nasal, velar |
| Z-AXIS, JAW POSITION |
| (+)Z-axis, jaw vertical position: |
| Z = 1, close |
| Z = 2, close-mid |
| Z = 3, open-mid |
| Z = 4, open |
| (−) Z-axis, jaw horizontal position: |
| Z = (−)1, jaw forward, close-mid |
| Z = (−)2, jaw retracted, close-mid |

As shown therein, vowels are defined by three variables, represented in a 3-dimensional matrix: Lip position (x-axis, 3 values); tongue or other articulating organs' position (y-axis, 15 values) and jaw position (z-axis, 6 values). This is a reduction from five variables (five dimensions), with jaw vertical-position and jaw horizontal-position having been merged, and intensity of contact of the articulating organs not being considered. As seen, vowel length is treated separately within the 3-d matrix, although it is technically an additional variable.

Figure 49:
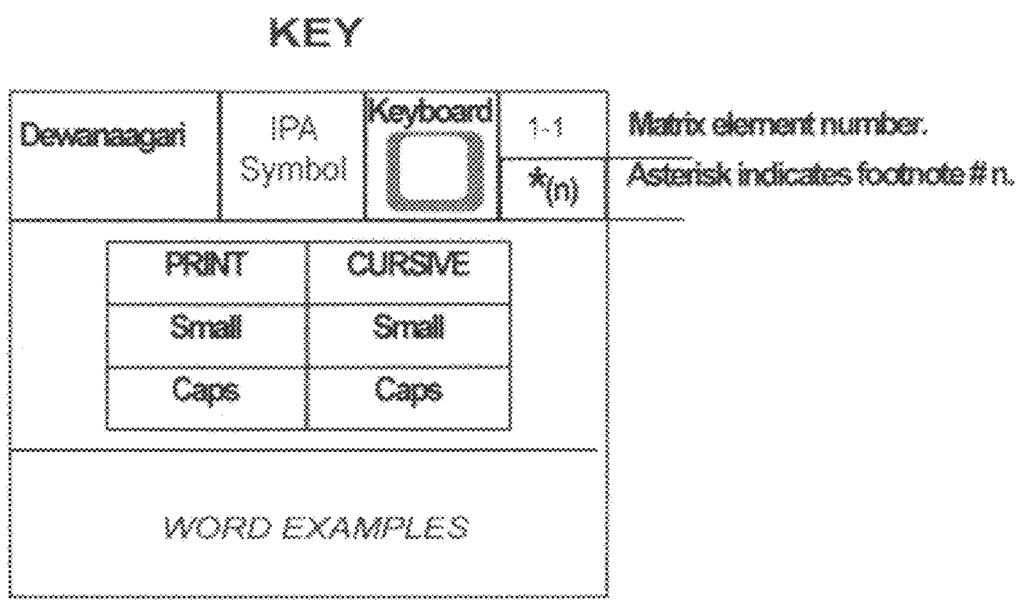

Table 2 summarizes, and FIGS. 49-114 illustrate, the non-vowel classification used in the present invention. As shown therein, non-vowels are defined by two variables: Articulation organ position, or artition for short, with 15 values; and the "color of the phone" (such as aspiration, voicing, fricatization etc.), denoted as phonochromaticity, of which there are 35 values. (This non-vowel classification is said to have 15 artitions and 35 phonochromes.)

TABLE 2

| NON-VOWEL CLASSIFICATION, INCLUDING SEMIVOWELS, CENTRALS AND LATERALS | |
|---|---|
| A. THE 15 ARTITIONS OF NAVLIPI FOR NON-VOWELS | |
| 1. | Glottal |
| 2. | Pharyngeal |
| 3. | Uvular |
| 4. | Velar |
| 5. | Retroflex |
| 6. | Medio-Palatal |
| 7. | Palatal |
| 8. | Alveolar |
| 9. | Apico/Medio-Dental |
| 10. | Standard Dental |
| 11. | Pharyngealized Dental |
| 12. | Interdental |
| 13. | Infralabio-Supradental |
| 14. | Supralabio-Infradental |
| 15. | Bilabial |
| B. THE 35 PHONOCHROMES OF NAVLIPI FOR NON-VOWELS | |
| 1. | Unvoiced/unaspirated |
| 2. | Unvoiced/aspirated |
| 3. | Voiced/unaspirated |
| 4. | Voiced/aspirated |
| 5. | Nasal |
| 6. | Fricative/unvoiced |
| 7. | Fricative/voiced |
| 8. | Flap/unaspirated |
| 9. | Flap/aspirated |
| 10. | Flap/nasal |
| 11. | Flap/fricatized |
| 12. | Trill/normal |
| 13. | Trill/fricatized |
| 14. | Click, ingressive, central, single, unvoiced |
| 15. | Click, ingressive, central, single, voiced |
| 16. | Click, ingressive, central, single, nasal |
| 17. | Click, ingressive, central, trill |
| 18. | Click, ingressive, lateral, single, unvoiced |
| 19. | Click, ingressive, lateral, single, voiced |
| 20. | Click, ingressive, lateral, single, nasal |
| 21. | Click, ingressive, lateral, trill |
| 22. | Click, egressive, central |
| 23. | Click, egressive, lateral |
| 24. | Ejective, unvoiced |
| 25. | Ejective, fricative |
| 26. | Implosive, unvoiced |
| 27. | Implosive, voiced |
| 28. | Semivowel, simple |
| 29. | Semivowel, pharyngeal |
| 30. | Semivowel, central |
| 31. | Semivowel, lateral, unaspirated |
| 32. | Semivowel, lateral, aspirated |
| 33. | Semivowel, lateral, fricatized |
| 34. | Semivowel, lateral, palatalized |
| 35. | Semivowel, lateral, pharyngealized |

As seen in the above Tables, there are technically (3×15×6)=270 distinct vowel phones and (15×35)=525 distinct non-vowel phones. If one were to represent each of these phones with a distinct glyph (character or letter), one might technically need one glyph for each of the 270+525=795 distinct phones, i.e. one would need 795 different glyphs. However, many of these phones are not in use in any significant language in the world, and thus, from the point of view of practical phonemics, they may be ignored. These are denoted by blank cells in the matrices in the above Figures.

With the use of such devices as post-positional operators ("post-ops"), the remaining glyphs are represented in the present invention entirely with the use of the Roman script (alphabet), with the use of just one borrowed glyph (Greek omega), one entirely new glyph, and just three transformed Roman glyphs.

Thus, the present invention is able to represent the 795 distinct phones of the phonological classification on which it is based entirely with the 26 letters of the Roman script, untransformed in any way (i.e., not rotated or inverted as in the IPA script), plus one borrowed glyph or letter (Greek omega), plus one entirely new glyph, plus three glyphs from transformed Roman letters. The suggested didactic or pedagogical order of NAVLIPI, i.e. the way it might be taught (like a, b, c, d . . . ) in a modern Roman alphabet is given in FIG. 115A-D.

The phonological classification represented by the above Tables and Figures form the phonological basis of the script used in the articles, methods, apparatus, systems and devices/apparatus of the present invention. It meets the other requirements spelled out above, such as universality, completeness, recognizability, distinctiveness, simplicity, intuitive nature, and ease/rapidity of transcription from the points of view of cursive, print and keyboard rendering. The elements of the script are set forth below.

Post-Positional Operators ("Post-Ops") and Phonemic Condensates

The present invention uses post-positional operators, or post-ops for short, not only to indicate certain properties of phones, thus drastically reducing the number of glyphs (characters or letters) required to represent the full phonological classification, but also to address phonemic idiosyncrasy.

A typical post-op of the present invention is [$h_o$], i.e. the letter h with a subscripted little circle. When used after a phone, it indicates aspiration. Thus, [p] is the unaspirated, unvoiced, bilabial plosive, whilst [$ph_o$] is its aspirated counterpart. Another, similar post-op is [$h_0$], i.e. the letter h with a subscripted little-oval. When used after a phone, it indicates fricatization. Its use occurs only when a glyph (i.e., character or letter) is not available to represent a phone. Thus, it would not be used for the fricative phones [f] and [s], which are, respectively, a labio-dental and a dental fricative, since these already have their own glyphs or letters. It would, however be used for the interdental fricative of English think, which would be represented as [$th_0$]. It is seen that these two post-ops are very intuitive.

One example of how the script used in the articles, methods, apparatus/devices and systems of the present invention addresses phonemic idiosyncrasy is set forth below. Specifically, the English phoneme /p/. NAVLIPI uses the post-op [$_o$] (subscripted little-circle), to represent the combined (aspirated+unaspirated) phoneme. This post-op is very amenable to cursive writing as well as keyboarding, yet very distinct and recognizable. This post-op then gives us three sets of glyphs (symbols or characters) for the components of the English phoneme /p/: (1) [p] (unaspirated phone); (2) [$ph_o$] (aspirated phone); and (3) $p_o$ (aspirated/unaspirated combined phoneme but generally pronounced [p]). In the script used in the present invention, $p_o$ is a phonemic condensate. That is to say, the [p] and [ph] phones are said to be condensed into one phonemic condensate, i.e. $p_o$=[p]+[ph]. In transcription in the present invention, only the $p_o$ would be used for English, i.e. all letters p in English would be written as $p_o$.

Yet another typical post-op of the present invention is [∞], i.e. the infinity sign (or horizontal figure-8), subscripted. This represents the (unvoiced+voiced) phonemic condensate, common in the Chinese languages. Thus, for example, when used with the bilabial, unaspirated, plosives ([p], unvoiced, [b], voiced), the phonemic condensate would be written as either [p] or [b], and would imply both the unvoiced and voiced phones, i.e. p.=[p]+[b]. Thus, when writing Mandarin in the universal script of the present invention, Beijing would be written as B.eijing. This would immediately inform the English-speaking reader that [p] and [b] are allophones of the same phoneme in Mandarin, and that this phoneme is preferentially articulated as a [b] although it may also sometimes be articulated as a [p] without changing the meaning of the word. Other words in Mandarin may be written with the phone [p] as basis. For example, the word pu or bu ("no, not") would be transcribed in the present invention as p.u rather than b.u. More accurately, since this word is articulated in the first tone (high, level), it would be transcribed as p.u$^{1}$, using the post-op for the first tone [$^{1}$]. In the case of standard Arabic, however, this phonemic condensate would always be written as b., since [p] is not articulated in standard Arabic.

Tables 3 and 4 summarize the post-ops and phonemic condensates used in the articles, methods, devices/apparatus, and systems of the present invention. The phonemic condensates used include but is not limited to PO-1 . . . PO-21 and PCON-1 . . . PCON-17 for purposes of reference. In a particular embodiment, the post-ops used include but are not limited to PO-4, PO-5, PO-8, PO-10, PO-11, PO-14, PO-15, PO-20 and PO-21. As seen therein, the cursive rendition of the post-ops is particularly facile, yet very recognizable and distinct.

TABLE 3: LIST OF POST-OPS

Table 3A

POST-OPS (POST-POSITIONAL-OPERATORS )

| | FUNCTION | DESCRIPTION | EXAMPLES | | | CORRESPONDING PCON |
|---|---|---|---|---|---|---|
| | | | POST-OP | PRINT | CURSIVE | |
| PO-1 | *Phonemic condensate*, designates (aspirate + nonaspirate) generally to be used with nonaspirate letter which is most common in transcription. | Little circle<br>(not subscript, just sitting on line.)<br>Cursive is like "little e". | o | *illustrated with (aa)*<br>$aa_o$<br>*illustrated with (p)*<br>$p_o$ | aae<br>pe | PCON-1 |
| PO-2 | Indicates long length of vowels when used with vowels. Rare because *Navlipi* uses reduplicated vowels. | | | | | |
| PO-3 | Length of tones | | | | | |
| PO-4 | Indicates aspiration | "h" with little circle on or straddling line | $h_o$ | illustrated with (p)<br>$ph_o$ | ph | |
| PO-5 | Indicates fricatization | "h" with oval. Usually used with root phone (e.g. plosive, central) to indicate fricatization where separate glyph is unavailable. "h" with oval below line is easily distinguishable from little circle. Analogous to "h" in present day English *sh*, French *ch*. | $h_0$ | *illustrated with (ɔ)*<br>$ɔh_0$ | ɔh | |
| PO-6 | *Phonemic condensate,* designates combination (voiced + unvoiced). Generally to be used with most common transcription (e.g. In Arabic with *b* to give $b^{\infty}$ in Cantonese with *p* to give $p^{\infty}$. | *(Print)* Infinity symbol straddling or on the line. *(Cursive)* Like two little "e"s. | ∞ | p∞ | pee | PCON-2 |
| PO-7 | Indicates sonant(voicing). Used very very rarely, e.g. for clicks. | Infinity symbol, same as above, but superscripted. | $^{\infty}$ | *illustrated with ( lz )*<br>$lz^{\infty}$ | $lz^{\infty}$ | |
| PO-8 | Indicates nasal sound or nasalization. Generally used only with vowels (but this includes lateral (l), central (r), vowels etc) | n with oval, m with oval, also optional tilde | $n_0$, ~<br>$m_0$ | $n_0$, ~<br>$m_0$ | n, ~<br>m | |

Table 3B

POST-OPS (POST-POSITIONAL-OPERATORS )

| | FUNCTION | DESCRIPTION | EXAMPLES | | | CORRESPONDING PCON |
|---|---|---|---|---|---|---|
| | | | POST-OP | PRINT | CURSIVE | |
| PO-9 | *Phonemic condensate* indicates a vowel can be nasal or non-nasal. Accurately should be used for much American speech, but is impractical. | Same as above but with additional dot above. Very very rare. | ṅ₀ | ṅ₀ |  | PCON-16 |
| PO-10 | Indicates flap. Most flaps have their own separate letters. This symbol used mainly for Indian letters. | Single dot or period (full stop). *(Print)* On line. *(Cursive)* Below letter. Distinguished from period by space. | . | *illustrated with* (t) t. |  | |
| PO-11 | Indicates uvular *or* pharyngeal variant. Mainly Arabic "faucal" letters etc. Mostly used with the velar base plosive (e.g.. (k,g)) also t.. d.. (etc.) | Double dot (period). *(Cursive)* Double dot above letter. *(Print)* Double dot (period, full stop) after letter (preferred) or Shift + dot (raised dot). Cursive double dot over letter somewhat emulates some Roman transcriptions today, e.g. of Arabic. Mainly to be used in Arabic, Hebrew. Distinct from period at end of sentence. | .. | *illustrated with* (k) k.. |  | |
| PO-12 | *Phonemic condensate* Indicates (stop + fricative). Usually used with stop. | h with horizontal infinity sign. *(Cursive)* Double circle or "double superscript e". | h∞ | h∞ |  | PCON-3 |
| PO-13 | *Phonemic condensate* Indicates (stop + forward fricative). Usually used with stop. | *(Print)* h with vertical infinity sign or small "figure 8". *(Cursive)* Same, but infinity sign written like a "figure 8" (Somewhat rare). | h8 | *illustrated with (p, ȷ)* ph8 ȷh8 |  | PCON-4 |
| PO-14 | Click ingressive. Used after corresponding stop or semi-vowel (e.g. lateral) to indicate a click in the same articulation position as the operand. | Letter z with crossbar. | ƶ | *illustrated with (l)* lƶ |  | |
| PO-15 | Click egressive. Used after corresponding stop or semi-vowel (e.g. lateral) to indicate a click in the same articulation position as the operand. | Letter z with double crossbar. | z̿ | *illustrated with (l)* lz̿ |  | |

Table 3C

POST-OPS (POST-POSITIONAL-OPERATORS )

| | FUNCTION | DESCRIPTION | EXAMPLES | | | CORRESPONDING PCON |
|---|---|---|---|---|---|---|
| | | | POST-OP | PRINT | CURSIVE | |
| PO-16 | Ejective. Operand is stop, lateral, etc. | Letter z with crossbar with single apostrophe. (Very, very rare). | ƶ' | ƶ' | z' | |
| PO-17 | Implosive. Operand is stop, lateral, etc. | Letter z with crossbar with double apostrophe. (Quite rare). | ƶ" | ƶ" | z" | |
| PO-18 | *Phonemic condensate.* Indicates (stop + semi-vowel) | Vertical "figure 8" (infinity symbol) on parent stop. | 8 | *illustrated with (b, į)* b8 į8 | b8 į8 | PCON-5 |
| PO-19 | Denotes a "mobile, generic" vowel where choice of vowel does not appear to matter, e.g. in some Semitic and Chinese languages. | ***(Print)* equals sign. *(Cursive)* wave resembling equals sign.** Used as Post-Op. Most difficult amongst phonemic condensates to treat. Found in Arabic dialects and in some Chinese languages. E.g., most Arabic dialects do not have phonemic distinctions between [i] and [u]. | = | *illustrated with (a)* a= | a= | PCON-15 |
| PO-20 | Combination of Phones | Bar-above *(Print)* To be written as a post-op, thus resembling IPA symbol. *(Cursive)* To be written directly above the phones it acts on. Thus, its use will be much like crossing a t. | ‾ | *illustrated with (kp)* kp‾ *(Igbo)* | k̄p̄ | |
| PO-21 | "Silent" Non-Vowel | ***(Print)* Empty parenthesis *(Cursive)* rendered by circling the relevant glyph. See description of this unique post-op in the book. | () | *(Bahasa Malaysia, "No")*** Tidak() | Tidak | |

TABLE 4: List of Phonemic Condensates

Table 4A

P-CONS (PHONEMIC CONDENSATES)

Figure 8:
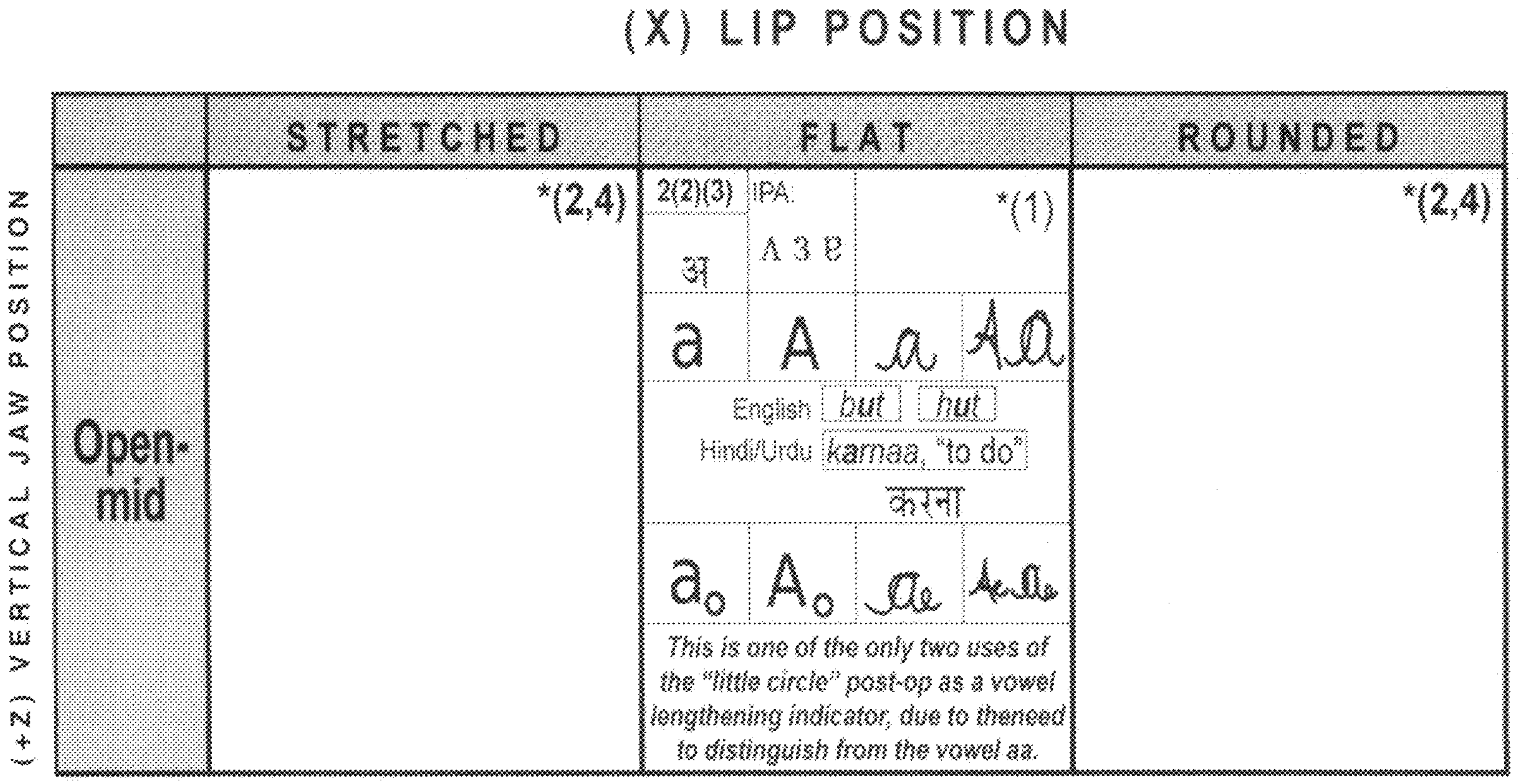
Figure 10:
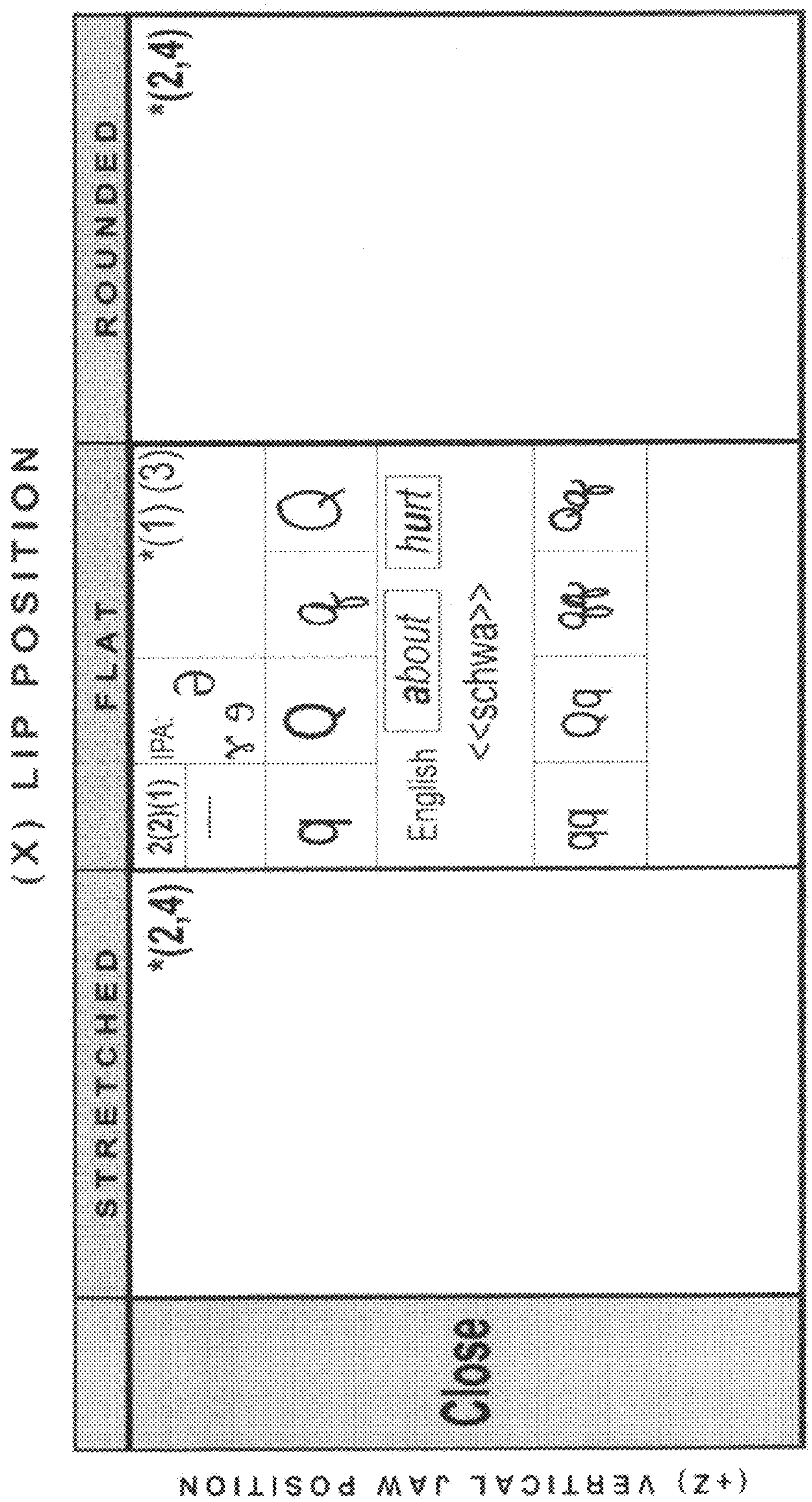
Figure 11:
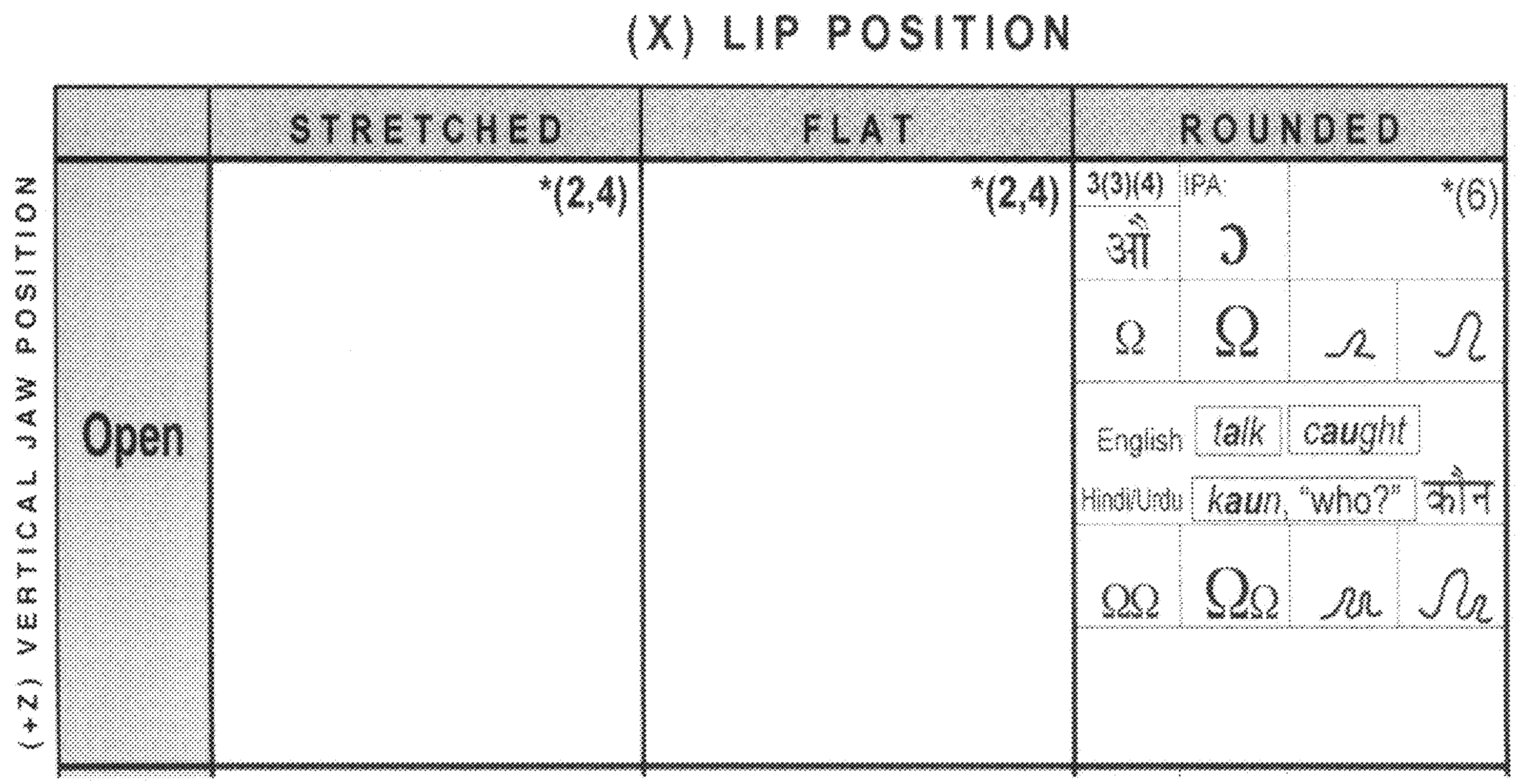
Figure 12:
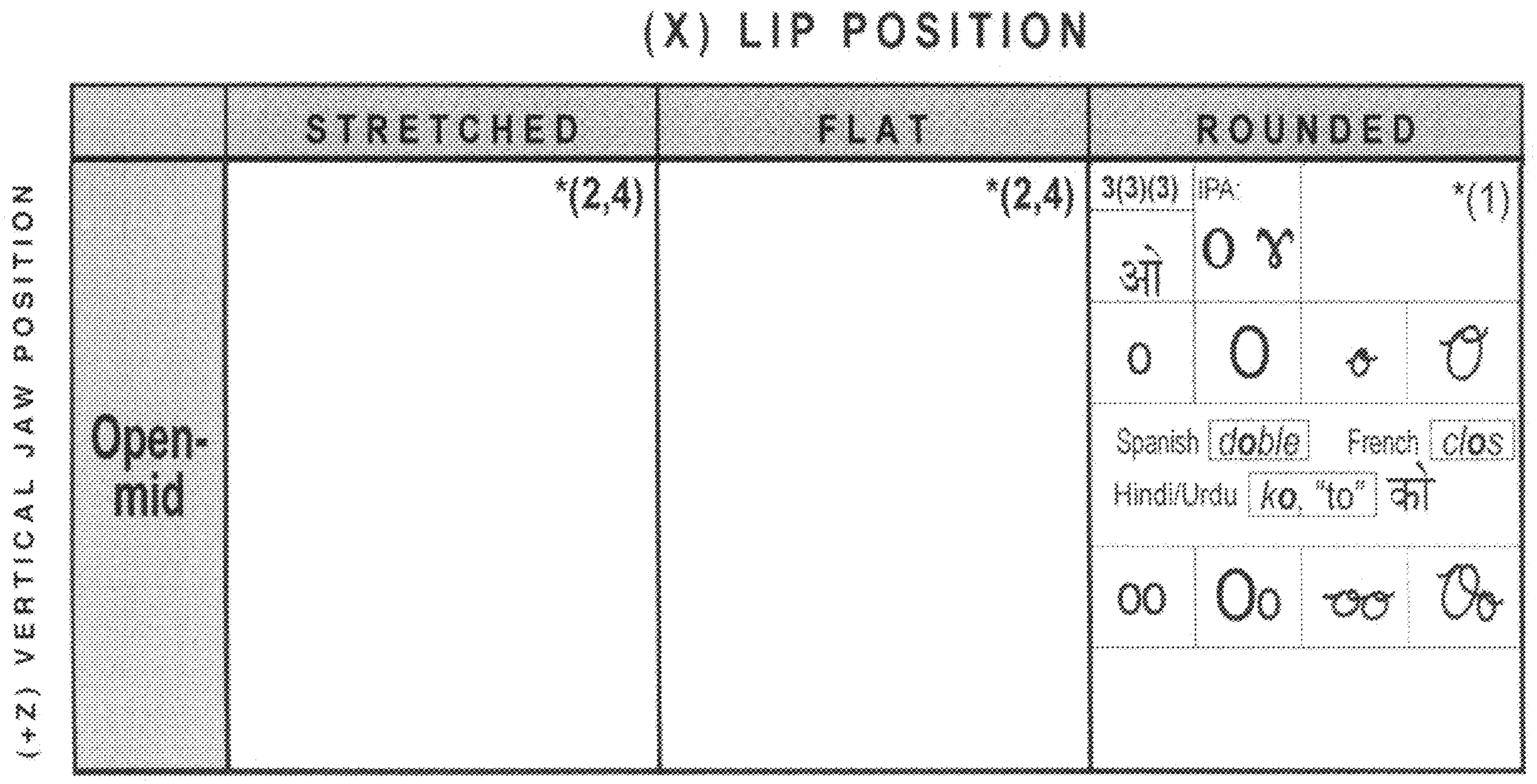
Figure 17:
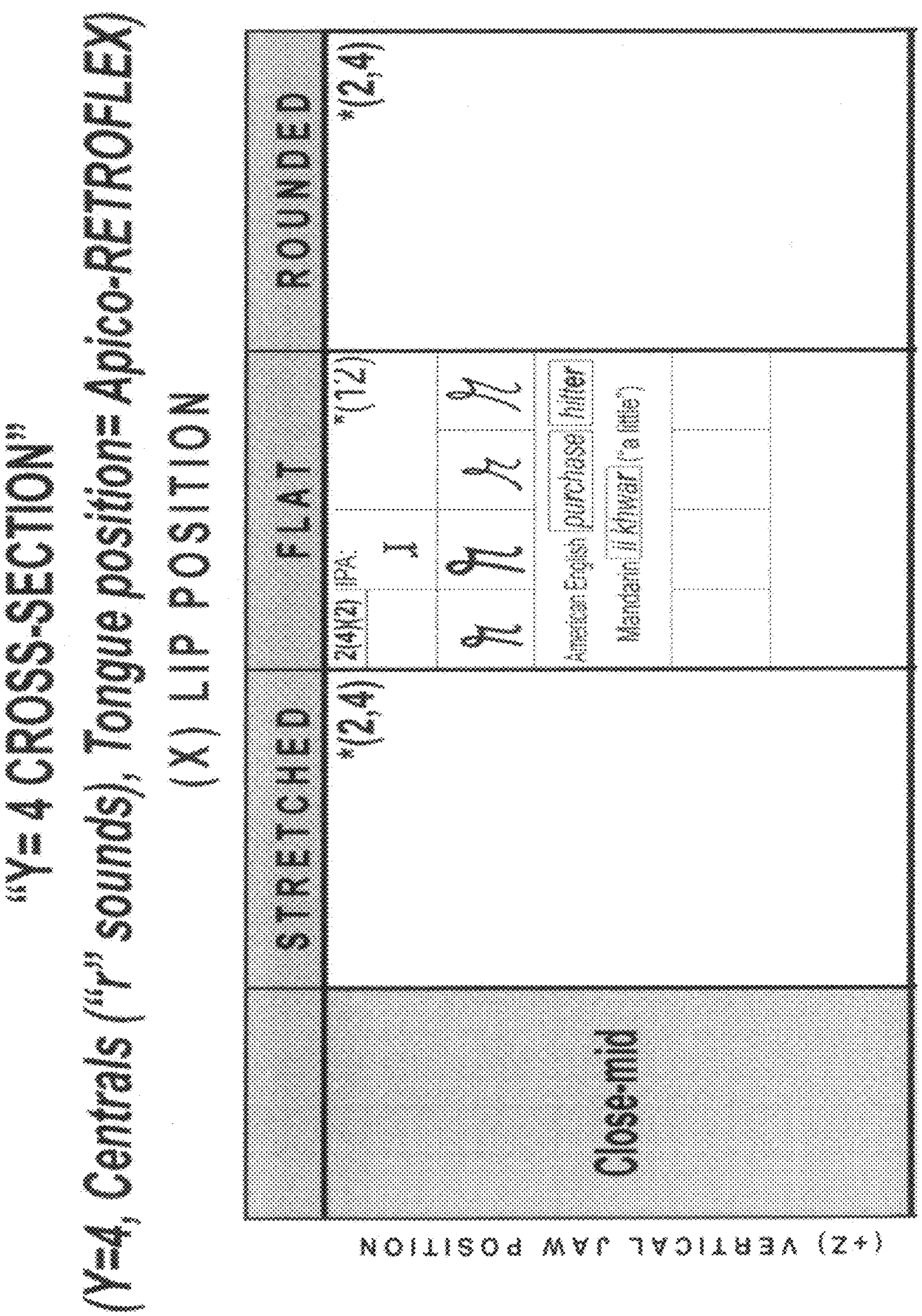
Figure 19:
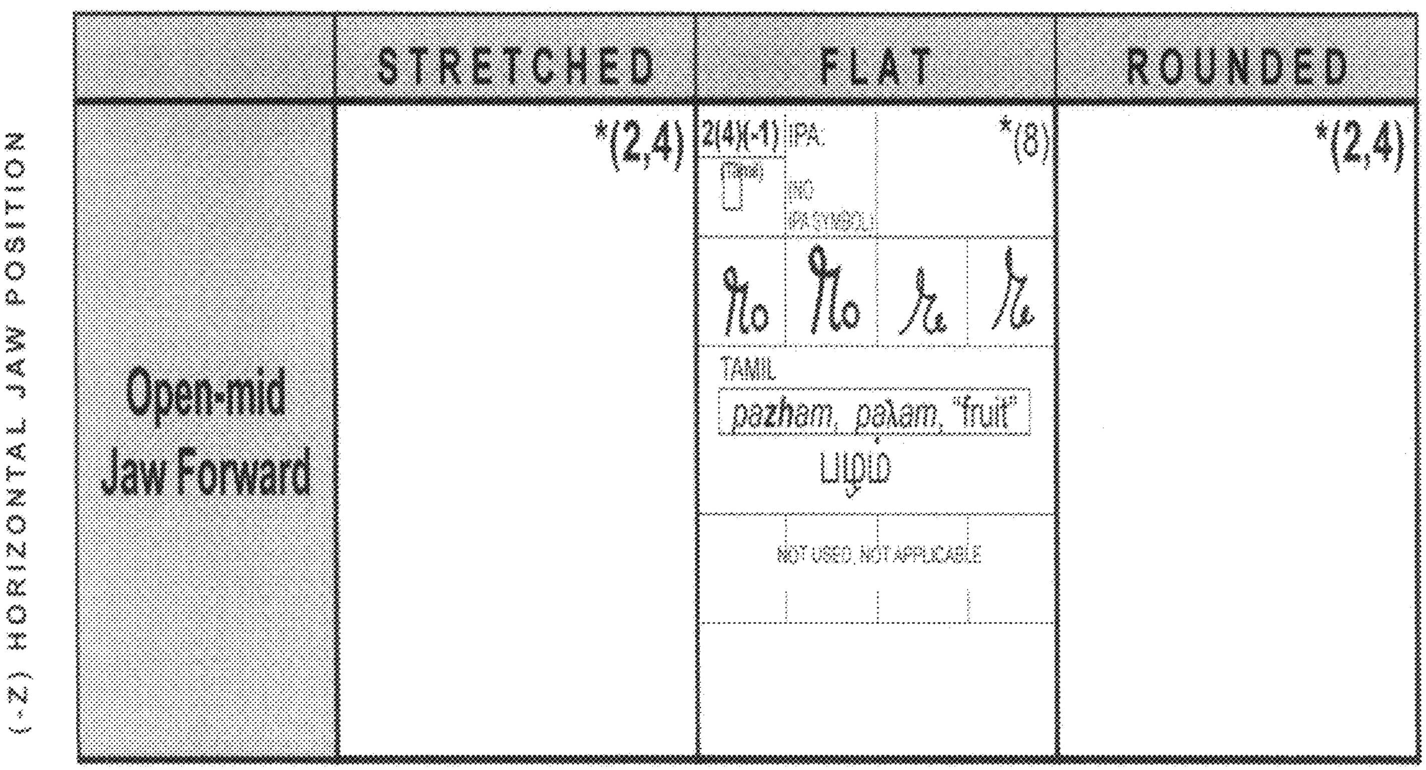
Figure 23:
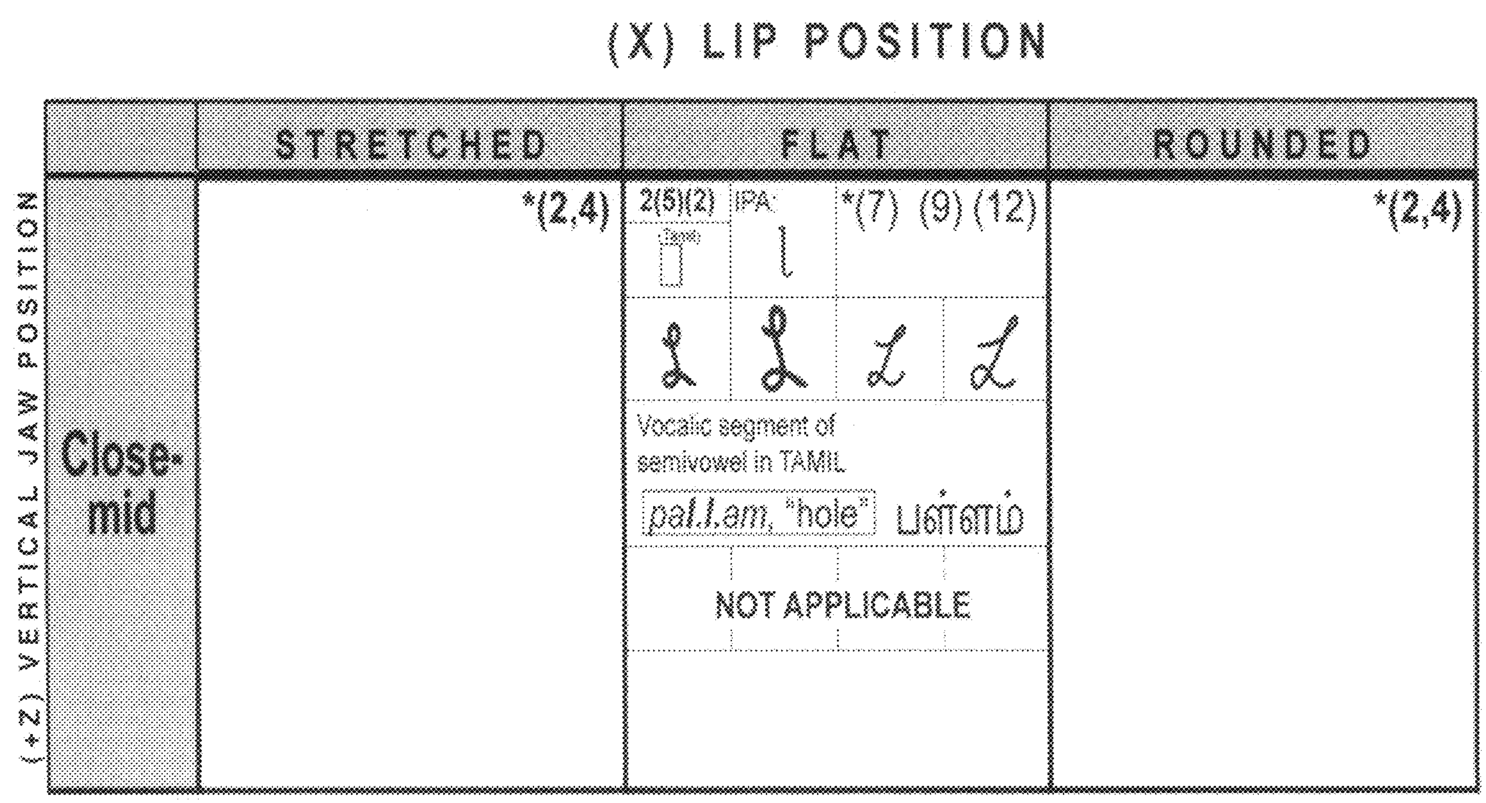
Figure 28:
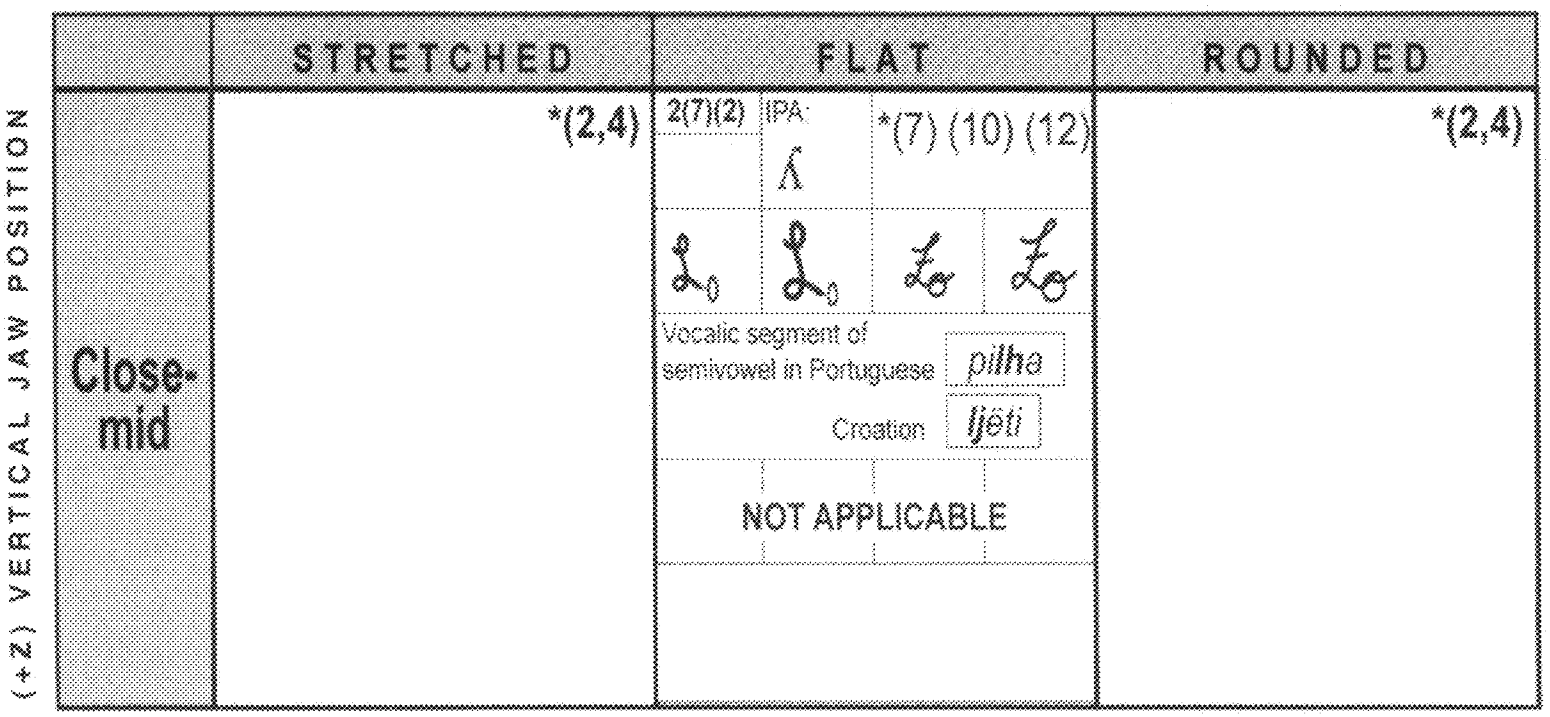
Figure 32:
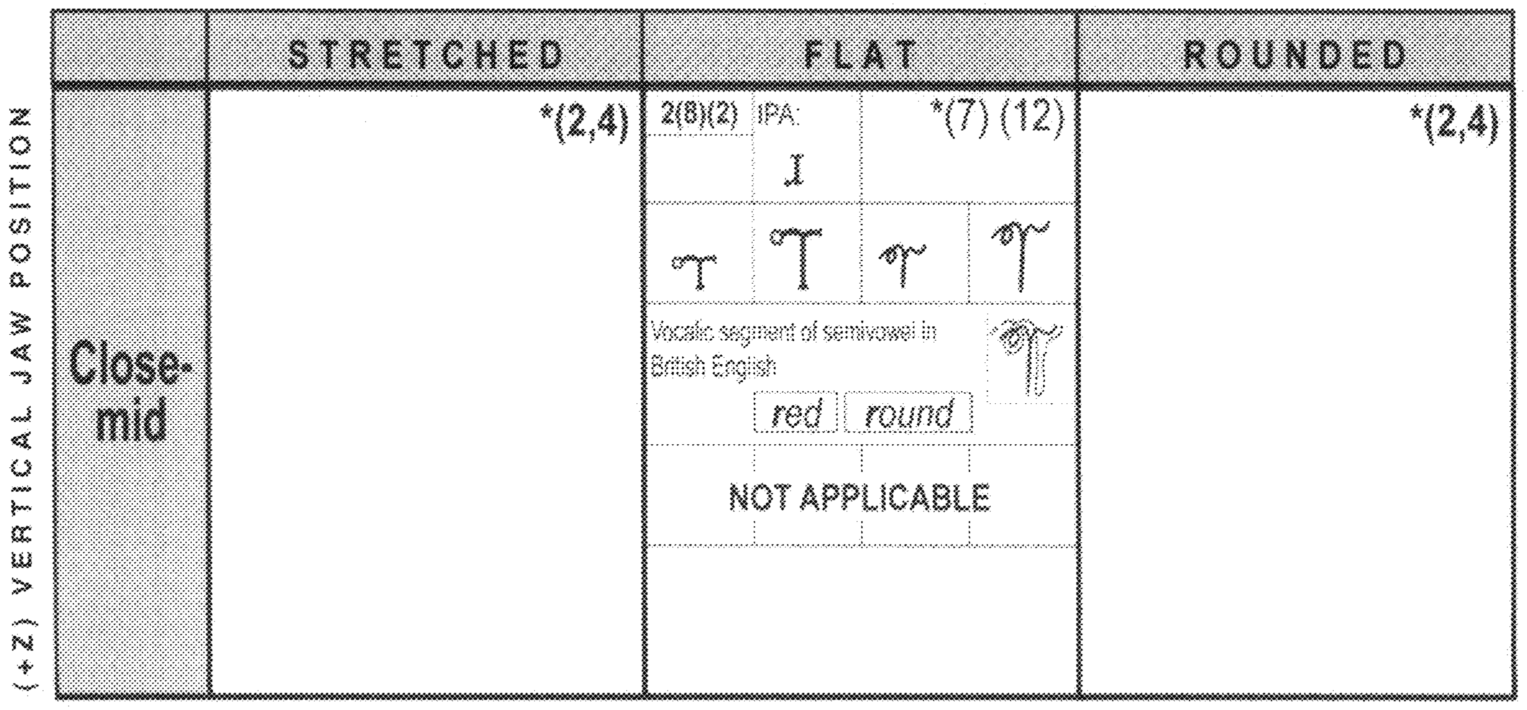
Figure 37:
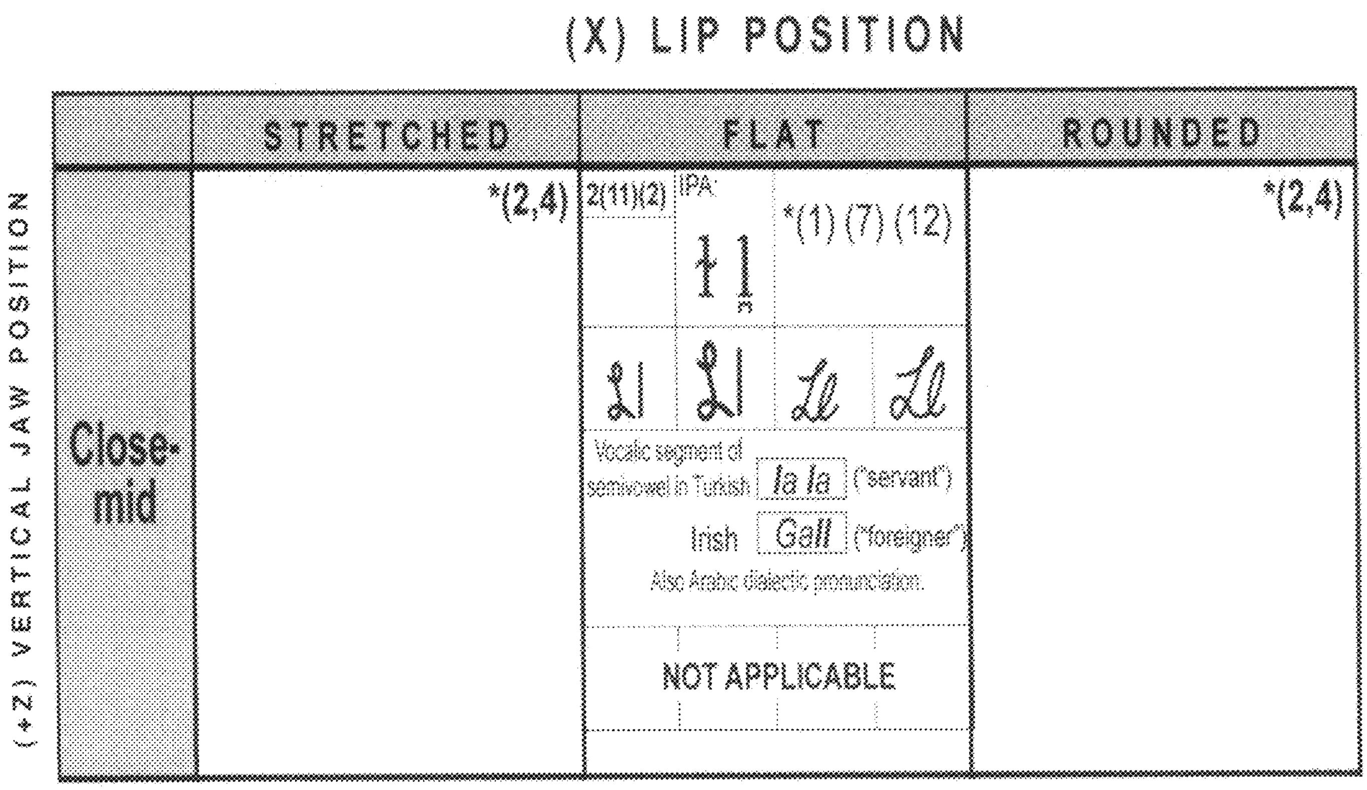
Figure 43:
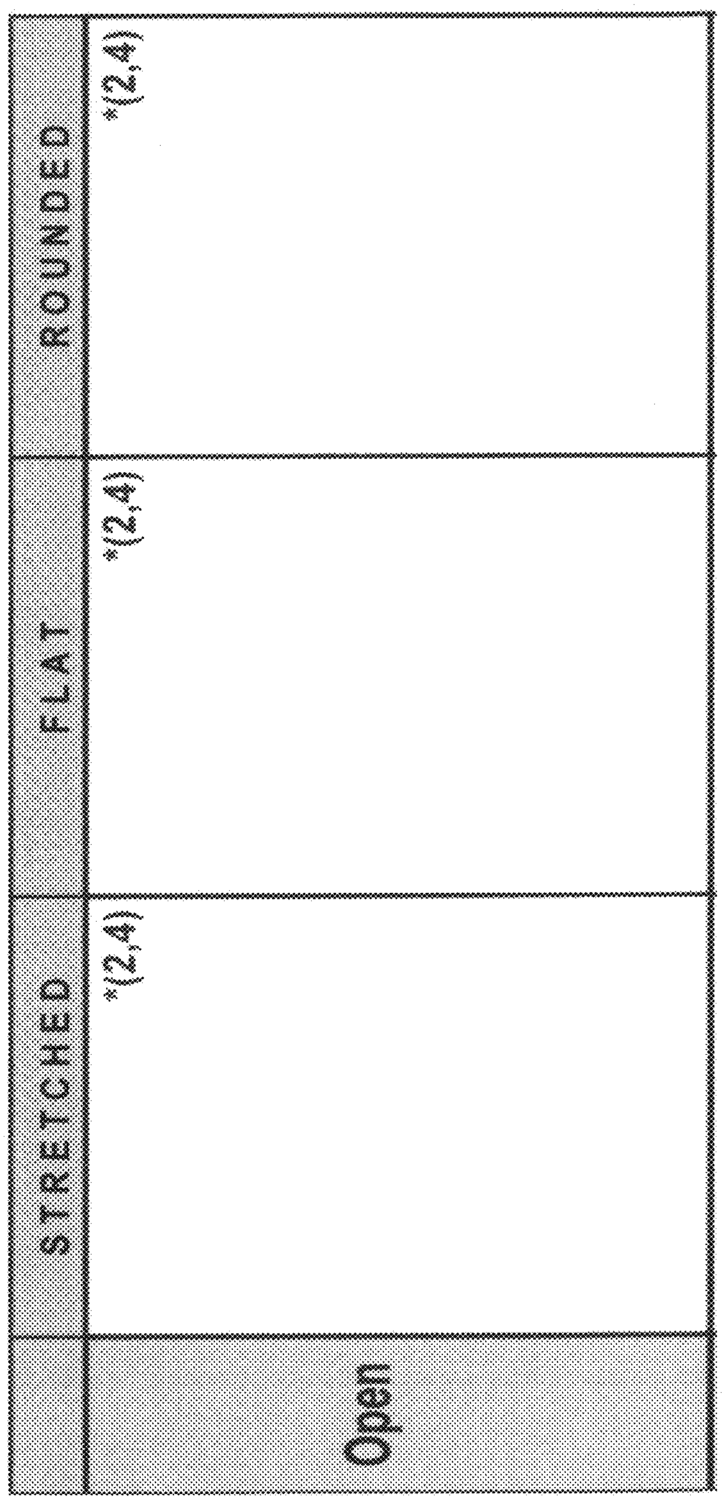
Figure 45:
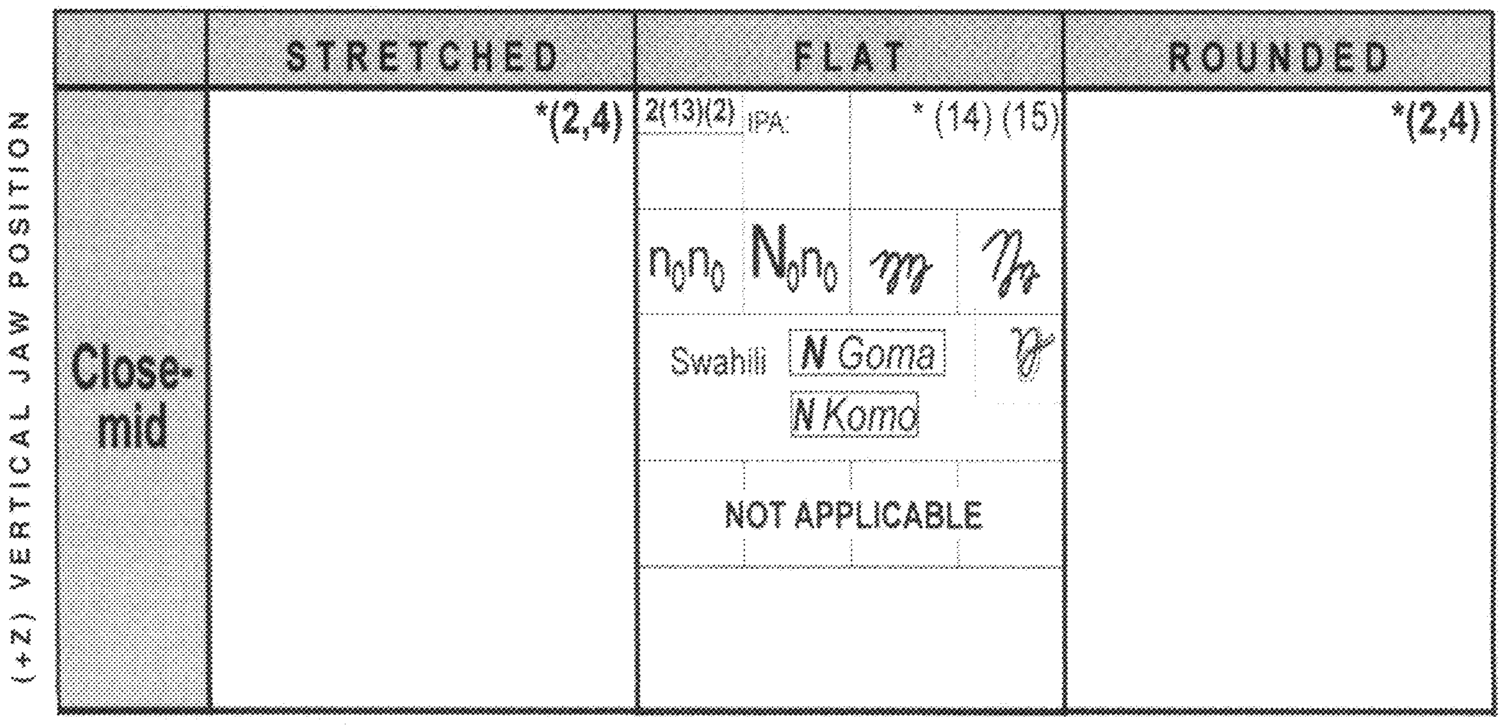

| | FUNCTION | DESCRIPTION | EXAMPLES | | | |
|---|---|---|---|---|---|---|
| | | | P-CON ONLY | PRINT | CURSIVE | RELEVANT EQUIVALENCE |
| PCON-1 | (aspirate + non-aspirate) (non-vowel) | Little circle | o | *illustrated with (p)* $p_o$ | $p_o$ | $p_o = [p] + [ph_o]$ |
| PCON-2 | (unvoiced +voiced) | Infinity sign | ∞ | *illustrated with (p)* $p_\infty$ | $p_\infty$ | $p_\infty = [p] + [b]$ |
| PCON-3 | (stop + fricative) | h + (Horizontal infinity sign or double circle) | $h_\infty$ | *illustrated with (k)* $kh_\infty$ | $kh_\infty$ | $kh_\infty = [k] + [x]$ |
| PCON-4 | (stop + forward fricative) | h + (Vertical infinity sign or figure 8) | $h_8$ | *illustrated with (p)* $ph_8$ | $ph_8$ | $ph_8 = [ph_o] + [f]$ |
| PCON-5 | (stop + semi-vowel) | Vertical infinity sign or figure 8 | 8 | *illustrated with (b)* $b_8$ | $b_8$ | $b_8 = [b] + [w]$ |
| PCON-6 | (semi-vowel + forward fricative) | Digraph, starting with forward fricative. | vw | vw | vw | vw = [ v ] + [ w ] |
| PCON-7 | (stop + flap) | Digraph, starting with stop. (Rare) | ttr | ttr | ttr | ttr = [ tt ] + [ r ] |
| PCON 8 | (flap + trill + semivowel) in (alveolo-dental central) artition. *("common r")* | The letter "r" | r | r | r | $r = [r^{o}] + [r^{o} r^{o}] + [r_0]$ |
| PCON-9 | (flap + trill + semi-vowel) in retroflex artition. | Mentioned for completeness only | Not used no phonemic significance | | | |
| PCON-10 | [(trill + flap + semivowel) in alveolo-dental artition] + [uvular fricative] | Digraph: Corresponds to component phones. Used mainly for French/German "r". No possibility of confusion as individual phones. x, r, almost never occur together. In the very rare instances they do, distinction can be made by context. | xr | xr | xr | xr = [ x ] + [ r ] |

Table 4B

P-Cons (PHONEMIC CONDENSATES)

| | FUNCTION | DESCRIPTION | EXAMPLES | | | |
|---|---|---|---|---|---|---|
| | | | P-CON ONLY | PRINT | CURSIVE | RELEVANT EQUIVALENCE |
| PCON-11 | (central flap + central trill + central semivowel + lateral semivowel) in alveolo-dental artition. | "r" with single bar across. Used mainly with Chinese languages and Japanese and some Southeast Asian languages. Parent phone is actually a lateral, but to avoid confusion with other phones (e.g. Polish palatal L, see above) we use this. The Chinese languages don't normally have a central (r sound) but they typically interchange the lateral [l] and central [r] phones. | ɍ | ɍ | ɍ | ɍ = $[r^{o}]$ + $[r^{o} r^{o}]$ + $[r_0]$ + [l] |
| PCON-12 | (Central semivowel + lateral semivowel) in retroflex artition. | ɻ with single bar across. Less common than above, but again used mainly in Chinese, and Southeast Asian languages, some dialects of Maraathi and Tamil also confuse these two component phones and so may need this. | ɻ̶ | ɻ̶ | ɻ̶ | ɻ̶ = [ɻ] + [ɭ] |
| PCON-13 | (central flap + central trill + central semivowel + lateral semivowel + nasal) in alveolo-dental artition. | "r" with double bar across. Quite rare, but needed for completeness. Also shows up in phonal changes in many language families e.g. Indo-European. | r̿ | r̿ | r̿ | r̿ = $[r^{o}]$ + $[r^{o} r^{o}]$ + $[r_0]$ + [l] + [n] |
| PCON-14 | (central semivowel + lateral semivowel + nasal) in retroflex artition. | ɻ with double bar across. Very, very rare. Again done for completeness only. | ɻ̿ | ɻ̿ | ɻ̿ | ɻ̿ = [ɻ] + [ɭ] + [ɳ] |
| PCON-15 | Denotes a "mobile, generic" vowel where choice of vowel does not appear to matter, e.g. in some Semitic and Chinese languages. | ***(Print)* equals sign. *(Cursive)* wave resembling equals sign.** Used as Post-Op. Most difficult amongst phonemic condensates to treat. Found in Arabic dialects and in some Chinese languages e.g. most Arabic dialects do not have phonemic distinctions between [i] and [u]. | = | *Illustrated with (a)* a= | a≋ | [ a= ] = [ a ] + [ e ] (Mandarin)<br>[ i= ] = [ i ] + [ u ] (some Arabic colloquial dialects) |
| PCON-16 | nasal + non-nasal | Nasal Post-Op, but with dot above | $\dot{n}_0$ | $\dot{n}_0$ | $\dot{\eta}$~ | |
| PCON-17 | "Universal R" | Uppercase R. To be used to represent ALL centrals when needed. Expected to be rarely used. | R | R | R | | in this transcription, tones are classified according to just three variables: their point of origin (low, mid, high); their nature (level, rising, falling); and their degree of rise or fall (if not level).

Tones

Tones of tone languages, which also convey phonemic information, are currently transcribed in a number of ways, most of which make heavy use of diacritics. An example of such heavy diacritic use is the Roman-based Vietnamese script. In some cases, tones are also transcribed with annotation marks or other devices, which are difficult to recognize or differentiate. An example of this latter use is the IPA. And of course, in many original transcriptions of tone languages, such as Chinese, tones were implicit but not separately transcribed. In the present invention, tones are transcribed entirely through the use of post-ops. As a first step in this transcription, tones are classified according to just three variables: their point of origin (low, mid, high); their nature (level, rising, falling); and their degree of rise or fall (if not level). The representation of tones in the present invention is summarized in Table 5. As seen therein, the cursive rendition of tones is particularly facile, yet very recognizable and distinct.

SUMMARY TABLE OF TONES

TABLE 5:

| POINT OF ORIGIN | LEVEL | | RISING [EXTENT OF RISE=SMALL] | | RISING [EXTENT OF RISE=LARGE] | | FALLING [EXTENT OF FALL=SMALL] | | FALLING [EXTENT OF FALL=LARGE] | |
|---|---|---|---|---|---|---|---|---|---|---|
| | PRINT | CURSIVE | PRINT | CURSIVE | PRINT | CURSIVE | PRINT | CURSIVE | PRINT | CURSIVE |
| 1. (HIGH) | ǀ [paǀd] | *(1) l [pald] | ˥ [pa˥d] | *(2) ɂ [paɂd] | N/A | N/A | Γ [paΓd] | ʃ [paʃd] | Γ [paΓd] | ʃ [paʃd] |
| 2. (MID) | ⁄ [pa⁄d] | *(3) χ̊ [paχ̊d] | ⟩ [pa⟩d] | χ̊ [paχ̊d] | > [pa>d] | χ̊ [paχ̊d] | ⌃ [pa⌃d] | χ̊ [paχ̊d] | ⌃ [pa⌃d] | χ [paχd] |
| 3. (LOW + LOW-MID) | — *(4) [pa—d] | — [pa—d] | ┘ [pa┘d] | ⊥ [pa⊥d] | ┘ [pa┘d] | ⊥ [pa⊥d] | ┐ *(5) [pa┐d] | ⊤ [pa⊤d] | N/A | N/A |

* (1) Like an uncrossed "t", but taller

* (2) Written like a cursive "x", but circle distinguishes this from an "x".

* (3) The bar or cross at the top is in one direction only (to the left (rising) or right (falling) and is at the very top. This clearly distinguishes it from a "t" and eliminates confusion, as repeated recognizability tests carried out by us have shown.

* (4) Longer than a hypen – seperate key.

* (5) The up (rising) or down (falling) bar is NOT at the end f the hyphen, but cose to the end.

Keyboarding

Several changes have been made to the keyboard of the present invention as compared to standard QWERTY or other keyboards. These include: (1) Left and right ALT keys made much larger so that the forefingers can easily and naturally access them. (2) SPACEBAR made correspondingly smaller to accommodate the larger ALT keys. Spacebar would be accessible only via thumbs. (3) For "ergonomic" keyboards (keyboards that are larger and have a curved surface to prevent carpal tunnel syndrome), this ALT and SPACEBAR placing can be modified slightly in the following way: The ALT keys can be placed slightly above although still to the right of the spacebar, in the intervening blank space created by the bifurcation of the keyboard. (4) The "lower case" keys of the NUMERIC part of the keyboard (i.e. those in effect when there is no Numeric Lock on) are deleted and replaced by other keys.

The keyboarding described below is for the English QWERTY keyboard, although the concepts set forth below may be extended to other common keyboards, e.g. the French AZERTY keyboard.

In the keyboarding of the present invention, each key is allocated four values, corresponding, respectively, to the key pressed alone, the key pressed along with the SHIFT key, the key pressed along with the ALT key, and the key pressed along with the CTRL key.

For ease in referral then, the present invention uses the following matrix notation to designate keys:

(m)(n)(N,S,C,A), where m is the column number (x-axis), n is the row number (y-axis) and N, S, C and A represent Normal, SHIFT, Control (CTRL) and Alternate (ALT).

Thus, by way of example only, using this notation: (4)(11)C represents the (Ctrl+P) key; (4)(11)C-A represents the (Ctrl+Alt+P) key; and (4)(11) alone represents the "P" key in general, i.e. all its functions (Normal, Shift, Ctrl, Alt). When we wish to refer to several keys together, we may use a combined notation. Thus, e.g., (2)(2,3,4) refers to three keys, (2)(2), (2)(3), (2)(4), the number keys for the numbers 1, 2 and 3, whilst (3,4,5)(5) refers to the three keys (3)(5), (4)(5), (5)(5), corresponding to the R, F and V keys. For more general notation, (2)(n) represents all the Row-2 keys 1, 2, 3 . . . etc.) whilst (m)(8) represents all the Column-8 keys, i.e. (F5, 7, U, J, M). In a similar vein, (2)(2-11) represents the number keys only (1, 2, 3 . . . 0).

Since each key has four possible renderings, as described above (Normal (no Shift, Ctrl or Alt pressed), Shift, Ctrl and Alt) each key in the actual keyboard should properly have four markings on it. We are at present used to keyboards with just one marking (e.g. the "P" key described above) or at most two (e.g. the (?/) key, with (?) being upper case, i.e. (Shift+the key). Thus, each key in the keyboard of the present invention will have four separate markings on it, in the four corners of the key.

Figure 116A:
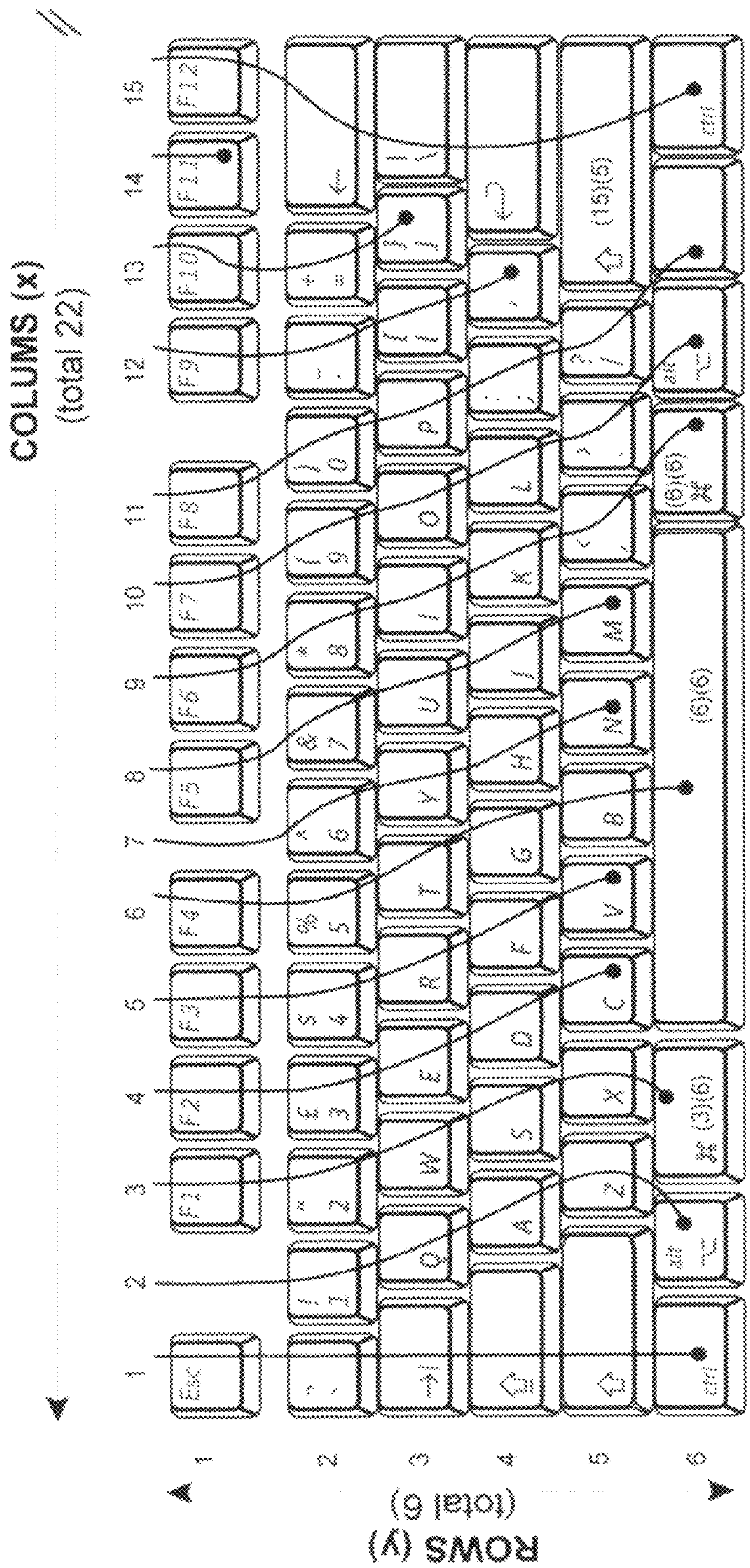
FIG. 116A-B show numerical notation used by the NAVLIPI keyboard. The notation is (x,y), with x=columns and y=rows. Thus, e.g., the notation for the current QWERTY s key is (3,4), and the notation for the r key is (5,3).
Figure 116B:
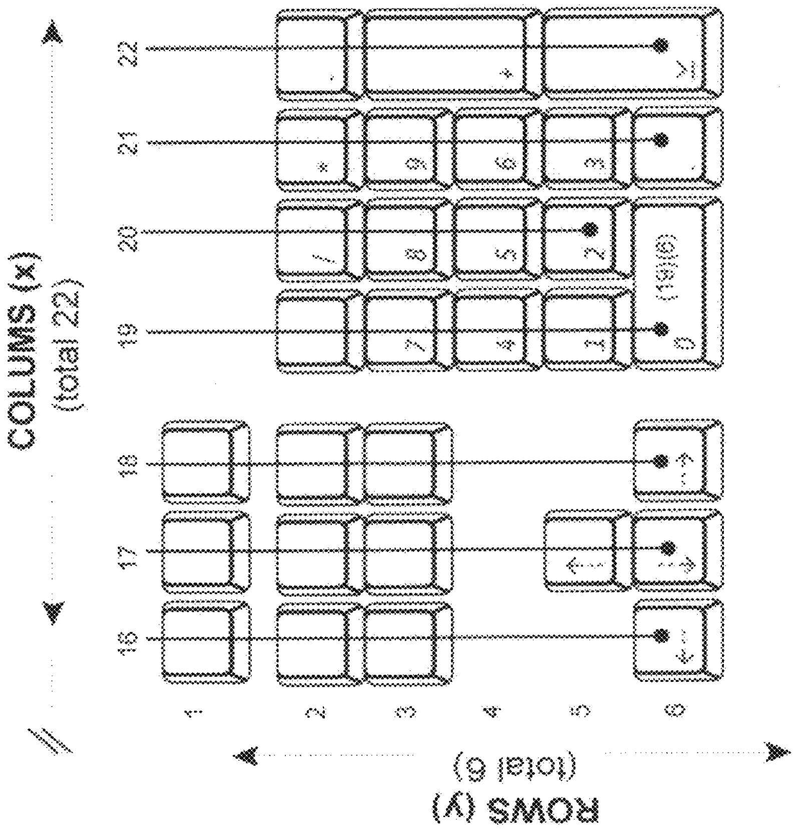
Figure 116C:
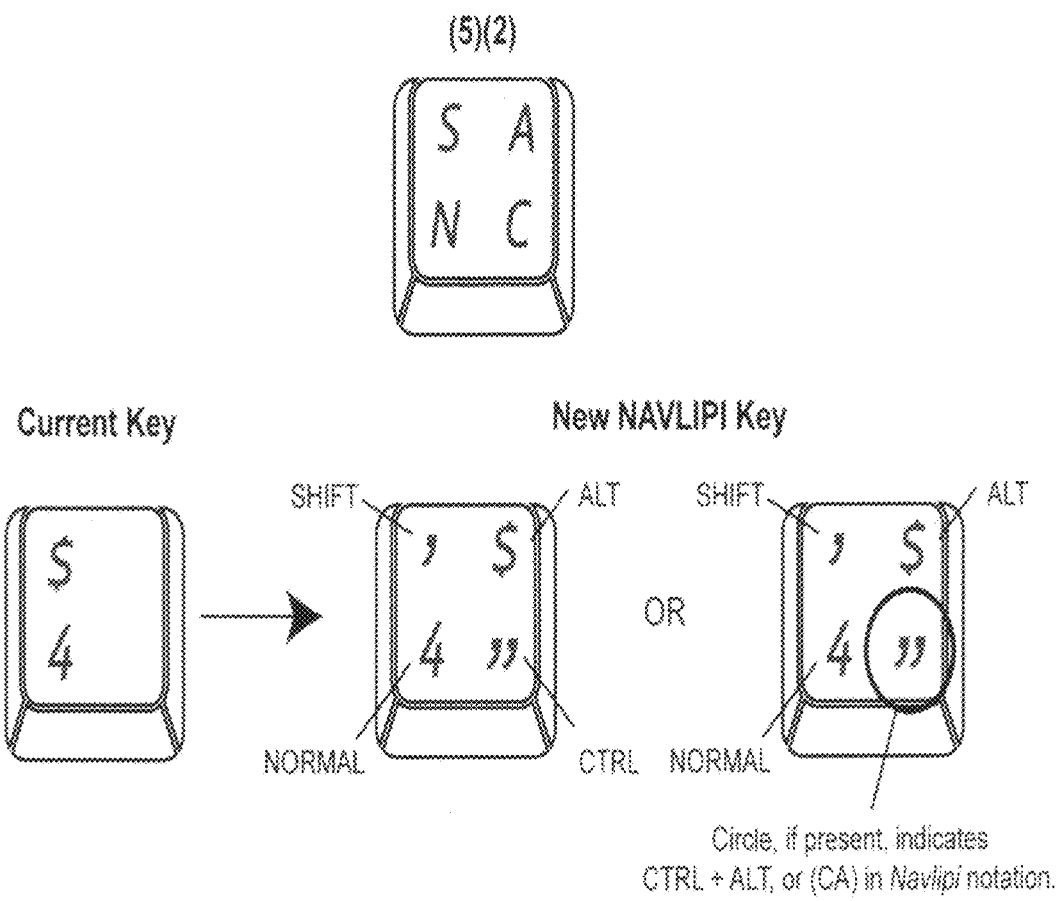
FIG. 116C shows a schematic illustration of the four (4) representations used by NAVLIPI for each key, for the Normal, Shift, Control and Alternate positions. In the illustration, the current QWERTY $-4 key is used as an example.
Figure 118:
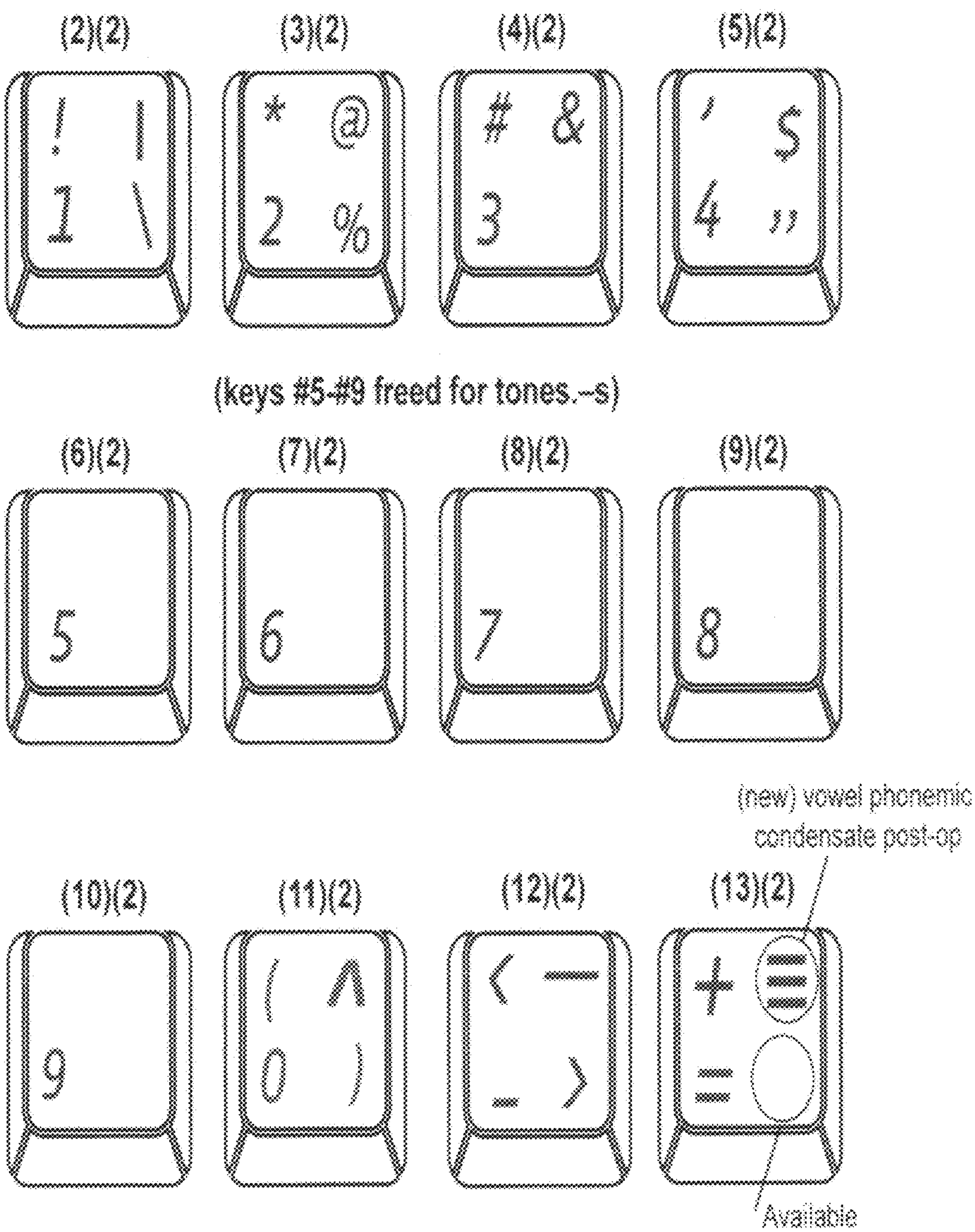
Figure 119:
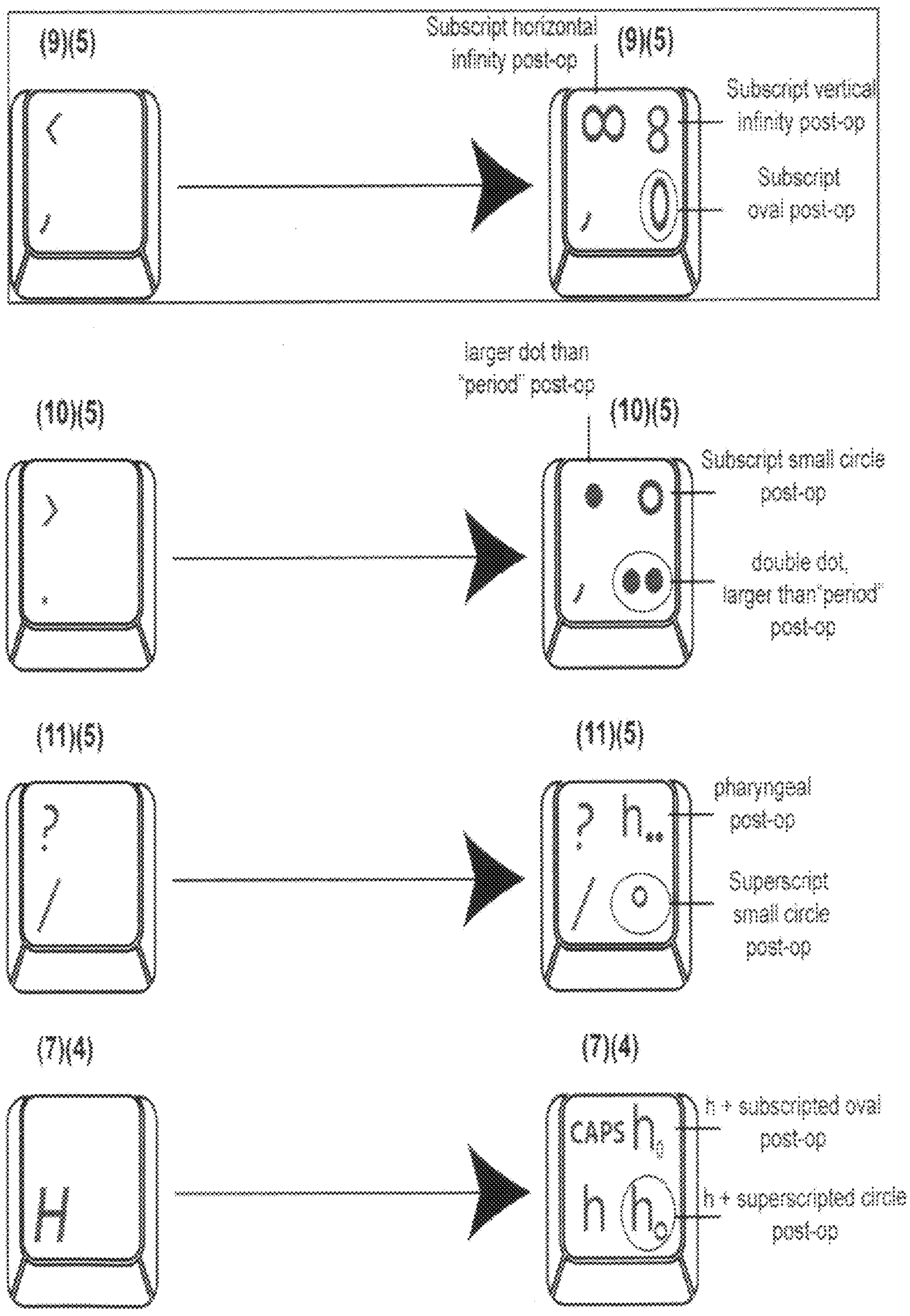

Also for ease of referral, the keyboard of the present invention will be represented as a 2-dimensional matrix, as seen in FIG. 116A-B, very similar to the 2-d matrix used for the Non-Vowel Tables cited earlier. The columns will represent the x-axis and the rows the y-axis. Such a numbering system will be used to identify individual keys. Software engineers will immediately recognize that reassignment of keyboard keys at will is not an easy or straightforward task. In particular, there are problems with re-assignment of [CTRL], [ALT] and other keys, especially with Unix-based systems and popular word processors. For example, the following keys are some examples of keys that may create problems (and by no means exhaustive): (1) [CTRL+C]: Used for copy functions in Windows as well as many word processors. More seriously and problematically, used for "Abort" functions in many older UNIX based systems. (2) [CTRL+A]: Select-all function. (3) [CTRL+P]: Print function. (4) [CTRL+S]: Save function. etc. NAVLIPI retains the original function of all these keys - - - e.g. [CTRL+C] still means "Copy". It instead uses multiple combinations of several special functions - - - e.g. [CTRL+ALT+C] - - - when it needs additional keys to represent glyphs, post-ops, etc.

Table 6 and FIGS. 116-134 show the keyboard layout as well as a graphical representation of the keyboard matrix notation of the present invention. Only the regular (non-"ergonomic") keyboard is shown for simplicity. From these tables, the changes from the conventional QWERTY keyboard are apparent.

TABLE 6: Inventory of leftover, unused (available) keys, referenced by *NAVLIPI* key notation.

- (5)(5)(CA) (CTRL+ALT+V).
- (4)(3)(A) (ALT + E).
- (6)(3)(A) (ALT + T) and (4)(4)(A) (ALT + D) *in the English/West-European language keyboard only.*
- (11)(5)(A) (ALT + " /? ") .
- (13)(2)(C) (CTRL + " =+ ") .
- (9)(2)(A) (ALT + 8) and (9)(2)(C) (CTRL + 8) .
- (10)(2)(A) (ALT + 9) and (10)(2)(C) (CTRL + 9) .
- (21)(3)(X), (21)(4)(X), (21)(5)(X) i.e. the 3, 6 and 9 number keys on the NUM LOCK section of the keyboard, in all positions (ALT, CTRL, SHIFT and normal)
- (20)(2)(X), (21)(2)(X), (22)(2)(X) i.e. the rightmost three keys ( /, *** and -** ) on the top row of NUM LOCK section of the keyboard, in all positions (ALT, CTRL, SHIFT and normal)
- All FUNCTION keys, (3 to 18)(1)(X) in generic *NAVLIPI* notation, except (7)(1)(X). A total of 15 keys. These may be used in word processors or other programs for other functions. However, if they are free, they could, technically, be used by *NAVLIPI*.

The present invention uses many post-ops, as described earlier, e.g. [$_o$] (subscripted little circle in print or little "e" in cursive, representing (aspirate+non-aspirate) phonemic condensate) and [$h_o$] ("h"+subscripted circle, for aspirate). In the keyboarding of the present invention, all these post-ops have their own keys. Furthermore, these keys are usually placed for high frequency usage, for instance on the current "period" ("full-stop") and "comma" keys. Nevertheless, due to the use of language-specific keyboards in the present invention, one finds that the need to use these separate keys for post-ops is actually minimal.

For example, instead of having to write the aspirated, unvoiced, bilabial stop of Hindi, [$ph_o$], as ([p]+[$h_o$]), i.e., two keystrokes, one simply uses one keystroke, [Alt+P] in the [Hindi/Spanish . . . ], language-specific keyboard to render this phone. Similarly, for the pharyngealized-[t] phone of Arabic, rather than using two keystrokes, ([t]+[..]), one simply uses the single keystroke [Alt+t]. And again, in English, when one types the "p" key, one gets [$p_o$] (aspirate+non-aspirate phonemic condensate) automatically, thus obviating the need to type [p]+[$_o$] separately. As a fourth example, in Mandarin, one need not use the [b]+[$_\infty$] keys to represent the common [$b_\infty$] phonemic condensate, since typing the "b" key directly yields this. The keyboard of the present invention may also contain rarely used central glyphs. One example is the unique Tamil retroflex central with a jaw-forward position in articulation, phonemically distinct from the same central in the jaw-normal position. In NAVLIPI, this is rendered as the glyph $r_o$, i.e. a script-r with a subscripted little circle. Since its use is expected to be only for Tamil and thus somewhat rare, rather than assigning a separate key for it, NAVLIPI will simply transcribe this as the serial combination of the two keystrokes, i.e. (5)(3)(CA), i.e. the glyph (r), followed by (10)(5)(A), i.e. the glyph ($_o$). Several phonemic condensates of central or central plus some other articulation, which are expected to be rarely used, are assigned by NAVLIPI to keys that are commensurate with their rare use and include:

(1) The alveolar (r+1) (i.e. central+lateral) phonemic condensate, transcribed as ғ in NAVLIPI, will use the key (19)(3)(N), i.e. the Numeric-7 key used with NUM LOCK off.

(2) The retroflex (r+1) (i.e., central+lateral) phonemic condensate, transcribed as ғ (script-r with single overstrike) in NAVLIPI, will use the key (20)(3)(N), i.e. the Numeric-8 key used with NUM LOCK off.

(3) The alveolar (r+1+n) (i.e. central+lateral+nasal) phonemic condensate, transcribed as ғ in NAVLIPI will be use the key (19)(4)(N), i.e. the Numeric-4 key used with NUM LOCK off.

(4) The retroflex (r+1+n) (i.e. central+lateral+nasal) phonemic condensate, transcribed as ғ (script-r with double overstrike) in NAVLIPI, will use the key (20)(4)(N), i.e. the Numeric-5 key used with NUM LOCK off.

(5) The alveolar (flap+trill+semivowel) central phonemic condensate, transcribed as $r^o$ in NAVLIPI, will use the key (20)(5)(N), i.e. the Numeric-2 key used with NUM LOCK off.

(6) The "generic R" phonemic condensate, transcribed as R in NAVLIPI, will use the key (19)(5)(N), i.e. the Numeric-1 key used with NUM LOCK off.

Keyboarding in the present invention is language-specific, for broad groups of languages. This serves a number of purposes. Firstly, it cuts down drastically on the number of glyphs, and hence keys, required. Thus, for instance, the many click phones will be rarely be used in any subset except the South-African, and it is needless to try to accommodate extra keys on the keyboard for them, when writing in English or German. Secondly, it groups together languages which have similar phonologies. And as a by-product, language-specificity also reduces the need to use separate keys for common post-ops, although these are still provided.

Some of these groups in the present invention are, by way of example only: (1) Hindi/-Spanish/-Indonesian. (2) English/French/German/Other-European-Languages. (3) Arabic. (4) Yoruba/Igbo. (5) Mandarin/Cantonese. (6) South-African (incorporating the click-phones).

As an illustration of how the language-specificity works, the following brief examples can be cited:

The p key in the Hindi/Spanish keyboard would print as p. However, in the English/-French/-German/-etc. keyboard, it would print as $p_o$, indicating that it is a phonemic condensate of the unaspirated and aspirated stops (i.e., [p]+[$ph_o$]).

In the Arabic keyboard, this same p key would print as b, indicating that it is now a phonemic condensate of the voiced and unvoiced stops, but with preferred articulation as [b].

In Mandarin, this [p] would print as $b_4$, once again indicating that it is now a phonemic condensate of the voiced and unvoiced stops, but now with preferred articulation as [b]. This key may not be used at all in Arabic, reflecting the true absence of the [p] phone in standard Arabic (but not in some Arabic dialects).

The [Alt+k] key in the Hindi/Spanish keyboard would print as the velar unvoiced aspirate stop, [$kh_o$]. However, in the Arabic keyboard, it would print as the uvular unvoiced stop, [k.], the Arabic "qaaf".

The [r] key would print in the Hindi/Spanish keyboard as r, indicating the alveolar flap/-tap/trill of Hindi and Spanish. However, in the English/-etc. keyboard, this same key would print as $r_0$, indicating the alveolar semivowel.

Other language specific examples are set forth in FIGS. 120-130, and 132A-C. In particular, in FIG. 120, NAVLIPI uses two (2) major language-specific variants of the central ("r") key, the Hindi/Spanish/Indonesian keyboard and the English/French/German/West European languages keyboard. For the Hindi/Spanish/Indonesian keyboard, the representation, (5)(3)(N) is the most common alveolar tap/flap/semivowel phonemic condensate; (5)(3)(A) is the alveolar semivowel; and finally, (5)(3)(CA) is the retroflex semivowel. The latter is used in American English, and also Tamil, Mandarin/Cantonese. It may be redundant in this, Hindi/Spanish/Indonesian keyboard, except for use in Sanskrit. For the English/French/German/West European languages keyboard, the representation, (5)(3)(N) is the alveolar semivowel only; (5)(3)(A) is the phonemic condensate (note that if one needs to use this in other keyboards, e.g. the Hindi/Spanish. keyboard, then one can simply render it by typing x and r in sequence; and finally, (5)(3)(CA) is the retroflex semivowel, used in American English, also Tamil.

Figure 123:
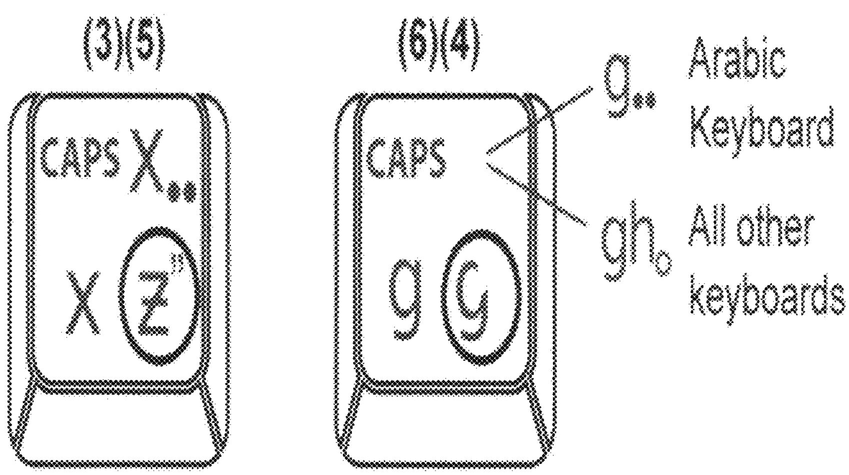
Figure 124:
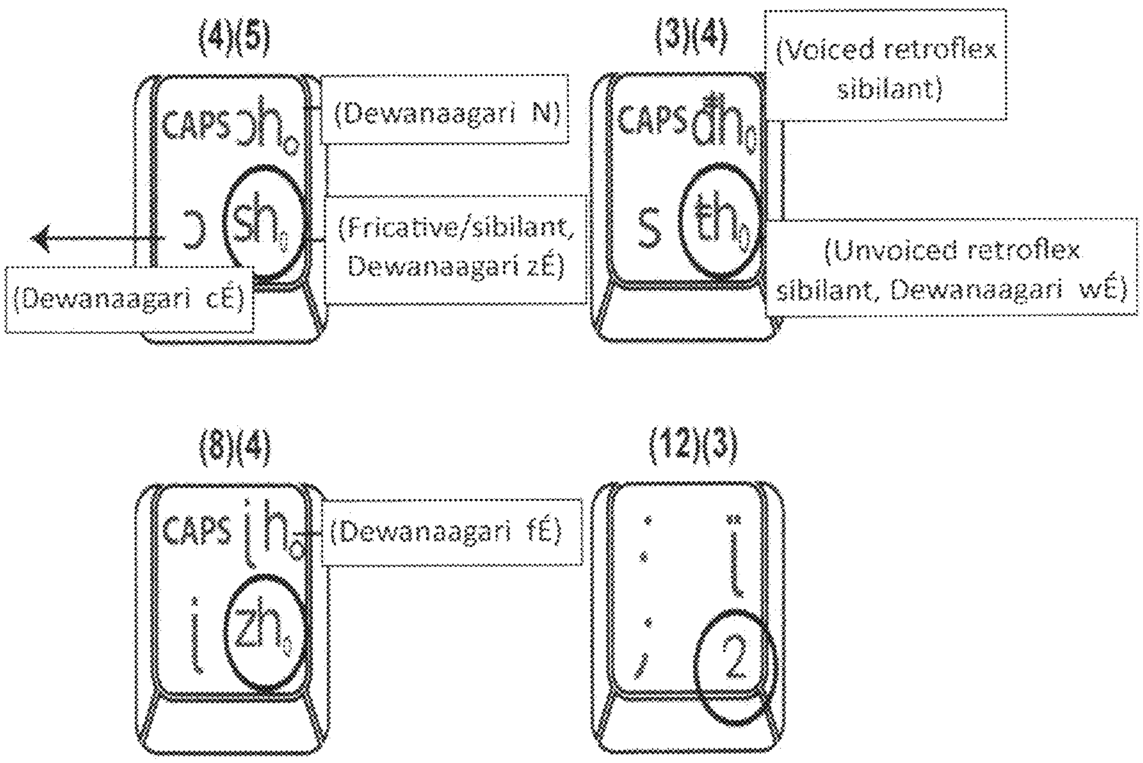
Figure 125E:
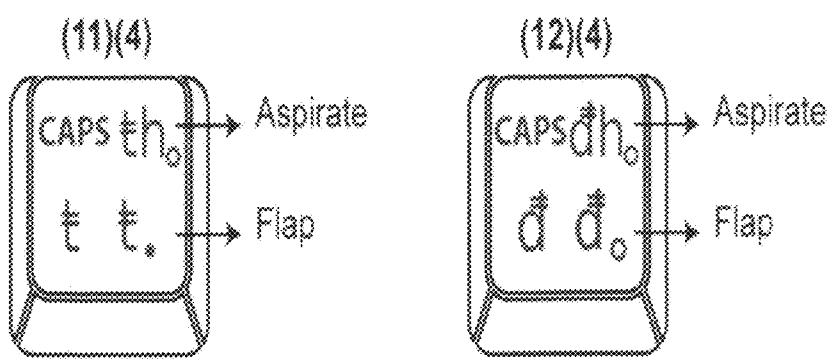
Figure 126:
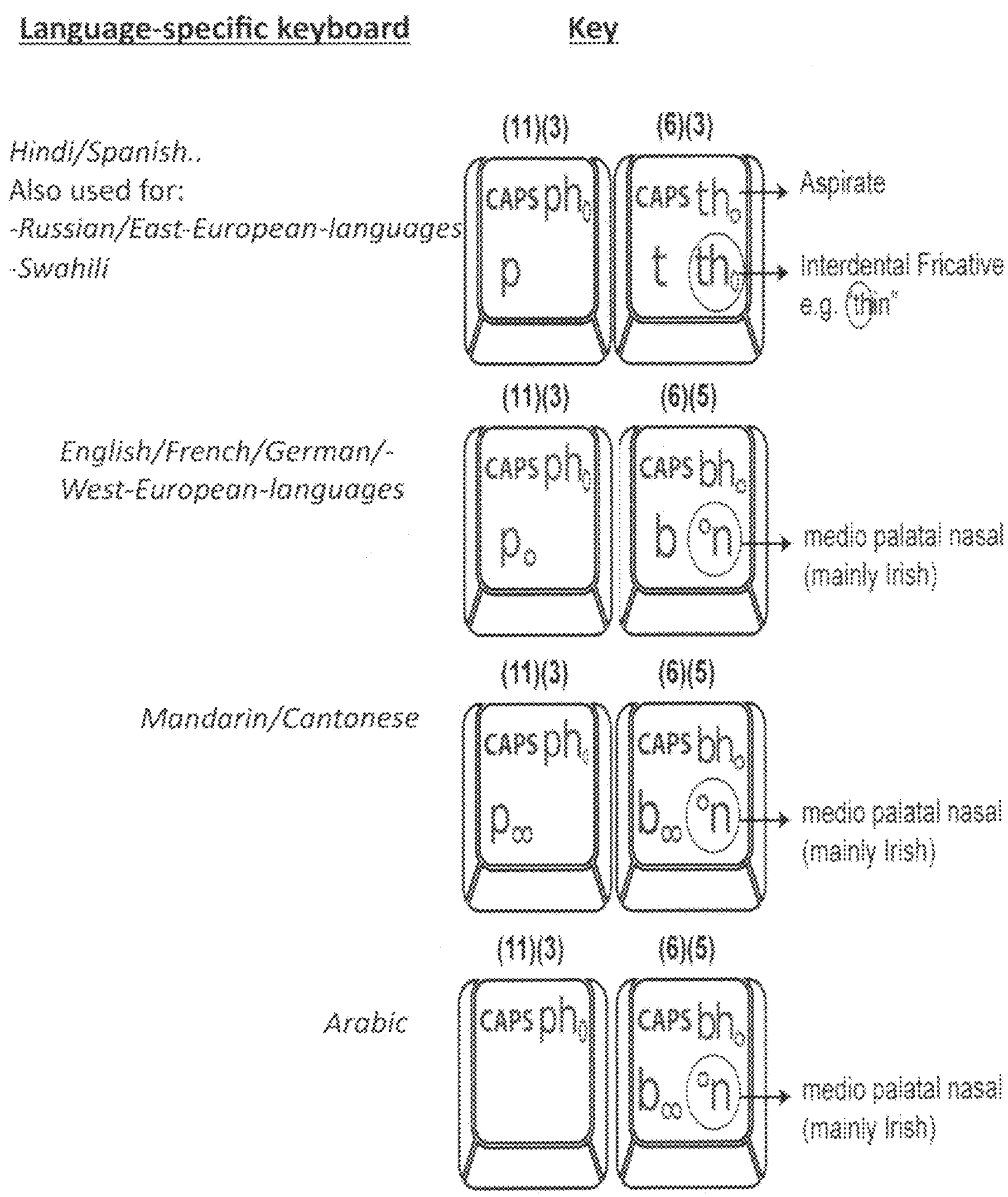
Figure 127:
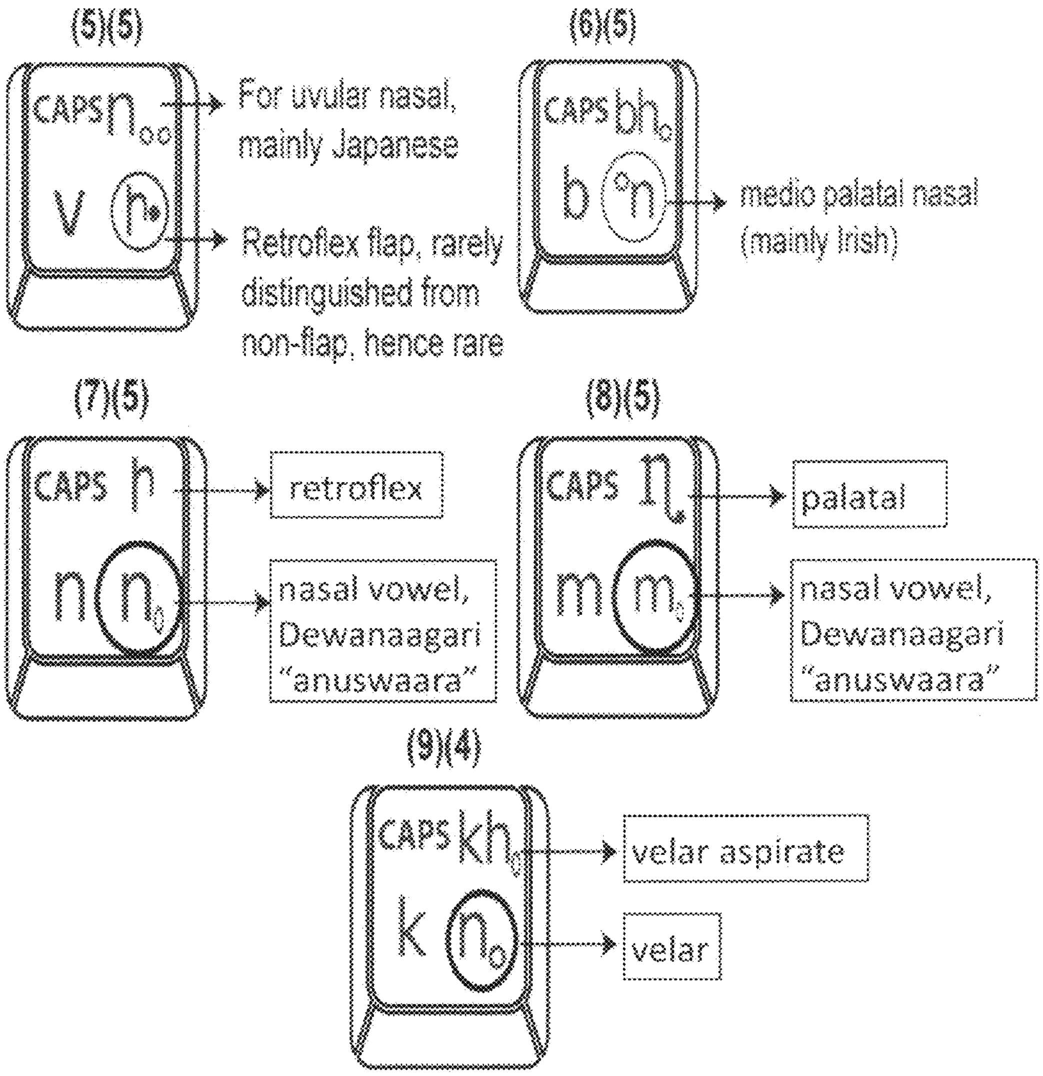
Figure 128:
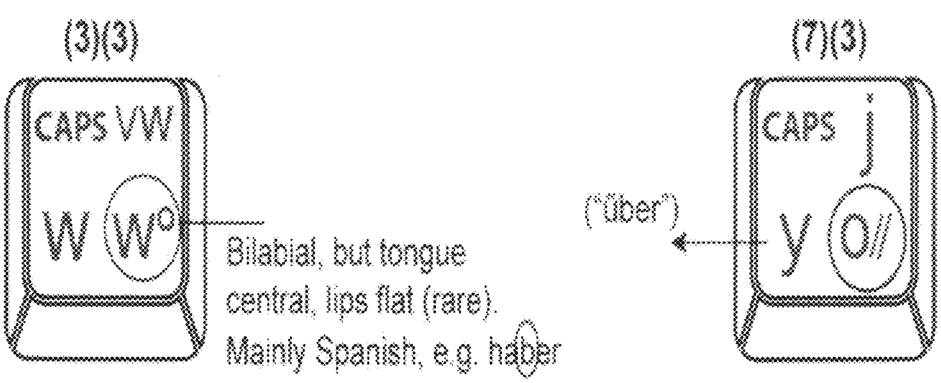
Figure 129:
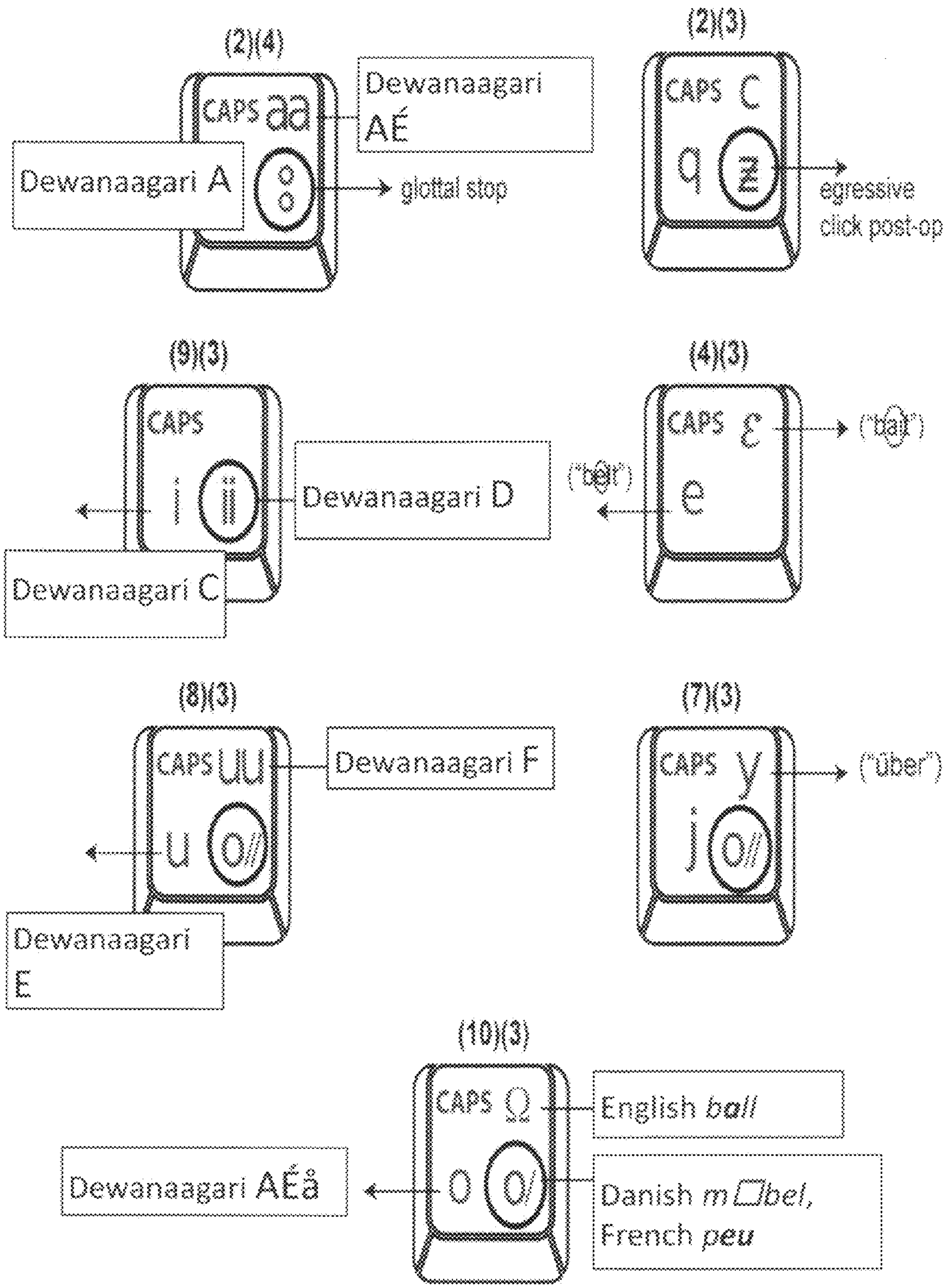
Figure 130:
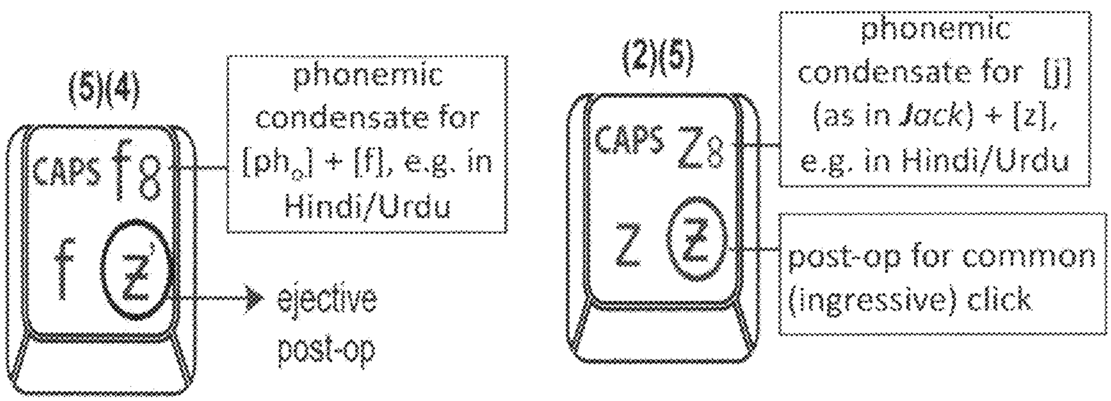
Figure 131:
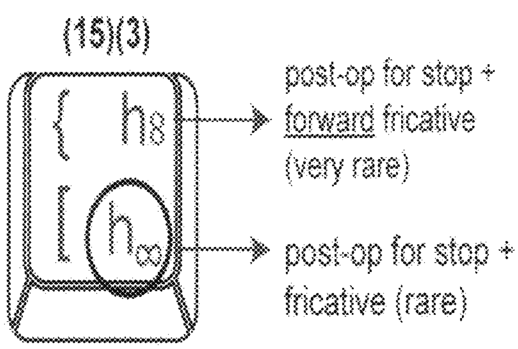
Figure 133:
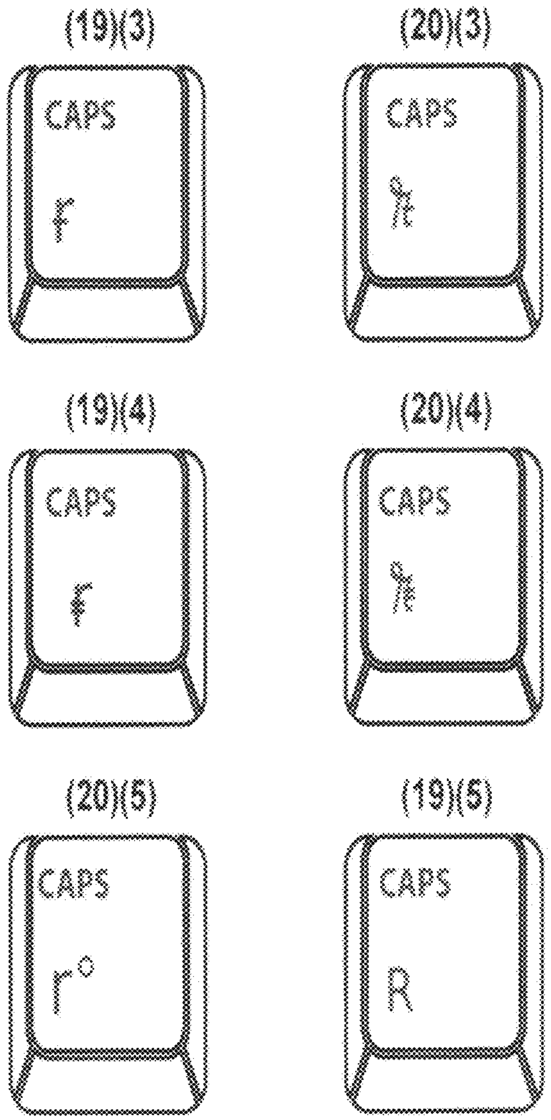
Figure 134A:
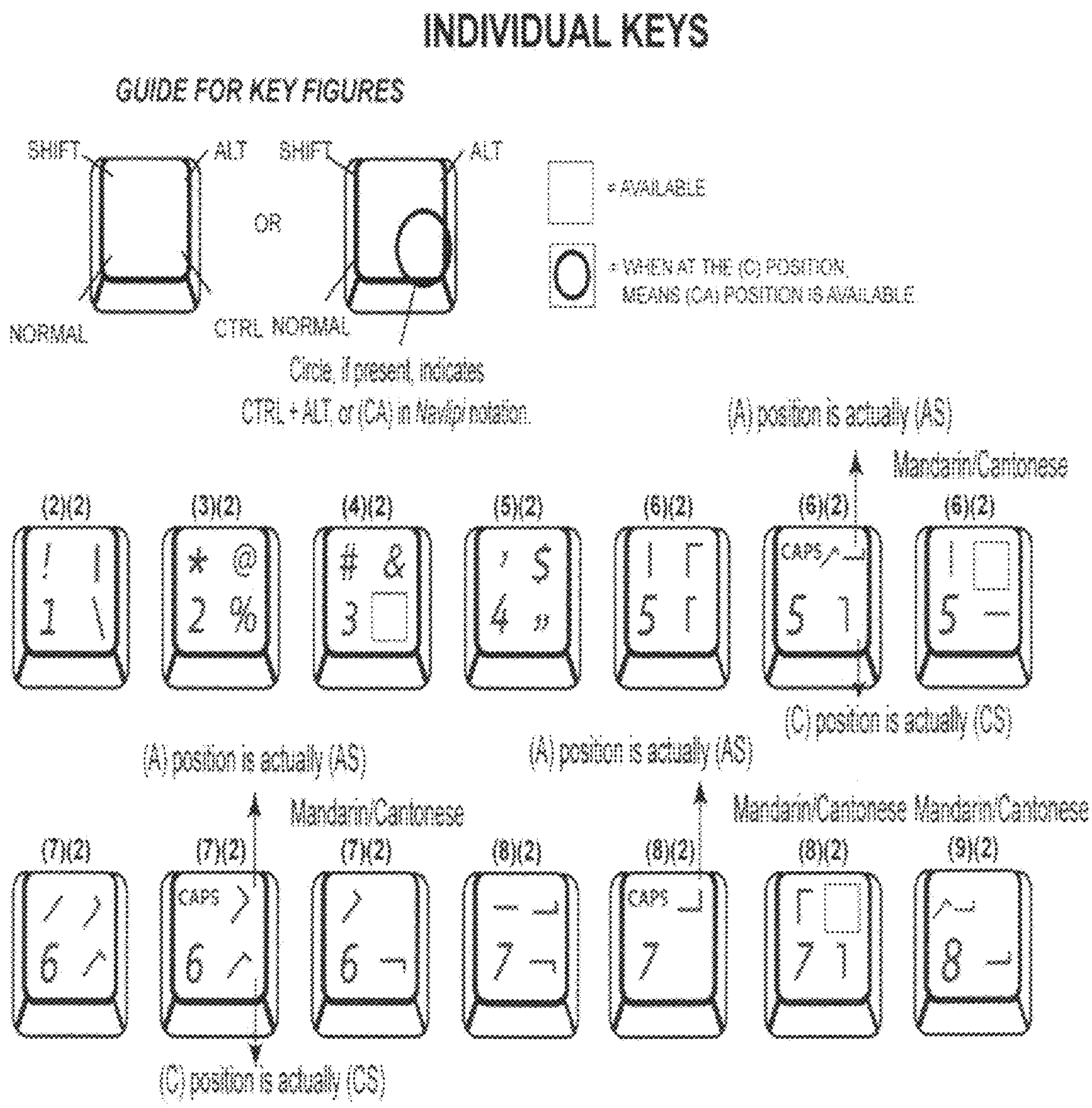
FIGS. 134A-F show individual keys.
Figure 134B:
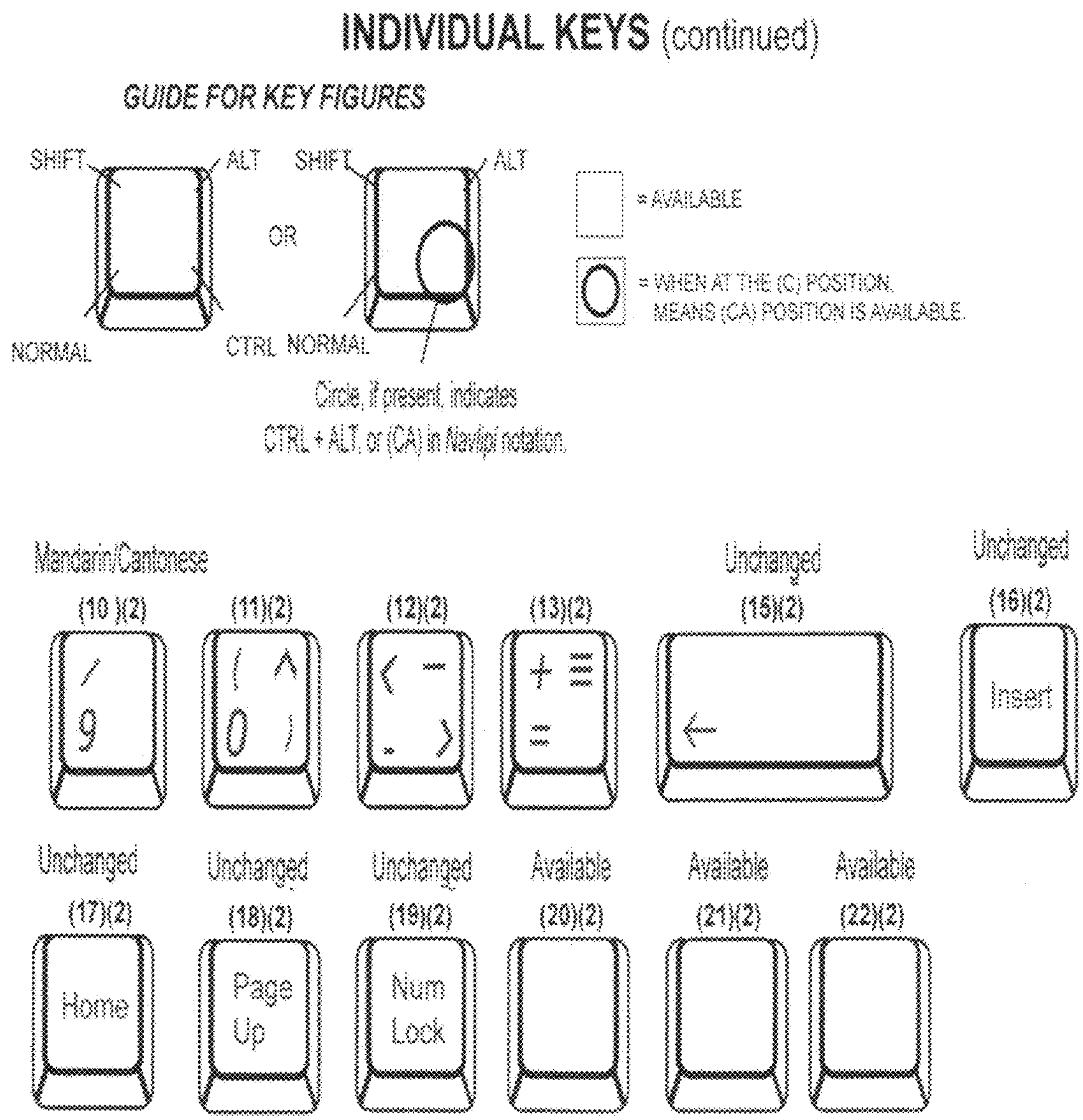
Figure 134C:
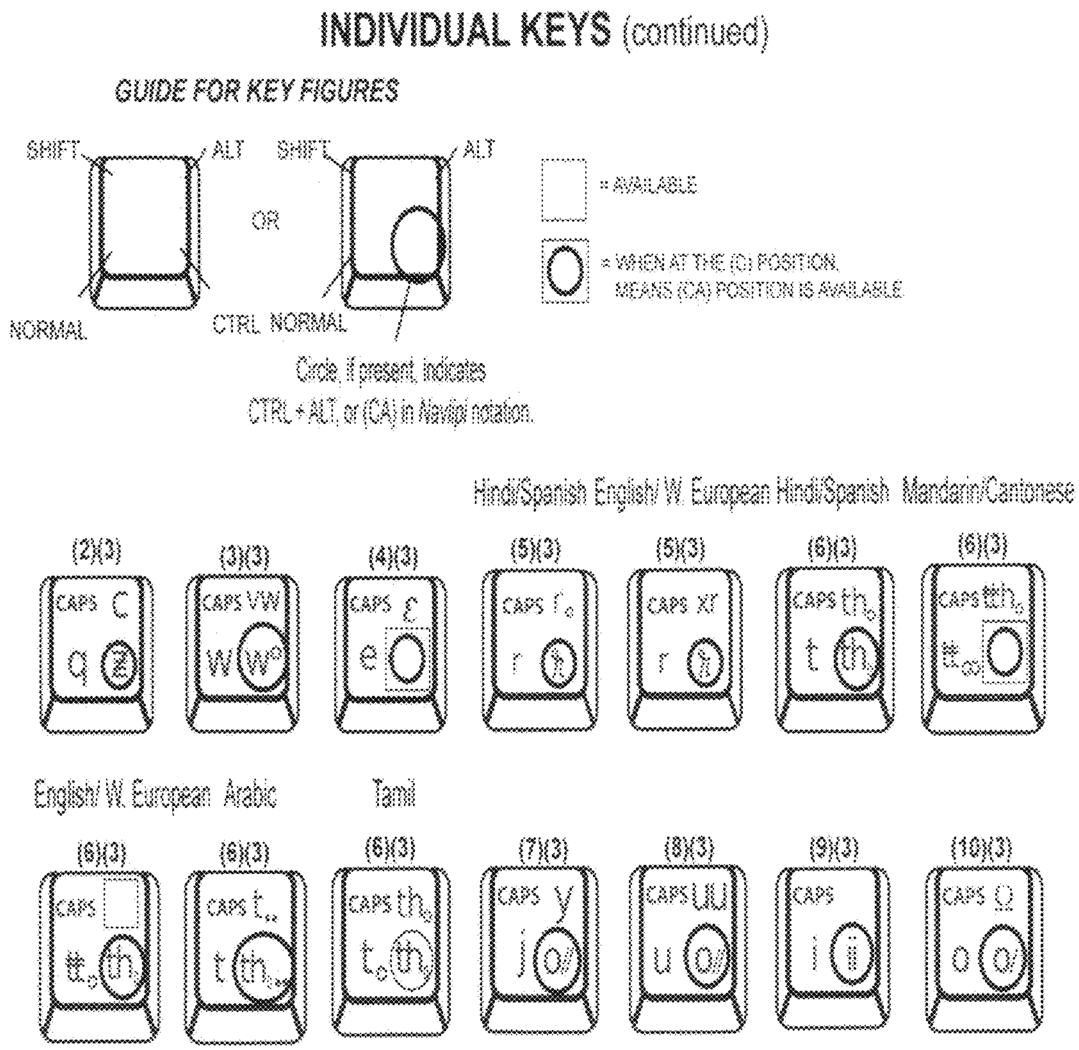
Figure 134D:
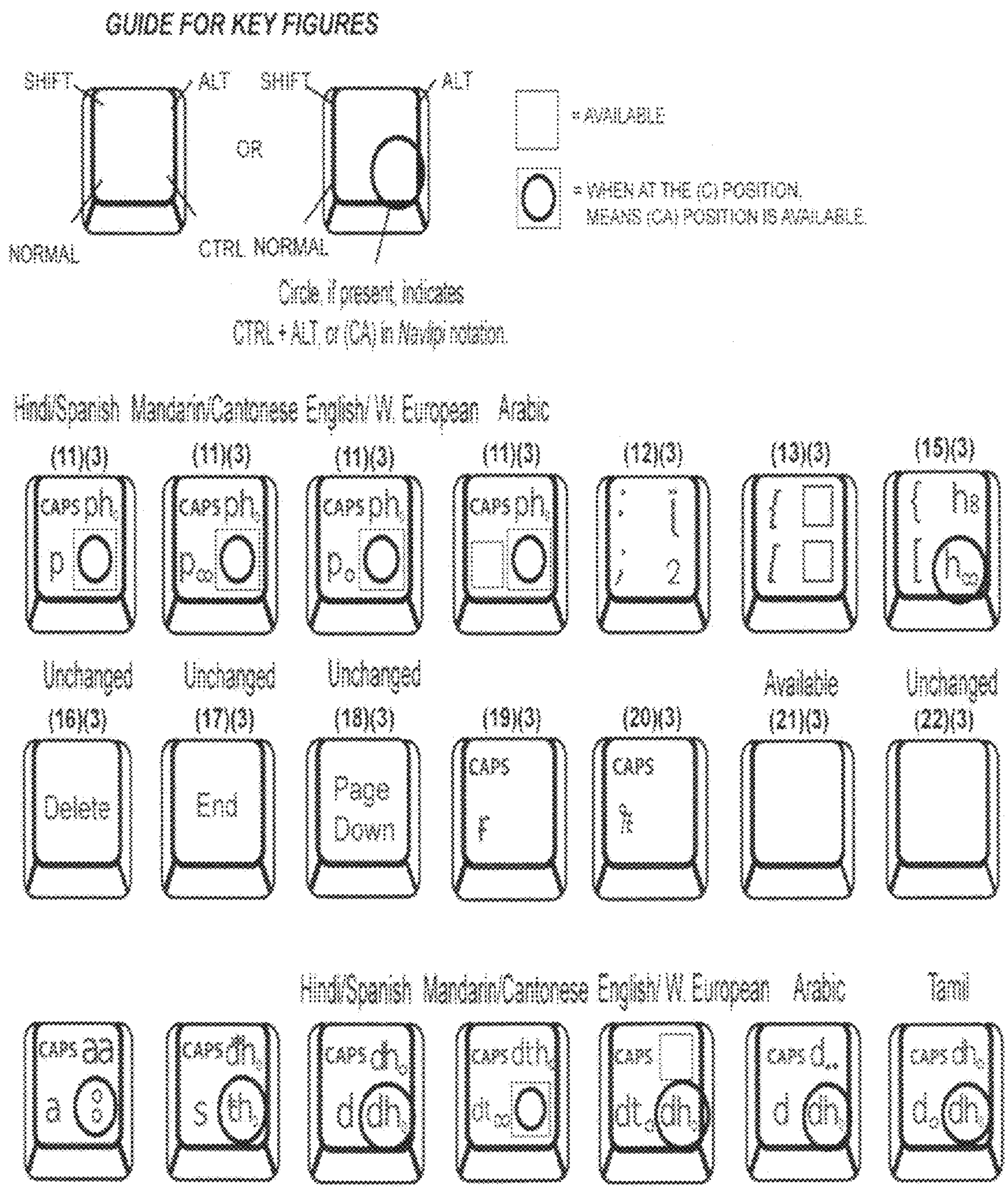
Figure 134E:
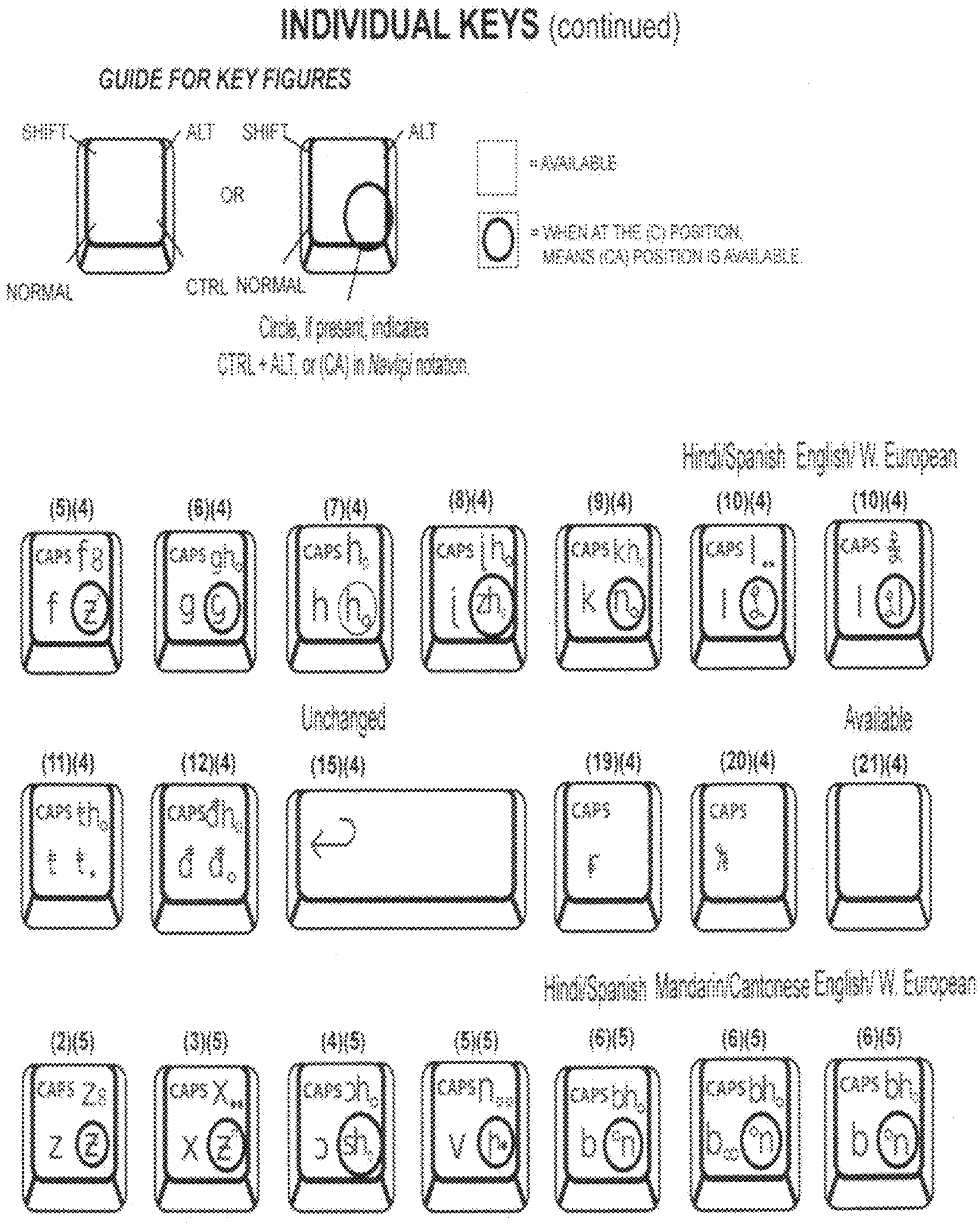
Figure 134F:
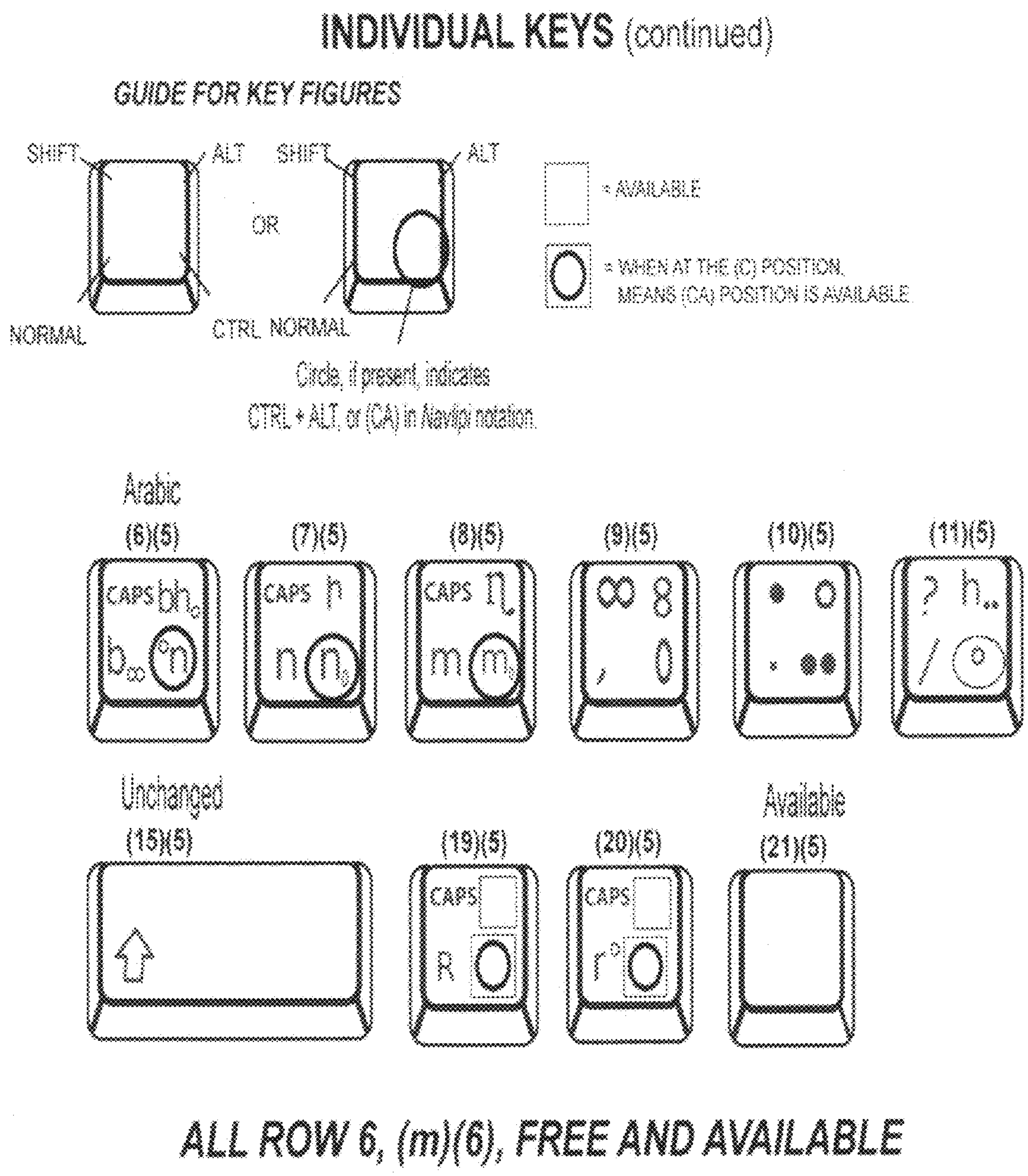

The velar keys in NAVLIPI are also language-specific. They are also the NAVLIPI keys with one of the largest language-specific diversities. The reason the velar keys have such large diversity is because, for many language groups, even very small phonemic distinctions in the velar articulation require the use of a separate key. The NAVLIPI language-specificities for the velar keys are: (1) The Hindi/Spanish/Indonesian languages group; (2) The Chinese languages group, including all major Chinese languages such as Mandarin, Cantonese and Fujienese. (3) The English/French/German/West-European languages group. (4) The Arabic group. This would include Hebrew and Amharic. (5) The Tamil group, including all five major Dravidian languages (Tamil, Telugu, Kannadaa, Malayaalam and Tulu). If the aspirated stops, [$kh_o$] and [$gh_o$] are accommodated for the Hindi/Spanish/Indonesian languages group, then a single velar key type can be used for all the languages in this group. The resultant keys are shown in FIGS. 121-122. The only difference between the Chinese languages group and the Hindi/Spanish/Indonesian languages group is that in place of (9)(4)(N), which is k in the Hindi/Spanish/Indonesian languages group, the phonemic condensate is used for unvoiced and voiced velar stop, ([k]+[g]), as applicable to the Chinese languages; these usually articulate this as [g], i.e. $g_4$. The (6)(4) key, i.e. the g key, would then not be used in the Chinese languages. For both the unvoiced and voiced keys in English/French/German/West-European languages group, the (A) position in the, i.e. (9)(4)(A) and (6)(4)(A), representing the aspirated stops $kh_o$ and $gh_o$, would not be used. For the unvoiced key, at the (N) position, i.e. (9)(4)(N), the k is replaced by $k_o$, indicating the (unaspirated+aspirated) phonemic condensate. For the voiced key, the (N) position, i.e. (6)(4)(N), retains the pure phone, g. Arabic group: The only difference between the Arabic group and the Hindi/Spanish/Indonesian languages group is that for (9)(4)(A), k . . . , is used for the uvular stop. Similarly, for (6)(4)(A), g. is used. For the velar unvoiced and voiced fricatives, the keys (3)(5) and (6)(4), respectively, are common to all language-specific keyboards in NAVLIPI are shown in FIG. 123.

EXAMPLES

Examples A

Various Widely-Used World Scripts Rendered in NAVLIPI

Example A.1

This example shows NAVLIPI transcription of Dewanaagari script (including variants thereof for Hindi/Urdu, Maraathi). Table 7 shows vowels; Table 8 shows non-vowels and Table 9 shows selected adaptations of Dewanaagara glyphs (Letters).

TABLE 7: VOWELS

***NAVLIPI* Transcription of Dewanaagri Script**
Including variants there of for Hindi/Urdu, Maraathi
(only small print glyphs are given for clarity)

VOWELS

| | FUNDAMENTAL (short and long) | | | DERIVATIVE | | | | |
|---|---|---|---|---|---|---|---|---|
| | Dewanaagari | Navlipi | | Dewanaagari | *Navlipi* In current Dewanaagari usage | | *Navlipi* In original (ancient) usage | |
| | | *Print* | *Cursive* | | *Print* | *Cursive* | *Print* | *Cursive* |
| VELAR | अ | V 2-2-3<br>a | a | | | | | |
| | आ | V 2-2-4<br>aa | aa | | | | | |
| PALATAL | इ | V 1(1)(1)<br>i | i | ए | V 1(1)(2)<br>ε | ε | ε | ε |
| | ई | V 1(1)(1)<br>ii | ii | ऐ** | V 2(2)(4) / V 1(1)(2)<br>aaε | aaε | V 1(1)(4)<br>c | c |
| BILABIAL | उ | V 3(3)(1)<br>u | u | ओ | V 3(3)(3)<br>o | o | | |
| | ऊ | V 3(3)(1)<br>uu | uu | औ** | V 2(2)(3) / V 3(3)(1)<br>aau | aau | V 3(3)(4)<br>Ω | Ω |
| RETROFLEX | ऋ | V 2(4)(2)<br>ħ | ħ | | | | | |
| | ॠ | V 2(4)(2)<br>ħħ | ħħ | | | | | |
| DENTAL | ऌ | V 2(9)(2)<br>l | l | | | | | |
| NASAL | | | | ं | $n_0$ | $n_0$ | – | – |
| GLOTTAL | | | | ः ## | h | h | NV 1-1<br>∘∘ | |
| | | | | ऍ | V 1(1)(4)<br>c | c | | |
| | | | | ऑ | V 3(3)(4)<br>Ω | Ω | | |

NB: V= from vowel matrix, NV= from non-vowel matrix

**Originally vowels, today articulated as diphthongs.

Originally the glottal stop, today articulated as a "voiceless aspiration".

TABLE 8: NON-VOWELS

LEGEND:

R=ROMAN EQUIVALENT
D=DEWANAAGARI
N=NAVLIPI
NV=NONVOWEL
V=VOWEL

Table 8A

| | PHONOCHROMATICITY | | | | | | | | | | | | | | |
|---|---|---|---|---|---|---|---|---|---|---|---|---|---|---|---|
| | UNASPIRATED UNVOICED | | | ASPIRATED VOICED | | | UNASPIRATED UNVOICED | | | ASPIRATED VOICED | | | NASAL | | |
| ARTITION | R | D | N | R | D | N | R | D | N | R | D | N | R | D | N |
| GLOTTAL | | | | | | | | | | | | | | | |
| VELAR | [KA] | क | NV 1-4 k | [KHA] | ख | NV 2-4 $kh_o$ | [GA] | ग | NV 3-4 g | [GHA] | घ | NV 4-4 $gh_o$ | [ˉNA] | ङ | NV 5-4 $n_o$ |
| PALATAL | [CA] | च | NV 1-7 ɔ | [CHA] | छ | NV 2-7 $ɔh_o$ | [JA] | ज | NV 3-7 ɩ | [JHA] | झ | NV 4-7 $ɩh_o$ | [ÑA] | ञ | NV 5-7 ɳ |
| RETRO-FLEX | [.TA] | ट | NV 1-5 ŧ | [.THA] | ठ | NV 2-5 $ŧh_o$ | [.DA] | ड | NV 3-5 đ | [.DHA] | ढ | NV 4-5 $đh_o$ | [.NA] | ण | NV 5-5 h |
| DENTAL | [TA] | त | NV 1-10 t | [THA] | थ | NV 2-10 $th_o$ | [DA] | द | NV 3-10 d | [DHA] | ध | NV 4-10 $dh_o$ | [NA] | न | NV 5-8 NV 5-10 n |
| BILABIAL | [PA] | प | NV 1-15 p | [PHA] | फ | NV 2-15 $ph_o$ | [BA] | ब | NV 3-15 b | [BHA] | भ | NV 4-15 $bh_o$ | [MA] | म | NV 5-15 m |

TABLE 8B

| | SEMIVOWELS | | | FRICATIVES | | | (CORRESPONDING VOWELS) | | |
|---|---|---|---|---|---|---|---|---|---|
| ARTITION | R | D | N | R | D | N | R | D | N |
| GLOTTAL | | | | [HA] | ह | NV 6-1 h | [A] | अ | V 2(2)(3) a |
| VELAR | | | | | | | | | |
| PALATAL | [YA] | य | NV 28-7 j | [SHA] | श | NV 6-7 $sh_0$ | [I] | इ | V 1(1)(1) i |
| RETROFLEX | [RA] | र | PCON-8, NV 8-8 r | [RETRO-FLEX-SHA] | ष | NV 6-5 $th_0$ | [R] | ऋ | V 2(4)(2) ɽ |
| DENTAL | [LA] | ल | NV 31-8 l | [SA] | स | NV 6-9 s | [L] | ऌ | NV 31-8 l |
| BILABIAL | [WA] | व | NV 28-15 W | | | | [U] | उ | V 3(3)(1) u |

TABLE 9: ADAPTATIONS OF SIX DEWANAAGARI GLYPHS (LETTERS)

Selected Adaptations of Dewanaagari Glyphs (Letters).
(Only six are given for simplicity).

| Phone (Roman equivalent) | Adapted Dewanaagari rendition in Hindi, Maraathi, etc. | Parent Dewanaagari [Roman equivalents in brackets] | Navlipi |
|---|---|---|---|
| [f] | फ़ | फ [ph] | NV 6-13<br>f |
| [z] | ज़ | ज [j] | NV 7-9<br>z |
| [k.]<br>(uvular stop) | क़ | क [k] | NV 1-3<br>k.. |
| [x]<br>(velar unvoiced fricative) | ख़ | ख | NV 2-3<br>k..h$_o$ |
| [g.]<br>(uvular voiced stop) | ग़ | ग | NV 3-3<br>g.. |
| [d..]<br>(retroflex voiced flap) | ड़ | ड | NV 8-5<br>đ. |

NB: NV= from non-vowel matrix

Example A.2

This example shows the Cyrillic script (alphabet) rendered in NAVLIPI and is shown in Table 10 (10A and 10B).

TABLE 10A

Cyrillic/Navlipi

| CYRILLIC | ENGLISH EQUIVALENTS | NAVLIPI |
|---|---|---|
| а | *a* as in car | V 2(2)(4) aa |
| б | *b* as in *b*in | NV 3-15 b |
| в | *v* as in *v*an | NV 7-13 v |
| ґ | *g* as in *g*un | NV 3-4 g |
| д | *d* as in *d*in | NV 3-8 dt |
| е | *e* as in *ye*t | NV 28-7/V1(1)(3) je |
| ё | *aw* as in *yaw*n | NV 28-7/V3(3)(4) jΩ |
| ж | *z* as in azure | NV 7-7 $zh_0$ |
| з | *z* as in *z*inc | NV 7-9 z |
| и | *ea* as in b*ea*t | V 1(1)(1) ii |
| й | *y* as in *y*es | NV 28-7 j |
| к | *c* as in *c*at | NV 1-4 k |
| л | *ll* as in pu*ll* | NV 31-7 l |
| м | *m* as in *m*an | NV 5-15 m |
| н | *n* as in *n*et | NV 5-8/5-10 n |
| о | *o* as in st*o*ry | V 3(3)(3) o |
| п | *p* as in *p*in | NV 1-15 p |

NB: V= from vowel matrix, NV= from non-vowel matrix

TABLE 10B
Cyrillic/Navlipi

| CYRILLIC | ENGLISH EQUIVALENTS | NAVLIPI |
|---|---|---|
| р | Scottish trilled r | NV 12-8 rr |
| с | *s* as in *s*ink | NV 6-9 s |
| т | *t* as in *t*in | NV 1-8 tt |
| у | *oo* as in m*oo*ring | V 3(3)(1) uu |
| ф | *f* as in *f*an | NV 6-13 f |
| х | *ch* as in German *ach* or Scottish *loch* | NV 6-4 x |
| ц | *ts* as in ba*ts* | NV1-10/6-9 ts |
| ч | *ch* as in *ch*ins | NV 1-7 ɔ |
| ш | *sh* as in har*sh* | NV 6-7 $sh_0$ |
| щ | *shch* as in fre*sh ch*eese | NV 6-7/1-7 $sh_0$ɔ |
| ъ | *i* as in b*i*t | V 1(1)(1) i |
| ы | | |
| ь | | |
| э | e as in bet | V 1(1)(3) e |
| ю | *ou* as in y*ou* | NV 28-7/V 3(3)(1) ju |
| я | e as in bet | NV 28-7/V 2(2)(4) jaa |

NB: V= from vowel matrix, NV= from non-vowel matrix

Example A3

This example shows the Arabic script (alphabet) rendered in NAVLIPI and is shown in Table 11 (11A and 11B).

TABLE 11A

Arabic (Egyptian (Al Azheu) Pronunciations)-Navlipi

| | | |
|---|---|---|
| alif | ا | V 2(2)(3)<br>a |
| baá' | ب | NV 3-15<br>b |
| taa' | ت | NV 1-10/2-10<br>t,th₀ |
| ṯaa' | ث | NV 6-12<br>th₀ |
| gim, jiim | ج | NV 3-7/7-7<br>j,zh₀ |
| haa' | ح | NV 6-2<br>h.. |
| ẖaa' | خ | NV 6-4<br>x,xx |
| daal | د | NV 3-10<br>d |
| ḏaal | ذ | NV 7-12<br>dh₀ |
| raa' | ر | PCON-8/NV 8-8<br>r,rr |
| zaaii | ز | NV 7-9<br>z |
| siin | س | NV 6-9<br>s |
| shiin | ش | NV 6-7<br>sh₀ |
| saad | ص | NV 6-9/PO-11<br>s.. |
| daad | ض | NV 3-5/ PO-11<br>d.. |

NB: V= from vowel matrix, NV= from non-vowel matrix

TABLE 11B

Arabic (Egyptian (Al Azheu) Pronunciations)-Navlipi

| NAME IN ROMAN SCRIPT | GLYPH | NAVLIPI |
|---|---|---|
| taa | ط | NV 1-5/PO-11<br>t.. |
| ẓaa | ظ | NV 7-9/PO-11<br>z.. |
| ‘ayn | ع | NV 1-1<br>8 |
| gayn | غ | NV 7-4<br>g |
| faa’ | ف | NV 6-13<br>f |
| qaaf | ق | NV 1-3<br>k.. |
| kaaf | ك | NV 1-4/2-4<br>k,kh$_o$ |
| laam | ل | NV 31-8<br>l |
| miim | م | NV 5-15<br>m |
| nuun | ن | NV 5-8/5-10<br>n |
| haa’ | ه, ه | NV 6-1<br>h |
| waaw | و | NV 28-15<br>w |
| yaa’ | ي | NV 28-7<br>j |

NB: V= from vowel matrix, NV= from non-vowel matrix

Example A.4

This example shows the Tamil script (alphabet) rendered in NAVLIPI. Vowels are shown in Table 12; non-vowels are shown in Table 13.

TABLE 12

Tamil/Navlipi VOWELS

| GLYPH | NAVLIPI |
|---|---|
| அ | V 2(3)(2) a |
| ஆ | V 2(2)(4) aa |
| இ | V 1(1)(1) i |
| ஈ | V 1(1)(1) ii |
| உ | V 3(3)(1) u |
| ஊ | V 3(3)(1) uu |
| எ | V 1(1)(3), NV 28-7/ V 1(1)(3) e, je |
| ஏ | V 1(1)(2) ɛ |
| ஐ | V 2(2)(4)/1(1)(2) aaɛ |
| ஒ | V 3(3)(3) o |
| ஓ | V 3(3)(3) oo |
| ஔ | V 2(2)(4)/3(3)(1) aau |

NB: V= from vowel matrix
NV= from non-vowel matrix

TABLE 13

Tamil/Navlipi Non-Vowels

| GLYPH | NAVLIPI |
|---|---|
| க் | NV1-4<br>k |
| ங் | NV5-4<br>$n_o$ |
| ச் | NV1-7<br>ɔ |
| ஞ் | NV5-7<br>ɳ |
| ட் | NV1-5<br>ŧ |
| ண் | NV5-5<br>ɦ |
| த் | NV1-10<br>t |
| ந் | NV5-8/5-10<br>n |
| ப் | NV1-15<br>p |
| ம் | NV5-15<br>m |
| ய் | NV28-7<br>j |
| ர் | PCON-8/NV8-8<br>r |
| ல் | NV31-8<br>l |
| வ் | NV28-15<br>w |
| ழ் | V2(4)(-1)<br>$ɧ_o$ |
| ள் | V2(5)(2)<br>ɭ |
| ற் | NV12-8<br>rr |
| ன் | NV5-8/5-10<br>n |

| GLYPH | NAVLIPI |
|---|---|
| ஜ் | NV3-7<br>j |
| ஷ் | NV6-7<br>$sh_0$ |
| ஸ் | NV6-9<br>s |
| ஹ் | NV6-1<br>h |
| க்ஷ் | NV1-4/6-7<br>$ksh_0$ |
| க | NV1-4/V2(2)(3)<br>ka |
| கா | NV1-4/V2(2)(4)<br>kaa |
| கி | NV1-4/V1(1)(1)<br>ki |
| கீ | NV1-4/V1(1)(1)<br>kii |
| கு | NV1-4/V3(3)(1)<br>ku |
| கூ | NV1-4/V3(3)(1)<br>kuu |
| கெ | NV1-4/V1(1)(3)<br>ke |
| கே | NV1-4/V1(1)(2)<br>kε |
| கை | NV1-4/V2(2)(3)/V1(1)(3)<br>kaae |
| கொ | NV1-4/V3(3)(3)<br>ko |
| கோ | NV1-4/V3(3)(3)<br>koo |
| கௌ | NV1-4/V2(2)(3)/V3(3)(1)<br>kaau |

NB: V= from vowel matrix, NV= from non-vowel matrix

Examples B

In the examples described herein, transcription of various languages in NAVLIPI are shown. The first five languages are listed in decreasing number of world speakers.

Example B.1

Figure 135A:
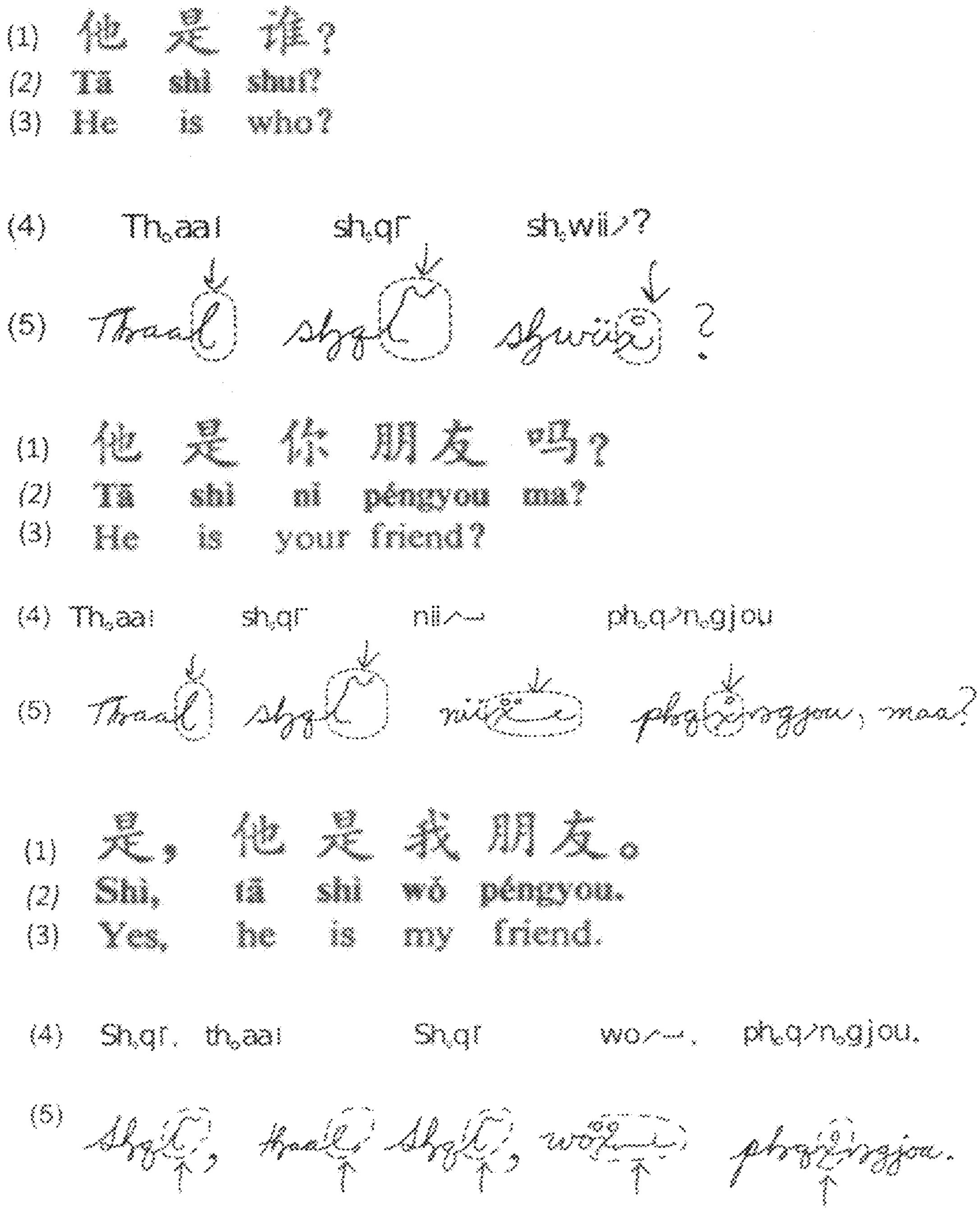
FIG. 135A-B shows the transcription of a Mandarin passage into NAVLIPI. Lines give.
Figure 135B:
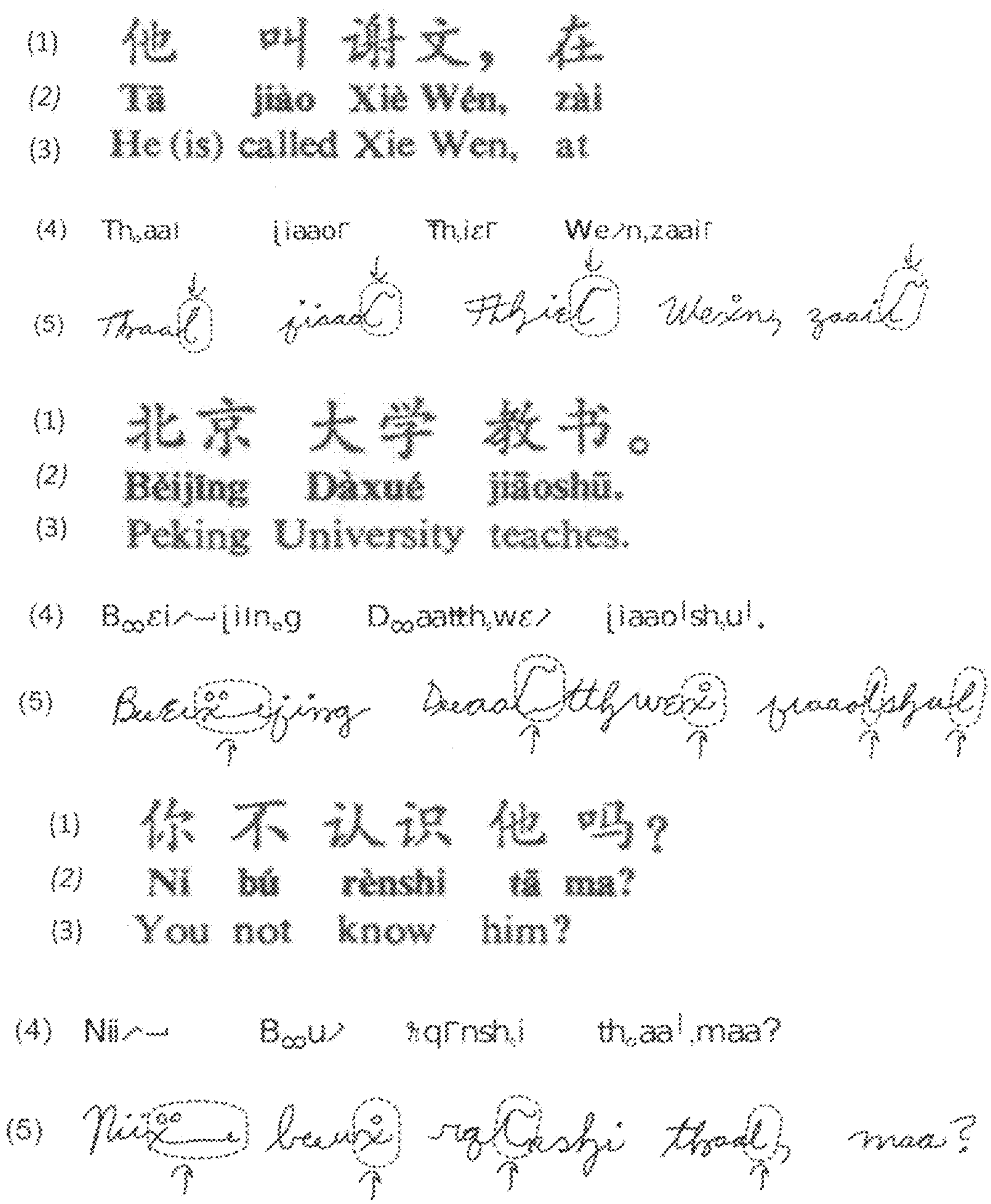

This example provides a Mandarin transcription passage and is depicted in FIG. 135A-B. The English translation is as follows:

Who is he? Is he your friend? Yes, he is my friend. His name is Xie Wen. He teaches at Beijing University. Don't you know him? I have heard of him. He is from Beijing, isn't he?

Example B.2

This example provides a transcription of a Hindi/Urdu passage into NAVLIPI and is provided in FIG. 136A-C. The English translation of the passage is as follows:

One beautiful day, a man and a woman (couple, husband-wife) went out for a walk with their two beautiful children. The sun was shining, filling the day with light. The kids were weaving circles around their parents. The whole family sat down under the shade of a big banyaan tree. In their pleasure, the parents went to sleep. Who knows what dreams they had? The kids continued playing.

Example B3

This example provides a transcription of an English passage into NAVLIPI depicted in FIG. 137A-C.

Example B.4

This example provides a transcription of a Spanish passage into NAVLIPI and is depicted in FIG. 138A-B. The English translation of this passage is as follows:

Another earthquake sufficiently strong to generate a small tsunami with a height of two meters occurred last week below Indonesia. The quake was 6.9 on the Richter scale. The inhabitants of the costal areas were told to move temporarily to higher locations.

Example B.5

This example provides a transcription of an Arabic passage (Syrian pronunciation) into NAVLIPI. The original Arabic is given first (FIG. 139A). Next, in order are the rough Roman transcription, the NAVLIPI PRINT transcription and the NAVLIPI CURSIVE transcription (FIGS. 139B-E). (In the latter two, the alternative transcription for nasalizations, where applicable, is given in square brackets.). The approximate English of the passage is shown below:

A man and a woman go out for a walk with their two beautiful children, a girl and a boy, whom they love very much. It is a sunny day. They sit down on the grass below a shady tree. The children play nearby at the bank of a stream. The boy yells. He is hurt. His sister runs to their parents to tell them. She is worried. The parents decide it is time to go home. They gather their belongings, get the children, and head home.

Example B.6

This example provides a transcription of a French passage into NAVLIPI and is depicted in FIG. 140A-B. The English translation of passage is set forth below:

A man and a woman go out for a walk, with their two beautiful children. The sun shines, filling the day with its brilliance. In their play, the children make circles around their parents. The family stops under a big tree giving lots of shade. In the ambience, sleep engulfs the parents. Who knows what sorts of dreams they have?

Example B.7

This example provides a transcription of a German passage into NAVLIPI and is depicted in FIG. 141A-C. This passage is a paragraph excerpted from Arthur Schopenhauer's Parerga and Paralipomena, Kleine philosophische Schriften, published in 1859. For the "scharfe s", B, the modern pronunciation, which is essentially a geminated "s", is given, rather than the original pronunciation of the $18^{th}$ century, which was likely a retroflex sibilant.

Example B.8

This example provides a transcription of a Maraathi (Marathi) passage into NAVLIPI and is depicted in FIG. 142A-C. The English translation of the passage is set forth below:

One quiet day, at a gathering in metropolitan Mumbai, everyone was waiting for that moment, when the foreign minister was going to make an announcement. Everyone's expectation was heightened about whom the foreign minister would select as his deputy minister. The tenseness was high. Finally, the foreign minister surprisingly chose Baabaasaaheb Raanade.

Example B.9

This example provides a transcription of a Hungarian passage into NAVLIPI and is depicted in FIG. 143A-D. The passage is set forth below in English:

A man and a woman go out for a walk with their two beautiful children, a girl and a boy, whom they love very much. It is a sunny day. They sit down on the grass below a shady tree. The children play nearby at the bank of a stream. The boy yells. He is hurt. His sister runs to their parents to tell them. She is worried. The parents decide it is time to go home. They gather their belongings, get the children, and head home.

Table 12 sets forth NAVLIPI equivalents of select Hungarian-Roman transcriptions found in this passage:

TABLE 12: HUNGARIAN ROMAN TRANSCRIPTONS

| Hungarian | *NAVLIPI*, PRINT | *NAVLIPI*, CURSIVE |
| --- | --- | --- |
| a | aa | aa |
| à | aae, c (when initial) | ee, C (when initial) |
| è | je | je |
| ì | ji | jï |
| ö | o/ | ø |
| ő | o/o/, ju (rarely) | øø, ju (rarely) |
| | oo o/ | oo, ø |
| ò | y | y |
| ü | yy | yy |
| ű | ju | ju |
| ù | 2 | 2 |
| cs | 2h$_0$ | 2h |
| css | ī | ï |
| gy | sh$_0$ | sh |
| s | s,sz (s + z, occasionally) | s, sz (occasionally) |
| sz | | |

Example B.10

This example provides a partial transcription of a Vietnamese passage into NAVLIPI for the purposes of illustrating NAVLIPI tones. Partial transcription is set forth in Table 13. Original Vietnamese is shown in FIG. 144A; NAVLIPI print is shown in FIG. 144B and NAVLIPI script is shown in FIG. 144C.

Table 13. VIETNAMESE,
*(Partial Transcription, Used for Illustrating NAVLIPI Tones Only)*
Tones Used in Vietnamese Transcriptions
(Six, per Northern, standard Vietnamese)

| Vietnamese tone *(Illustrated with a)* | *NAVLIPI* (post-op), PRINT | *NAVLIPI* (post-op), CURSIVE |
| --- | --- | --- |
| 1) ạ (*dot below*) → short, falling, Mid-to-low. |  |  |
| 2) Á (*acute accent*) → rising, Mid-to-high. |  |  |
| 3) À, â (*grave or circumflex accent*) → Falling, low-to-lower |  |  |
| 4) Ã (*tilde*) → nasal, falling, high-to-mid, Plus rising, mid-to-high |  | 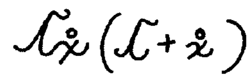 |
| 5) A' (*hook or quotation mark*), falling, Mid-to-low, rising, Low-to-mid |  | 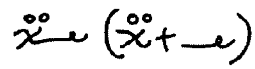 |
| 6) A (*no diacritic*) or ā (*bar above*) → Mid, level, elongated |  |  |

*Notes on the transcription:*

- Vietnamese, a language with complex tones is used primarily to demonstrate the great facility of NAVLIPI with transcription of tones.
- For clarity, therefore, only the tones of the original Vietnamese transcription are transcribed in NAVLIPI.
- Also for clarity, in the cursive NAVLIPI transcription, the tones are highlighted with small arrows.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Various references are cited herein, the disclosures of which are incorporated by reference in their entireties.

What is claimed is:

1. An article having a surface, wherein said surface contains at least one word having at least one glyph wherein said word comprises one or more phonemic condensates and at least one of: (a) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (b) one or more post-ops indicating tones as used in a tone language; or (c) one or more glyphs selected from the group consisting of: (i) a medio-palatal, unvoiced, unaspirated plosive phone; (ii) a medio-palatal, voiced, unaspirated plosive phone; (iii) a velar, nasal, plosive phone; (iv) a retroflex, nasal, plosive phone; (v) a mediopalatal, nasal, plosive phone; (vi) a standard palatal, nasal, plosive phone; (vii) a retroflex, unvoiced, unaspirated plosive phone; (viii) a retroflex, voiced, unaspirated plosive phone and (ix) velar, voiced fricative; and wherein said article comprises at least one vowel having a phonological classification based on a 3-d matrix consisting of an x-axis, lip position; a y-axis, tongue's or other articulating organs' position; and a z-axis, jaw position.

2. The article according to claim 1, wherein the phonemic condensate is selected from the group consisting of PCON-1 PCON-2, PCON-3, PCON-4, PCON-5, PCON-6, PCON-7, PCON-8, PCON-9, PCON-10, PCON-11, PCON-12, PCON-13, PCON-14, PCON-15, PCON-16, and PCON-17.

3. The article according to claim 1, wherein said post-op comprises PO-1, PO-2, PO-3, PO-4, PO-5, PO-6, PO-7, PO-8, PO-9, PO-10, PO-11, PO-12, PO-13, PO-14, PO-15, PO-16, PO-17, PO-18, PO-19, PO-20, or PO-21.

4. The article according to claim 1, wherein said z-axis, jaw position comprises a (+) z-axis, jaw vertical position and (−) z-axis, jaw horizontal position.

5. The article according to claim 1, wherein said article further comprises at least one non-vowel having a phonological classification based on phonochromaticity, wherein phonochromaticity is the "color" of the phone, and artition, wherein artition is articulation position.

6. The article according to claim 1, wherein said word on said article further comprises at least one of (a) a vowel having a phonological classification consisting of an x-variable, y-variable and z-variable, (b) one or more non-vowels having an artition, and (c) one or more phonochromes.

7. The article according to claim 6, wherein said non-vowel is a semi-vowel.

8. The article according to claim 7, wherein said semi-vowel is selected from the group consisting of a simple semi-vowel, a central semi-vowel and a lateral.

9. A method for providing phonemic information comprising providing the article of claim 1.

10. A language-specific keyboard comprising: (a) A plurality of keys, wherein each key is capable of four representations, wherein one representation is obtained by striking the key, the second representation is obtained by pressing the "Shift" key while striking the key; a third representation is obtained by holding the "Contra" key while striking the key and the fourth representation is obtained by holding the "Alt" key; and (b) an Alt bar at least two times wider than the space bar; wherein said plurality of keys comprises one or more glyphs of a script associated with a selected subset of the plurality of keys, said script comprising one or more phonemic condensates; and wherein said script comprises at least one vowel having a phonological classification based on a 3-d matrix consisting of an x-axis, lip position; a y-axis, tongue's or other articulating organs' position; and a z-axis, jaw position.

11. The keyboard according to claim 10, wherein said language specific keyboard contains keys specific to the following groups of languages selected from the group consisting of (1) Hindi/Spanish/Indonesian; (2) English/French/German/Other non-Spanish European languages; (3) Arabic; (4) Yoruba/Igbo; (5) Mandarin/Cantonese; (6) South African; (7) Tamil.

12. The keyboard according to claim 10, wherein said script further comprises at least one of: (a) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (b) one or more post-ops indicating tones as used in a tone language; or (c) one or more glyphs selected from the group consisting of: (i) a medio-palatal, unvoiced, unaspirated plosive phone; (ii) a medio-palatal, voiced, unaspirated plosive phone; (iii) a velar, nasal, plosive phone; (iv) a retroflex, nasal, plosive phone; (v) a mediopalatal, nasal, plosive phone; (vi) a standard palatal, nasal, plosive phone; (vii) a retroflex, unvoiced, unaspirated plosive phone; (viii) a retroflex, voiced, unaspirated plosive phone and (ix) velar, voiced fricative.

13. The keyboard according to claim 12, wherein at least one of the glyphs of said script are mapped to a subset of standard keys.

14. An apparatus for indicating phonemic information comprising (a) a means for inputting data representing glyphs of a script into the keyboard of claim 12, (b) a processing means coupled to the means for inputting data of (a) for receiving the data inputted and associating the data received with glyphs of the script set forth in the previous paragraph above and (c) a display means for displaying glyphs of the script to indicate phonemic information.

15. A method for providing a teaching aid to a student in thereof comprising providing the apparatus of claim 14.

16. A language specific system for providing phonemic information comprising: (a) the language specific keyboard of claim 10 and (b) language specific processor coupled to said keyboard of (a) which associates selection of a key on said keyboard with a glyph of a script of a language.

17. A method for indicating phonemic information comprising: (A) providing data of a script with an inputting device that comprises one or more phonemic condensates and at least one of: (a) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (b) one or more post-ops indicating tones as used in a tone language; or (c) one or more glyphs selected from the group consisting of: (i) a medio-palatal, unvoiced, unaspirated plosive phone; (ii) a medio-palatal, voiced, unaspirated plosive phone; (iii) a velar, nasal, plosive phone; (iv) a retroflex, nasal, plosive phone; (v) a mediopalatal, nasal, plosive phone; (vi) a standard palatal, nasal, plosive phone; (vii) a retroflex, unvoiced, unaspirated plosive phone; (viii) a retroflex, voiced, unaspirated plosive phone and (ix) velar, voiced fricative; (B) processing the data provided in step (a) with a processing device to associate said data inputted with said glyphs and (C) displaying said glyphs of said script with a display device; and wherein said script comprises at least one vowel having a phonological classification based on a 3-d matrix consisting of an x-axis, lip position; a y-axis, tongue's or other articulating organs' position; and a z-axis, jaw position.

18. The method of claim 17, wherein the inputting device is a keyboard or voice-recognition device.

19. The method according to claim 17, wherein the processing device is a data processing system which optionally comprises a computer readable medium.

20. The method according to claim 19, wherein the computer readable medium embodies instructions for: (a) transcribing phonemic idiosyncrasy by means of phonemic condensates; (b) indicating language of a script and (c) associating a glyph with pressing of a keyboard character key and optionally simultaneous pressing of a keyboard shift, control or alt key.

21. The method according to claim 17, wherein the display device is a computer screen, a smart board, or a poster board.

22. A non-transitory computer readable medium comprising instructions for: (a) transcribing phonemic idiosyncrasy by means of phonemic condensates; (b) indicating language of a script and (c) associating a glyph with pressing of a keyboard character key and optionally simultaneous pressing of a keyboard shift, control or alt key, wherein said glyph is at least one of: (i) one or more phonemic condensates; (ii) one or more post-positional operators ("post-ops"), which indicate aspiration, fricatization, voicing, nasalization, flap, uvular or pharyngeal variant, click ingressive, click egressive, ejective, implosive, a mobile vowel or silent non-vowel; (iii) one or more post-ops indicating tones as used in a tone language; or (iv) one or more glyphs selected from the group consisting of: (A) a medio-palatal, unvoiced, unaspirated plosive phone; (B) a medio-palatal, voiced, unaspirated plosive phone; (C) a velar, nasal, plosive phone; (D) a retroflex, nasal, plosive phone; (E) a mediopalatal, nasal, plosive phone; (F) a standard palatal, nasal, plosive phone; (G) a retroflex, unvoiced, unaspirated plosive phone; (H) a retroflex, voiced, unaspirated plosive phone and (I) velar, voiced fricative; and wherein said script comprises at least one vowel having a phonological classification based on a 3-d matrix consisting of an x-axis, lip position; a y-axis, tongue's or other articulating organs' position; and a z-axis, jaw position.

* * * * *